(12) United States Patent
Zhang et al.

(10) Patent No.: US 11,175,929 B2
(45) Date of Patent: Nov. 16, 2021

(54) USER INTERFACES FOR ENABLING AN ACTIVITY

(71) Applicant: Apple Inc., Cupertino, CA (US)

(72) Inventors: Yongjun Zhang, Sunnyvale, CA (US); Reza Abbasian, Los Gatos, CA (US); Darin Adler, Los Gatos, CA (US); Ada Chan, Cupertino, CA (US); Dana J. Dubois, San Francisco, CA (US); Steven Falkenburg, Los Altos, CA (US); Craig M. Federighi, Los Altos Hills, CA (US); Kenneth Arthur Abraham Ferry, San Francisco, CA (US); Christopher Patrick Foss, San Francisco, CA (US); Sam H. Gharabally, San Carlos, CA (US); Brian Erik Goldberg, San Carlos, CA (US); Nicholas Stephen Doherty, San Francisco, CA (US); Heena Ko, San Francisco, CA (US); Keith P. Kowalczykowski, San Francisco, CA (US); Grant Paul, San Francisco, CA (US); Jeffrey L. Robbin, Los Altos, CA (US); James S. Savage, San Jose, CA (US); Matthew Sibson, Campbell, CA (US); Gurshamnjot Singh, Tracy, CA (US); Caelan G. Stack, Belmont, CA (US); Luming Yin, San Jose, CA (US); Charles H. Ying, San Mateo, CA (US); Mark M. Xue, Beaverton, OR (US); Hengliang Zhang, Cupertino, CA (US); Xiaoyue Zhang, Saratoga, CA (US); Patrick L. Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/030,804

(22) Filed: Sep. 24, 2020

(65) Prior Publication Data

US 2021/0318893 A1 Oct. 14, 2021

Related U.S. Application Data

(60) Provisional application No. 63/032,970, filed on Jun. 1, 2020, provisional application No. 63/022,869, filed
(Continued)

(51) Int. Cl.
*G06F 9/54* (2006.01)
*G06F 3/0488* (2013.01)
(Continued)

(52) U.S. Cl.
CPC ........ *G06F 9/44568* (2013.01); *G06F 3/0488* (2013.01); *G06F 9/54* (2013.01); *H04L 67/2828* (2013.01); *H04L 67/34* (2013.01)

(58) Field of Classification Search
CPC ...... G06F 9/44568; G06F 3/0488; G06F 9/54; H04L 67/34; H04L 67/2828
See application file for complete search history.

(56) References Cited

U.S. PATENT DOCUMENTS 8,661,557 B2* 2/2014 Ellis .................... H04L 67/325
726/28
10,437,611 B2 10/2019 Forstall et al.
(Continued)

FOREIGN PATENT DOCUMENTS

CN 107589887 A 1/2018
EP 2738661 A2 6/2014
(Continued)

OTHER PUBLICATIONS

Applicant-Initiated Interview Summary received for U.S. Appl. No. 17/031,687, dated Mar. 5, 2021, 4 pages.
(Continued)

*Primary Examiner* — Stephen S Hong
*Assistant Examiner* — Ahamed I Nazar
(74) *Attorney, Agent, or Firm* — Dentons US LLP

(57) ABSTRACT

The present disclosure generally relates to user interfaces for enabling an activity using a computer system. In some embodiments, exemplary user interfaces for invoking an activity associated with an application are described. In some embodiments, exemplary user interfaces for customizing displayed content based on circumstances under which the content was invoked are described. In some embodiments, exemplary user interfaces for managing applications that were used to enable activities are described. In some
(Continued)

embodiments, exemplary user interfaces for managing settings for applications used to enable activities are described.

26 Claims, 91 Drawing Sheets

Related U.S. Application Data on May 11, 2020, provisional application No. 63/008,586, filed on Apr. 10, 2020.

(51) Int. Cl.
*G06F 9/445* (2018.01)
*H04L 29/08* (2006.01)

(56) References Cited

U.S. PATENT DOCUMENTS

| | | | |
|---|---|---|---|
| 10,496,705 B1* | 12/2019 | Irani | G06F 9/451 |
| 2007/0244872 A1 | 10/2007 | Hancock | |
| 2008/0004888 A1 | 1/2008 | Davis et al. | |
| 2010/0262928 A1 | 10/2010 | Abbott | |
| 2011/0093567 A1 | 4/2011 | Jeon et al. | |
| 2012/0158545 A1 | 6/2012 | Chen et al. | |
| 2013/0132941 A1 | 5/2013 | Lindeman et al. | |
| 2013/0166332 A1 | 6/2013 | Hammad | |
| 2013/0290203 A1 | 10/2013 | Purves et al. | |
| 2013/0311600 A1* | 11/2013 | McDiarmid | H04L 67/10 709/217 |
| 2014/0074605 A1 | 3/2014 | Sanchez et al. | |
| 2014/0172627 A1 | 6/2014 | Levy et al. | |
| 2014/0201681 A1 | 7/2014 | Mahaffey et al. | |
| 2014/0229863 A1 | 8/2014 | St. Clair | |
| 2014/0259017 A1 | 9/2014 | Murray et al. | |
| 2014/0351744 A1 | 11/2014 | Jeon et al. | |
| 2015/0081764 A1 | 3/2015 | Zhao et al. | |
| 2015/0127774 A1* | 5/2015 | Hitomi | G06F 21/105 709/219 |
| 2015/0199727 A1 | 7/2015 | Naveh | |
| 2015/0348001 A1* | 12/2015 | Van Os | G06Q 20/322 705/44 |
| 2015/0370456 A1 | 12/2015 | Kobayashi et al. | |
| 2016/0005038 A1 | 1/2016 | Kamal et al. | |
| 2016/0019547 A1 | 1/2016 | Gurnani et al. | |
| 2016/0026253 A1 | 1/2016 | Bradski et al. | |
| 2016/0063473 A1 | 3/2016 | Lee | |
| 2016/0162270 A1* | 6/2016 | Kumar | G06F 3/0488 717/177 |
| 2016/0163052 A1 | 6/2016 | Kim | |
| 2016/0191355 A1 | 6/2016 | Joshi et al. | |
| 2016/0244311 A1 | 8/2016 | Burks et al. | |
| 2016/0292291 A1 | 10/2016 | Yan | |
| 2016/0334966 A1 | 11/2016 | Kim et al. | |
| 2016/0371686 A1 | 12/2016 | Metral | |
| 2017/0127230 A1 | 5/2017 | Enriquez et al. | |
| 2017/0161716 A1 | 6/2017 | Hurley et al. | |
| 2017/0164159 A1 | 6/2017 | Mycek et al. | |
| 2017/0278150 A1 | 9/2017 | Tucker | |
| 2017/0357387 A1 | 12/2017 | Clarke | |
| 2018/0063684 A1 | 3/2018 | Cheng et al. | |
| 2018/0165002 A1* | 6/2018 | Yang | G06F 3/04847 |
| 2018/0288564 A1 | 10/2018 | Ellis et al. | |
| 2018/0335903 A1* | 11/2018 | Coffman | G06F 3/0482 |
| 2019/0171441 A1 | 6/2019 | Chatterjee et al. | |
| 2019/0339840 A1 | 11/2019 | Park et al. | |
| 2020/0090157 A1* | 3/2020 | Khan | G06Q 20/3267 |

FOREIGN PATENT DOCUMENTS

| | | |
|---|---|---|
| WO | 2013/006654 A2 | 1/2013 |
| WO | 2016/167620 A1 | 10/2016 |
| WO | 2017/027526 A1 | 2/2017 |
| WO | 2019/092435 A1 | 5/2019 |

OTHER PUBLICATIONS

Final Office Action received for U.S. Appl. No. 17/031,687, dated Mar. 24, 2021, 32 pages.
Applicant-Initiated Interview Summary received for U.S. Appl. No. 14/960,279, dated Nov. 17, 2020, 4 pages.
Search Report and Opinion received for Danish Patent Application No. PA202070634, dated Jan. 6, 2021, 9 pages.
Non-Final Office Action received for U.S. Appl. No. 17/031,687, dated Dec. 21, 2020, 28 pages.
Search Report and Opinion received for Danish Patent Application No. PA202070633, dated Dec. 21, 2020, 10 pages.
Storehub, "QR Table Ordering and Cashback—Beep Order & Cashback", Available online on: <https://www.youtube.com/watch?v=TCukF45kOU8&ab_channel=StoreHub>, Jul. 25, 2019, 3 pages.
Final Office Action received for U.S. Appl. No. 14/960,279, dated Feb. 9, 2021, 26 pages.
Advisory Action received for U.S. Appl. No. 14/960,279, dated Apr. 13, 2021, 3 pages.
Applicant-Initiated Interview Summary received for U.S. Appl. No. 17/031,687, dated May 28, 2021, 4 pages.
Office Action received for Australian Patent Application No. 2020239759, dated Jun. 3, 2021, 6 pages.
Office Action received for Danish Patent Application No. PA202070634, dated Jun. 4, 2021, 3 pages.
Android Developers, "Android App Bundle", Online available at: http://web.archive.org/web/20200303021924/https:/developer.android.com/platform/technology/app-bundle, Mar. 3, 2020, 5 pages.
Android Developers, "Deliver features on-demand with dynamic features", Online available at: https://www.youtube.com/watch?v=httqEshsBk, May 23, 2018, 3 pages.
Howtoinstall, "How to Download and Install Winamp 5.6 on Windows 2017", Online available at: https://www.youtube.com/watch?v=-6YDT9UkuEg, Oct. 17, 2017, 3 pages.
Office Action received for Danish Patent Application No. PA202070633, dated May 6, 2021, 6 pages.
Invitation to Pay Additional Fees received for PCT Patent Application No. PCT/US2021/025051, dated Jul. 28, 2021, 17 pages.
Office Action received for Australian Patent Application No. 2020239747, dated Jul. 29, 2021, 9 pages.
International Search Report and Written Opinion received for PCT Patent Application No. PCT/US2021/025051, dated Sep. 23, 2021, 21 pages.

* cited by examiner

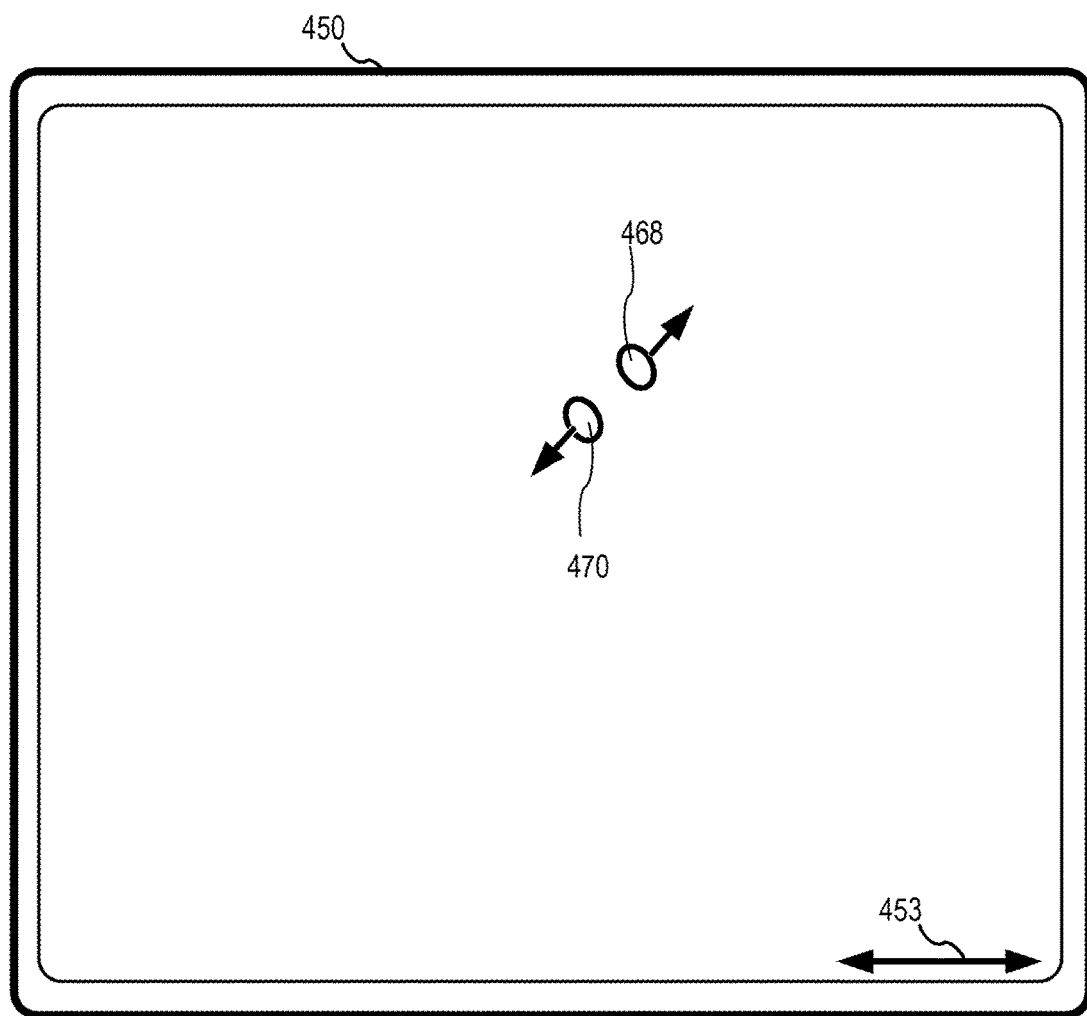
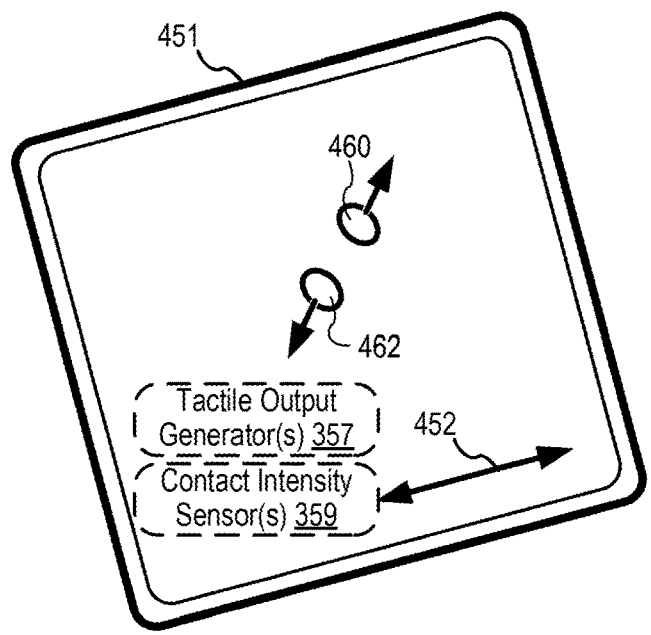
*FIG. 4B*

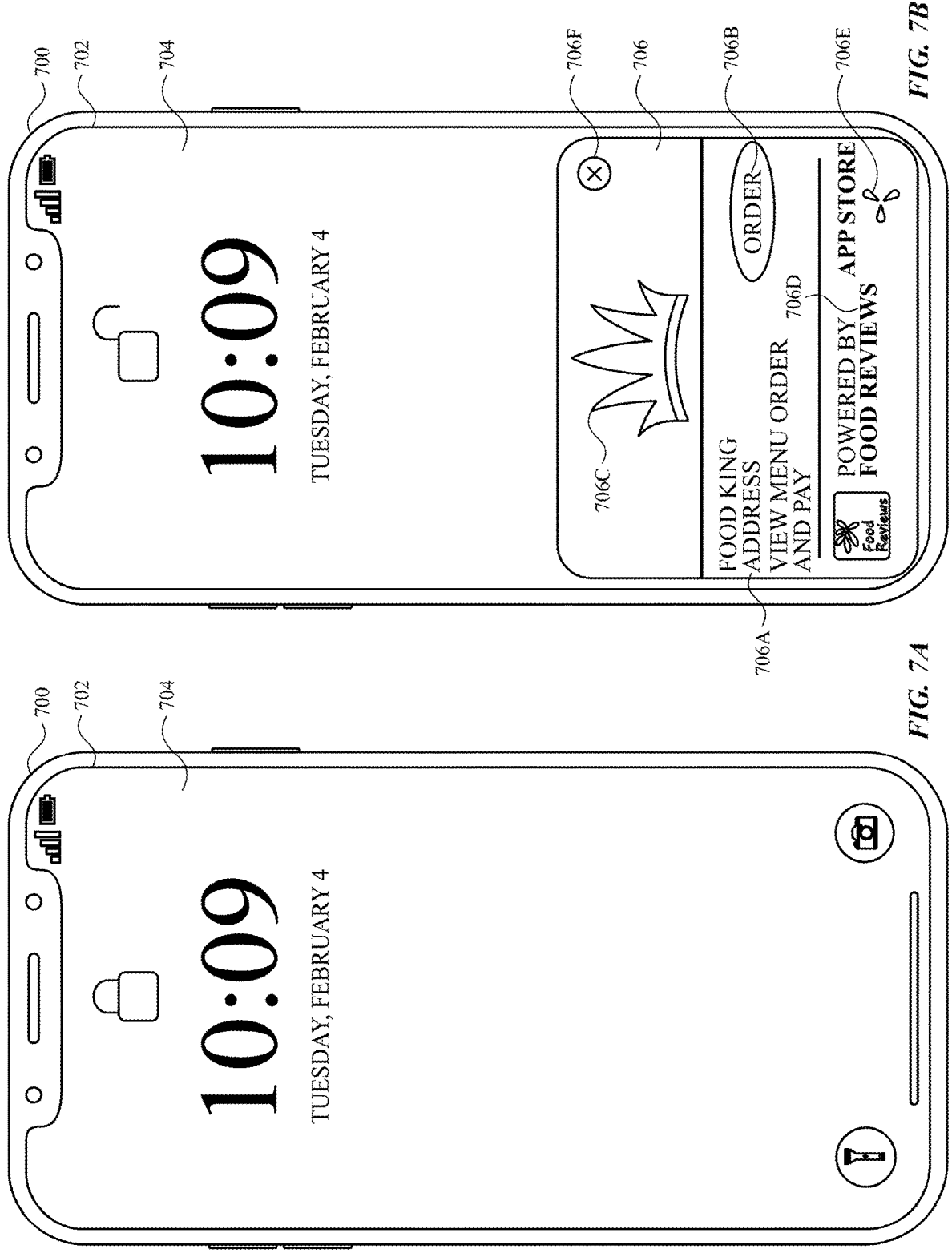

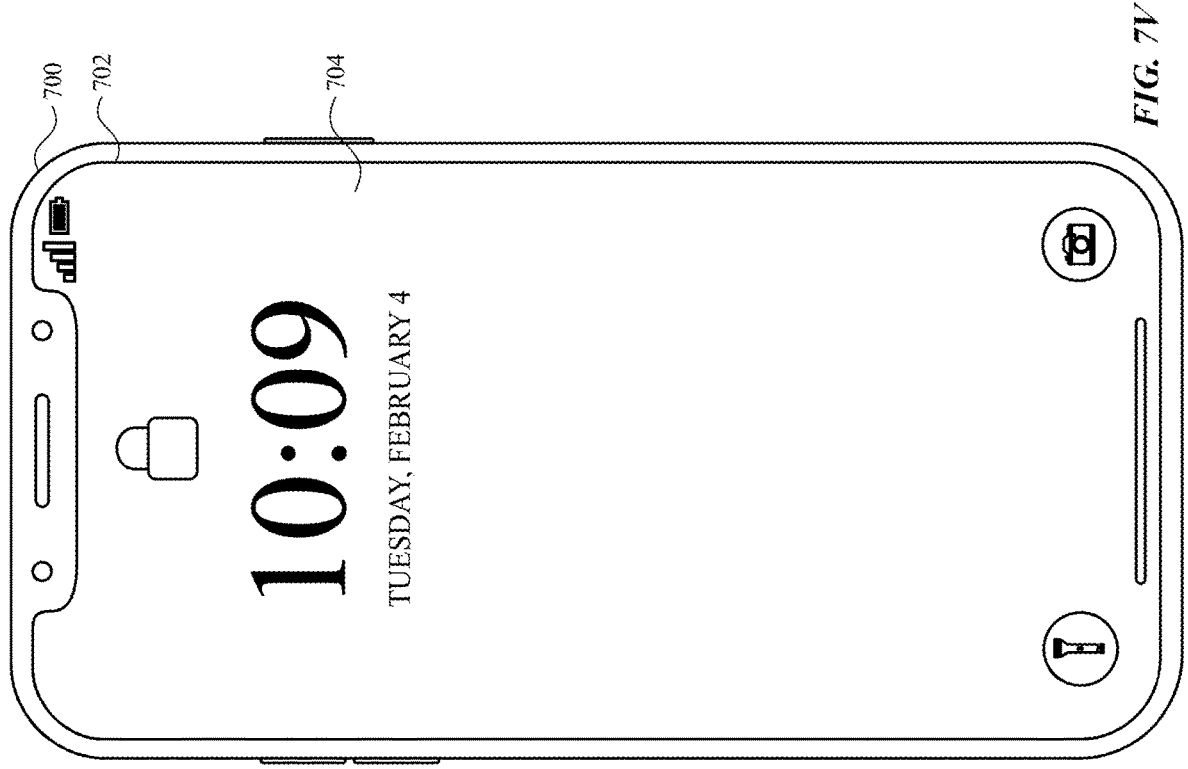
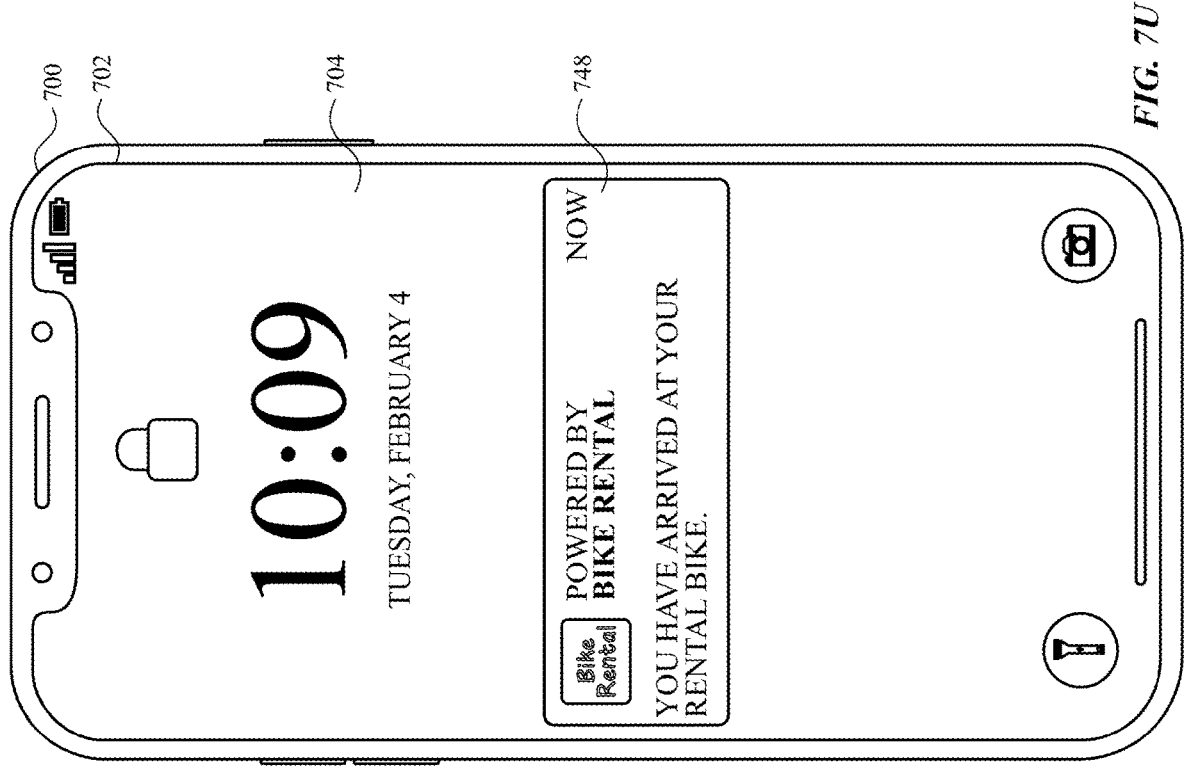

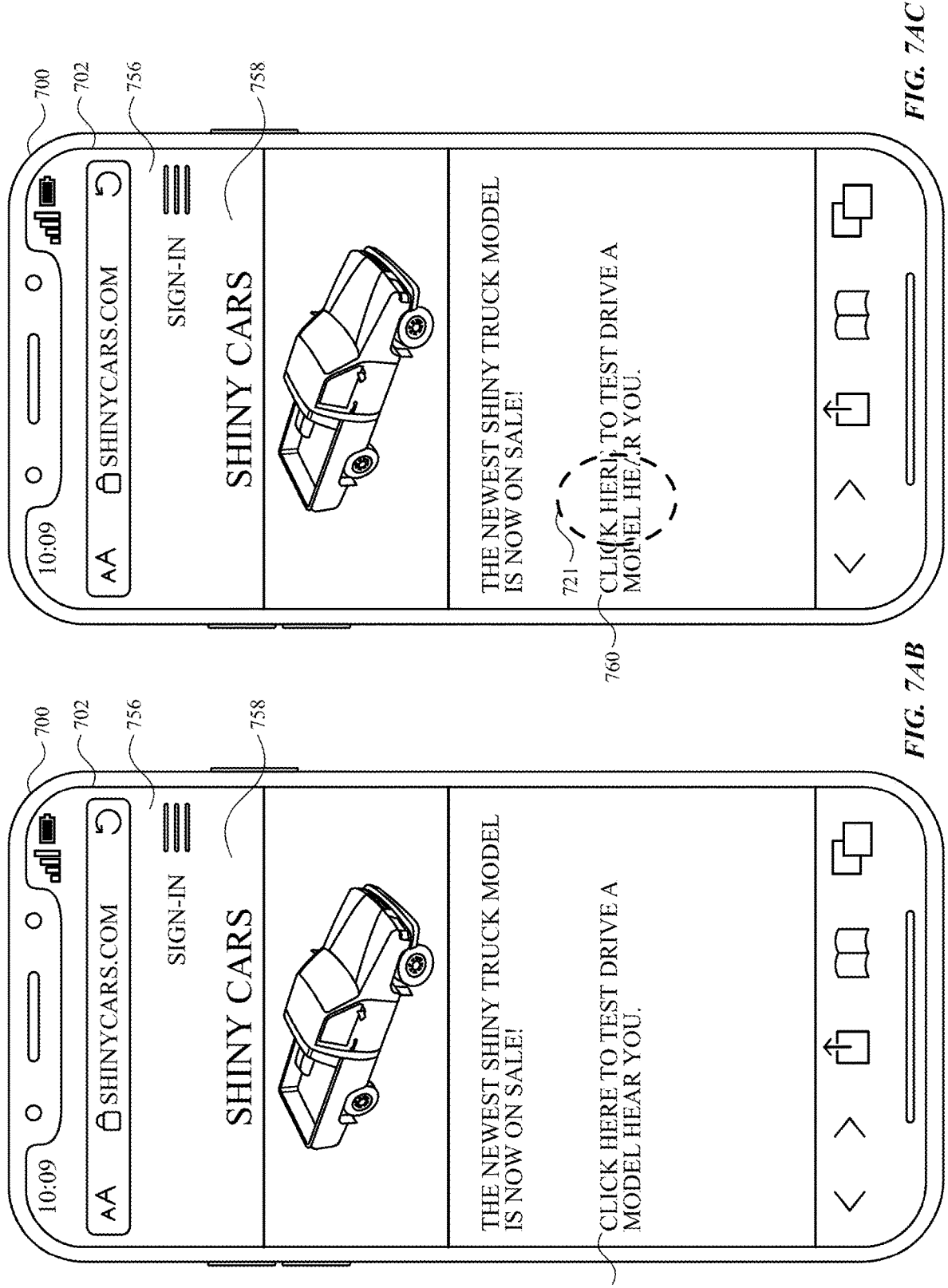

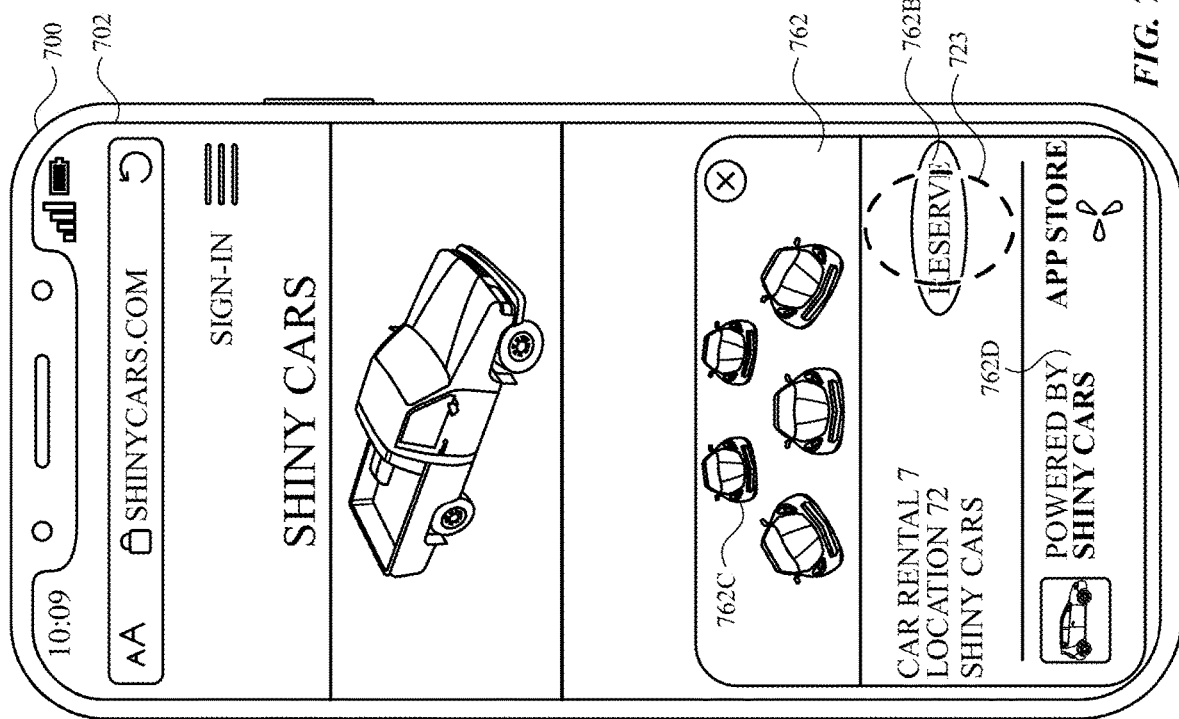

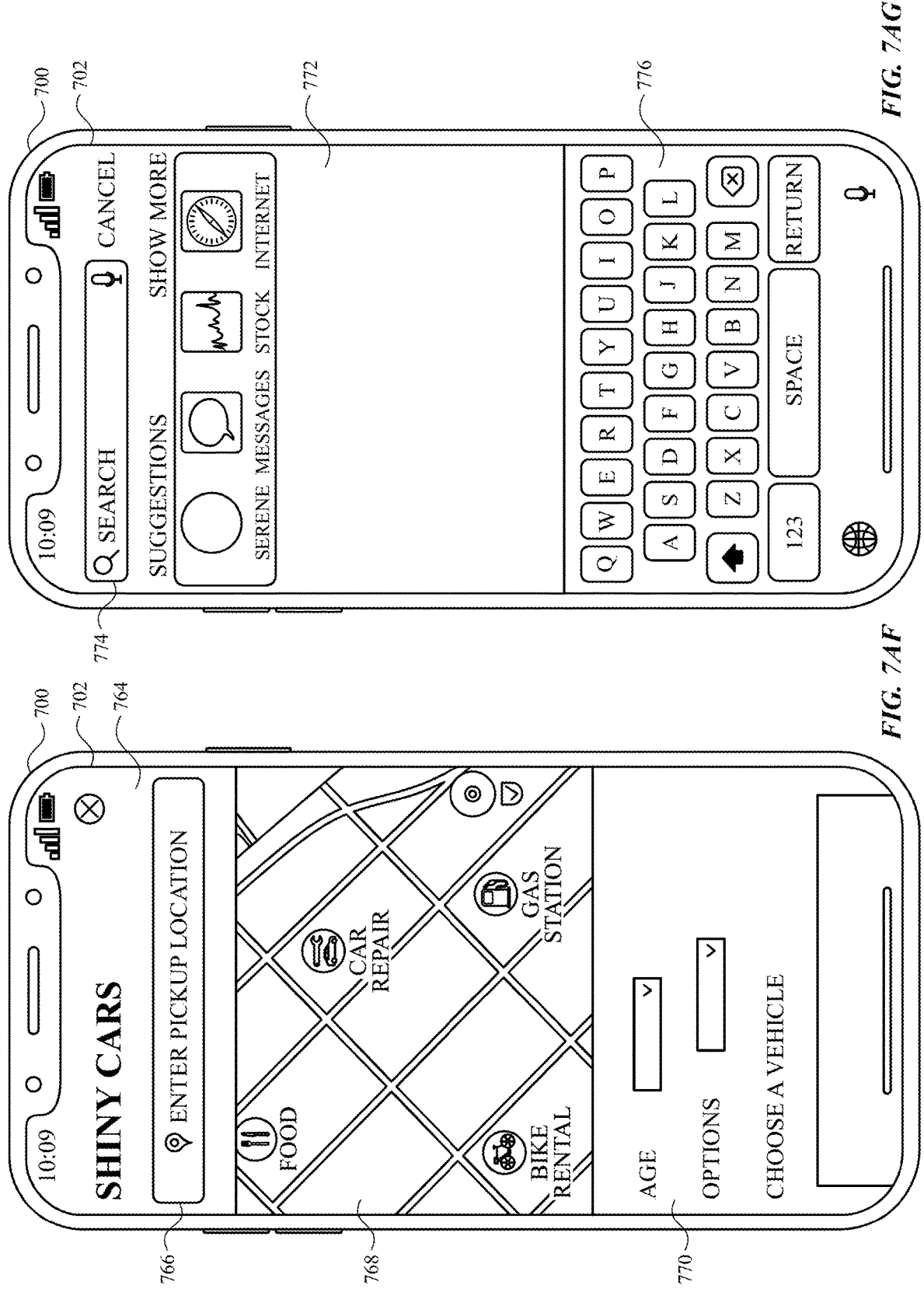

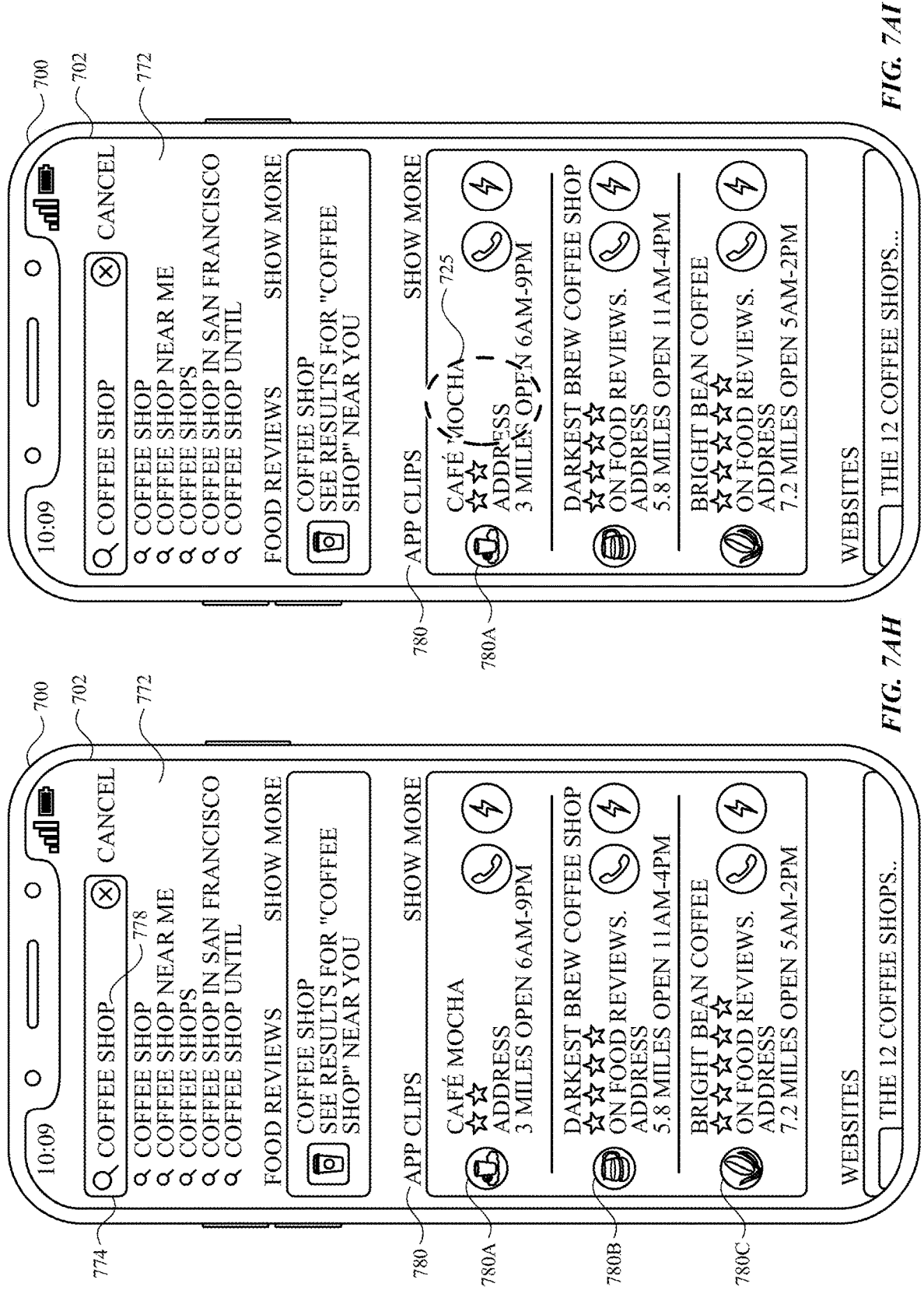

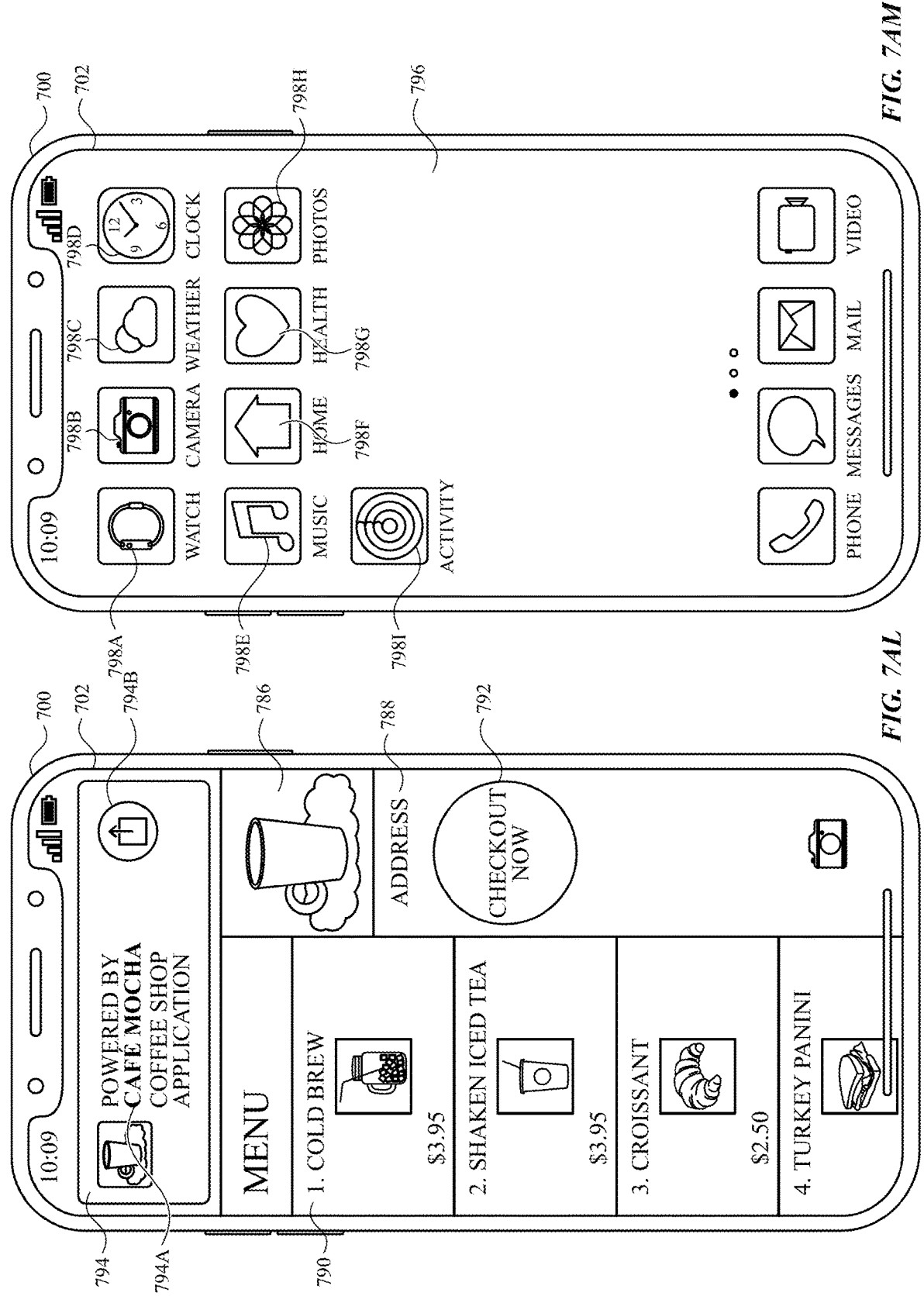

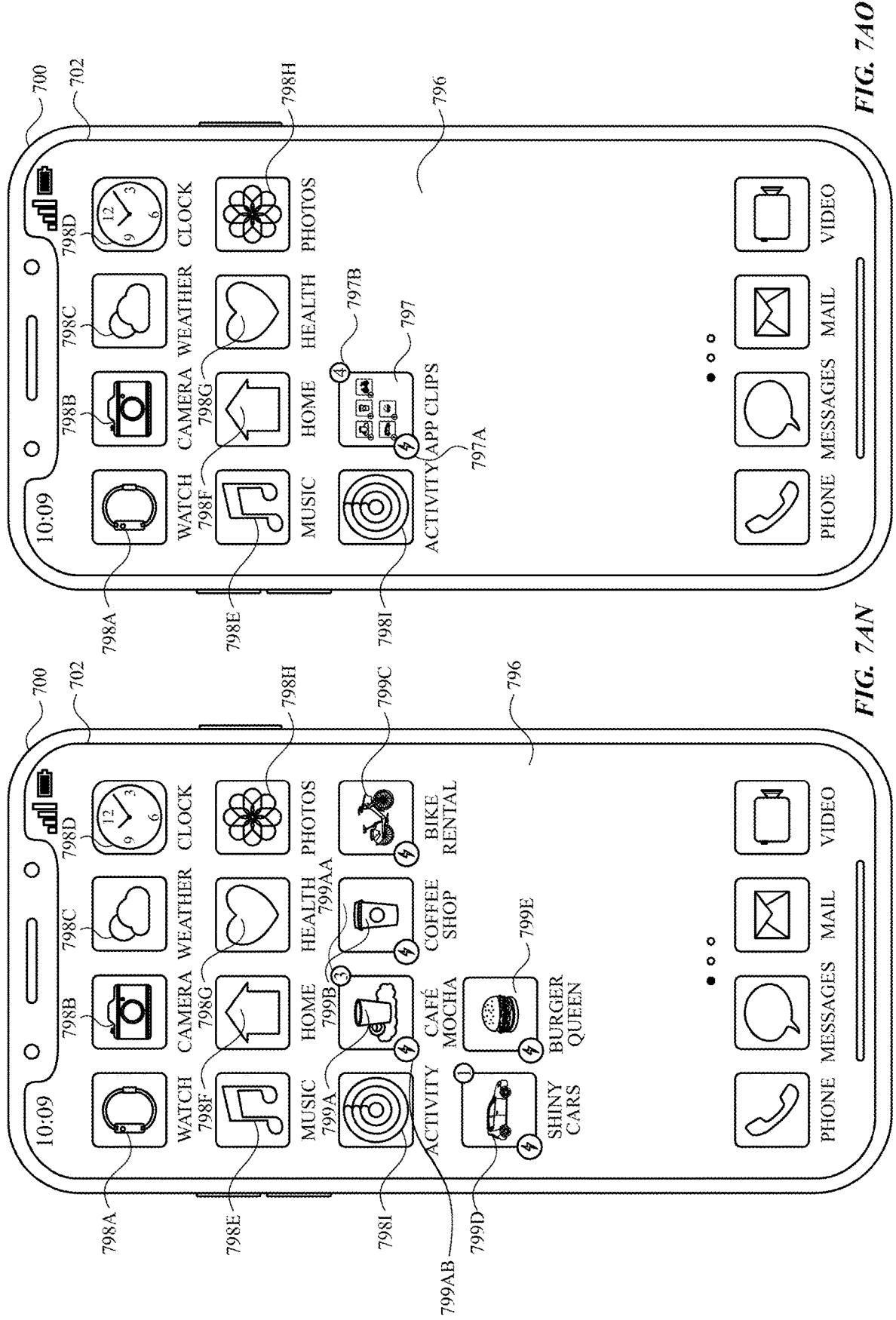

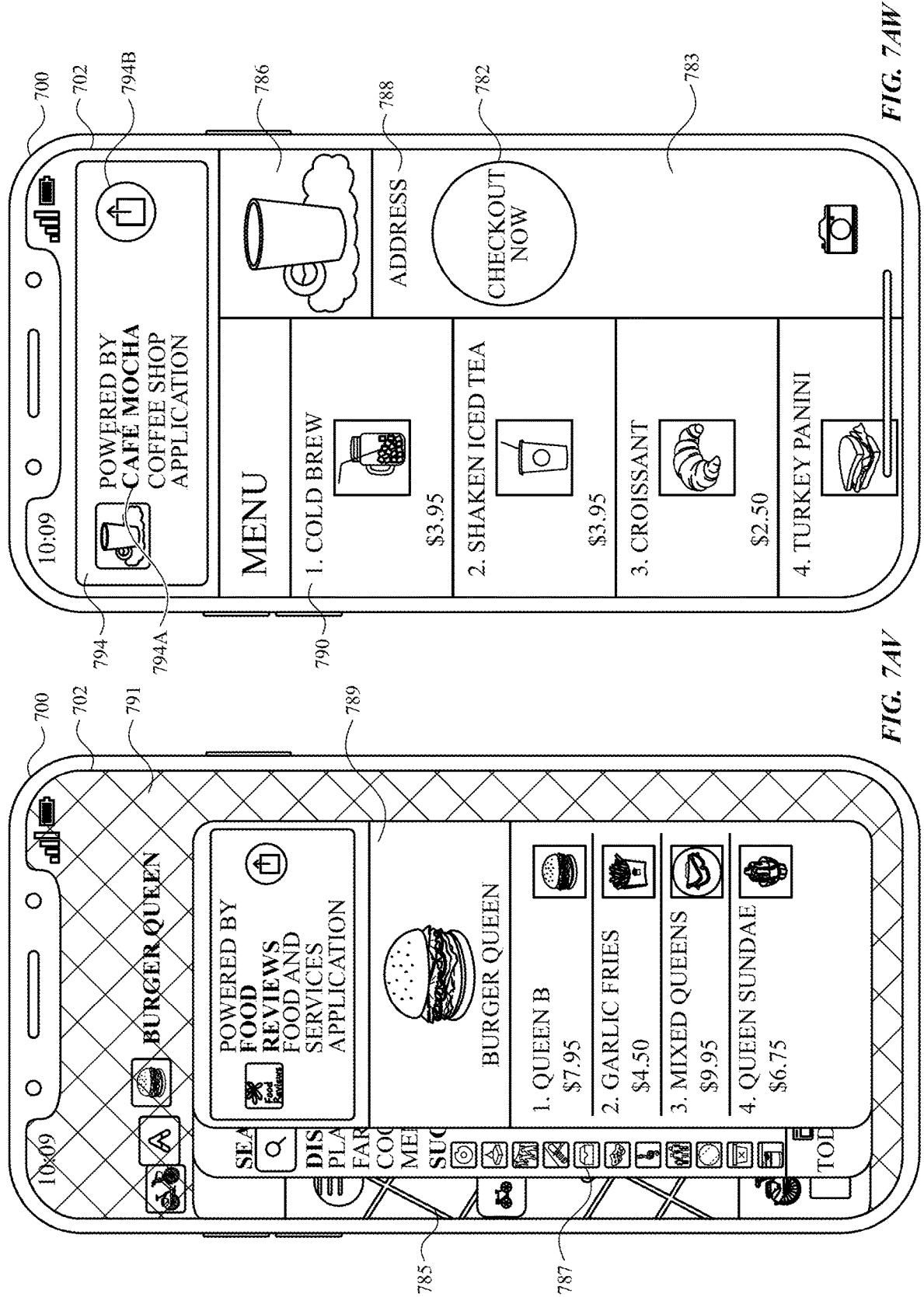

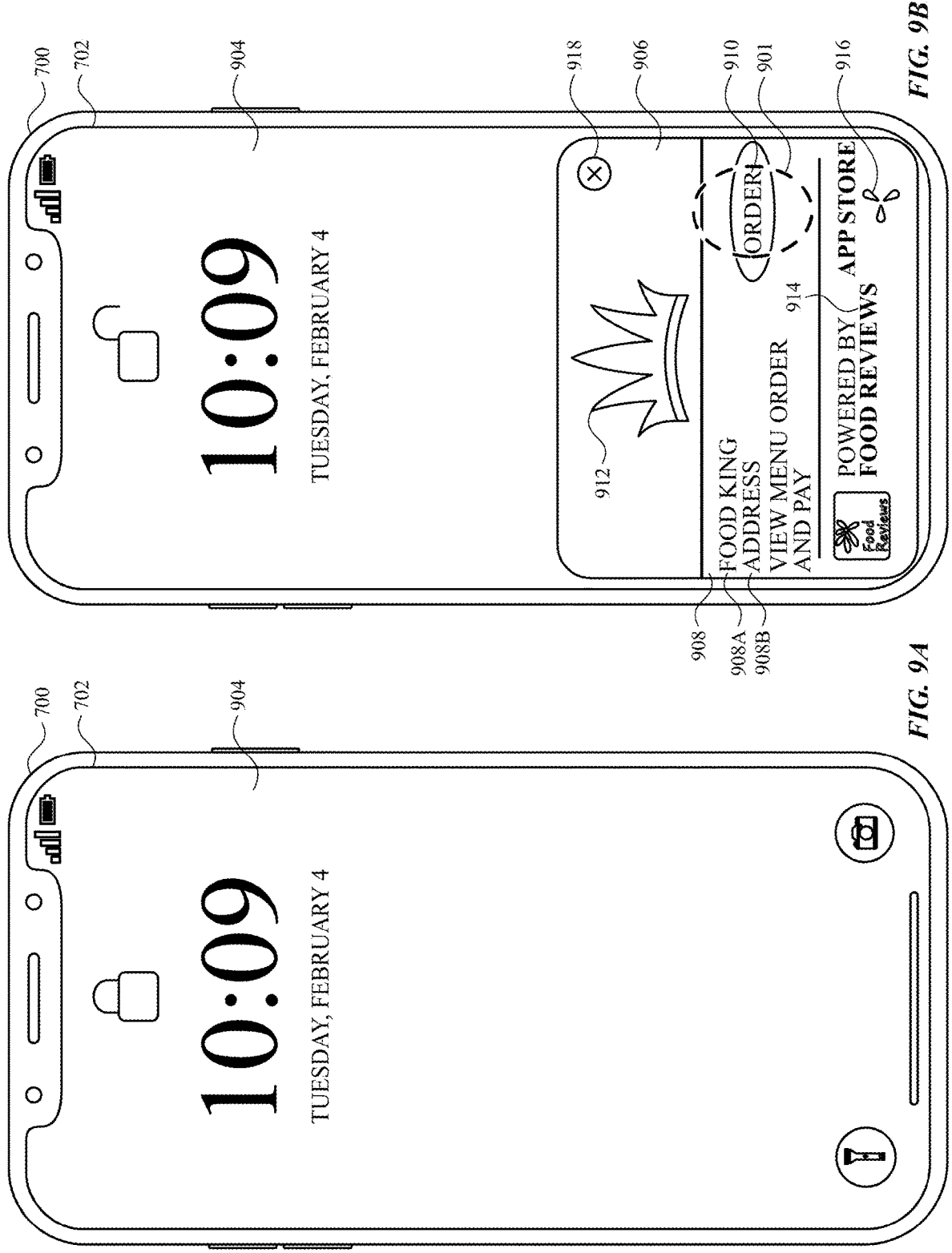

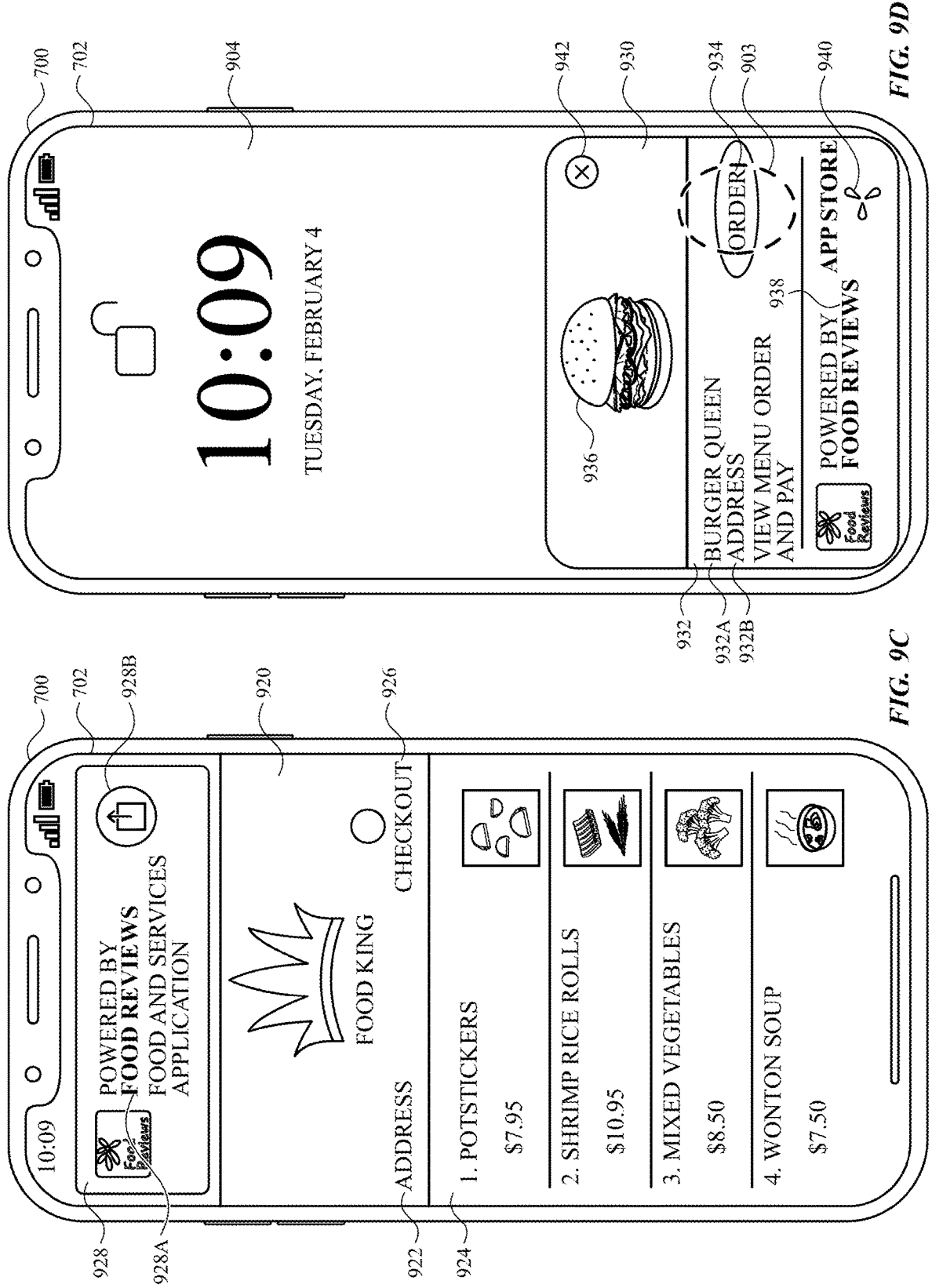

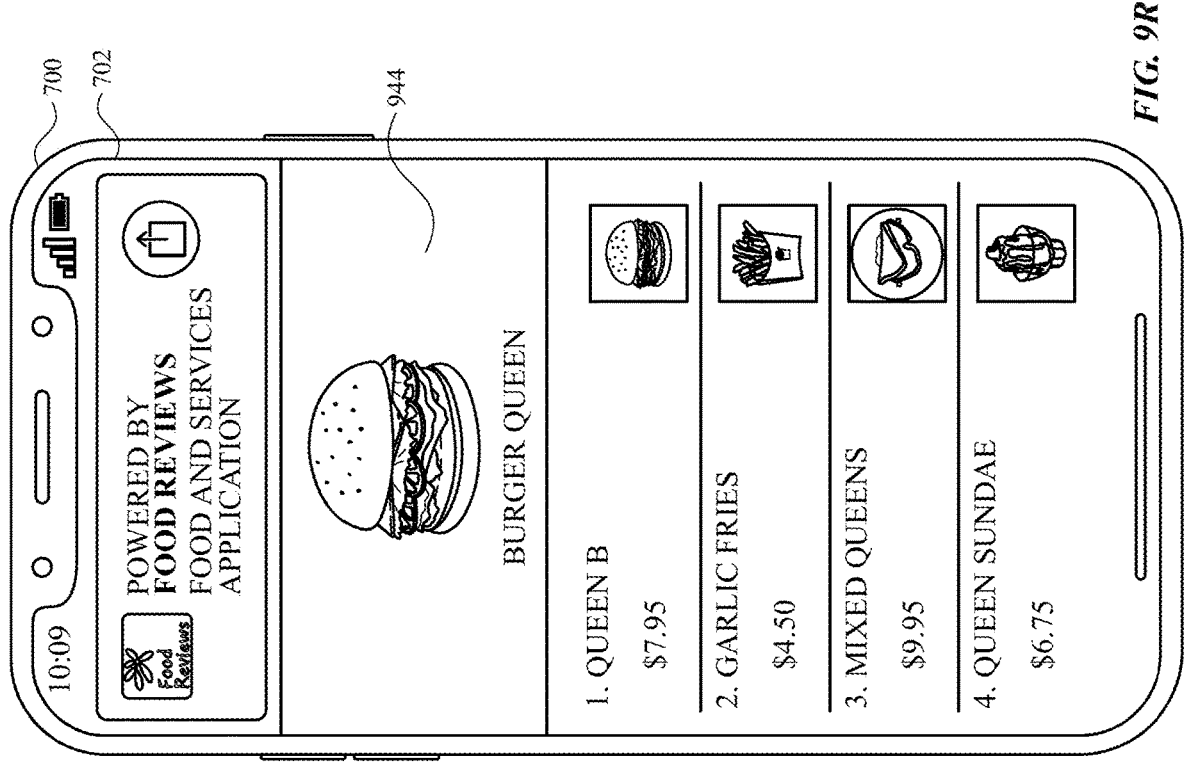
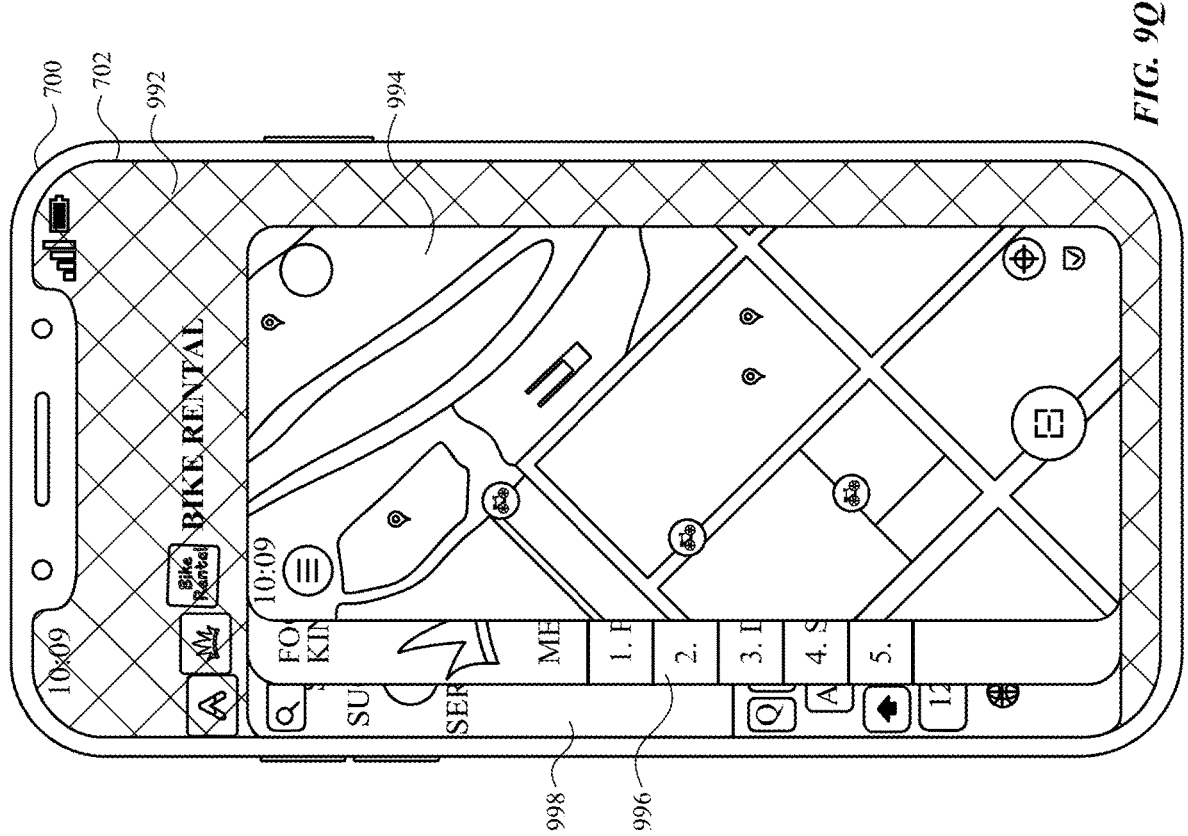
FIG. 9R
FIG. 9Q

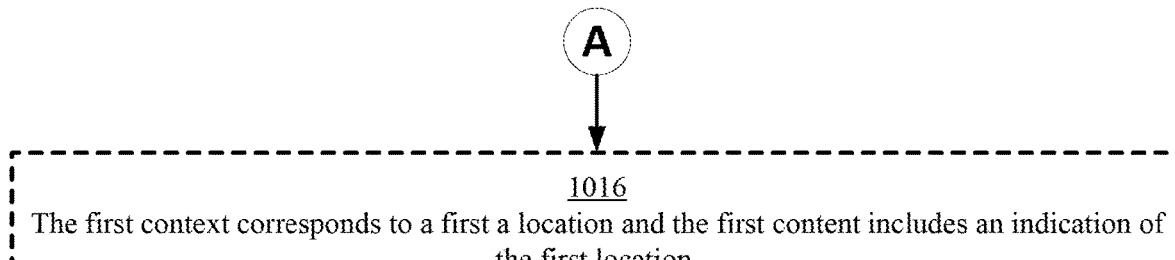
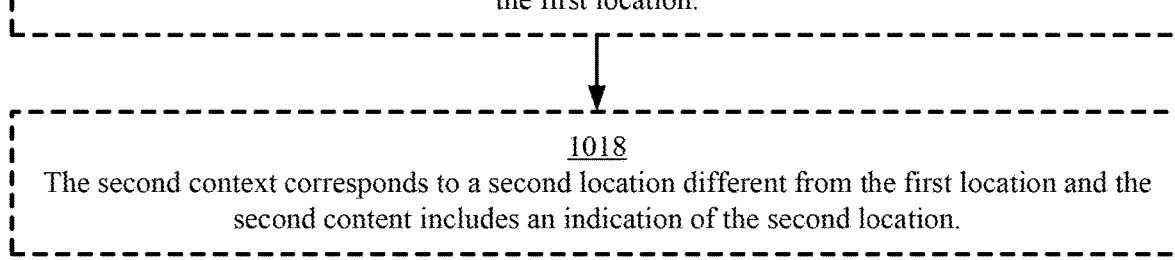
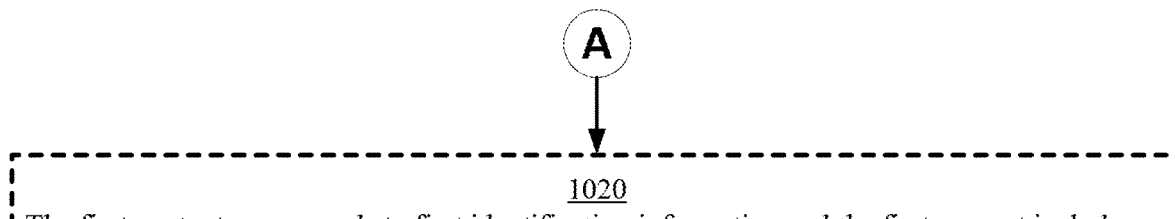
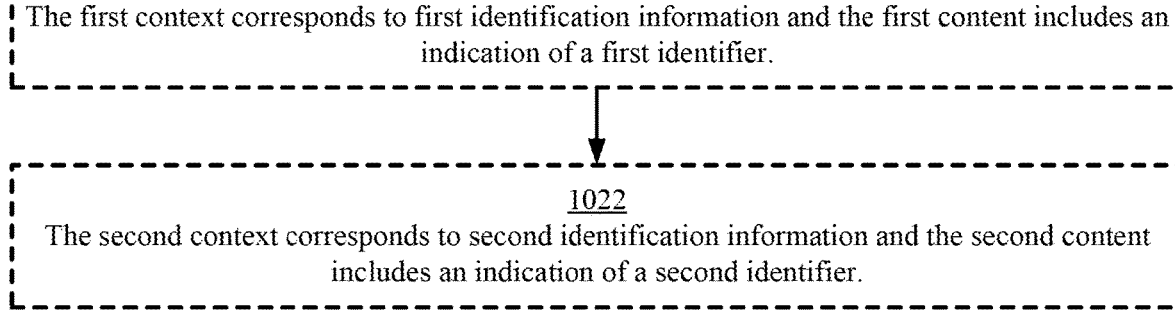
FIG. 10B

```
┌─────────────────────────────────────────────────────────────────────┐
│                               1024                                  │
│  Subsequent to displaying the first user interface corresponding to the first application: │
│   ┌───────────────────────────────────────────────────────────────┐ │
│   │                          1026                                 │ │
│   │ Detect, via the one or more input devices, a second request to invoke the first │ │
│   │ application, wherein the second request is detected after at least a predetermined time │ │
│   │                         period.                               │ │
│   └───────────────────────────────────────────────────────────────┘ │
└─────────────────────────────────────────────────────────────────────┘
                                  │
                                  ▼
┌─────────────────────────────────────────────────────────────────────┐
│                               1028                                  │
│  In response to detecting the second request to invoke the first application: │
│   ┌───────────────────────────────────────────────────────────────┐ │
│   │                          1030                                 │ │
│   │ Display, via the display generation component, the first user interface corresponding to │ │
│   │ the first application, wherein displaying the first user interface includes displaying, in the │ │
│   │ first user interface, third content, different from the first content and the second content, │ │
│   │            in the respective region of the first user interface. │ │
│   └───────────────────────────────────────────────────────────────┘ │
└─────────────────────────────────────────────────────────────────────┘
```

```
┌─────────────────────────────────────────────────────────────────────┐
│                               1032                                  │
│  The first user interface corresponds to a first vendor, and displaying the first user interface │
│  includes displaying, via the display generation component, an indication of an entity that created │
│           the first application used to display the first user interface. │
└─────────────────────────────────────────────────────────────────────┘
```

*FIG. 10C*

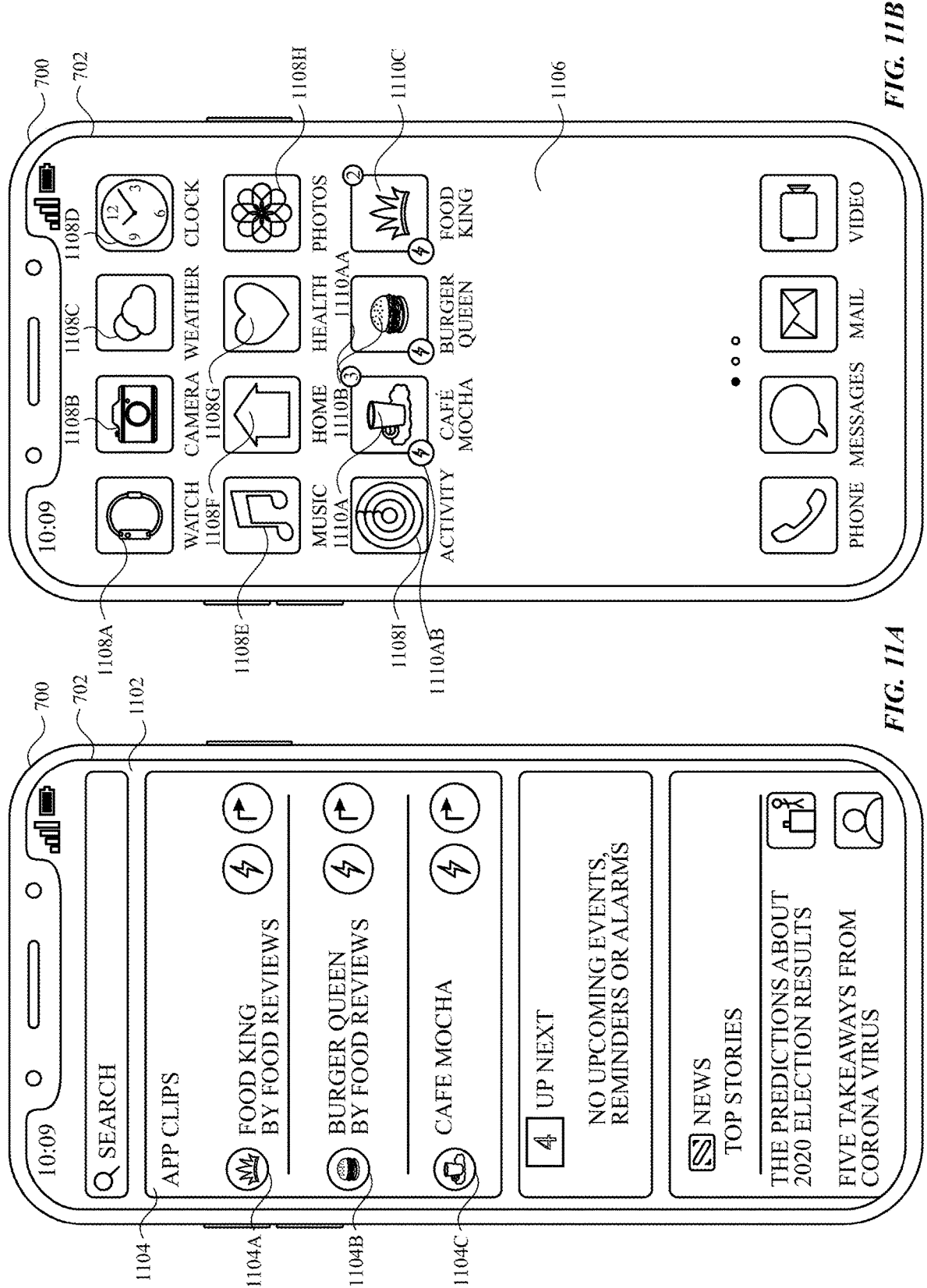

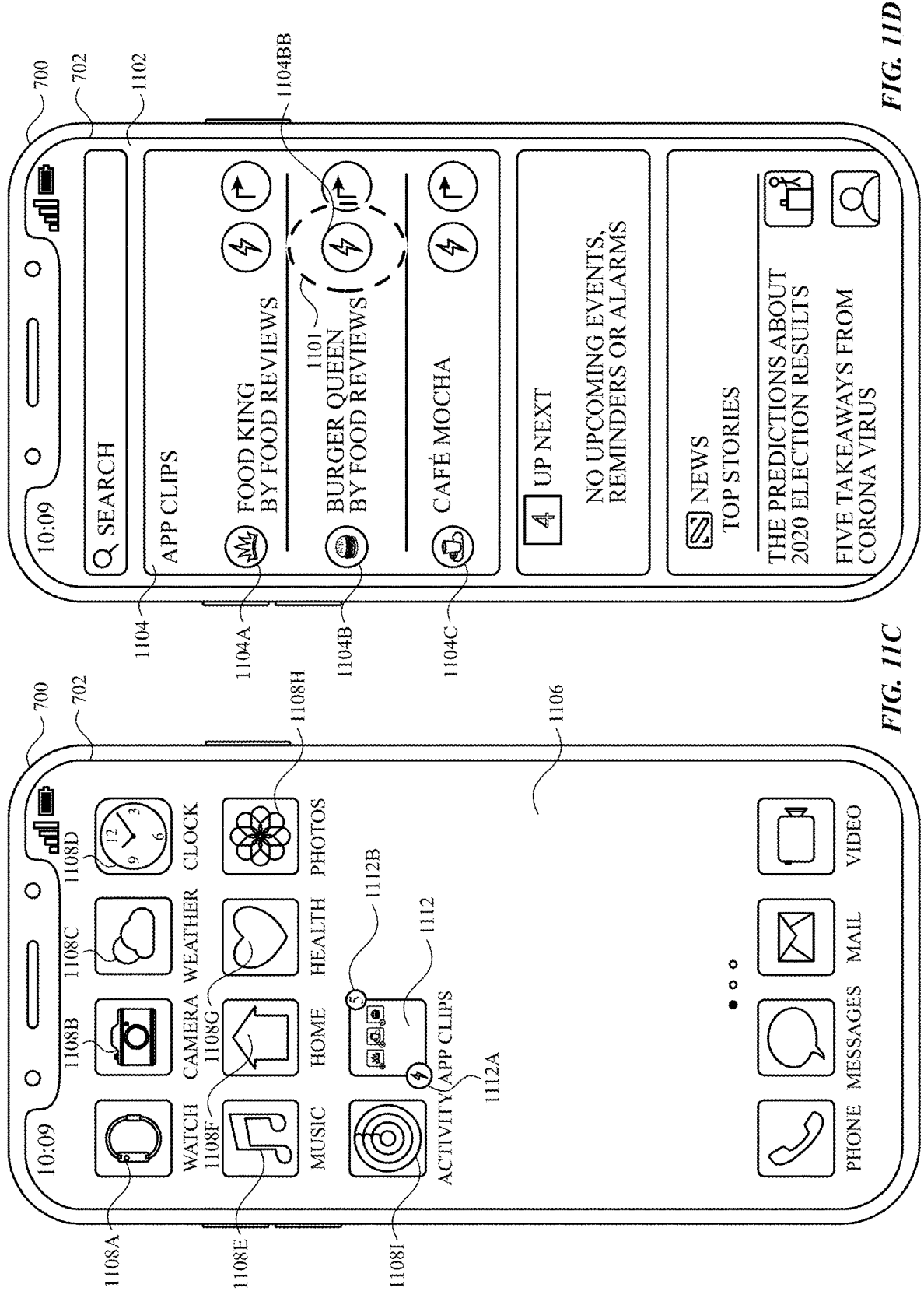

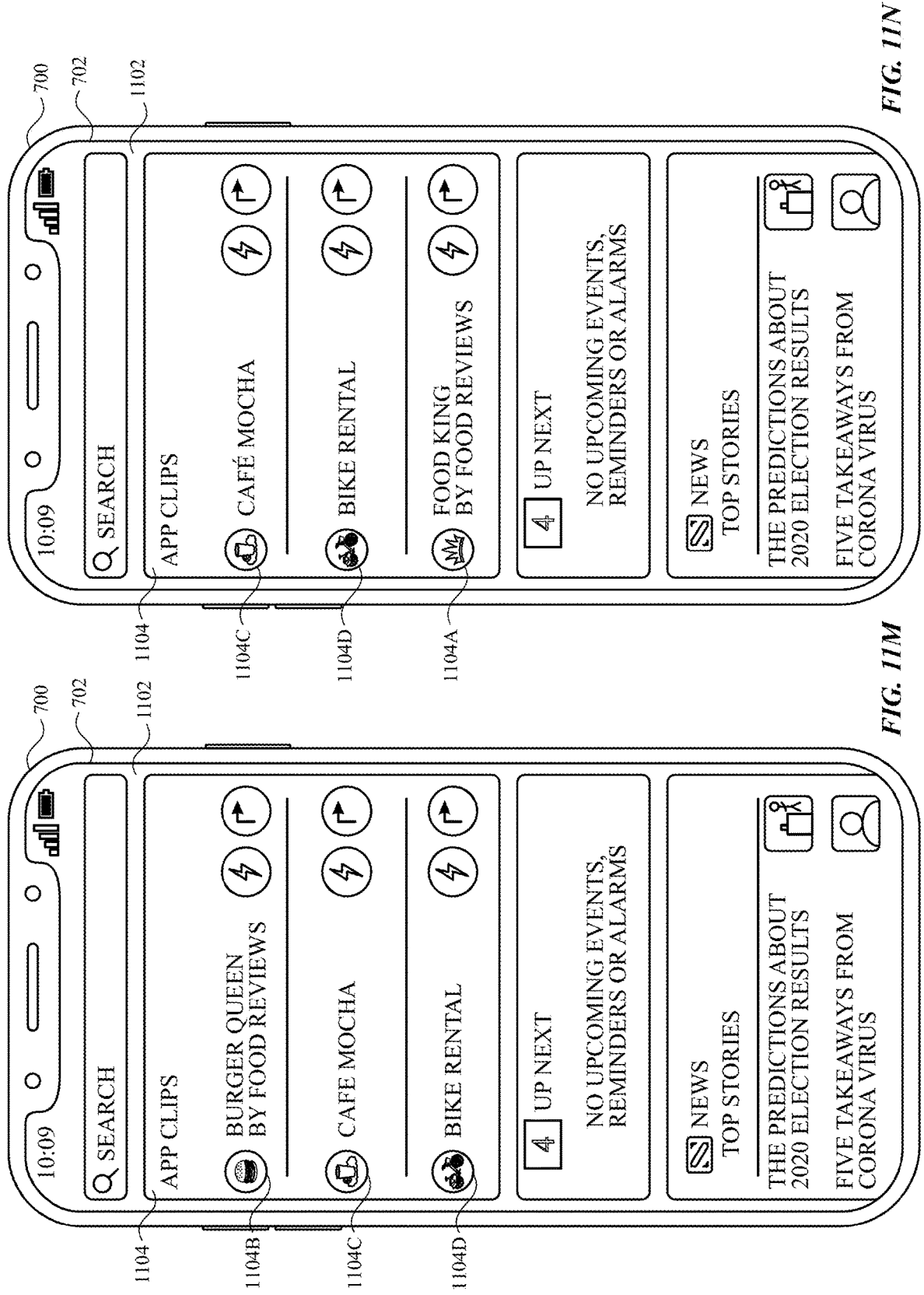

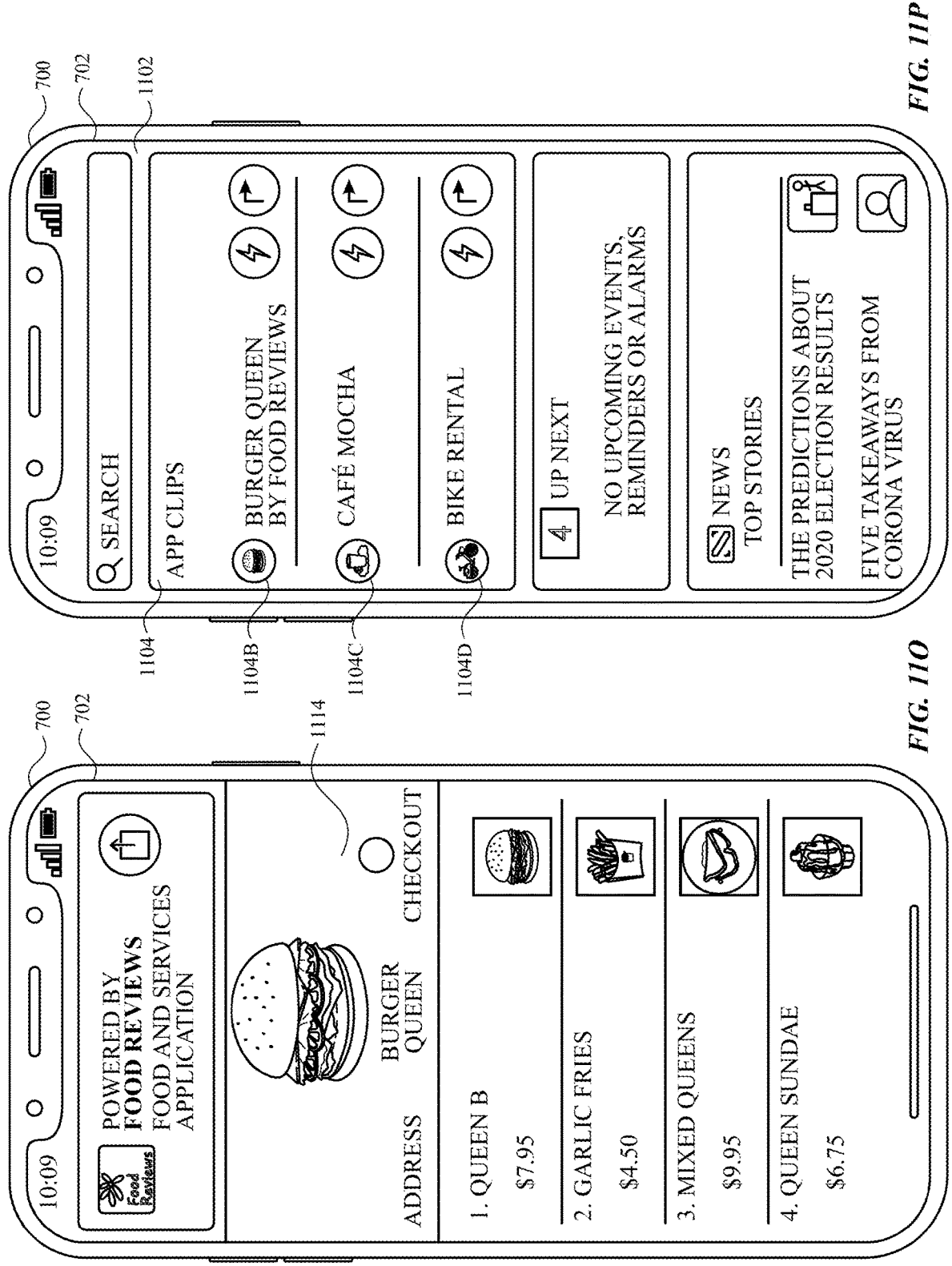

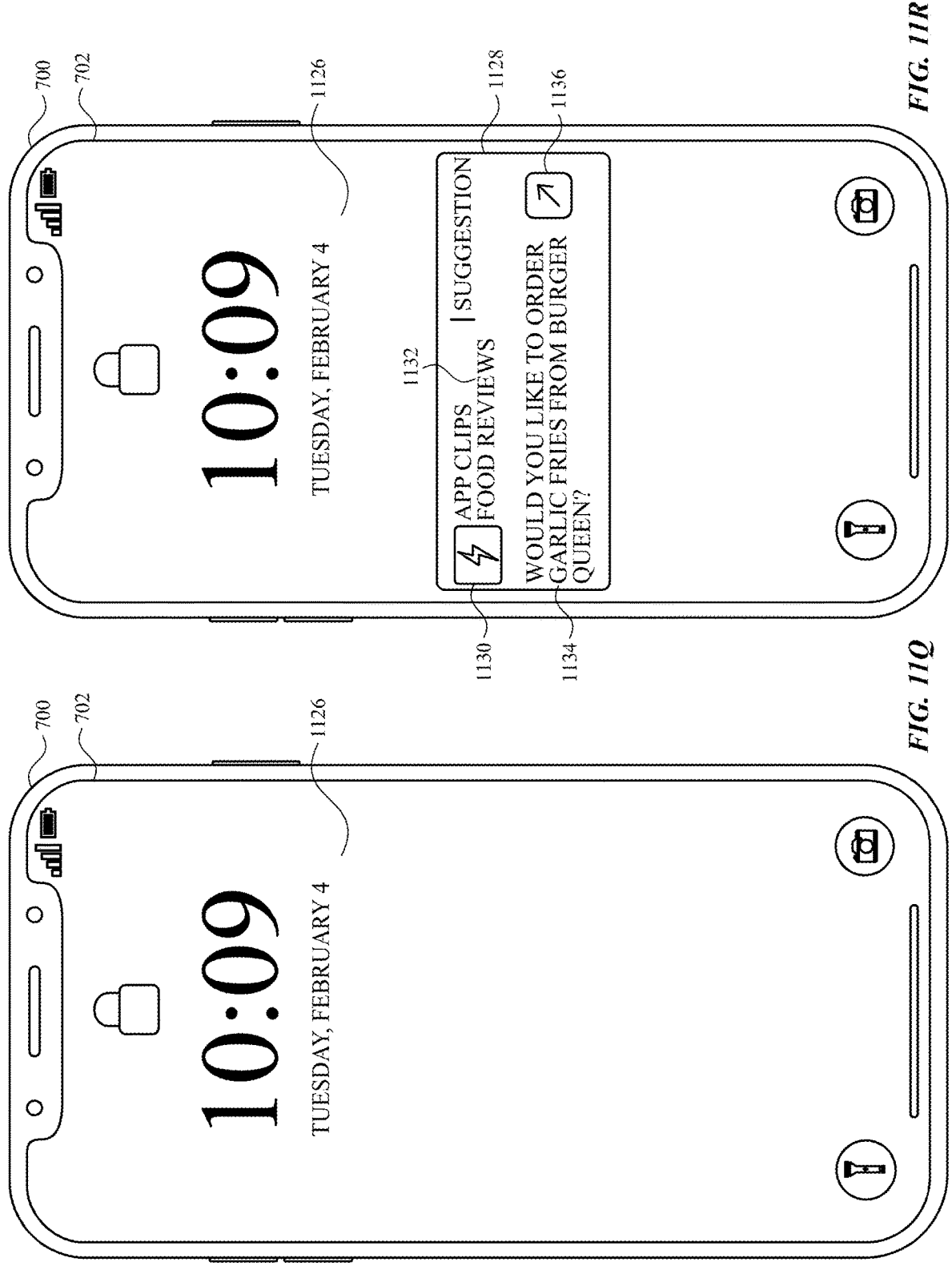

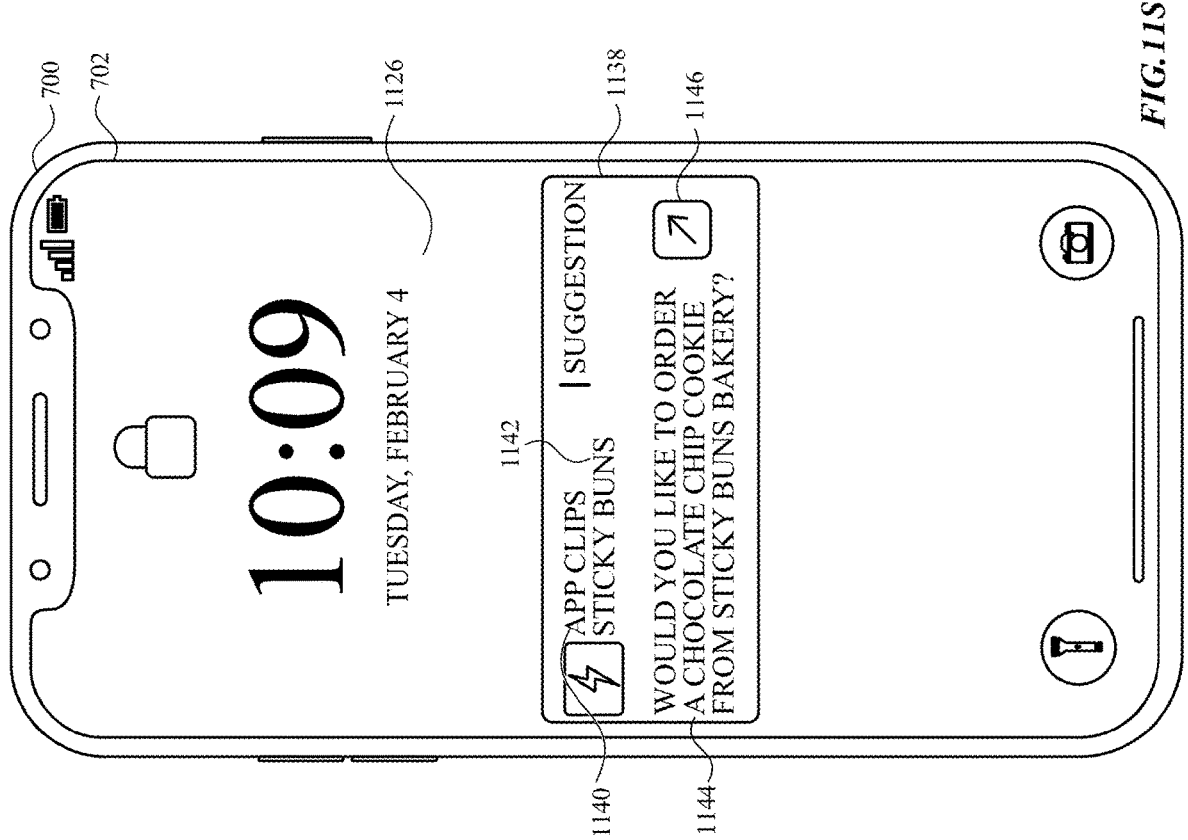

1200

1202
Over a period of time, accumulate a plurality of automatically downloaded applications that were downloaded automatically to assist in performing contextually relevant tasks, wherein the plurality of applications include a first application with first usage information and a second application with second usage information.

1204
The plurality of automatically downloaded applications are, once downloaded, stored on the computer system.

1206
After the plurality of applications have been downloaded automatically:

1208
Receive, via the one or more input devices, a request to display representations of automatically downloaded applications that are available on the computer system.

1210
In response to receiving the request:

1212
Display, via the display generation component, a user interface for accessing the automatically downloaded applications, wherein the user interface provides access to a subset of the plurality of automatically downloaded applications that excludes one or more applications that do not meet respective usage criteria.

1214
In accordance with a determination that the first usage information meets the respective usage criteria, the subset of the plurality of automatically downloaded applications includes the first application.

1402
Detect the occurrence of a triggering condition for initiating an activity that is associated with a first application.

1404
While the first application is not installed on the computer system:

1406
Install, on the computer system and based on the detected triggering condition, a second application that is configured to perform the activity without downloading at least a portion of the first application.

1408
Set one or more system privileges for the second application.

1410
After setting the one or more system privileges for the second application, install, on the computer system, the first application.

1412
After installing the first application on the computer system:

1414
In accordance with a determination that the second application was installed on the computer system when installing the first application occurred, set one or more system privileges for the first application based on the one or more system privileges for the second application.

1416
In accordance with a determination that the second application was not installed on the computer system when installing the first application occurred, set the one or more system privileges for the first application based on default system privileges.

1418
The one or more system privileges for the second application exclude permission for persistent access to location information.

1420
The one or more system privileges for the second application include a first type of permission and exclude a second type of permission different from the first type of permission.

1422
The one or more system privileges for the second application include one or more of: permission for access to a camera, permission for access to a microphone, permission for access to Bluetooth, or permission for access to location information.

B

1424
After the first application has been installed and after the second application was granted permission for access to location information:

1426
Detect the occurrence of a condition under which the first application has a use for location information.

1428
In response to detecting the occurrence of the condition under which the first application has a use for location information:

1430
In accordance with the determination that the one or more system privileges for the second application do not include the indication that permission for access to location information has been denied, display a request for permission for access to location information by the first application.

*FIG. 14B*

USER INTERFACES FOR ENABLING AN ACTIVITY

CROSS-REFERENCE TO RELATED APPLICATIONS

This application claims priority to U.S. Provisional Patent Application Nos. 63/008,586, "USER INTERFACES FOR ENABLING AN ACTIVITY," filed Apr. 10, 2020; 63/022,869, "USER INTERFACES FOR ENABLING AN ACTIVITY," filed May 11, 2020; 63/032,970, "USER INTERFACES FOR ENABLING AN ACTIVITY," filed Jun. 1, 2020. All of these applications are incorporated by reference herein in their entirety.

FIELD

The present disclosure relates generally to computer user interfaces, and more specifically to techniques for enabling an activity using a computer system.

BACKGROUND

Computer systems can include applications that are installed on the computer system. Installed applications can be used on the computer system to perform operations on the computer system. Applications that are not available on the computer system can be downloaded and installed on the computer system, such as a from an application store that is accessible by the computer system.

BRIEF SUMMARY

Some techniques for enabling an activity using computer systems (e.g., electronic devices), however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated computer systems.

Accordingly, the present technique provides computer systems with faster, more efficient methods and interfaces for enabling an activity. Such methods and interfaces optionally complement or replace other methods for enabling an activity. Such methods and interfaces reduce the cognitive burden on a user and produce a more efficient human-machine interface. For battery-operated computing devices, such methods and interfaces conserve power and increase the time between battery charges. Such methods and interfaces also provide quick, efficient, and easy access to performing an activity using the computer system. Such methods and interfaces also informs a user that the computer system can be used to perform an activity for which the user may not have been aware.

In accordance with some embodiments, a method performed at a computer system that is in communication with a display generation component and one or more input devices is described. The method comprises: detecting the occurrence of a triggering condition for initiating an activity that is associated with a first application; in response to detecting the occurrence of the triggering condition, displaying, via the display generation component, a first user interface, wherein displaying the first user interface includes concurrently displaying: a description of the activity, and a first selectable user interface object for taking action associated with the activity; while displaying the first user interface, detecting, via the one or more input devices, activation of the first selectable user interface object; and in response to detecting the activation of the first selectable user interface object: in accordance with a determination that the first application is not available on the computer system, displaying, via the display generation component, a second user interface that is configured to perform the activity without downloading at least a portion of the first application.

In accordance with some embodiments, a non-transitory computer-readable storage medium storing one or more programs configured to be executed by one or more processors of computer system that is in communication with a display generation component and one or more input devices is described. The one or programs include instructions for: detecting the occurrence of a triggering condition for initiating an activity that is associated with a first application; in response to detecting the occurrence of the triggering condition, displaying, via the display generation component, a first user interface, wherein displaying the first user interface includes concurrently displaying: a description of the activity, and a first selectable user interface object for taking action associated with the activity; while displaying the first user interface, detecting, via the one or more input devices, activation of the first selectable user interface object; and in response to detecting the activation of the first selectable user interface object: in accordance with a determination that the first application is not available on the computer system, displaying, via the display generation component, a second user interface that is configured to perform the activity without downloading at least a portion of the first application.

In accordance with some embodiments, a transitory computer-readable storage medium storing one or more programs configured to be executed by one or more processors of computer system that is in communication with a display generation component and one or more input devices is described. The one or programs include instructions for: detecting the occurrence of a triggering condition for initiating an activity that is associated with a first application; in response to detecting the occurrence of the triggering condition, displaying, via the display generation component, a first user interface, wherein displaying the first user interface includes concurrently displaying: a description of the activity, and a first selectable user interface object for taking action associated with the activity; while displaying the first user interface, detecting, via the one or more input devices, activation of the first selectable user interface object; and in response to detecting the activation of the first selectable user interface object: in accordance with a determination that the first application is not available on the computer system, displaying, via the display generation component, a second user interface that is configured to perform the activity without downloading at least a portion of the first application.

In accordance with some embodiments, a computer system comprising a display generation component, one or more input devices, one or more processors, and memory storing one or more programs configured to be executed by the one or more processors is described. The one or more programs include instructions for: detecting the occurrence of a triggering condition for initiating an activity that is associated with a first application; in response to detecting the occurrence of the triggering condition, displaying, via the display generation component, a first user interface, wherein displaying the first user interface includes concurrently displaying: a description of the activity, and a first selectable user interface object for taking action associated with the activity; while displaying the first user interface, detecting, via the one or more input devices, activation of the first selectable user interface object; and in response to detecting the activation of the first selectable user interface object: in accordance with a determination that the first application is not available on the computer system, displaying, via the display generation component, a second user interface that is configured to perform the activity without downloading at least a portion of the first application.

In accordance with some embodiments, a computer system is described. The computer system comprises: a display generation component; one or more input devices; means for detecting the occurrence of a triggering condition for initiating an activity that is associated with a first application; means for, in response to detecting the occurrence of the triggering condition, displaying, via the display generation component, a first user interface, wherein displaying the first user interface includes concurrently displaying: a description of the activity, and a first selectable user interface object for taking action associated with the activity; means for, while displaying the first user interface, detecting, via the one or more input devices, activation of the first selectable user interface object; and means for, in response to detecting the activation of the first selectable user interface object: in accordance with a determination that the first application is not available on the computer system, displaying, via the display generation component, a second user interface that is configured to perform the activity without downloading at least a portion of the first application.

In accordance with some embodiments, a method performed at a computer system that is in communication with a display generation component and one or more input devices is described. The method comprises: detecting, via the one or more input devices, a request to invoke a first application; and in response to detecting the request to invoke the first application, displaying, via the display generation component, a first user interface corresponding to the first application, wherein: in accordance with a determination that detecting the request to invoke the first application occurred in a first context, displaying the first user interface includes displaying, in the first user interface, first content in a respective region of the first user interface; and in accordance with a determination that detecting the request to invoke the first application occurred in a second context different from the first context, displaying the first user interface includes displaying, in the first user interface, second content in the respective region of the first user interface, wherein the second content is different from the first content.

In accordance with some embodiments, a non-transitory computer-readable storage medium storing one or more programs configured to be executed by one or more processors of computer system that is in communication with a display generation component and one or more input devices is described. The one or more programs include instructions for: detecting, via the one or more input devices, a request to invoke a first application; and in response to detecting the request to invoke the first application, displaying, via the display generation component, a first user interface corresponding to the first application, wherein: in accordance with a determination that detecting the request to invoke the first application occurred in a first context, displaying the first user interface includes displaying, in the first user interface, first content in a respective region of the first user interface; and in accordance with a determination that detecting the request to invoke the first application occurred in a second context different from the first context, displaying the first user interface includes displaying, in the first user interface, second content in the respective region of the first user interface, wherein the second content is different from the first content.

In accordance with some embodiments, a transitory computer-readable storage medium storing one or more programs configured to be executed by one or more processors of computer system that is in communication with a display generation component and one or more input devices is described. The one or more programs include instructions for: detecting, via the one or more input devices, a request to invoke a first application; and in response to detecting the request to invoke the first application, displaying, via the display generation component, a first user interface corresponding to the first application, wherein: in accordance with a determination that detecting the request to invoke the first application occurred in a first context, displaying the first user interface includes displaying, in the first user interface, first content in a respective region of the first user interface; and in accordance with a determination that detecting the request to invoke the first application occurred in a second context different from the first context, displaying the first user interface includes displaying, in the first user interface, second content in the respective region of the first user interface, wherein the second content is different from the first content.

In accordance with some embodiments, a computer system comprising a display generation component, one or more input devices, one or more processors, and memory storing one or more programs configured to be executed by the one or more processors is described. The one or more programs include instructions for: detecting, via the one or more input devices, a request to invoke a first application; and in response to detecting the request to invoke the first application, displaying, via the display generation component, a first user interface corresponding to the first application, wherein: in accordance with a determination that detecting the request to invoke the first application occurred in a first context, displaying the first user interface includes displaying, in the first user interface, first content in a respective region of the first user interface; and in accordance with a determination that detecting the request to invoke the first application occurred in a second context different from the first context, displaying the first user interface includes displaying, in the first user interface, second content in the respective region of the first user interface, wherein the second content is different from the first content.

In accordance with some embodiments, a computer system is described. The computer system comprises: a display generation component; one or more input devices; means for detecting, via the one or more input devices, a request to invoke a first application; and means for, in response to detecting the request to invoke the first application, displaying, via the display generation component, a first user interface corresponding to the first application, wherein: in accordance with a determination that detecting the request to invoke the first application occurred in a first context, displaying the first user interface includes displaying, in the first user interface, first content in a respective region of the first user interface; and in accordance with a determination that detecting the request to invoke the first application occurred in a second context different from the first context, displaying the first user interface includes displaying, in the first user interface, second content in the respective region of the first user interface, wherein the second content is different from the first content.

In accordance with some embodiments, a method performed at a computer system that is in communication with a display generation component and one or more input devices is described. The method comprises: over a period of time, accumulating a plurality of automatically downloaded applications that were downloaded automatically to assist in performing contextually relevant tasks, wherein the plurality of applications include a first application with first usage information and a second application with second usage information; after the plurality of applications have been downloaded automatically, receiving, via the one or more input devices, a request to display representations of automatically downloaded applications that are available on the computer system; and in response to receiving the request, displaying, via the display generation component, a user interface for accessing the automatically downloaded applications, wherein the user interface provides access to a subset of the plurality of automatically downloaded applications that excludes one or more applications that do not meet respective usage criteria, wherein: in accordance with a determination that the first usage information meets the respective usage criteria, the subset of the plurality of automatically downloaded applications includes the first application; in accordance with a determination that the first usage information does not meet the respective usage criteria, the subset of the plurality of automatically downloaded applications excludes the first application; in accordance with a determination that the second usage information meets the respective usage criteria, the subset of the plurality of automatically downloaded applications includes the second application; and in accordance with a determination that the second usage information does not meet the respective usage criteria, the subset of the plurality of automatically downloaded applications excludes the second application.

In accordance with some embodiments, a non-transitory computer-readable storage medium storing one or more programs configured to be executed by one or more processors of computer system that is in communication with a display generation component and one or more input devices is described. The one or more programs include instructions for: over a period of time, accumulating a plurality of automatically downloaded applications that were downloaded automatically to assist in performing contextually relevant tasks, wherein the plurality of applications include a first application with first usage information and a second application with second usage information; after the plurality of applications have been downloaded automatically, receiving, via the one or more input devices, a request to display representations of automatically downloaded applications that are available on the computer system; and in response to receiving the request, displaying, via the display generation component, a user interface for accessing the automatically downloaded applications, wherein the user interface provides access to a subset of the plurality of automatically downloaded applications that excludes one or more applications that do not meet respective usage criteria, wherein: in accordance with a determination that the first usage information meets the respective usage criteria, the subset of the plurality of automatically downloaded applications includes the first application; in accordance with a determination that the first usage information does not meet the respective usage criteria, the subset of the plurality of automatically downloaded applications excludes the first application; in accordance with a determination that the second usage information meets the respective usage criteria, the subset of the plurality of automatically downloaded applications includes the second application; and in accordance with a determination that the second usage information does not meet the respective usage criteria, the subset of the plurality of automatically downloaded applications excludes the second application.

In accordance with some embodiments, a transitory computer-readable storage medium storing one or more programs configured to be executed by one or more processors of computer system that is in communication with a display generation component and one or more input devices is described. The one or more programs include instructions for: over a period of time, accumulating a plurality of automatically downloaded applications that were downloaded automatically to assist in performing contextually relevant tasks, wherein the plurality of applications include a first application with first usage information and a second application with second usage information; after the plurality of applications have been downloaded automatically, receiving, via the one or more input devices, a request to display representations of automatically downloaded applications that are available on the computer system; and in response to receiving the request, displaying, via the display generation component, a user interface for accessing the automatically downloaded applications, wherein the user interface provides access to a subset of the plurality of automatically downloaded applications that excludes one or more applications that do not meet respective usage criteria, wherein: in accordance with a determination that the first usage information meets the respective usage criteria, the subset of the plurality of automatically downloaded applications includes the first application; in accordance with a determination that the first usage information does not meet the respective usage criteria, the subset of the plurality of automatically downloaded applications excludes the first application; in accordance with a determination that the second usage information meets the respective usage criteria, the subset of the plurality of automatically downloaded applications includes the second application; and in accordance with a determination that the second usage information does not meet the respective usage criteria, the subset of the plurality of automatically downloaded applications excludes the second application.

In accordance with some embodiments, a computer system comprising a display generation component, one or more input devices, one or more processors, and memory storing one or more programs configured to be executed by the one or more processors is described. The one or more programs include instructions for: over a period of time, accumulating a plurality of automatically downloaded applications that were downloaded automatically to assist in performing contextually relevant tasks, wherein the plurality of applications include a first application with first usage information and a second application with second usage information; after the plurality of applications have been downloaded automatically, receiving, via the one or more input devices, a request to display representations of automatically downloaded applications that are available on the computer system; and in response to receiving the request, displaying, via the display generation component, a user interface for accessing the automatically downloaded applications, wherein the user interface provides access to a subset of the plurality of automatically downloaded applications that excludes one or more applications that do not meet respective usage criteria, wherein: in accordance with a determination that the first usage information meets the respective usage criteria, the subset of the plurality of automatically downloaded applications includes the first application; in accordance with a determination that the first usage information does not meet the respective usage criteria, the subset of the plurality of automatically downloaded applications excludes the first application; in accordance with a determination that the second usage information meets the respective usage criteria, the subset of the plurality of automatically downloaded applications includes the second application; and in accordance with a determination that the second usage information does not meet the respective usage criteria, the subset of the plurality of automatically downloaded applications excludes the second application.

In accordance with some embodiments, a computer system is described. The computing system comprises: a display generation component; one or more input devices; means for, over a period of time, accumulating a plurality of automatically downloaded applications that were downloaded automatically to assist in performing contextually relevant tasks, wherein the plurality of applications include a first application with first usage information and a second application with second usage information; means for, after the plurality of applications have been downloaded automatically, receiving, via the one or more input devices, a request to display representations of automatically downloaded applications that are available on the computer system; and means for, in response to receiving the request, displaying, via the display generation component, a user interface for accessing the automatically downloaded applications, wherein the user interface provides access to a subset of the plurality of automatically downloaded applications that excludes one or more applications that do not meet respective usage criteria, wherein: in accordance with a determination that the first usage information meets the respective usage criteria, the subset of the plurality of automatically downloaded applications includes the first application; in accordance with a determination that the first usage information does not meet the respective usage criteria, the subset of the plurality of automatically downloaded applications excludes the first application; in accordance with a determination that the second usage information meets the respective usage criteria, the subset of the plurality of automatically downloaded applications includes the second application; and in accordance with a determination that the second usage information does not meet the respective usage criteria, the subset of the plurality of automatically downloaded applications excludes the second application.

In accordance with some embodiments, a method performed at a computer system that is in communication with one or more input devices is described. The method comprises: detecting the occurrence of a triggering condition for initiating an activity that is associated with a first application; while the first application is not installed on the computer system: installing, on the computer system and based on the detected triggering condition, a second application that is configured to perform the activity without downloading at least a portion of the first application; and setting one or more system privileges for the second application; after setting the one or more system privileges for the second application, installing, on the computer system, the first application; and after installing the first application on the computer system: in accordance with a determination that the second application was installed on the computer system when installing the first application occurred, setting one or more system privileges for the first application based on the one or more system privileges for the second application; and in accordance with a determination that the second application was not installed on the computer system when installing the first application occurred, setting the one or more system privileges for the first application based on default system privileges.

In accordance with some embodiments, a non-transitory computer-readable storage medium storing one or more programs configured to be executed by one or more processors of computer system that is in communication with one or more input devices is described. The one or more programs include instructions for: detecting the occurrence of a triggering condition for initiating an activity that is associated with a first application; while the first application is not installed on the computer system: installing, on the computer system and based on the detected triggering condition, a second application that is configured to perform the activity without downloading at least a portion of the first application; and setting one or more system privileges for the second application; after setting the one or more system privileges for the second application, installing, on the computer system, the first application; and after installing the first application on the computer system: in accordance with a determination that the second application was installed on the computer system when installing the first application occurred, setting one or more system privileges for the first application based on the one or more system privileges for the second application; and in accordance with a determination that the second application was not installed on the computer system when installing the first application occurred, setting the one or more system privileges for the first application based on default system privileges.

In accordance with some embodiments, a transitory computer-readable storage medium storing one or more programs configured to be executed by one or more processors of computer system that is in communication with one or more input devices is described. The one or more programs include instructions for: detecting the occurrence of a triggering condition for initiating an activity that is associated with a first application; while the first application is not installed on the computer system: installing, on the computer system and based on the detected triggering condition, a second application that is configured to perform the activity without downloading at least a portion of the first application; and setting one or more system privileges for the second application; after setting the one or more system privileges for the second application, installing, on the computer system, the first application; and after installing the first application on the computer system: in accordance with a determination that the second application was installed on the computer system when installing the first application occurred, setting one or more system privileges for the first application based on the one or more system privileges for the second application; and in accordance with a determination that the second application was not installed on the computer system when installing the first application occurred, setting the one or more system privileges for the first application based on default system privileges.

In accordance with some embodiments, a computer system comprising one or more input devices, one or more processors, and memory storing one or more programs configured to be executed by the one or more processors is described. The one or more programs include instructions for: detecting the occurrence of a triggering condition for initiating an activity that is associated with a first application; while the first application is not installed on the computer system: installing, on the computer system and based on the detected triggering condition, a second application that is configured to perform the activity without downloading at least a portion of the first application; and setting one or more system privileges for the second application; after setting the one or more system privileges for the second application, installing, on the computer system, the first application; and after installing the first application on the computer system: in accordance with a determination that the second application was installed on the computer system when installing the first application occurred, setting one or more system privileges for the first application based on the one or more system privileges for the second application; and in accordance with a determination that the second application was not installed on the computer system when installing the first application occurred, setting the one or more system privileges for the first application based on default system privileges.

In accordance with some embodiments, a computer system is described. The computer system comprises: means for detecting the occurrence of a triggering condition for initiating an activity that is associated with a first application; means for, while the first application is not installed on the computer system: installing, on the computer system and based on the detected triggering condition, a second application that is configured to perform the activity without downloading at least a portion of the first application; and setting one or more system privileges for the second application; means for, after setting the one or more system privileges for the second application, installing, on the computer system, the first application; and means for, after installing the first application on the computer system: in accordance with a determination that the second application was installed on the computer system when installing the first application occurred, setting one or more system privileges for the first application based on the one or more system privileges for the second application; and in accordance with a determination that the second application was not installed on the computer system when installing the first application occurred, setting the one or more system privileges for the first application based on default system privileges.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for enabling an activity, thereby increasing the effectiveness, efficiency, and user satisfaction with such devices. Such methods and interfaces may complement or replace other methods for enabling an activity.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 10A-10C are a flow diagram illustrating a method for customizing displayed content based on circumstances under which the content was invoked using a computer system, in accordance with some embodiments.

FIGS. 12A-12D are a flow diagram illustrating a method for managing applications that were used to enable activities using a computer system, in accordance with some embodiments.

FIGS. 14A-14B are a flow diagram illustrating a method for managing settings for applications used to enable activities using a computer system, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for enabling an activity. For example, there is a need for electronic devices that can suggest or enable an activity corresponding to an application that is not installed on or not available on the electronic device. For another example, there is a need for electronic devices that can initiate an activity corresponding to an application that is not installed on or not available on the electronic device without installing the application on the electronic device. For another example, there is a need for electronic devices that can enable quick and easy access to downloading and installing an application for an activity where the application is not installed on or available on the electronic device. Such techniques can reduce the cognitive burden on a user who accesses the activity using the electronic device, thereby enhancing productivity. Further, such techniques can reduce processor and battery power otherwise wasted on redundant user inputs.

Figure 6:
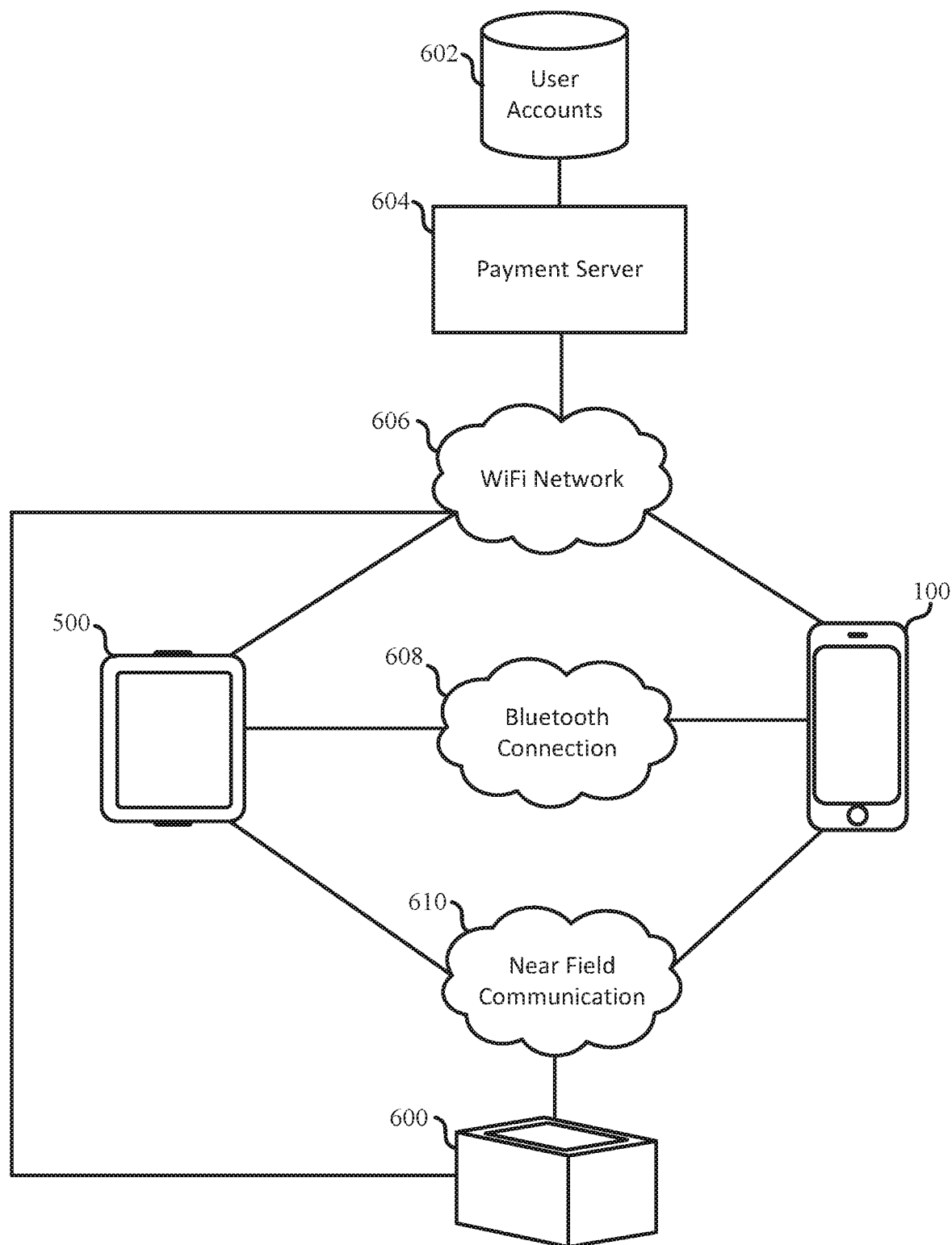
FIG. 6 illustrates exemplary devices connected via one or more communication channels, in accordance with some embodiments.
Figure 7D:
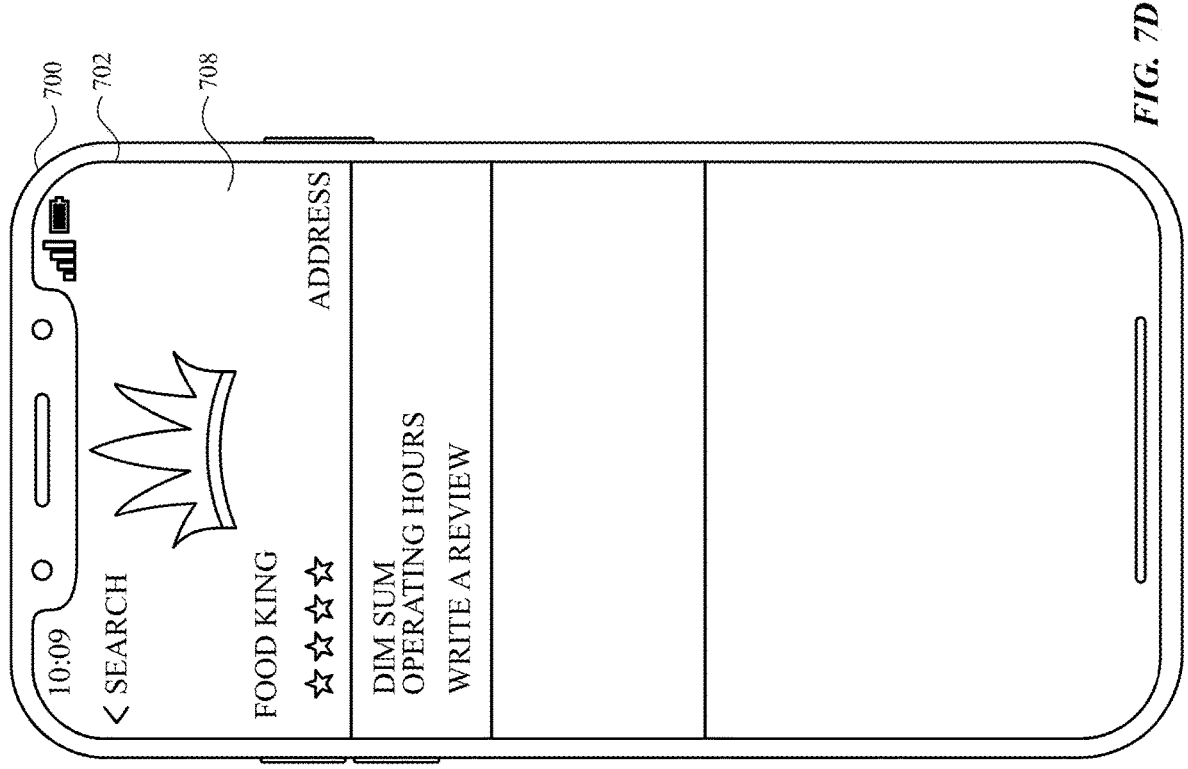
FIGS. 7A-7AZ illustrate exemplary user interfaces for invoking an activity associated with an application, in accordance with some embodiments.
Figure 7A:
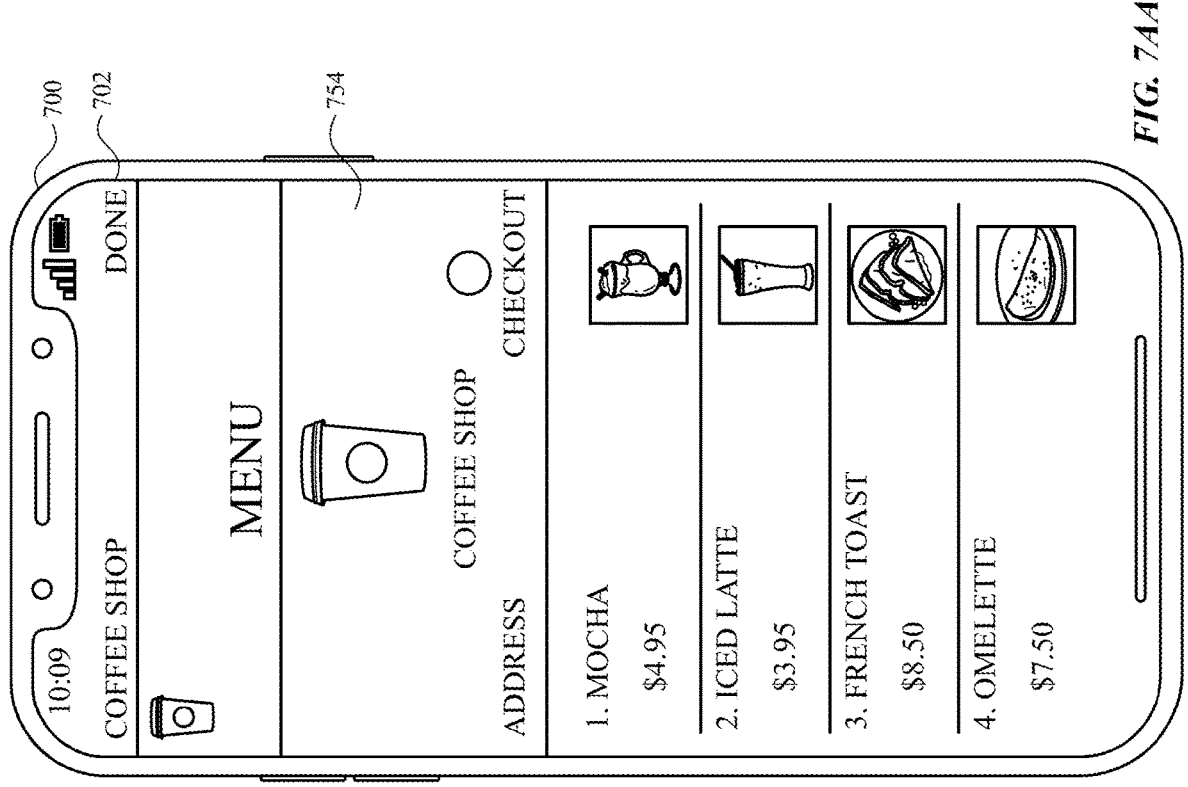
Figure 8A:
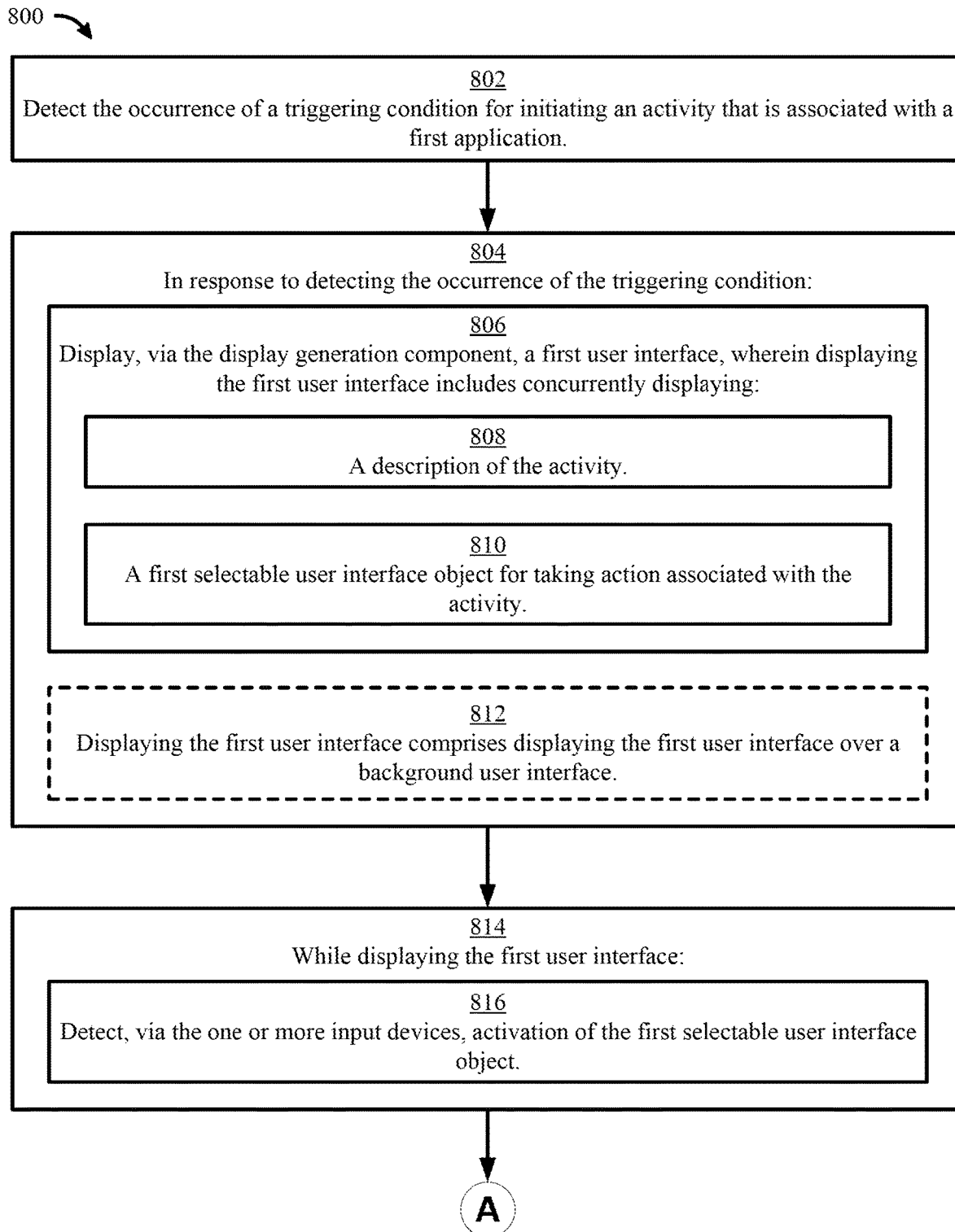
FIGS. 8A-8B are a flow diagram illustrating a method for invoking an activity associated with an application using a computer system, in accordance with some embodiments.
Figure 8B:
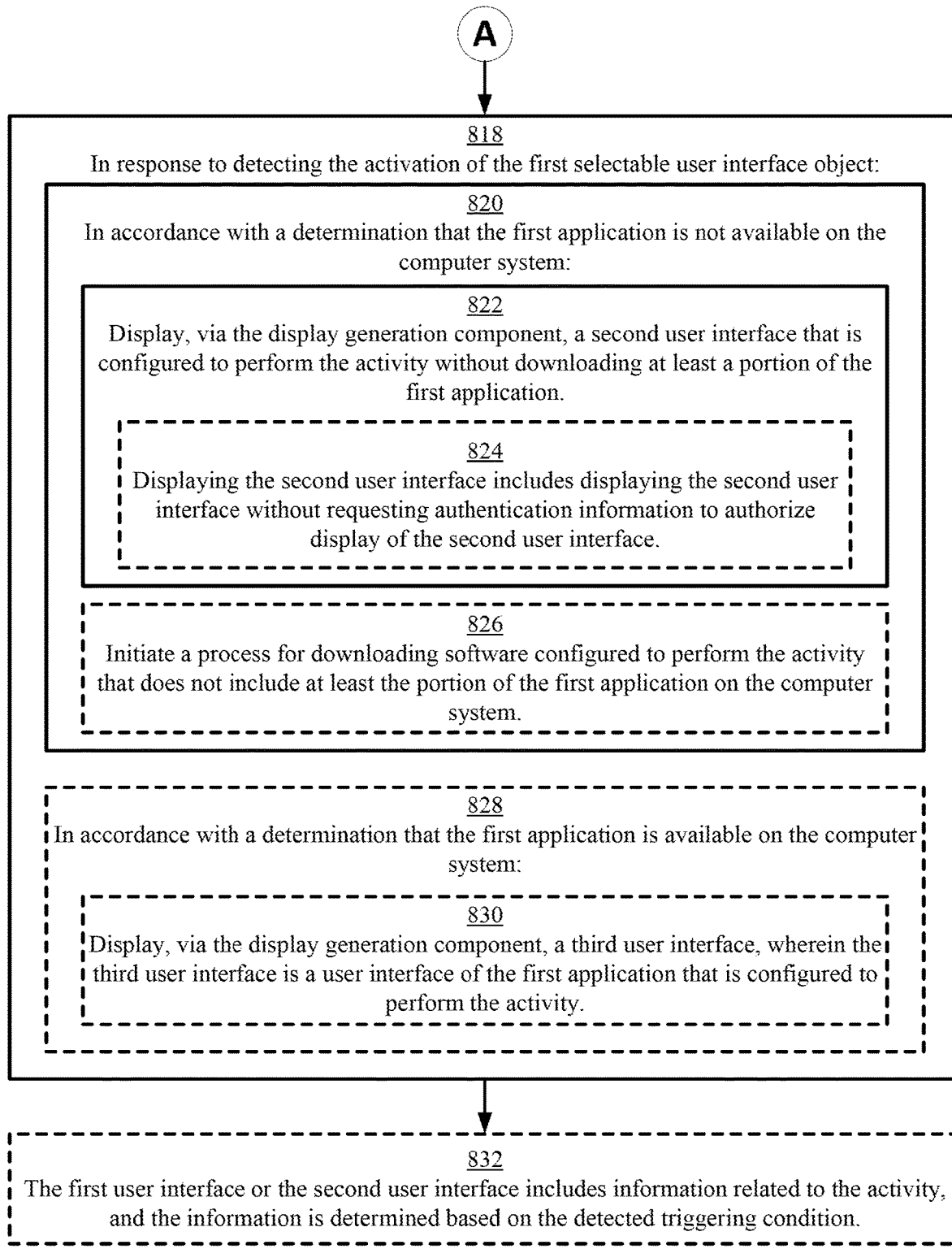
Figure 13A:
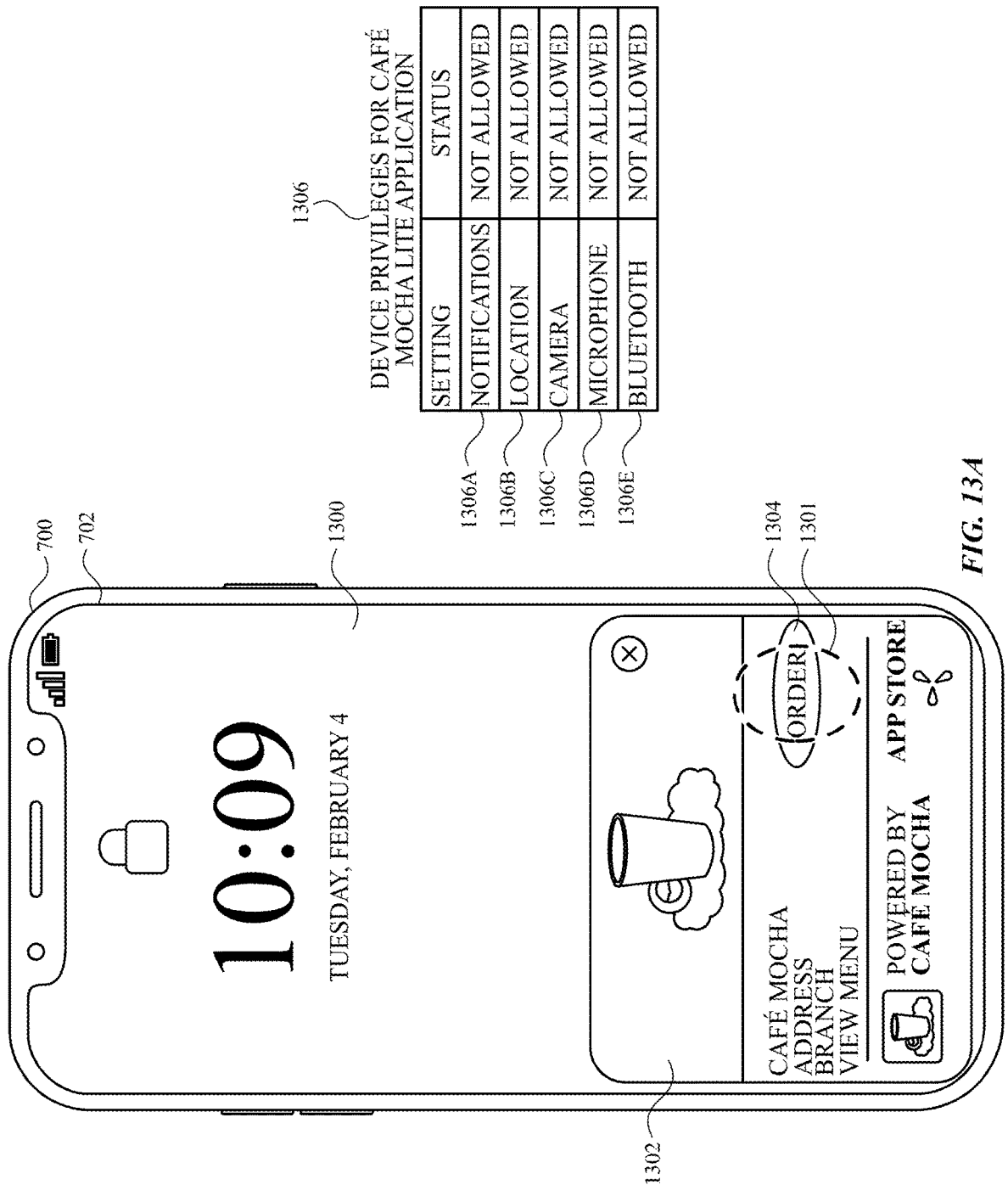
FIGS. 13A-13V illustrate exemplary user interfaces for managing settings for applications used to enable activities using a computer system, in accordance with some embodiments.

Below, FIGS. 1A-1B, 2, 3, 4A-4B, and 5A-5B provide a description of exemplary devices for performing the techniques for enabling an activity. FIG. 6 illustrates exemplary devices connected via one or more communication channels, in accordance with some embodiments. FIGS. 7A-7AZ illustrate exemplary user interfaces for invoking an activity associated with an application, in accordance with some embodiments. FIGS. 8A-8B are a flow diagram illustrating a method for invoking an activity associated with an application using a computer system, in accordance with some embodiments. The user interfaces in FIGS. 7A-7AZ are used to illustrate the processes described below, including the processes in FIGS. 8A-8B. FIGS. 9A-9T illustrate exemplary user interfaces for customizing displayed content based on circumstances under which the content was invoked, in accordance with some embodiments. FIGS. 10A-10C are a flow diagram illustrating a method for customizing displayed content based on circumstances under which the content was invoked using a computer system, in accordance with some embodiments. The user interfaces in FIGS. 9A-9T are used to illustrate the processes described below, including the processes in FIGS. 10A-10C. FIGS. 11A-11S illustrate exemplary user interfaces for managing applications used to enable activities, in accordance with some embodiments. FIGS. 12A-12D are a flow diagram illustrating a method for managing applications used to enable activities using a computer system, in accordance with some embodiments. The user interfaces in FIGS. 11A-11S are used to illustrate the processes described below, including the processes in FIGS. 12A-12D. FIGS. 13A-13V illustrate exemplary user interfaces for managing settings for applications used to enable activities using a computer system, in accordance with some embodiments. FIGS. 14A-14B are a flow diagram illustrating a method for managing settings for applications used to enable activities using a computer system, in accordance with some embodiments. The user interfaces in FIGS. 13A-13V are used to illustrate the processes described below, including the processes in FIGS. 14A-14B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
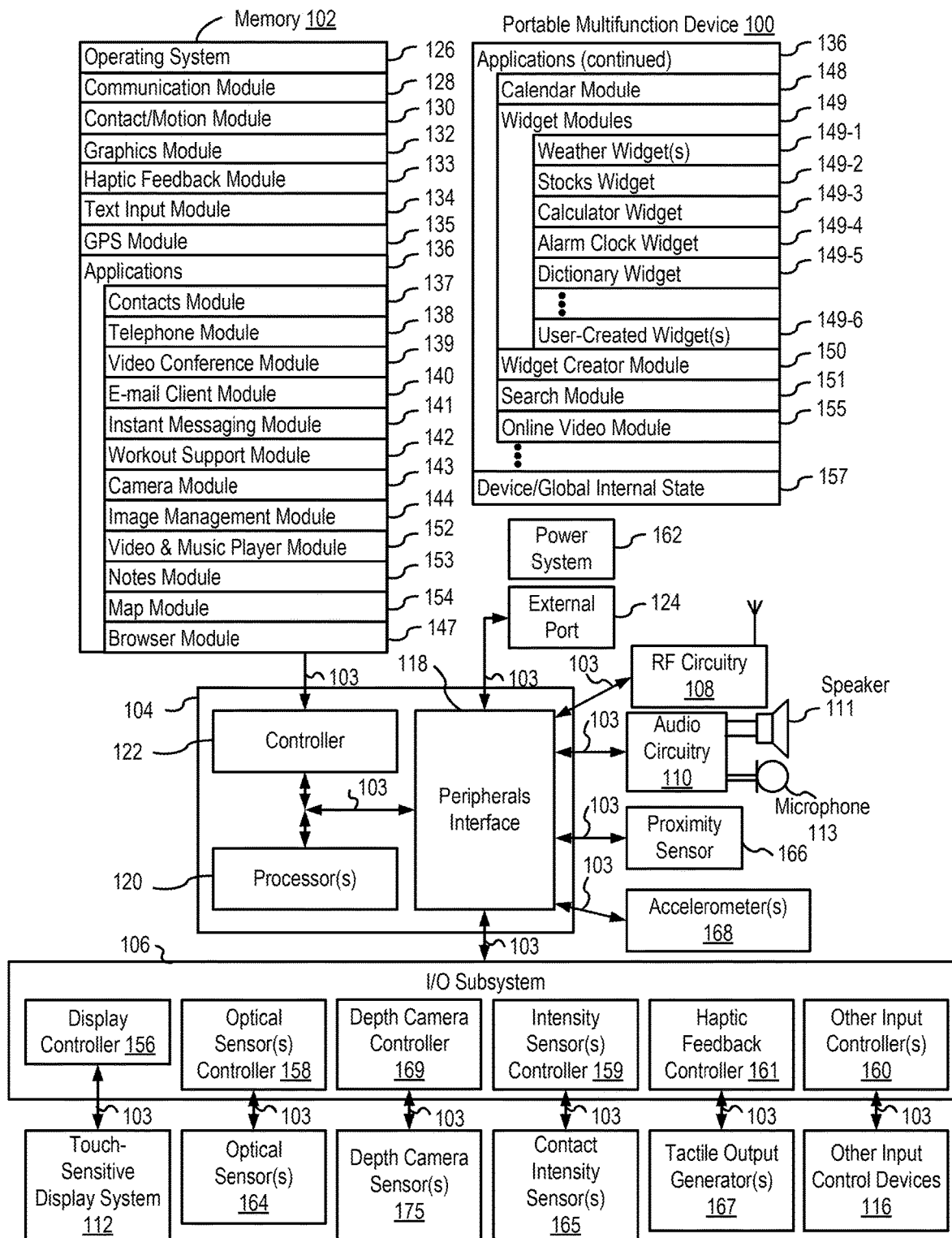
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
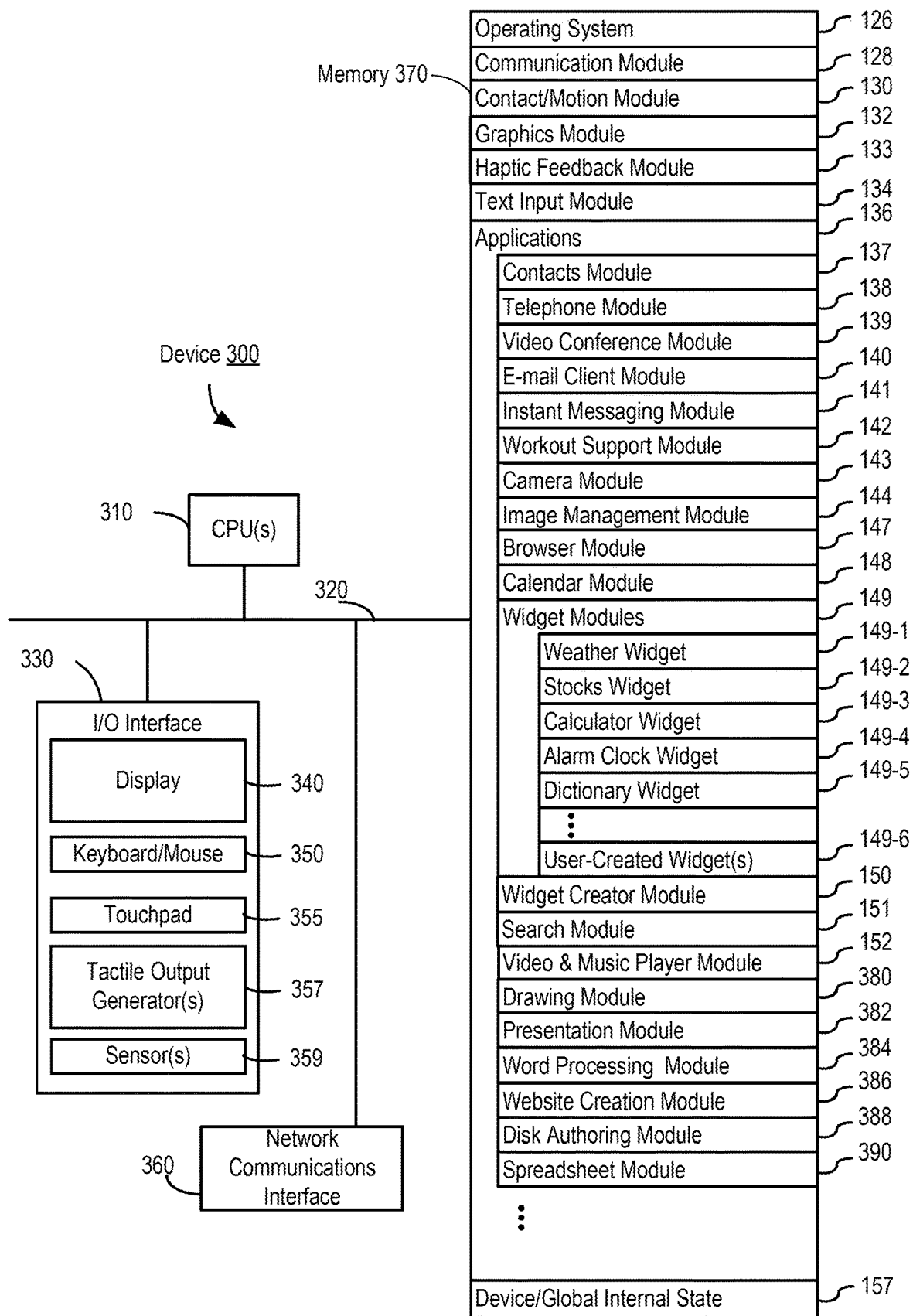
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
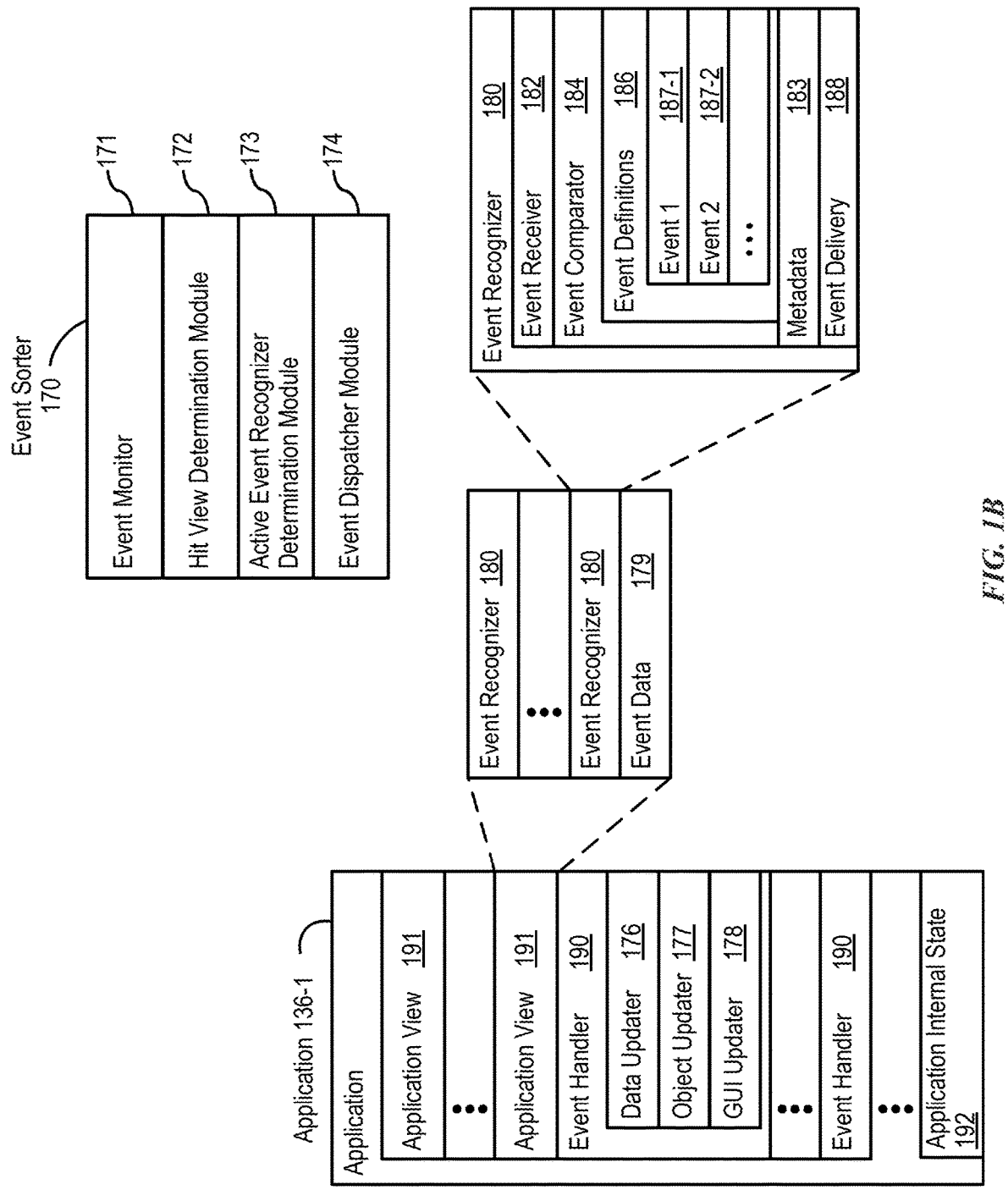
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predefined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
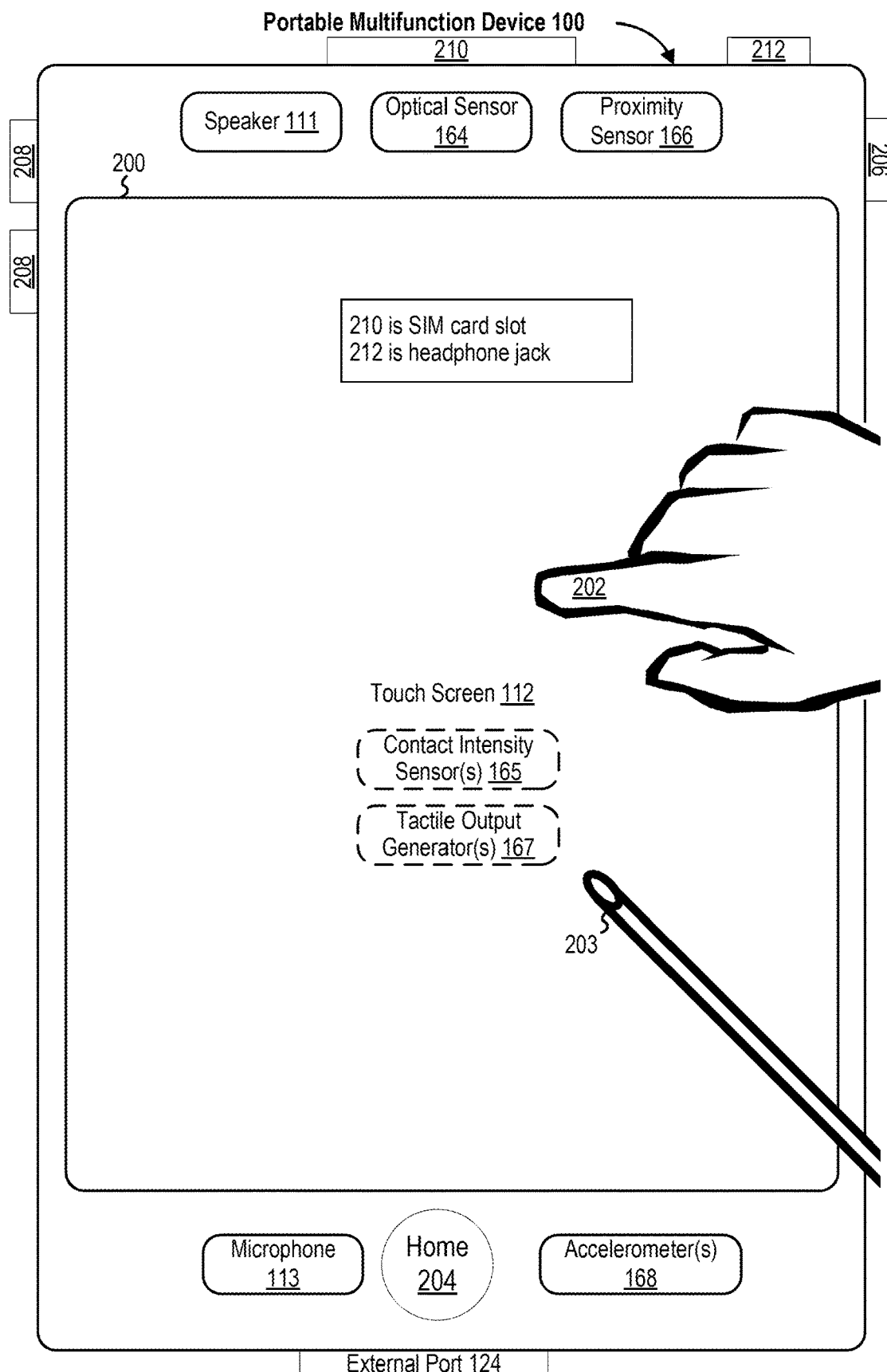
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
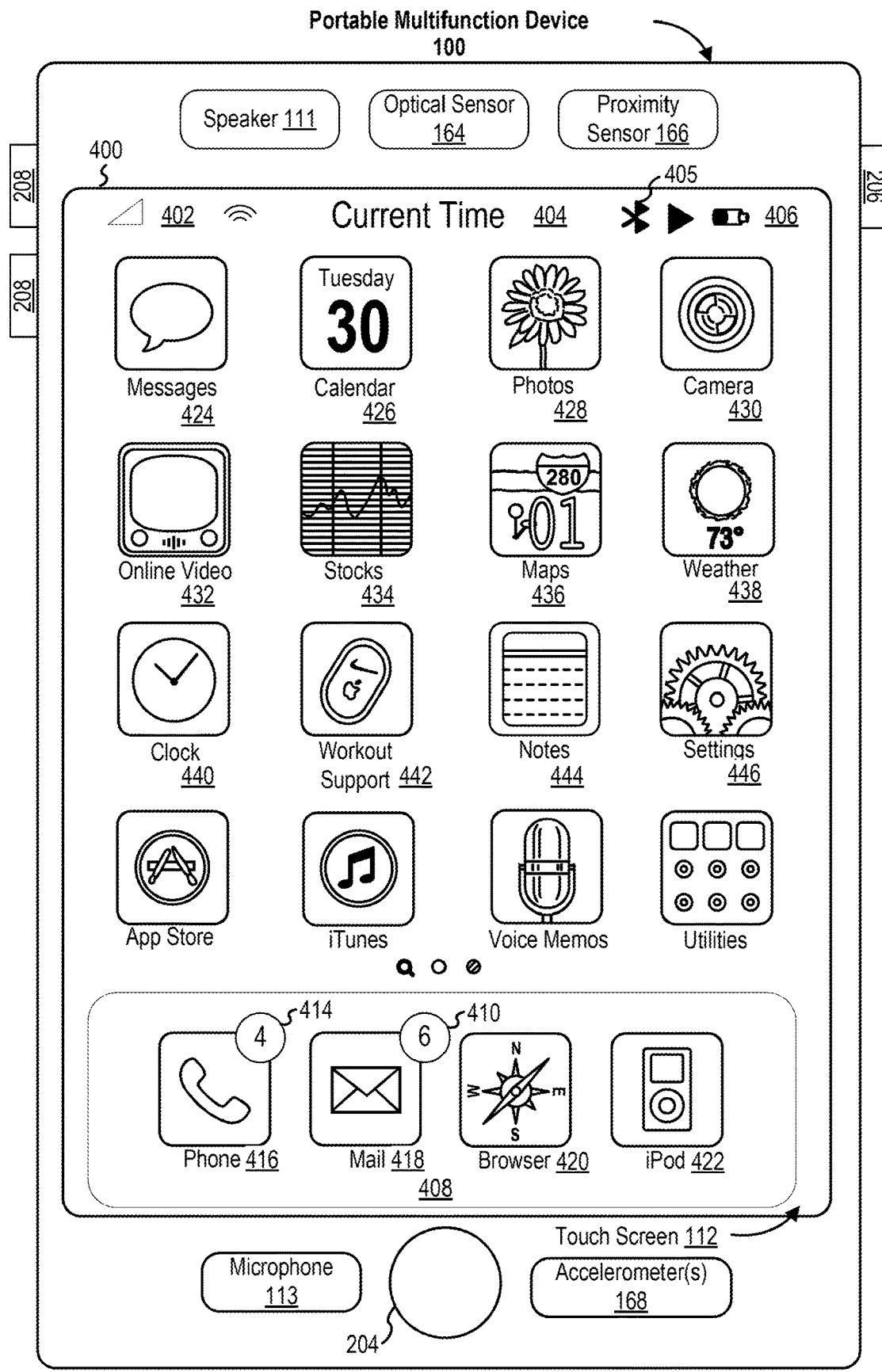
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
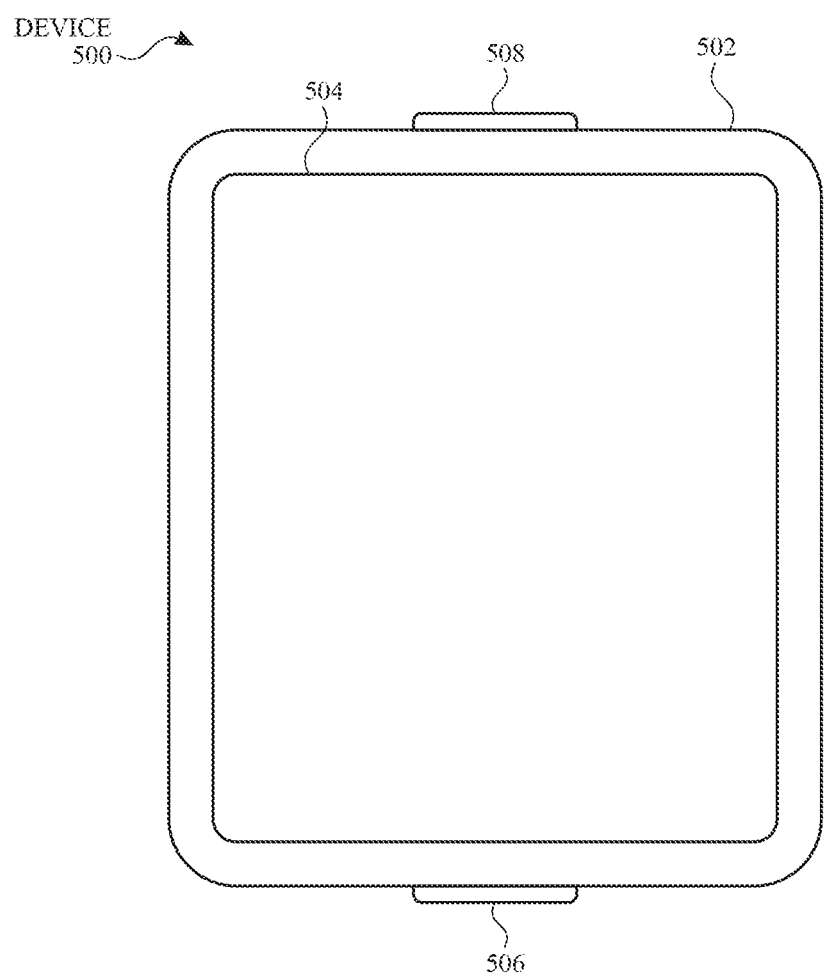
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
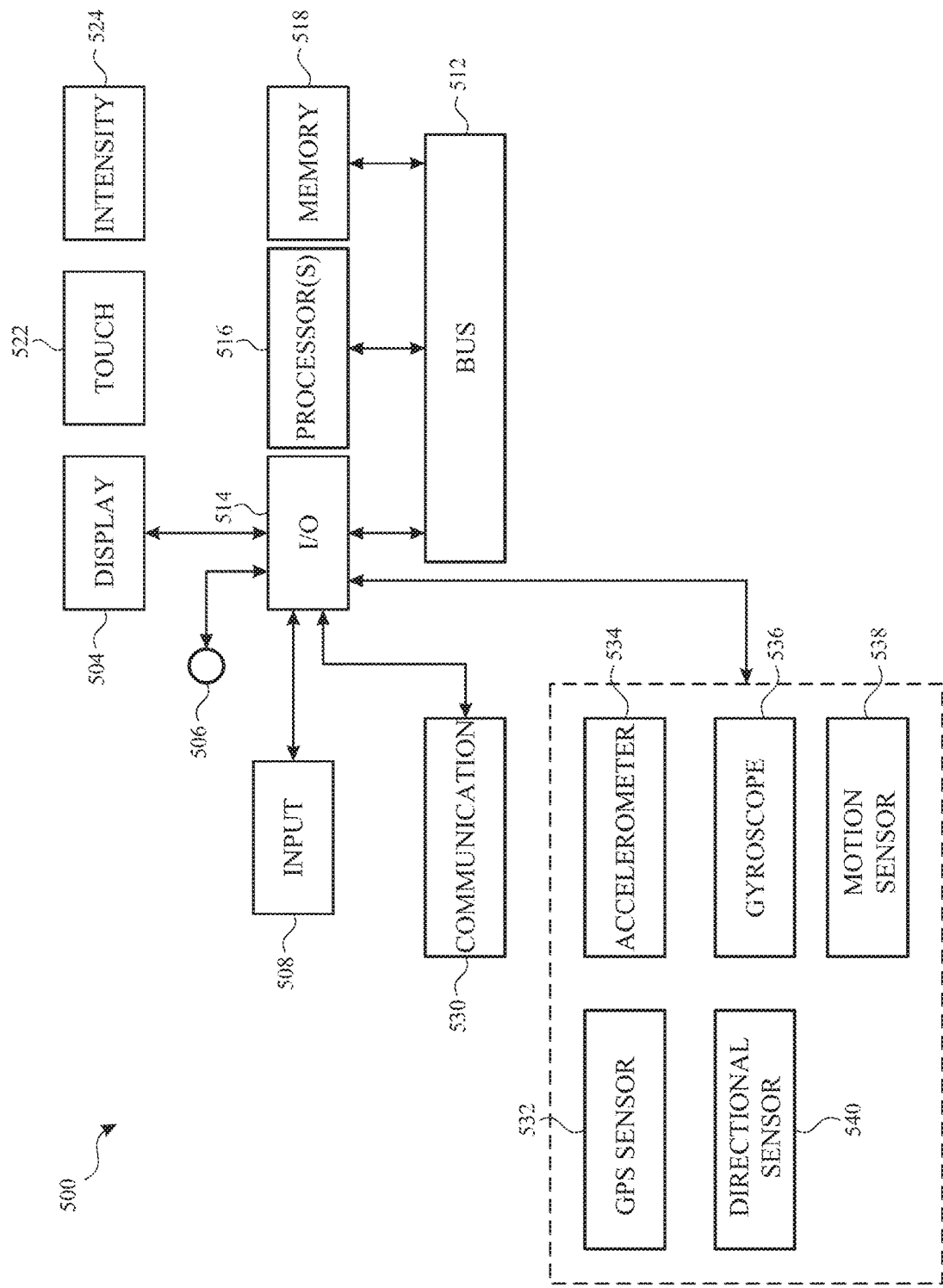
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some embodiments, electronic device (e.g., 100, 300, 500) communicates with payment terminal 600 using an NFC channel 610. In some embodiments, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 600) is established within a defined time period from detection of the input, the secure element releases payment information to be transmitted to the other device (e.g., payment terminal 600). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some embodiments, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some embodiments, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some embodiments, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some embodiments, a secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 7A-7AZ illustrate exemplary user interfaces for invoking an activity associated with an application, in accordance with some embodiments. The user interfaces in these figures are used to illustrate the processes described below, including the processes in FIGS. 8A-8B.

FIG. 7A illustrates a computer system 700 (e.g., an electronic device; a smartphone; a smartwatch; a tablet; a mobile device) that is in communication with (e.g., includes) a display generation component 702A (e.g., a display, a touch-sensitive display) and one or more input devices (e.g., a touch-sensitive surface that is integrated with display generation component 702A; one or more location sensors (e.g., GPS sensors); one or more image sensors (e.g., cameras); a mechanical input device). In FIG. 7A, computer system 700 displays, via display generation component 702A, a user interface 704 of a wake screen (e.g., a lock screen) of computer system 700. In some embodiments, a wake screen is a user interface that is displayed when a display generation component of a computer system transitions from an inactive (e.g., off) state to an active (e.g., on) state. In some embodiments, a lock screen is a user interface that is displayed when the computer system is operating in a locked state in which at least some functionality of the computer system is restricted (e.g., until the computer system is unlocked).

In some embodiments, computer system 700 detects (e.g., determines) (via one or more location sensors (e.g., GPS sensors) that are in communication with computer system 700), that computer system 700 is at (e.g., has entered) a first respective location (e.g., a store; a restaurant; a cafe; a bakery). In some embodiments, computer system 700 detects that the system is at the first respective location while displaying user interface 704 of the wake screen. In some embodiments, computer system 700 detects that the system is at the first respective location while displaying a different user interface (e.g., of a different application). In some embodiments, computer system 700 detects that the system is at the first respective location while display generation component 702 is in an off state.

In FIG. 7B, in response to detecting (e.g., determining) that computer system 700 is at the first respective location, computer system 700 displays, via display generation component 702 (e.g., and overlaid over a portion of user interface 704), a sheet user interface 706 corresponding to the first respective location, where sheet user interface 706 includes an information region 706A that includes information about the first respective location (e.g., the name of the first respective location; an address of the first respective location; an identifier/identification number (e.g., an object number; a branch number; a table number) related to an activity (e.g., reserving an object to rent (e.g., a bike; a car); ordering menu items, such as food and/or drinks) that can be performed at the first respective location) and an affordance 706B (e.g., a selectable user interface object; an activatable user interface object) which, when activated, initiates a process for enabling an activity (e.g., ordering; reserving; purchasing) on computer system 700 that relates to the first respective location. In some embodiments, a sheet user interface includes a graphical element having an appearance of a sheet that is displayed (e.g., pops up) over a current user interface and has a similar appearance to graphical elements (e.g., sheets) that are displayed (e.g., pop up) when other predefined events occur, such as pairing headphones, controlling music on a home audio device, or the like.

In the exemplary user interfaces depicted in FIGS. 7B-7N, the first respective location is a first restaurant (e.g., a restaurant called "Food King"). In some embodiments, information region 706A includes a name of the first restaurant (e.g., "Food King") and an address of the first restaurant.

In some embodiments, affordance 706B indicates (e.g., includes text that describes) a type of activity (e.g., ordering menu items, such as food and/or drinks) associated with the first restaurant.

In some embodiments, sheet user interface 706 includes an image 706C (e.g., of the first restaurant; a logo of the first restaurant) that is indicative of the first restaurant.

In some embodiments, sheet user interface 706 includes an indication 706D (e.g., text or an image) of a developer (e.g., an entity; a company) that powers (e.g., creates and/or manages) an application (e.g., an application platform) of a first type (e.g., a lite-version/partial version of an application for which there is a corresponding available full-version/regular version) that can be used to enable the activity (e.g., ordering menu items, such as food and/or drinks) associated with the first restaurant. For ease of description, an application of a first type is sometimes referred to as a lite-version application.

In some embodiments, the developer is different from the vendor corresponding to the first restaurant (that is, the vendor corresponding to the first restaurant is not the developer of the lite-version application). For example, in FIG. 7B, the application is powered by a first developer (e.g., "Food Reviews") that is different from the vendor corresponding to the first restaurant (e.g., "Food King"). In some embodiments, the developer can provide its application platform for use by a plurality of different vendors and the application can be customized for a respective vendor. In some embodiments, the developer is the same as the vendor corresponding to the first restaurant (that is, the vendor corresponding to the first restaurant is the developer of the application).

In some embodiments, sheet user interface 706 includes an affordance 706E (e.g., a selectable user interface object; an activatable user interface object) for accessing an application store (e.g., an application store, such as a computer application or a website, controlled and managed by a developer of the operating system of computer system 700, where the application store can be used to download first-party and third-party applications onto computer system 700).

In some embodiments, sheet user interface 706 includes an affordance 706F (e.g., a selectable user interface object; an activatable user interface object) for dismissing (e.g., causing computer system 700 to cease display of) sheet user interface 706 without performing the activity (e.g., ordering menu items, such as food and/or drinks) associated with the first restaurant.

Figure 7C:
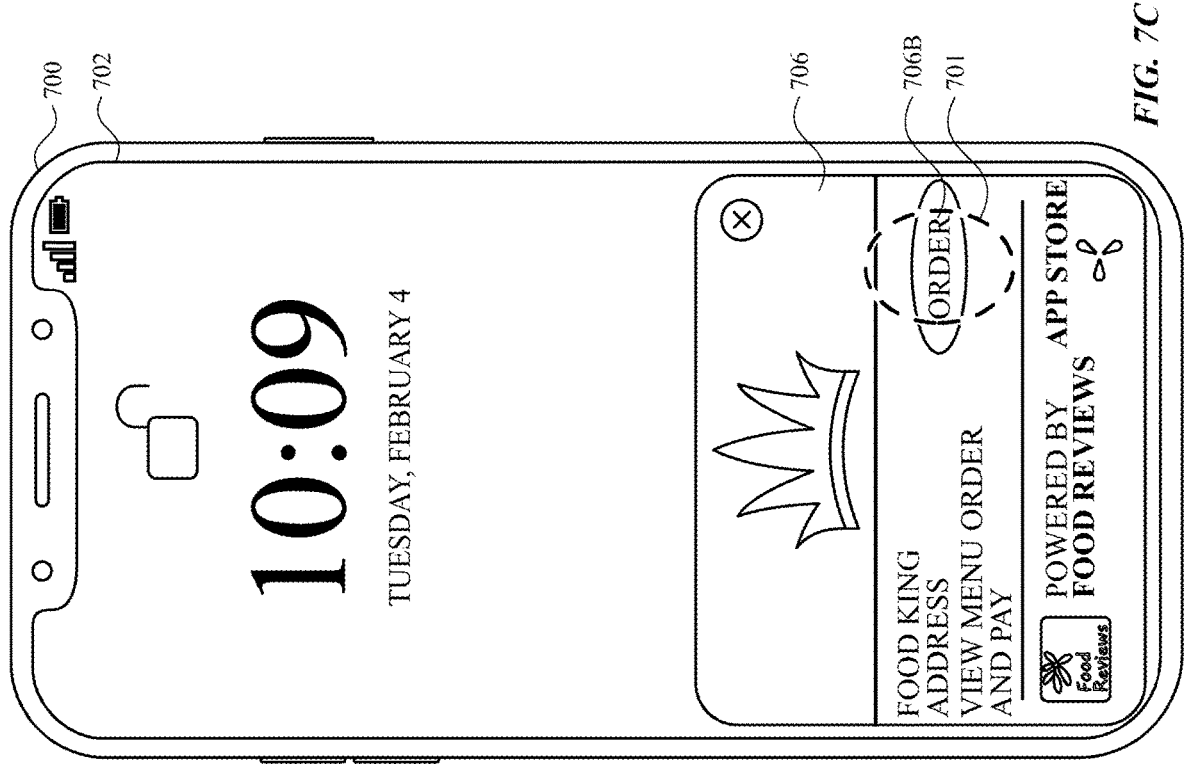
Figure 7F:
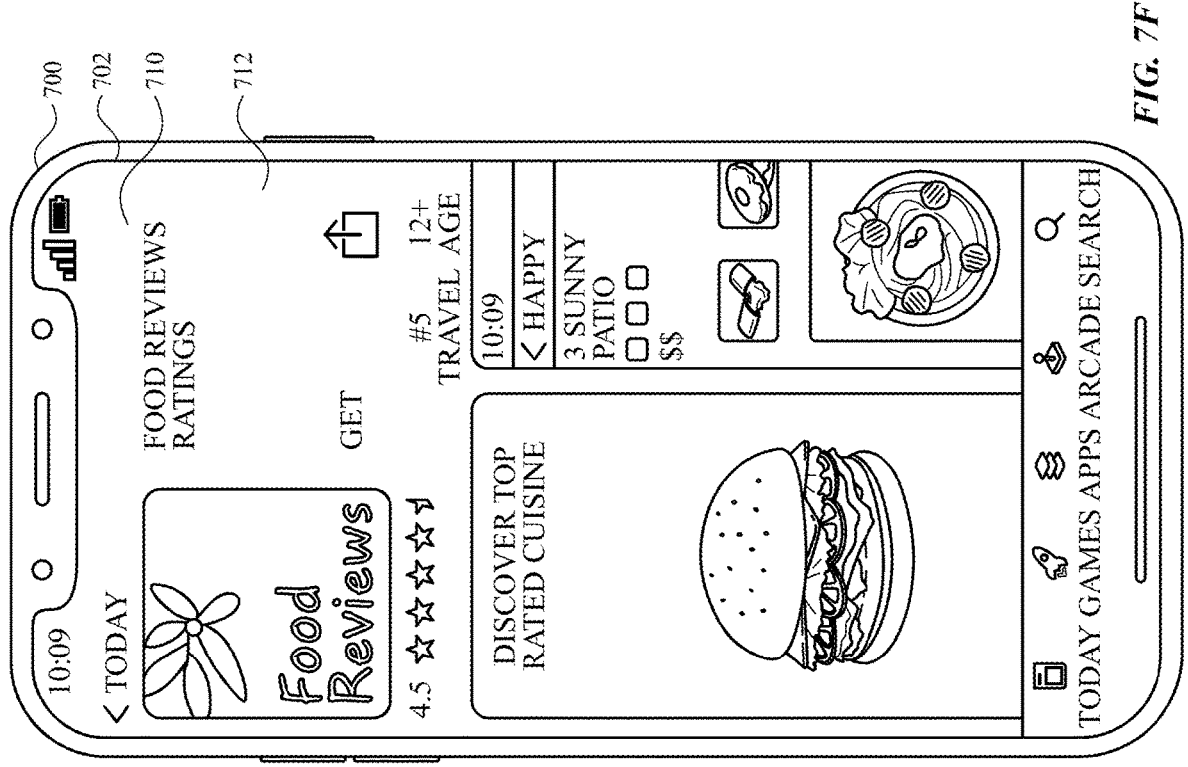

In FIG. 7C, while displaying sheet user interface 706 that can be used to initiate the activity (e.g., ordering menu items, such as food and/or drinks) associated with the first restaurant, computer system 700 detects, via the one or more input devices (e.g., via a touch sensitive surface of the one or more input devices), an activation 701 of (e.g., user selection of; user's tap input on) affordance 706B.

In FIG. 7D, in response to detecting activation 701 of affordance 706B, in accordance with a determination that an application of a second type (e.g., a full-version/a regular version of an application) of the developer (indicated via indication 706D) is already installed on (and thus already available on) computer system 700, computer system 700 displays, via display generation component 702, a user interface 708 of the application of the second type that is already installed on computer system. In some embodiments, an application of a second type can be downloaded onto computer system 700 from the application store. For ease of description, an application of a second type is sometimes referred to as a full-version application. In some embodiments, a respective full-version application has a counterpart lite-version application (e.g., both created and/or managed by the same developer (e.g., the same entity; the same company)).

Figure 7E:
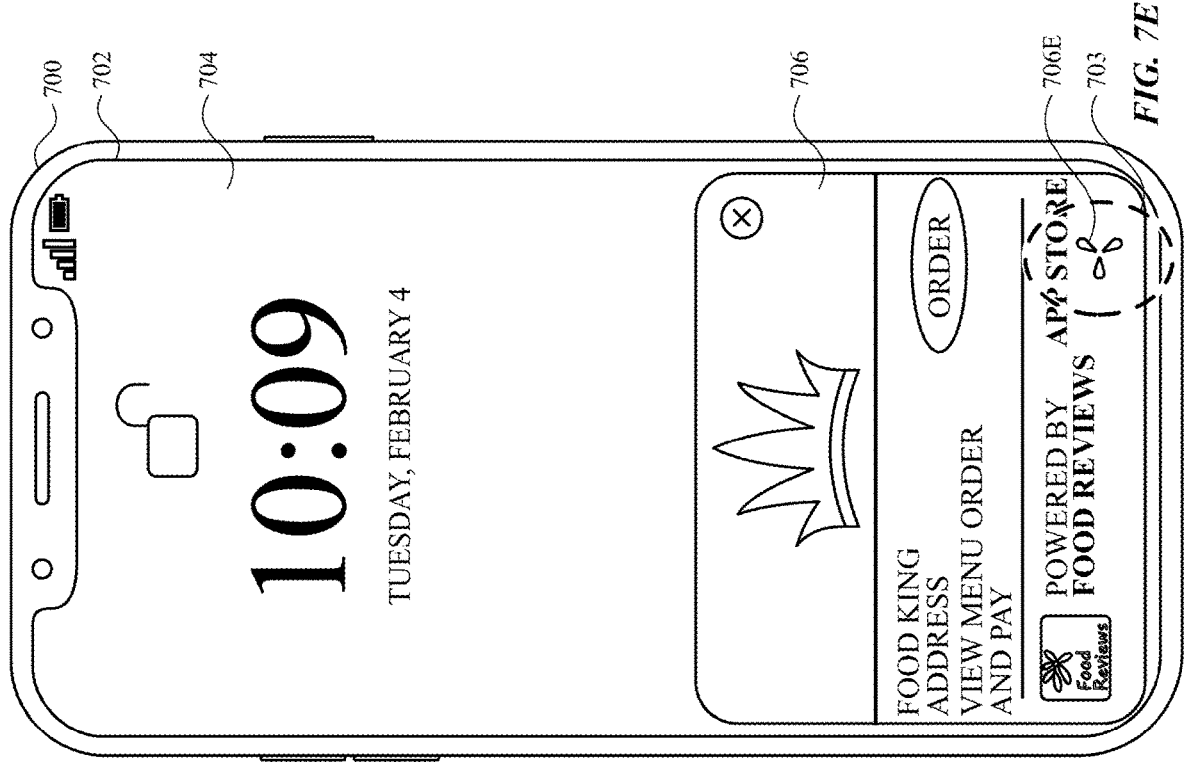

FIG. 7E illustrates computer system 700 displaying (e.g., again), via display generation component 702 (e.g., and overlaid over a portion of user interface 704), sheet user interface 706. In FIG. 7E, the full-version application corresponding to the developer is not available on (e.g., is not installed on) computer system 700.

In FIG. 7E, while displaying sheet user interface 706, computer system 700 detects (e.g., via a touch sensitive surface of the one or more input devices) an activation 703 of (e.g., user selection of; user's tap input on) affordance 706E for accessing the application store. In some embodiments, computer system 700 includes affordance 706E in sheet user interface 706 only if the full-version application corresponding to the developer is not installed on computer system 700 (e.g., as in FIG. 7E). In some embodiments, computer system 700 includes affordance 706E in sheet user interface 706 even if the full-version application corresponding to the developer is already installed on computer system 700.

In FIG. 7F, in response to detecting activation 703 of affordance 706E, computer system 700 displays, via display generation component 702, a user interface 710 of the application store, where the application store displays, in user interface 710, an application page 712 corresponding to and for downloading the full-version application onto computer system 700.

Figure 7H:
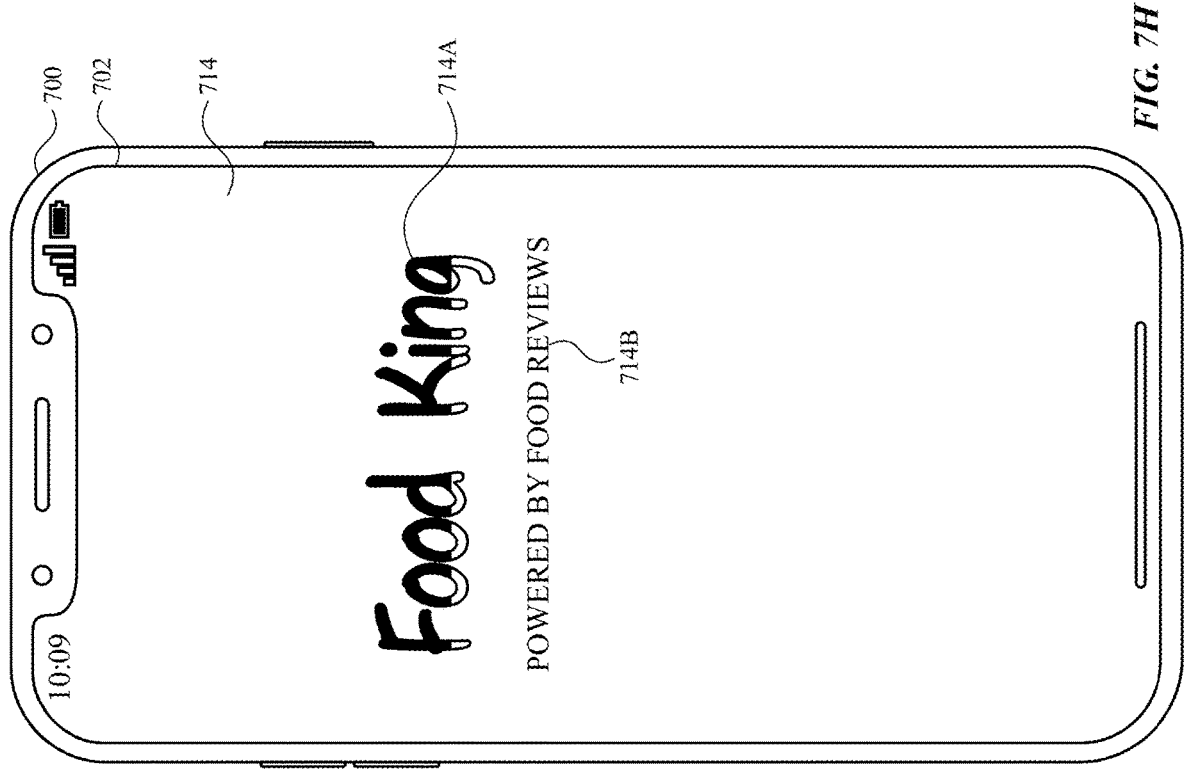
Figure 7G:
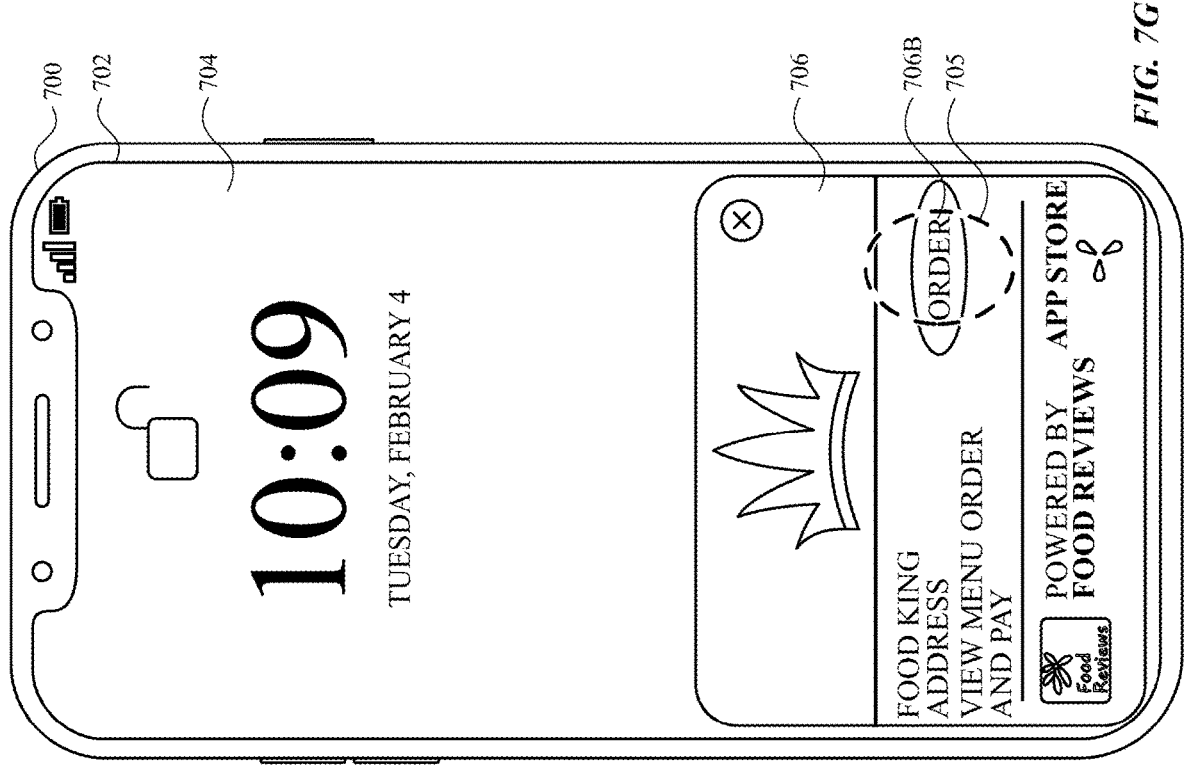

FIGS. 7G-7N illustrate a method (e.g., a location-based method) for initiating a process for enabling an activity on computer system 700 without using a corresponding full-version application on computer system 700 (e.g., because the full-version application is not installed on computer system 700). FIG. 7G illustrates computer system 700 displaying, in response to detecting (e.g., via one or more location sensors of the one or more input devices) that computer system 700 is at the first restaurant (e.g., because the user of computer system 700 walked into/arrived at the first restaurant), sheet user interface 706 as first depicted in FIG. 7B. In FIG. 7G, as in FIG. 7E, the full-version application of the developer (e.g., "Food Reviews") is not available on (e.g., is not installed on) computer system 700.

In FIG. 7G, while displaying sheet user interface 706, computer system 700 detects (e.g., via a touch sensitive surface of the one or more input devices) an activation 705 of (e.g., user selection of; user's tap input on) affordance 706B for initiating a process for enabling the activity (e.g., ordering) that relates to the first restaurant on computer system 700.

Figure 7J:
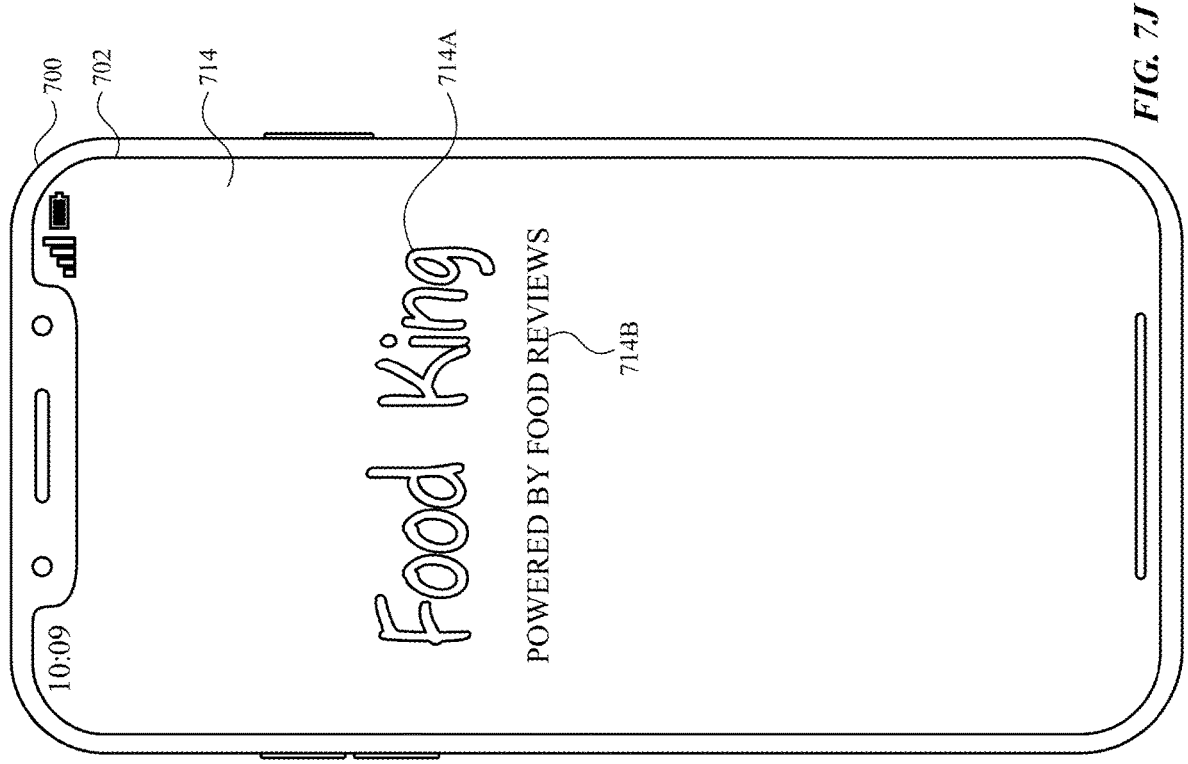
Figure 7I:
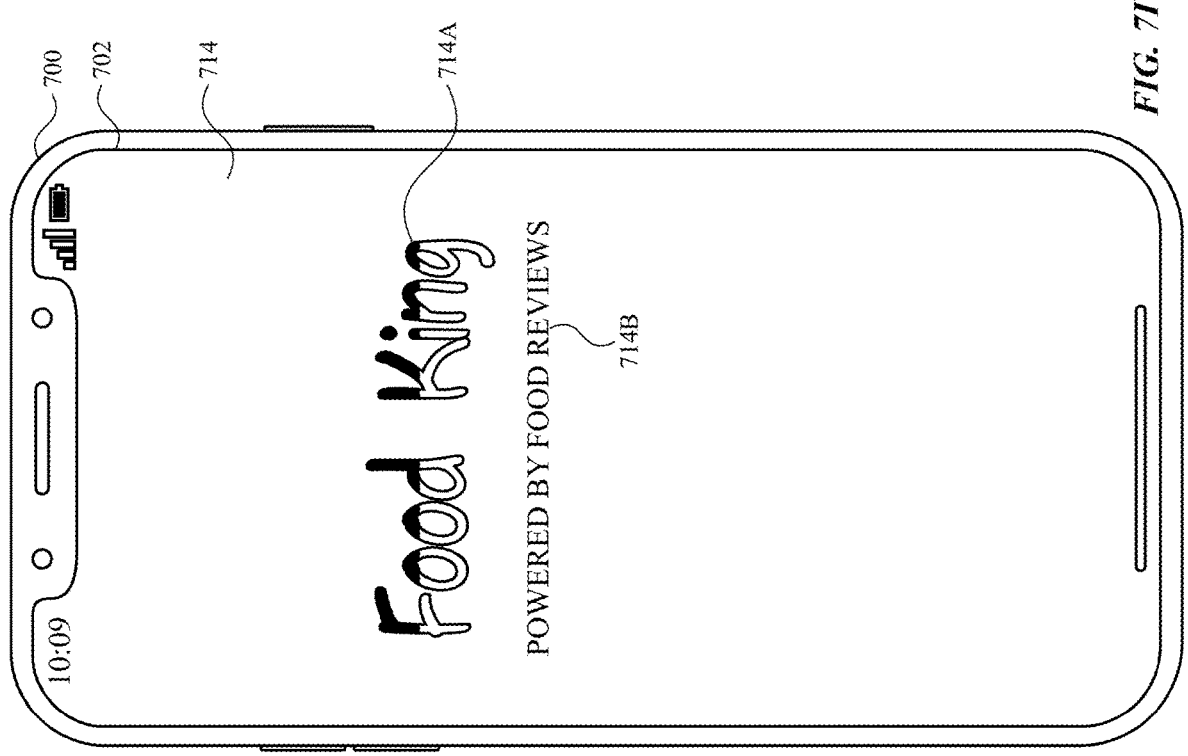

In some embodiments, as shown in FIGS. 7H-7J, in response to detecting activation 705 of affordance 706B in sheet user interface 706, computer system 700 displays, via display generation component 702, a user interface 714 (e.g., a loading screen) that includes an indication 714A of the name of the first restaurant (e.g., "Food King") and an indication 714B of the developer (e.g., an entity; a company) (e.g., "Food Reviews") that powers (e.g., creates and/or manages the template for) a lite-version application that can be used to enable the activity (e.g., ordering menu items, such as food and/or drinks) associated with the first restaurant. In some embodiments, computer system 700 displays a visual animation via indication 714A and/or indication 714B while displaying user interface 714 (e.g., the loading screen is animated).

Figure 7K:
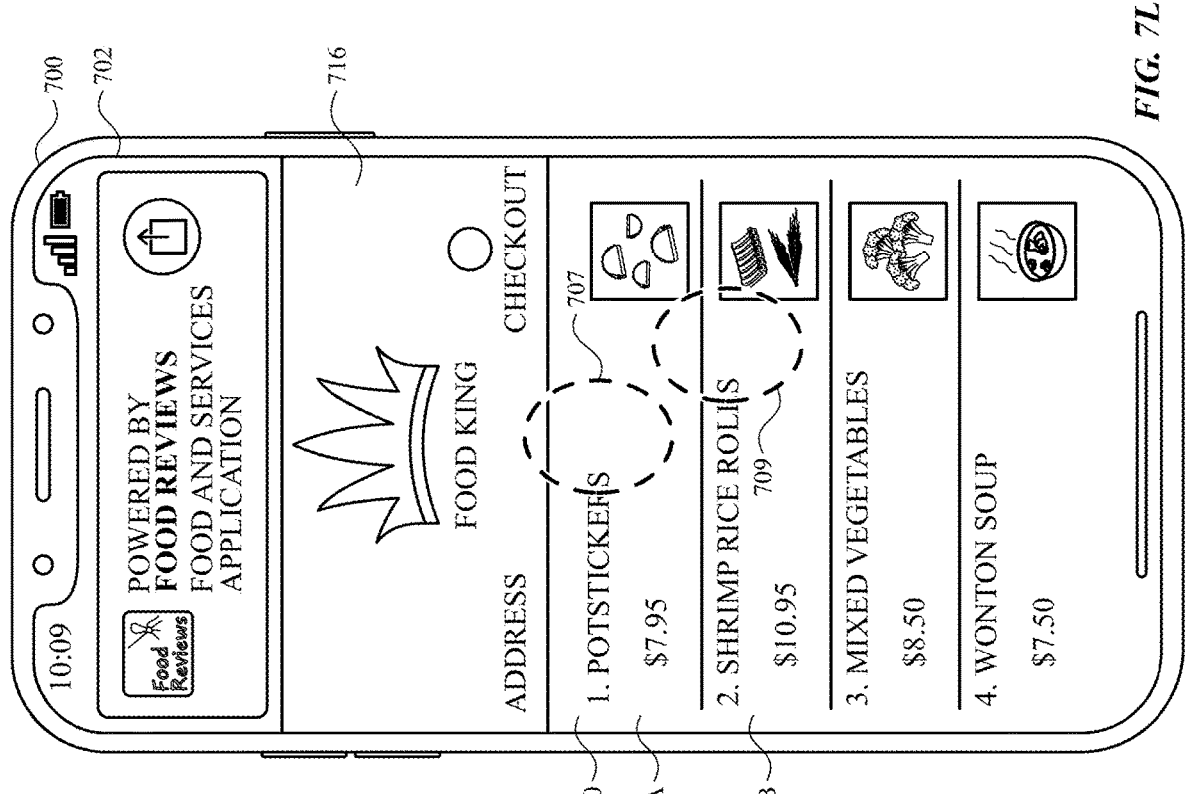

In FIG. 7K, in response to (e.g., or subsequent to) detecting activation 705 of affordance 706B in sheet user interface 706 (e.g., and after having displayed user interface 714 (e.g., the loading screen) for a predetermined time period), computer system 700A displays, via display generation component 702, a lite user interface 716 of the lite-version application, where lite user interface 716 corresponds to the first restaurant-version (e.g., the "Food King"-version) of the lite-version application (e.g., "Food Reviews"). In some embodiments, lite user interface 716 corresponds to the lite-version application of the full-version application (e.g., of "Food Reviews"), for which the counterpart full-version user interface is depicted in FIG. 7D. In some embodiments, in accordance with a determination that the lite-version application is not installed on computer system 700, computer system 700 automatically (e.g., without user input) downloads and installs the lite-version application corresponding to lite user interface 716 in response to detecting activation 705 of affordance 706B in sheet user interface 706 (e.g., while displaying user interface 714 (e.g., the loading screen) shown in FIGS. 7H-7J). In some embodiments, computer system 700 does not request user authorization (e.g., authorization by providing authentication information, such as biometric authentication and/or password/passcode authentication) to automatically download and install the lite-version application.

As shown in FIG. 7K, in some embodiments, lite user interface 716 includes location information 718 (e.g., address) of the first restaurant. In some embodiments, lite user interface 716 includes a menu region 720 that includes a plurality of selectable menu items that can be ordered at the first restaurant. In some embodiments, lite user interface 716 includes an affordance 722 (e.g., a selectable user interface object; an activatable user interface object) for ordering/checking out selected menu items.

As shown in FIG. 7K, in some embodiments, lite user interface 716 includes a user interface object 724 (e.g., a banner; a platter) that is displayed concurrently with lite user interface 716 (e.g., overlaid on a portion of lite user interface 716). In some embodiments, user interface object 724 is displayed with display of lite user interface 716 and is displayed for a predetermined time period (e.g., 10 seconds; 30 seconds; 1 minute). In some embodiments, user interface object 724 includes an indication 724A (e.g., text information) of the developer (e.g., an entity; a company) that powers (e.g., creates and/or manages the template for) the lite-version application corresponding to lite user interface 716. In some embodiments, user interface object 724 includes a share affordance 724B for initiating a process for sharing the lite-version application corresponding to lite user interface 716 with a different user (e.g., transmitting an electronic communication to a different computer system of the different user that includes the lite-version application and/or instructions for downloading the lite-version application).

Figure 7L:
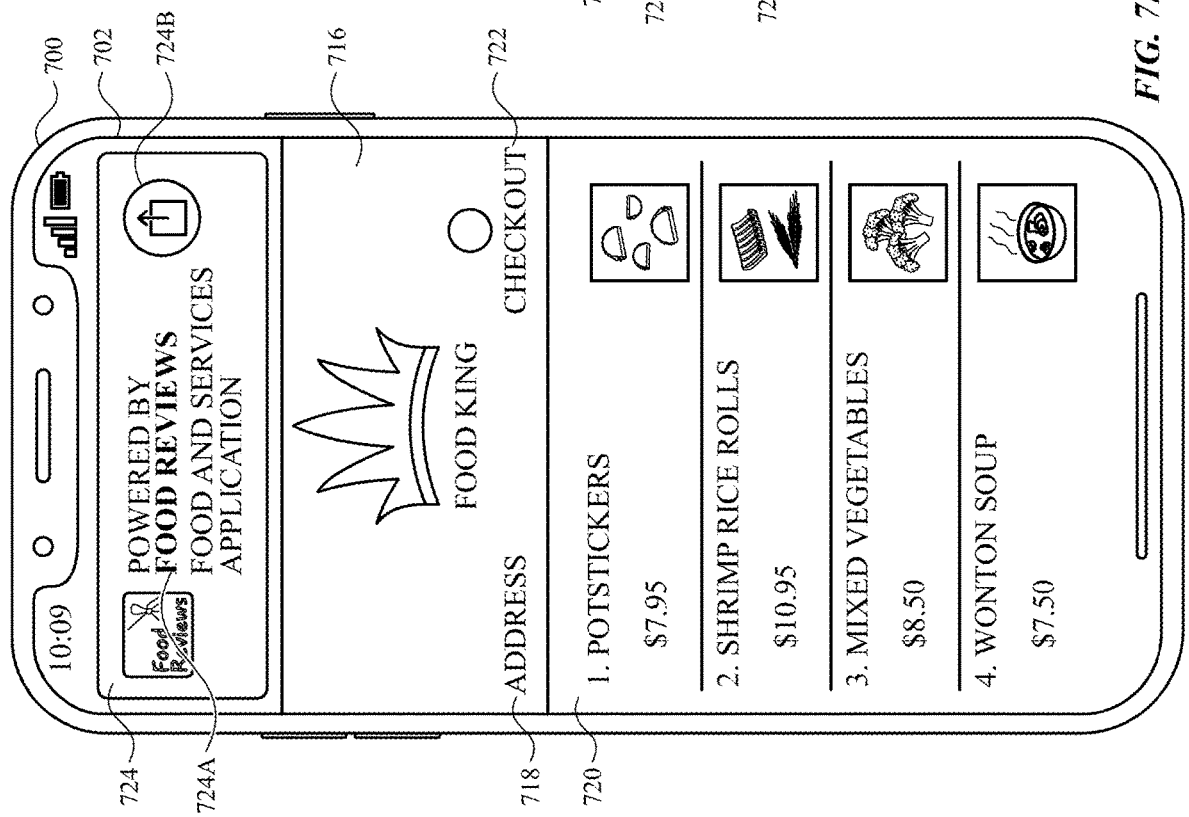
Figure 7N:
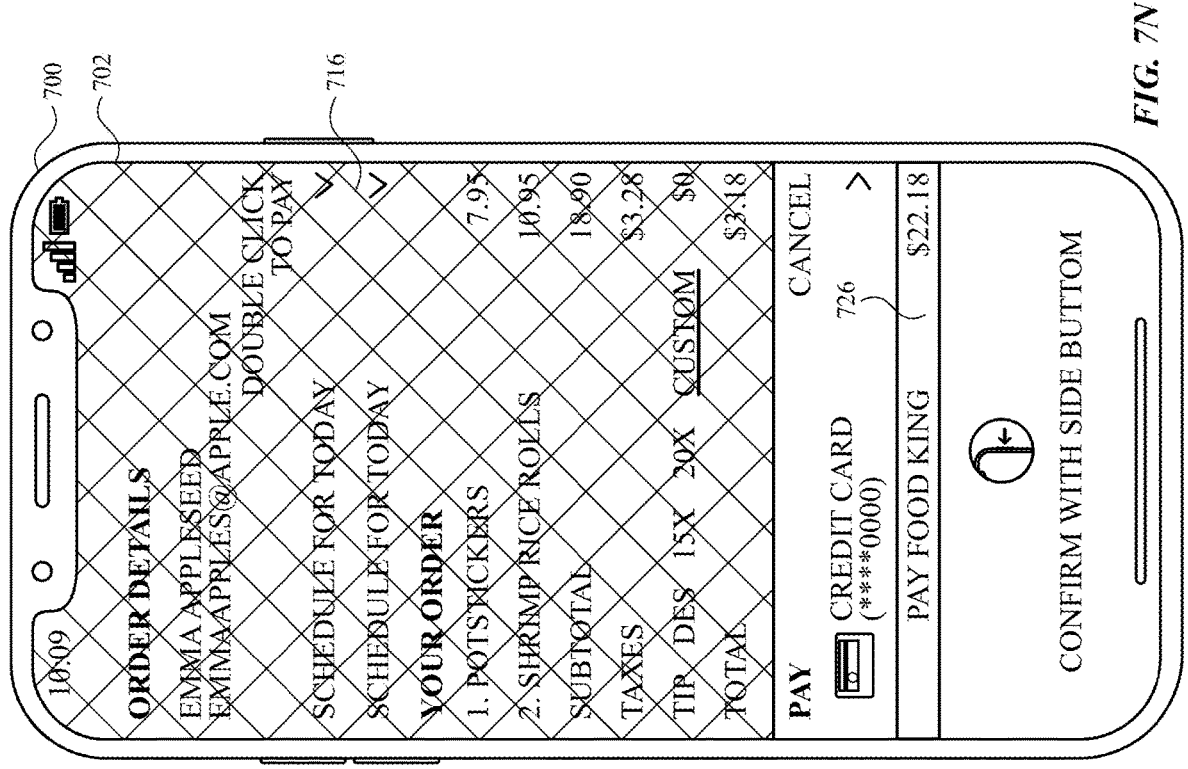

In FIG. 7L, while displaying lite user interface 716, computer system 700 detects (e.g., via a touch sensitive surface of the one or more input devices) a user selection 707 of a first menu item 720A and a user selection 709 of a second menu item 720B from menu region 720 of lite user interface 716.

Figure 7M:
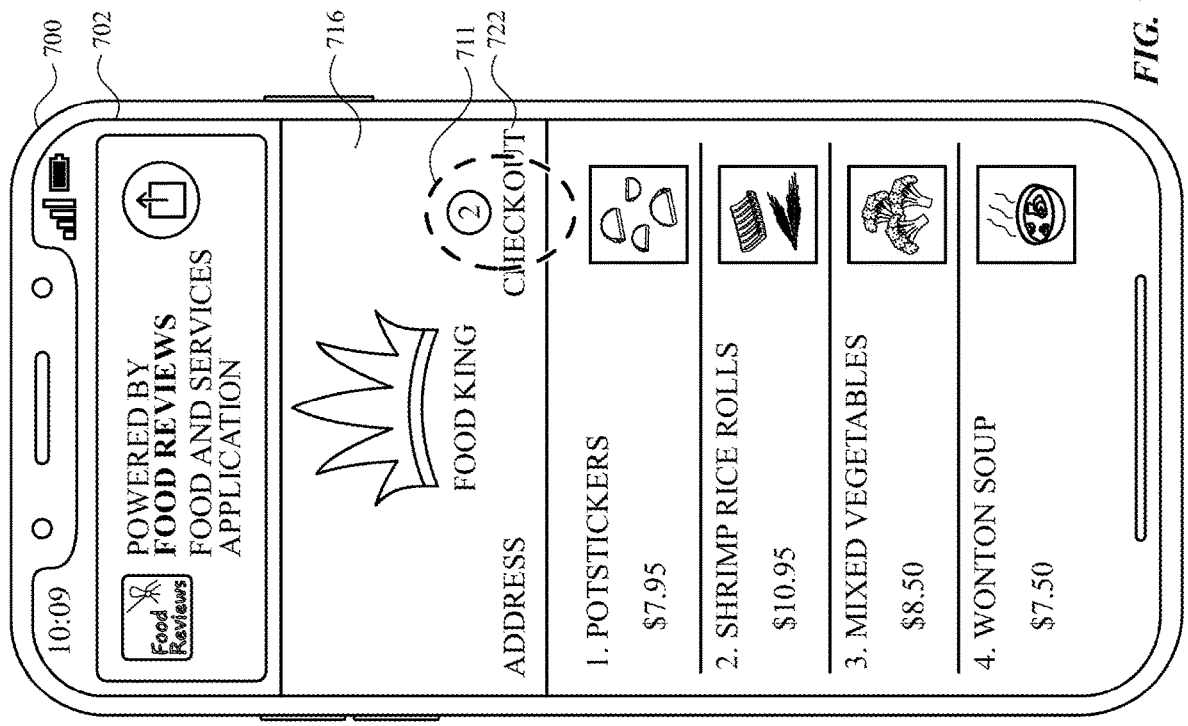

In FIG. 7M, in response to detecting user selection 709 and user selection 711 of first menu item 720A and second menu item 720B, respectively, computer system 700 displays, in lite user interface 716 (e.g., via affordance 722), an indication that the selected menu items have been added to a current order (e.g., added to a checkout cart). While the selected menu items have been added to the current order, computer system 700 detects (e.g., via a touch sensitive surface of the one or more input devices) an activation 711 of (e.g., user selection of; user's tap input on) affordance 722.

In FIG. 7N, in response to detecting activation 711 of affordance 722, computer system 700 displays, via display generation component 702 (e.g., overlaid on a portion of lite user interface 716 such that a portion of, but not all of, lite user interface 716 remains visible on display generation component 702), an authorization user interface 726 for authorizing a transfer (e.g., a transaction) to complete the process for ordering the selected menu items. In some embodiments, authorization user interface 726 corresponds to a secure first-party application that is developed and managed by the same entity (e.g., same company) that developed and manages the operating system of computer system 700.

Figure 7P:
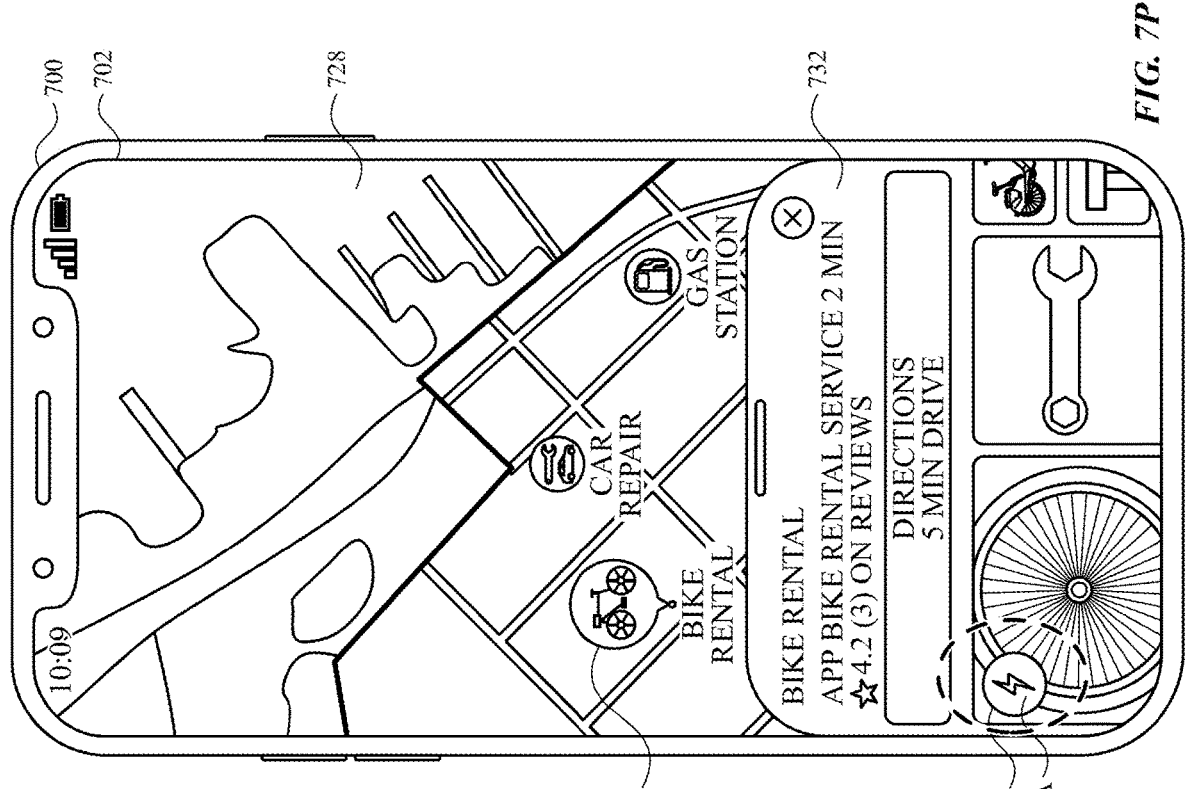
Figure 7O:
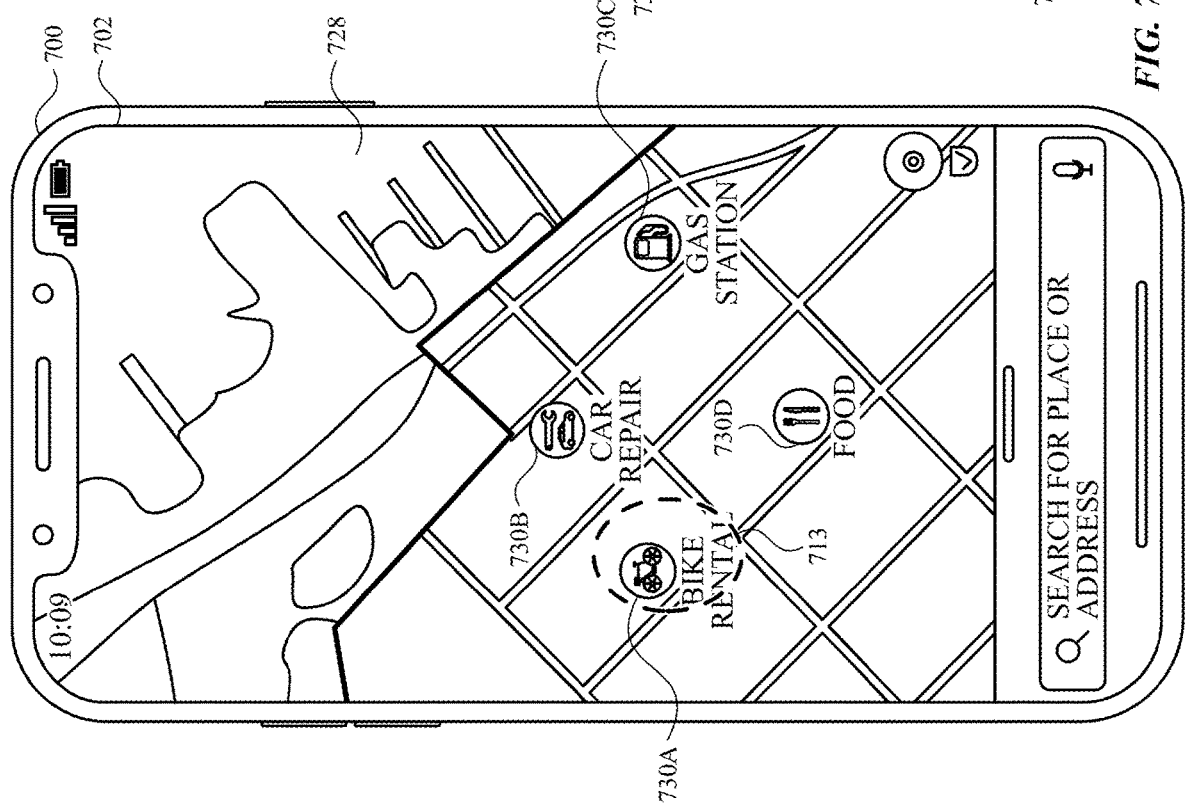
Figure 7R:
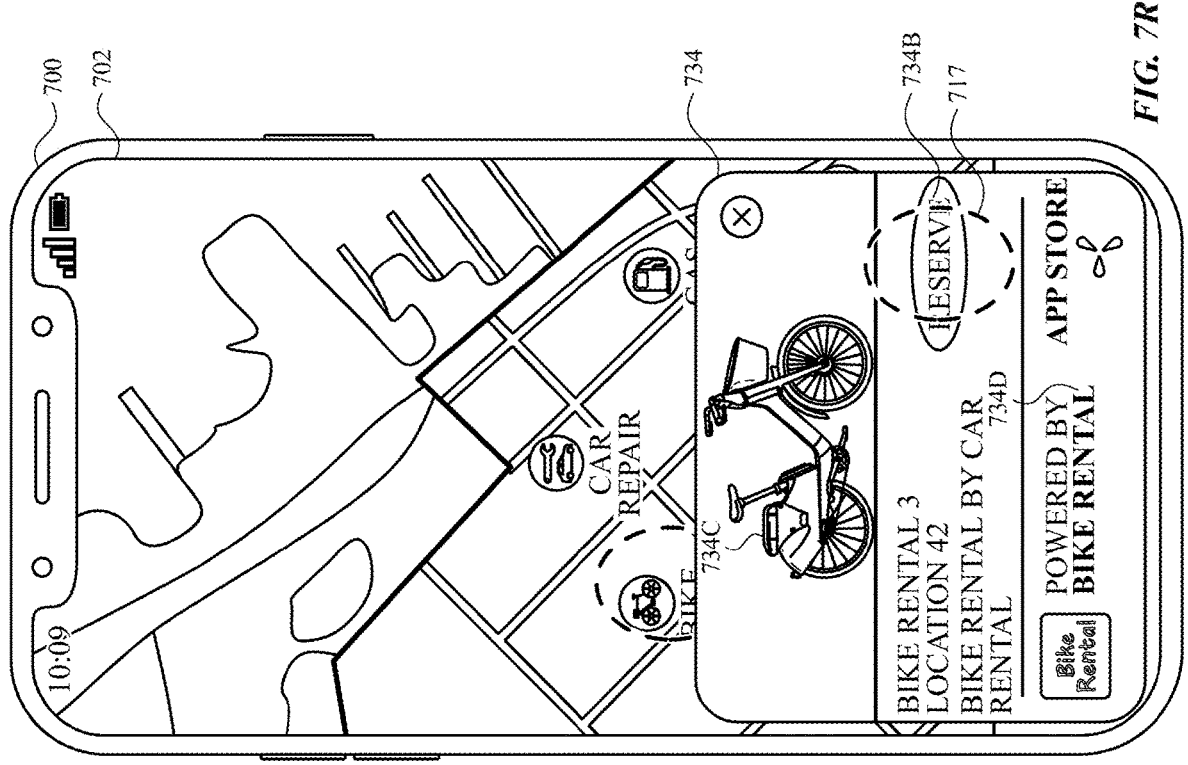

FIGS. 7O-7U illustrate a method (e.g., a point-of-interest-based method) for initiating a process for enabling an activity on computer system 700 without using a corresponding full-version application on computer system 700 (e.g., because the full-version application is not installed on computer system 700). FIG. 7O illustrates computer system 700 displaying, via display generation component 702, a user interface 728 of a map application that includes a map 730, and where map 730 includes a plurality of location points 730A-730D corresponding to point-of-interests (e.g., saved locations; favorite locations; suggested locations).

In FIG. 7O, while displaying map 730 in user interface 728 of the map application, computer system 700 detects (e.g., via a touch sensitive surface of the one or more input devices) a user selection 713 of a first location point 730A (e.g., a first point-of-interest) in map 730, where first location point 730A corresponds to a first bike rental location.

In FIG. 7P, in response to detecting user selection 713 of first location point 730A in map 730, computer system 700 displays, via display generation component 702 (e.g., overlaid on a portion of user interface 728), a user interface 732 (e.g., a pop-up) that includes information about (e.g., name; address; rating; reviews; photos; direction) the selected location (the first bike rental location), where user interface 732 includes an affordance 732A (e.g., a selectable user interface object; an activatable user interface object) associated with initiating the process for enabling an activity (e.g., renting a bike) associated with the selected first bike rental location on computer system 700.

In FIG. 7P, while displaying user interface 732, computer system 700 detects (e.g., via a touch sensitive surface of the one or more input devices) an activation 715 of (e.g., user selection of; user's tap input on) affordance 732A.

Figure 7Q:
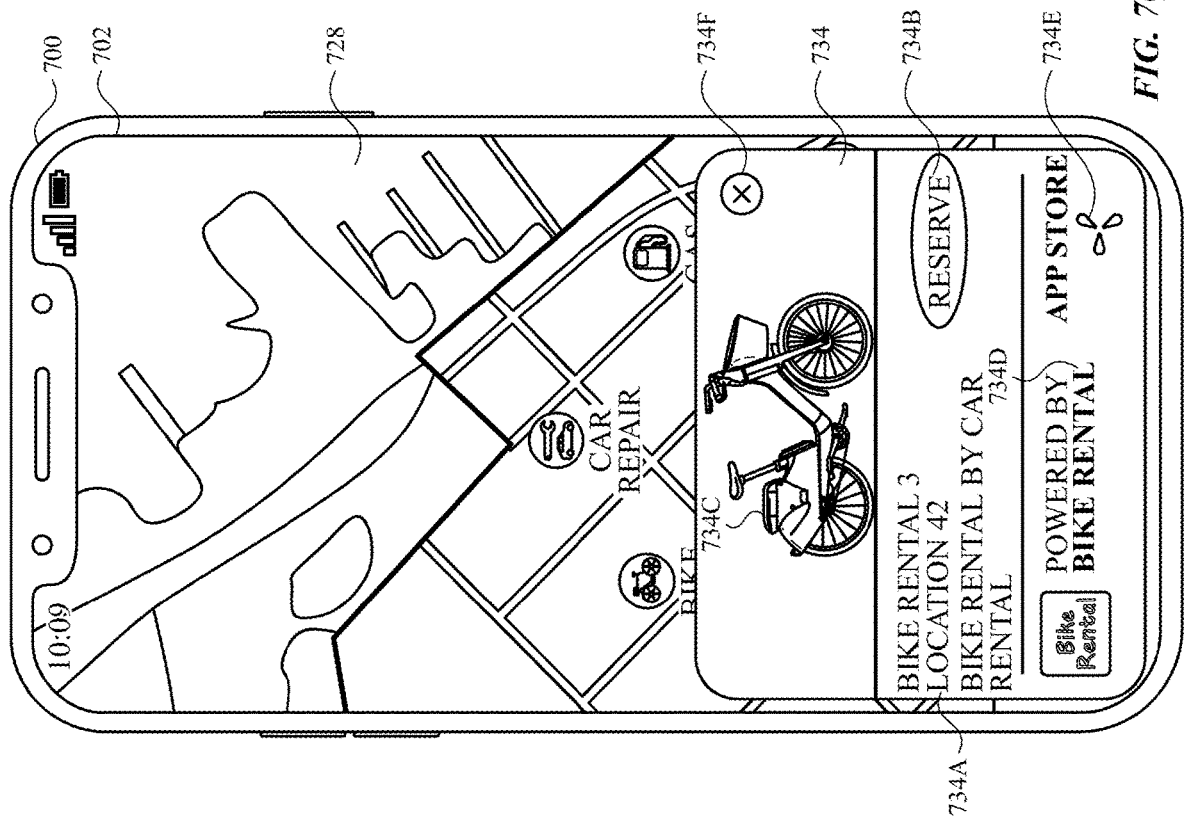

In FIG. 7Q, in response to detecting activation 715 of affordance 732A, computer system 700 displays, via display generation component 702 (e.g., and overlaid on a portion of user interface 728 of the map application), a sheet user interface 734 corresponding to the selected respective location (e.g., the first bike rental location), where sheet user interface 734 is similar to (e.g., has the same layout/structure as; provides a consistent experience as) sheet user interface 706 first described above with reference to FIG. 7B. In FIG. 7B, sheet user interface 706 is associated with enabling an activity (e.g., ordering) based on a detected respective location (e.g., detecting that computer system 700 is at the first restaurant). In FIG. 7Q, sheet user interface 734 is associated with enabling an activity (e.g., renting) based on a detected (e.g., received) selection of a respective location from a map application.

In the exemplary user interfaces depicted in FIGS. 7O-7U, the selected respective location is a first bike rental location (e.g., a bike rental store; a bike rental port) In some embodiments, sheet user interface 734 includes an information region 734A that includes a name of the first bike rental location (e.g., "Bike Rental 3") and an address and/or branch information about the bike rental location (e.g., "location 42") and an affordance 734B (e.g., a selectable user interface object; an activatable user interface object) which, when activated, initiates a process for enabling an activity (e.g., reserving a bike) that relates to the first bike rental location.

In some embodiments, sheet user interface 734 includes an image 734C (e.g., of the first bike rental location; a logo a vendor (e.g., an entity/company) that operates the first bike rental location) that is indicative of the first bike rental location.

In some embodiments, sheet user interface 734 includes an indication 734D of a developer (e.g., an entity; a company) that powers (e.g., creates and/or manages the template for) a lite-version application that can be used to enable the activity (e.g., reserving a bike) associated with the first rest first bike rental location on computer system 700. In some embodiments, as in FIG. 7Q, the developer that powers the lite-version application (and the corresponding full-version application) is the same as the vendor (e.g., the entity/company) that operates the first bike rental location.

In some embodiments, sheet user interface 734 includes an affordance 734E (e.g., a selectable user interface object; an activatable user interface object) for accessing an application store (e.g., an application store controlled and managed by a developer of the operating system of computer system 700, where the application store can be used to download first-party and third-party applications onto computer system 700).

In some embodiments, sheet user interface 734 includes an affordance 734F (e.g., a selectable user interface object; an activatable user interface object) for dismissing (e.g., causing computer system 700 to cease display of) sheet user interface 734 without performing the activity (e.g., reserving a bike) associated with the first bike rental location.

In FIG. 7R, while displaying sheet user interface 734 that can be used to initiate the activity (e.g., reserving a bike) associated with the first bike rental location, computer system 700 detects (e.g., via a touch sensitive surface of the one or more input devices) an activation 717 of (e.g., user selection of; user's tap input on) affordance 734B.

Figure 7S:
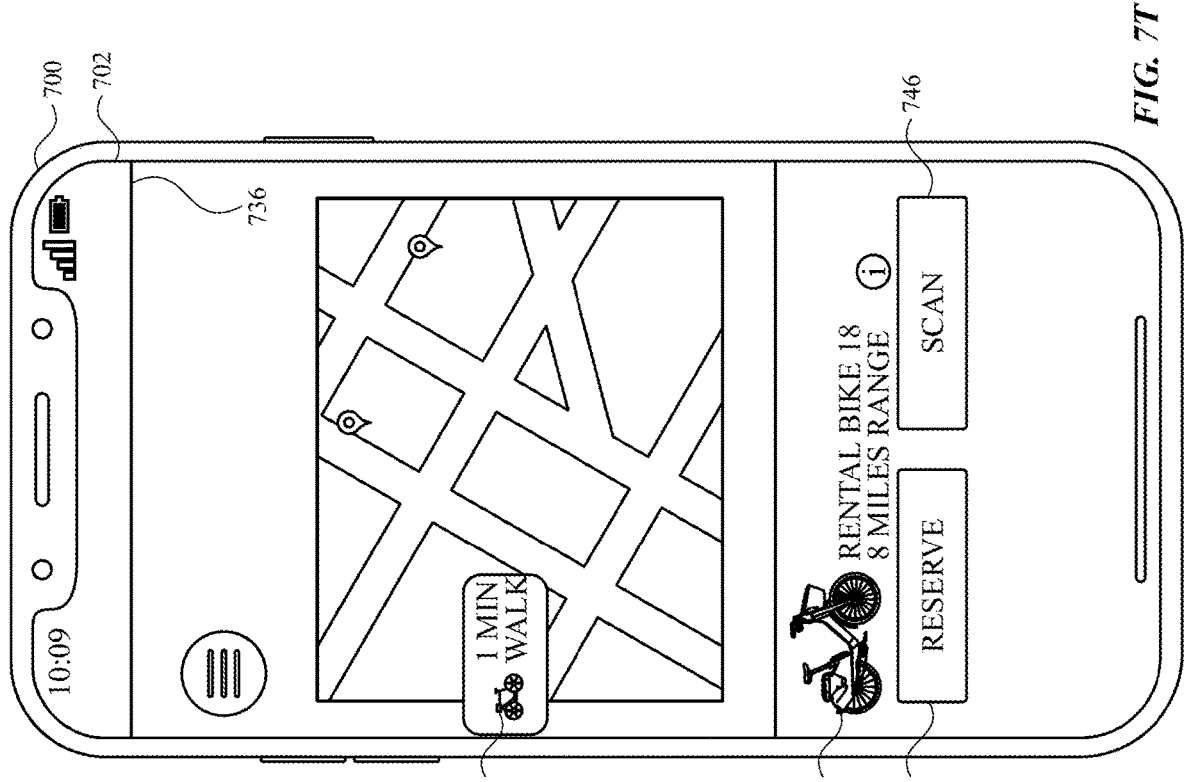

In FIG. 7S, in response to detecting activation 717 of affordance 734B, in accordance with a determination that the full-version application for enabling the activity (e.g., reserving a bike) is not available on (e.g., is not installed on) computer system 700, computer system 700 displays, via display generation component 702, a lite user interface 736 of the lite-version application for enabling the activity (e.g., reserving a bike). In some embodiments, the full-version application counterpart to the lite-version application for enabling the activity (e.g., reserving a bike) can be downloaded onto computer system 700 from the application store (e.g., via affordance 734E of user interface 734). In some embodiments, if the lite-version application is not installed on computer system 700 (e.g., because this is the first time the lite-version "Bike Rental" application is being accessed), computer system 700 (e.g., in response to detecting activation 717 of affordance 734B) automatically (e.g., without user input; without user authorization) downloads and installs (e.g., prior to and/or while displaying lite user interface 736) the lite-version application.

As shown in FIG. 7S, in some embodiments, lite user interface 736 includes a first region 738 that includes a map (e.g., indicating one or more locations in the vicinity corresponding to different bike rental locations; a map provided by the lite application that is customized for the purposes of the activity, as opposed to the map application illustrated in FIG. 7O). In some embodiments, lite user interface 736 includes an indication 740 (e.g., displayed as a user interface object; as a platter) showing a respective bike rental location (e.g., the first bike rental location) that is closest to a current location of computer system 700 (e.g., and includes a time required to reach (e.g., to walk to) the respective bike rental location).

In some embodiments, lite user interface 736 includes a second region 742 that includes information about an object (e.g., a specific bike) that can be reserved at the first bike rental location, including an identifier/identification number for that object (e.g., an identification number for that specific bike). In some embodiments, second region 742 includes an affordance 744 for reserving the object (e.g., the specific bike) and an affordance 746 for initiating a checkout of the object (e.g., by scanning a code/identifier of the bike) once the user has reached the object.

Figure 7T:
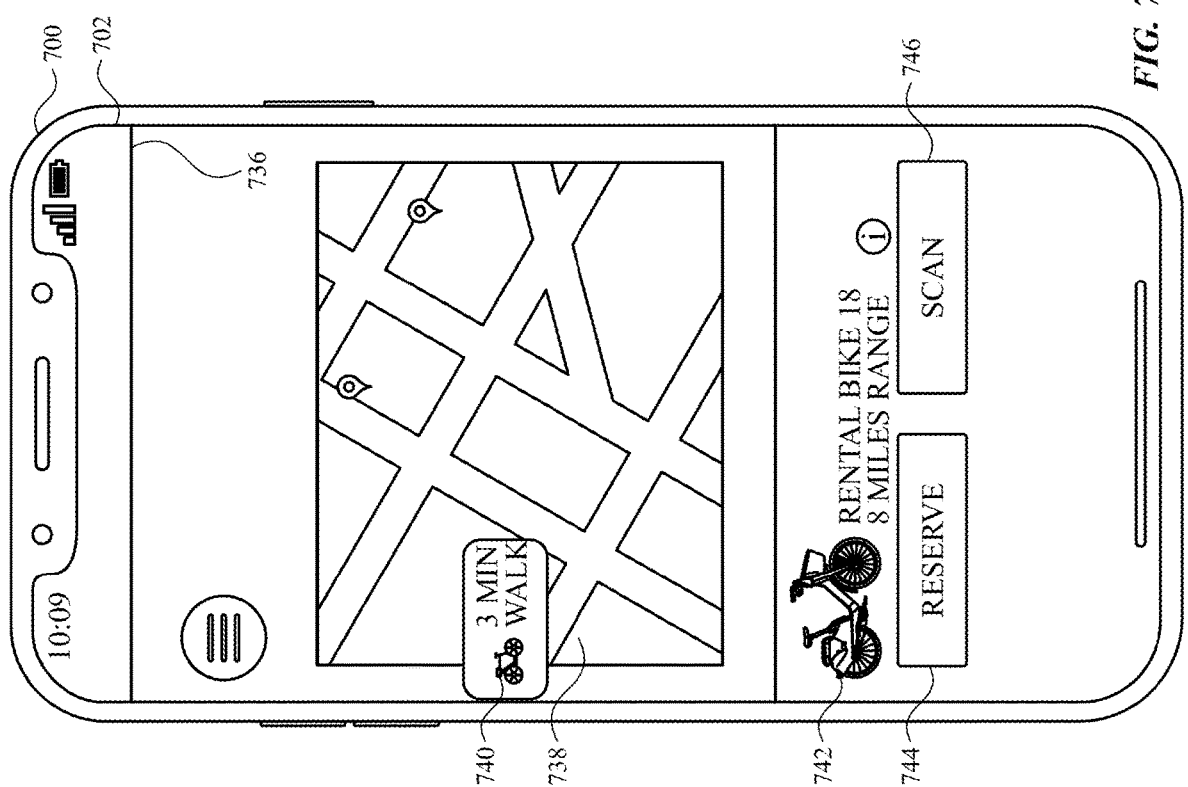

In some embodiments, while the lite-version application corresponding to lite user interface 736 has been recently used or is being used (e.g., is active on computer system; is currently being displayed and/or is running in the background), computer system 700 detects (e.g., via one or more location sensors) that computer system 700 is being moved closer to the first bike rental location. In some embodiments, computer system 700 indicates, in lite user interface 736 (e.g., via indication 740) the updated location of computer system 700 relative to the first bike rental location, as shown in FIG. 7T.

FIG. 7U illustrates computer system 700 displaying, via display generation component 702, user interface 704 corresponding to the wake screen (e.g., a lock screen) of computer system 700, as first described above with reference to FIG. 7A. In some embodiments, lite-version application is enabled to (e.g., is authorized to; has access to) cause notifications on computer system 700.

In FIG. 7U, in accordance with a determination that computer system 700 is at (e.g., has reached) the location of the first bike rental location, computer system 700 displays, via display generation component 702, a notification 748 indicating that the location has been reached.

FIGS. 7V-7AA illustrate a method (e.g., a NFC-based method; a QR code-based method) for initiating a process for enabling an activity on computer system 700 without using a corresponding full-version application on computer system 700 (e.g., because the full-version application is not installed on computer system 700).

FIG. 7V illustrates computer system 700 displaying, via display generation component 702, user interface 704 corresponding to the wake screen (e.g., a lock screen) of computer system 700, as first described above with reference to FIG. 7A. In FIG. 7V, computer system 700 is at a first identified location (e.g., a first table) at a first location (e.g., a first restaurant; a first cafe; a first bakery). In the exemplary user interfaces depicted in FIGS. 7V-7AA, the first identified location is a first table (e.g., table 5) at a first cafe.

Figure 7W:
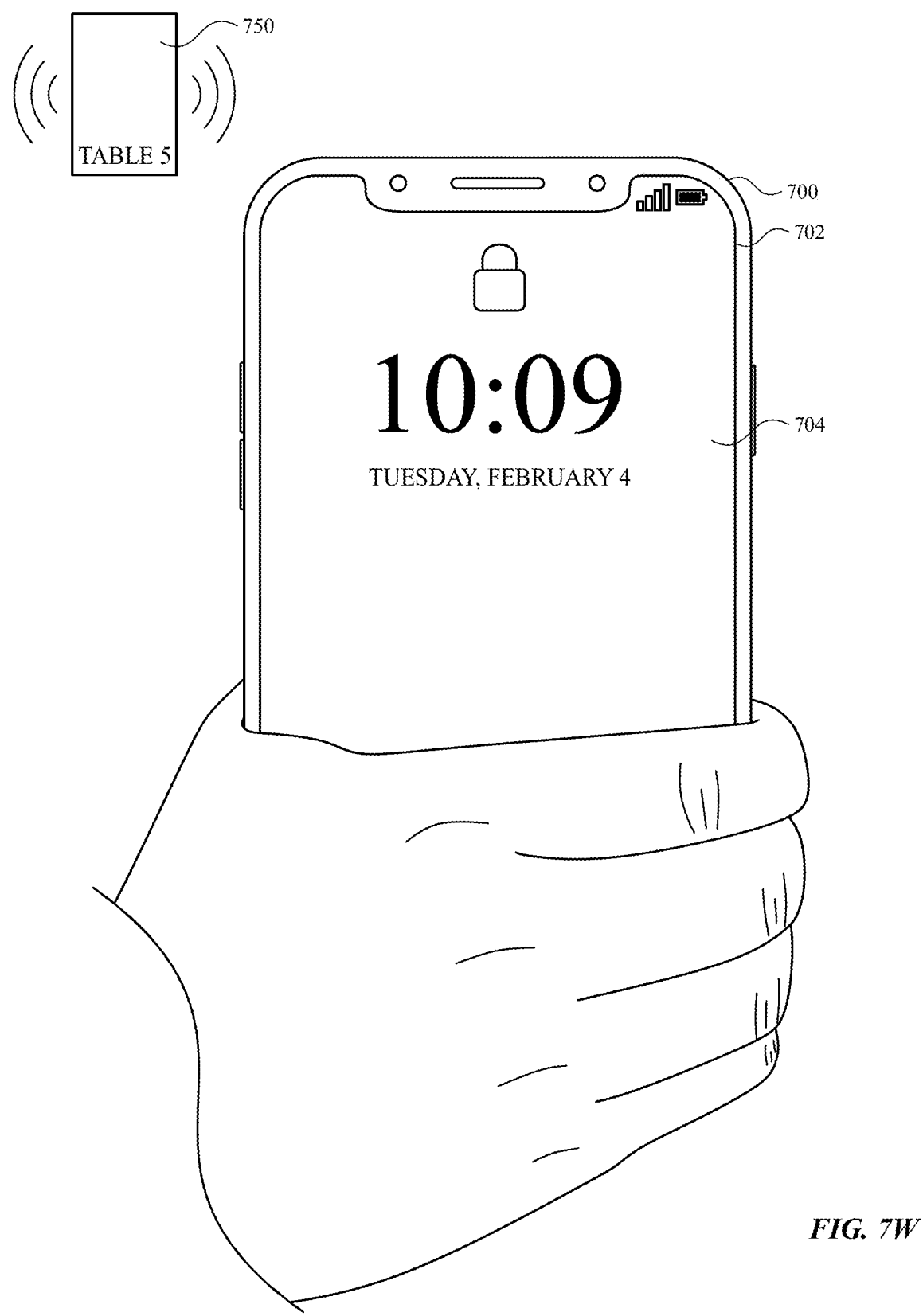
Figure 7Y:
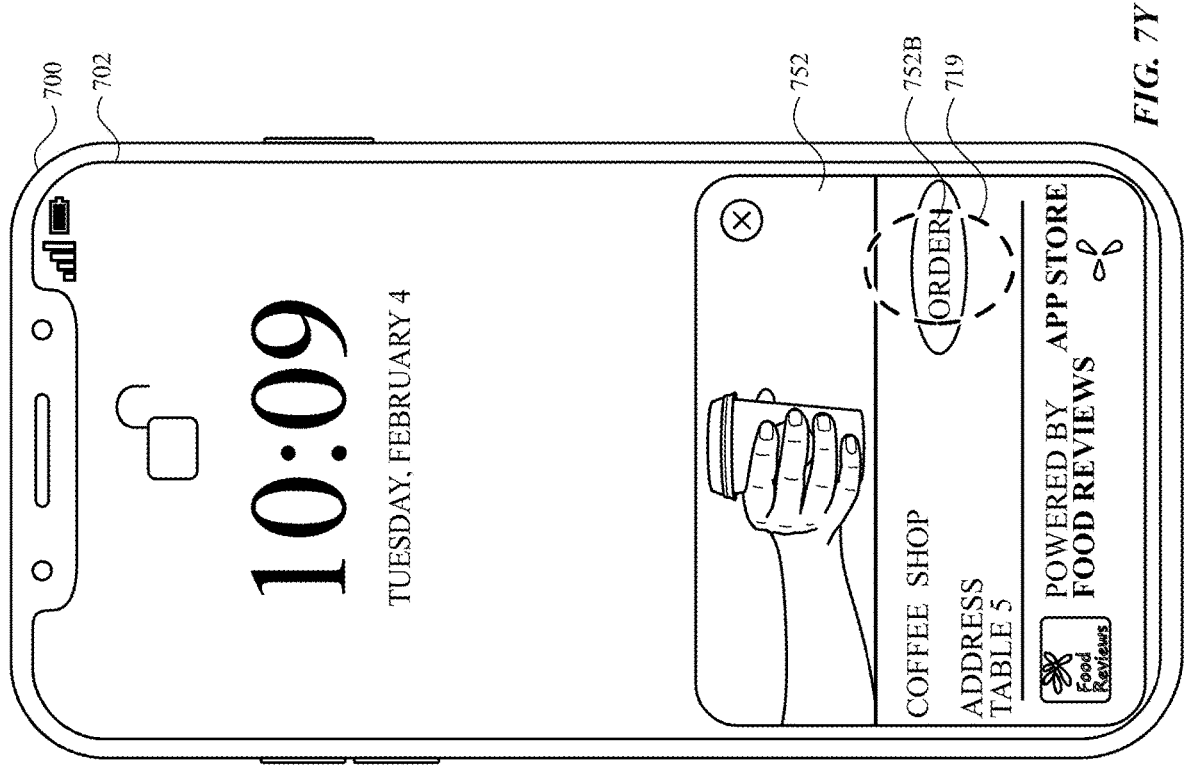

FIG. 7W illustrates computer system 700 in communication (e.g., via NFC) with a contactless wireless terminal 750 (e.g., a NFC terminal), where terminal 750 corresponds to a terminal at the first table (table 5) of the first cafe. In some embodiments, as shown in FIG. 7W, display generation component 702 of computer system 700 is in an on state (e.g., displaying user interface 704) when computer system receives the respective communication from terminal 750 (e.g., via NFC) (e.g., or alternatively, computer system 700 detects a QR code from a scan (e.g., using one or more image sensors) of a QR code terminal). In some embodiments, display generation component 702 of computer system 700 is in an off state when computer system 700 receives the respective communication from terminal 750 (e.g., via NFC).

In FIG. 7W, computer system 700 detects (e.g., receives) (e.g., via NFC) identification information (e.g., an identifier) from terminal 750 (e.g., or alternatively detects a QR code via a scan of (e.g., using one or more image sensors) the QR code terminal at the first table), where the identification information includes information about the first cafe (e.g., information identifying the first cafe) and/or information about the first table (e.g., information identifying that terminal 750 corresponds to table 5 within the first cafe).

Figure 7X:
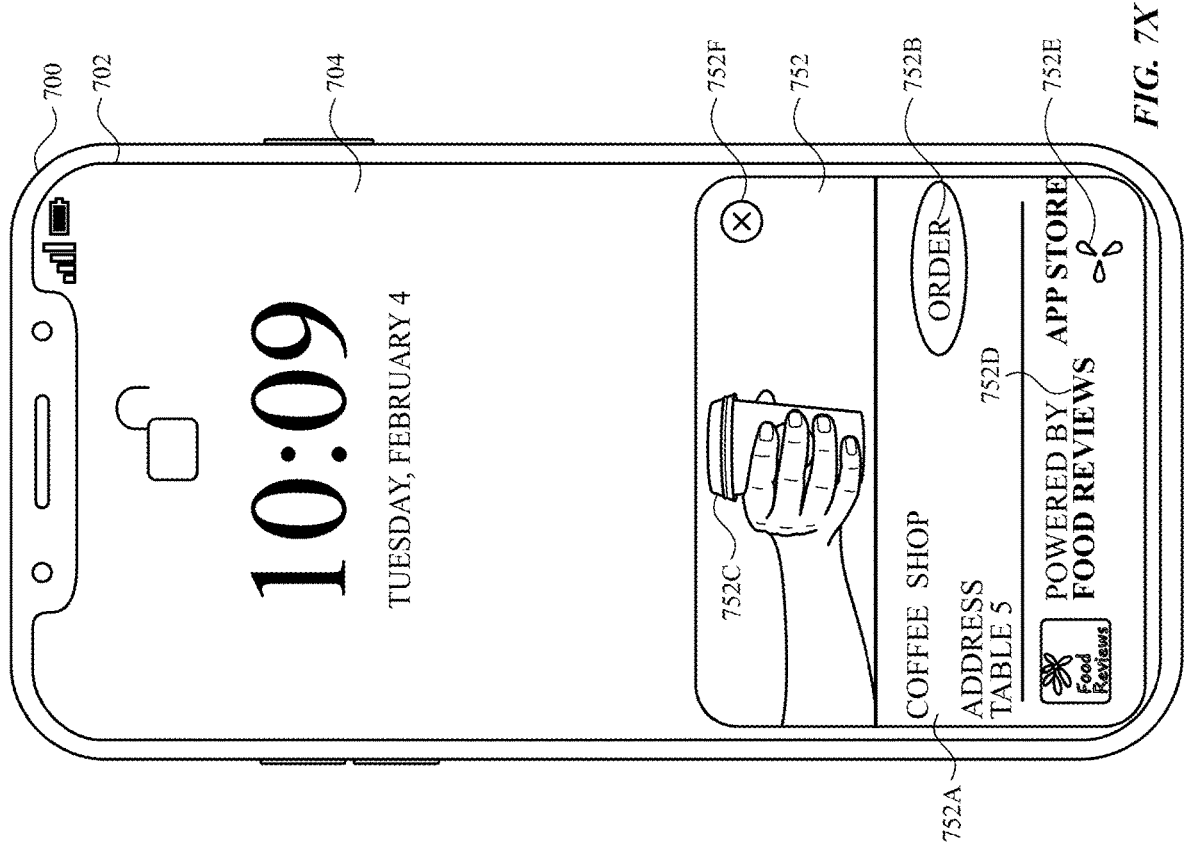

In FIG. 7X, in response to detecting (e.g., receiving) (e.g., via NFC; via scanning a QR code) the identification information from terminal 750, computer system 700 displays, via display generation component 702 (e.g., overlaid on a portion of user interface 704), a sheet user interface 752 based on the identification information from terminal 750, where sheet user interface 752 is similar to (e.g., has the same layout/structure as; provides a consistent experience as) sheet user interface 706 first described above with reference to FIG. 7B and sheet user interface 734 first described above with reference to FIG. 7Q. In FIG. 7B, sheet user interface 706 was associated with enabling an activity (e.g., ordering) based on a detected respective location (e.g., detecting that computer system 700 is at the first restaurant). In FIG. 7Q, sheet user interface 734 was associated with enabling an activity (e.g., renting) based on a detected (e.g., received) selection of a respective location from the map application. In FIG. 7X, sheet user interface 752 is associated with enabling an activity (e.g., ordering) based on detected (e.g., received) identification information (e.g., via NFC; via scanning a QR code) from an external device (e.g., a contactless wireless terminal).

In the exemplary user interfaces depicted in FIGS. 7V-7AA, the detected (e.g., received) identification information includes information about the first cafe and identifies the first table (e.g., table 5) within the first cafe. In some embodiments, sheet user interface 752 includes an information region 752A that includes a name of the first cafe (e.g., "Coffee Shop") and an address and/or branch information about the first cafe and an affordance 752B (e.g., a selectable user interface object; an activatable user interface object) which, when activated, initiates a process for enabling an activity (e.g., ordering one or more menu items to the first table) that relates to the first café, and specifically to the first table (e.g., table 5) at the first cafe.

In some embodiments, sheet user interface 752 includes an image 752C (e.g., of the first cafe; a logo a vendor (e.g., an entity/company) that operates the first cafe) that is indicative of the first café (e.g., "Coffee Shop").

In some embodiments, sheet user interface 752 includes an indication 752D of a developer (e.g., an entity; a company) that powers (e.g., creates and/or manages the template for) a lite-version application that can be used to enable the activity (e.g., ordering one or more menu items, such as food or drinks) associated with the first café (e.g., "Coffee Shop"). In some embodiments, as in FIG. 7X, the developer that powers the lite-version application (and the corresponding full-version application) (e.g., "Food Reviews") is different from the vendor (e.g., the first cafe (e.g., "Coffee Shop")).

In some embodiments, sheet user interface 752 includes an affordance 752E (e.g., a selectable user interface object; an activatable user interface object) for accessing an application store (e.g., an application store controlled and managed by a developer of the operating system of computer system 700, where the application store can be used to download first-party and third-party applications onto computer system 700). In some embodiments, the full-version application counterpart to the lite-version application for enabling the activity (e.g., reserving a bike) can be downloaded onto computer system 700 from the application store (e.g., via affordance 752E of sheet user interface 752).

In some embodiments, sheet user interface 752 includes an affordance 752F (e.g., a selectable user interface object; an activatable user interface object) for dismissing (e.g., causing computer system 700 to cease display of) sheet user interface 752 without performing the activity (e.g., ordering one or more menu items to the first table) associated with the first cafe.

In FIG. 7Y, while displaying sheet user interface 752 that can be used to initiate the activity (e.g., ordering one or more menu items to the first table) associated with the first cafe, computer system 700 detects (e.g., via a touch sensitive surface of the one or more input devices) an activation 719 of (e.g., user selection of; user's tap input on) affordance 752B.

Figure 7Z:
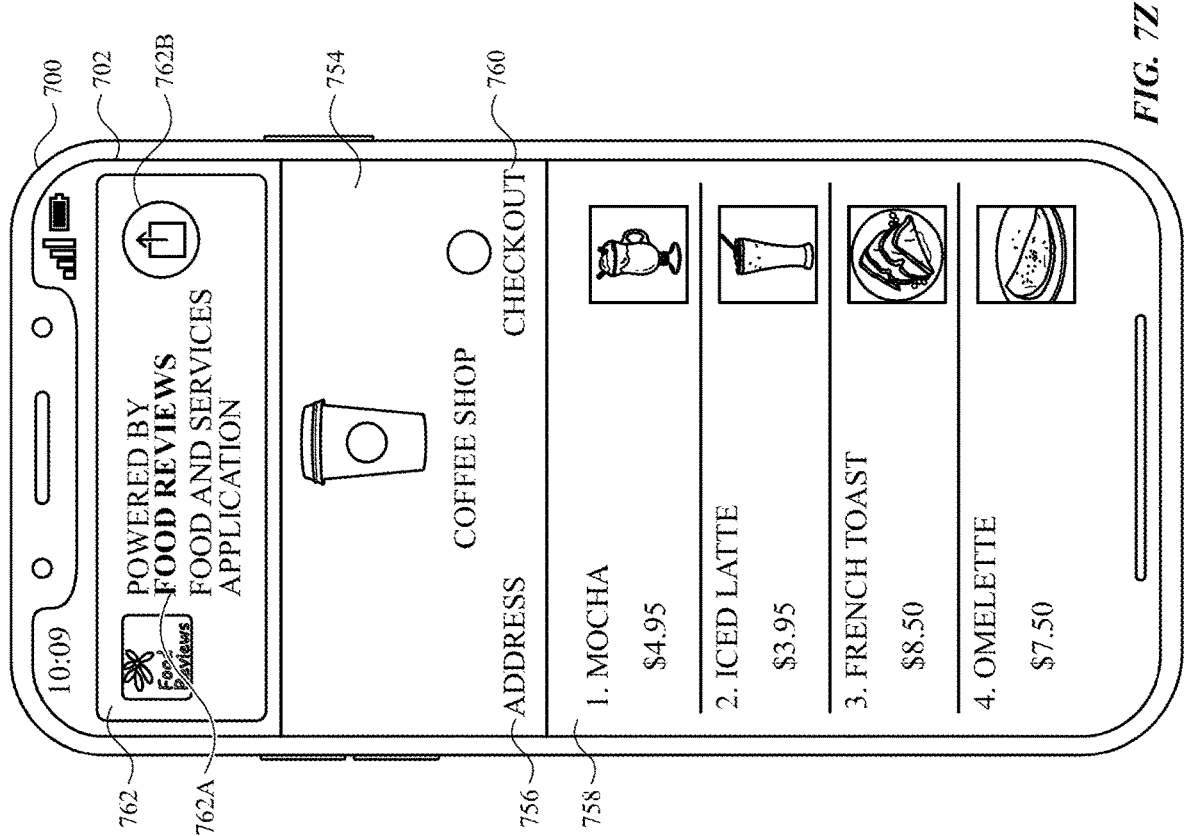
Figure 7A:
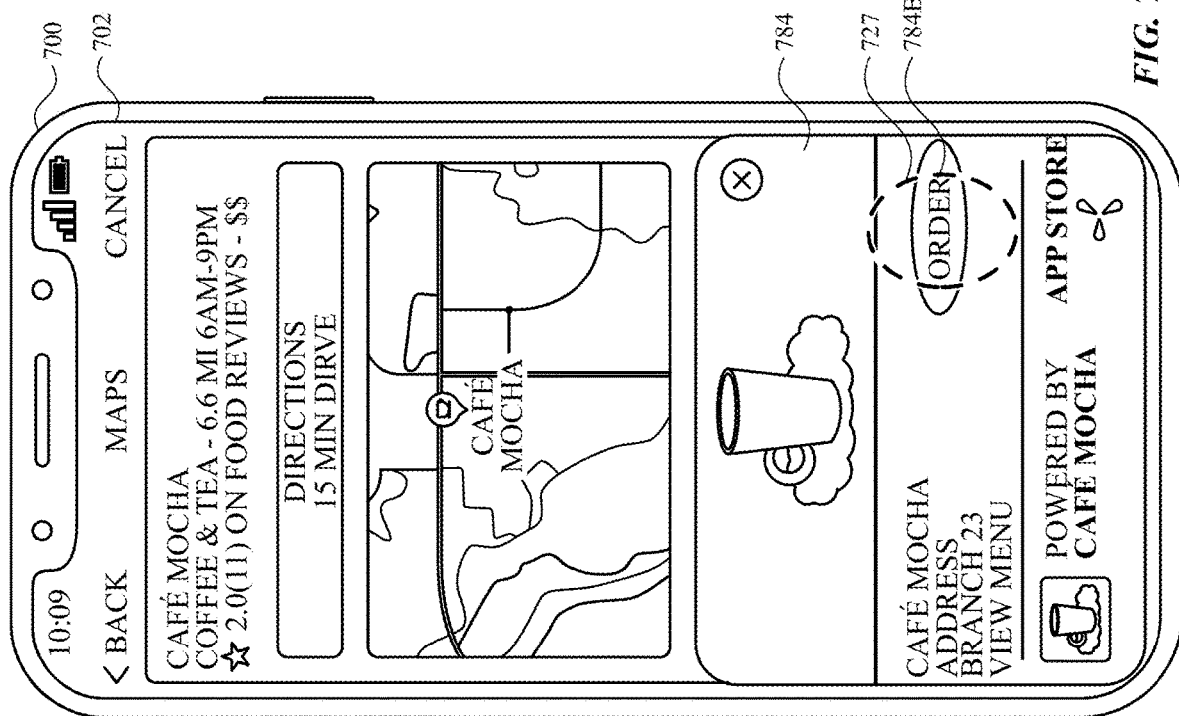
Figure 7A:
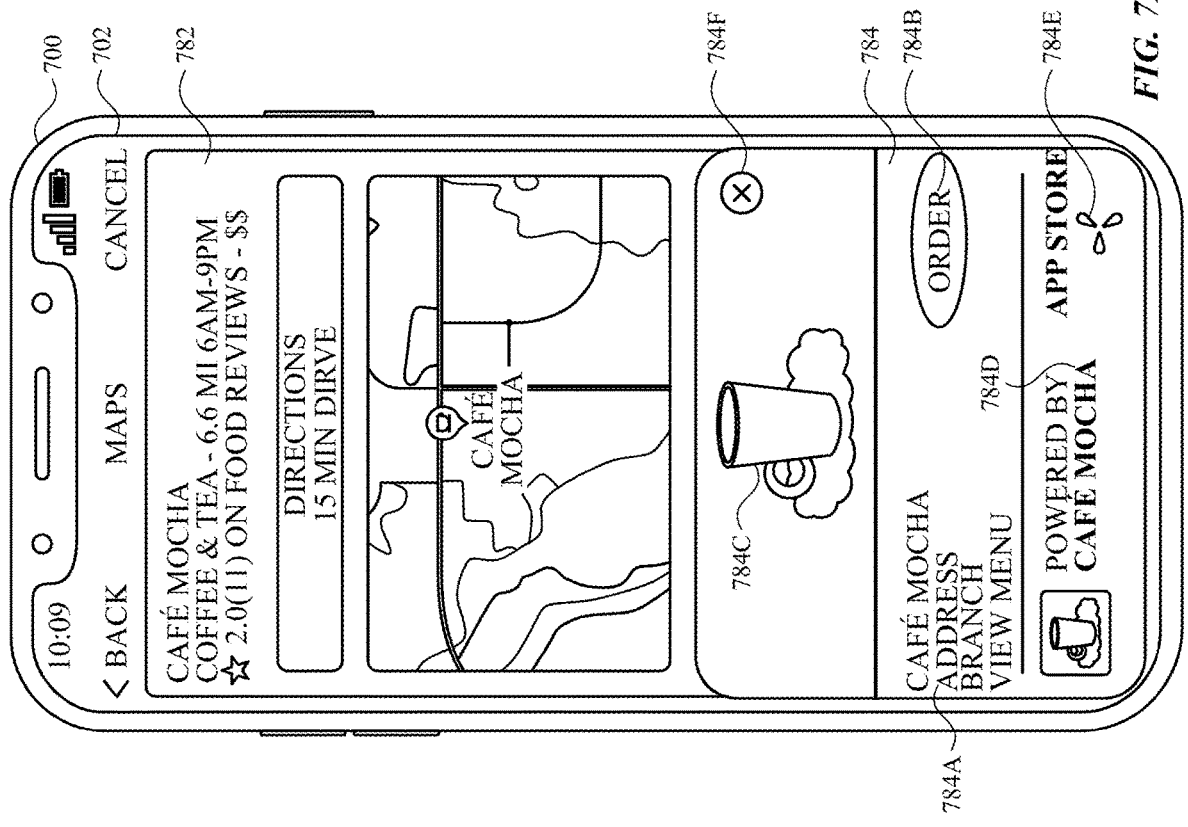
Figure 7A:
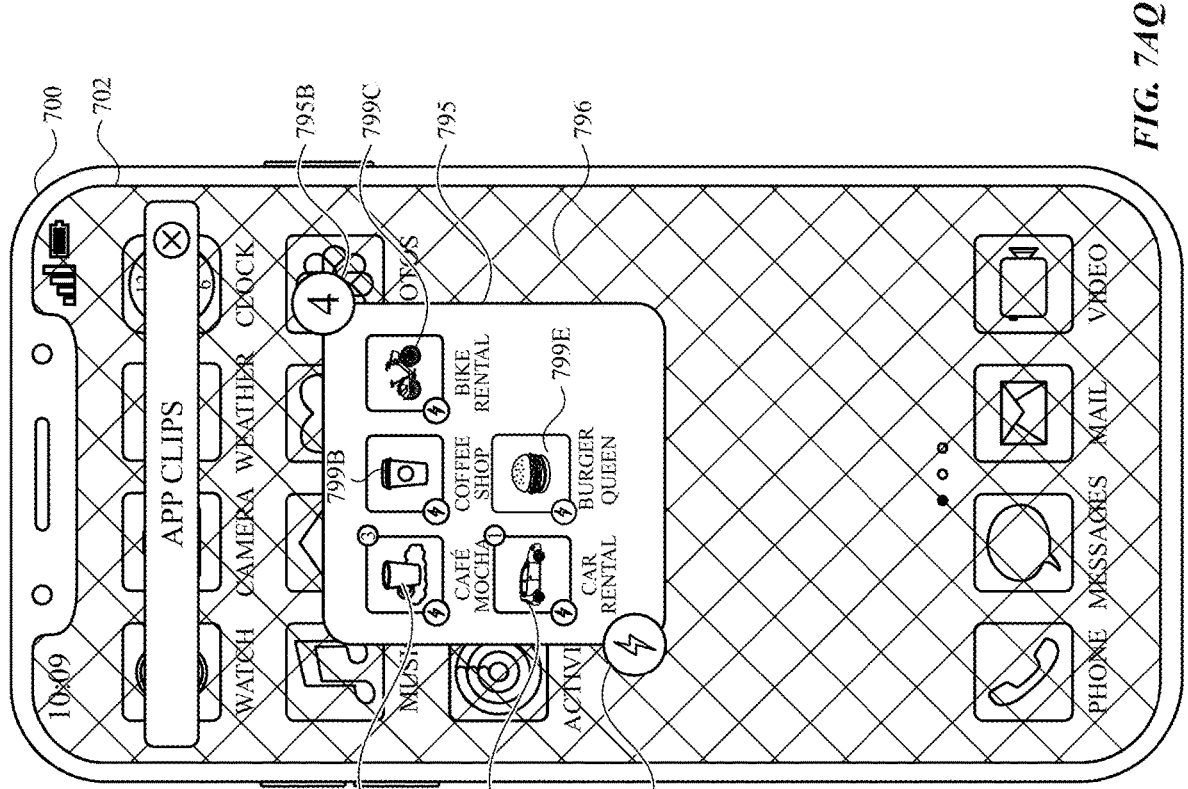
Figure 7A:
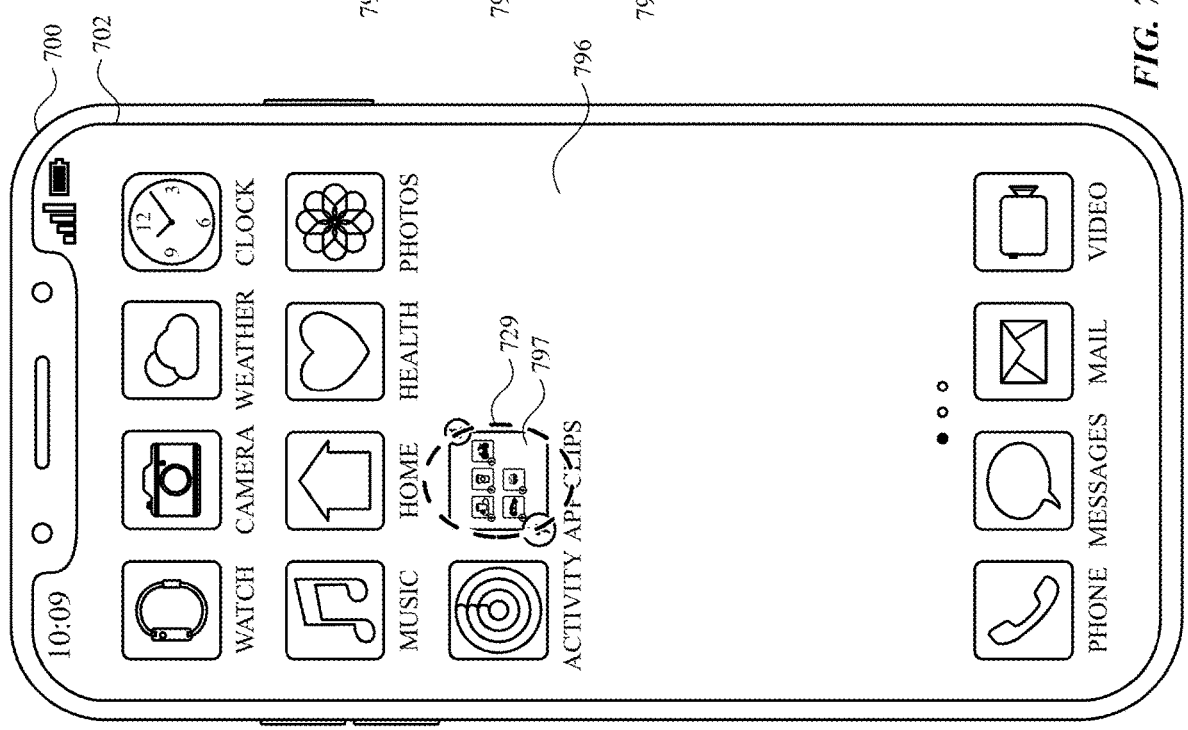
Figure 7A:
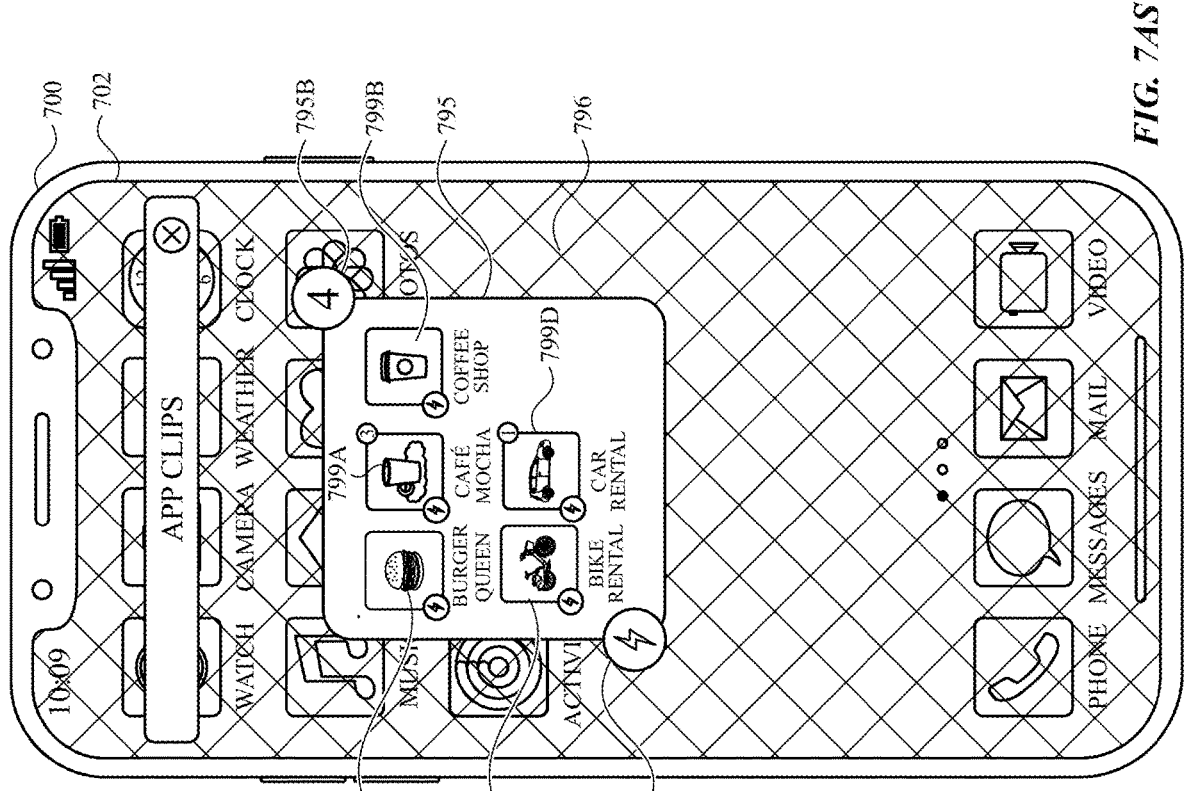
Figure 7A:
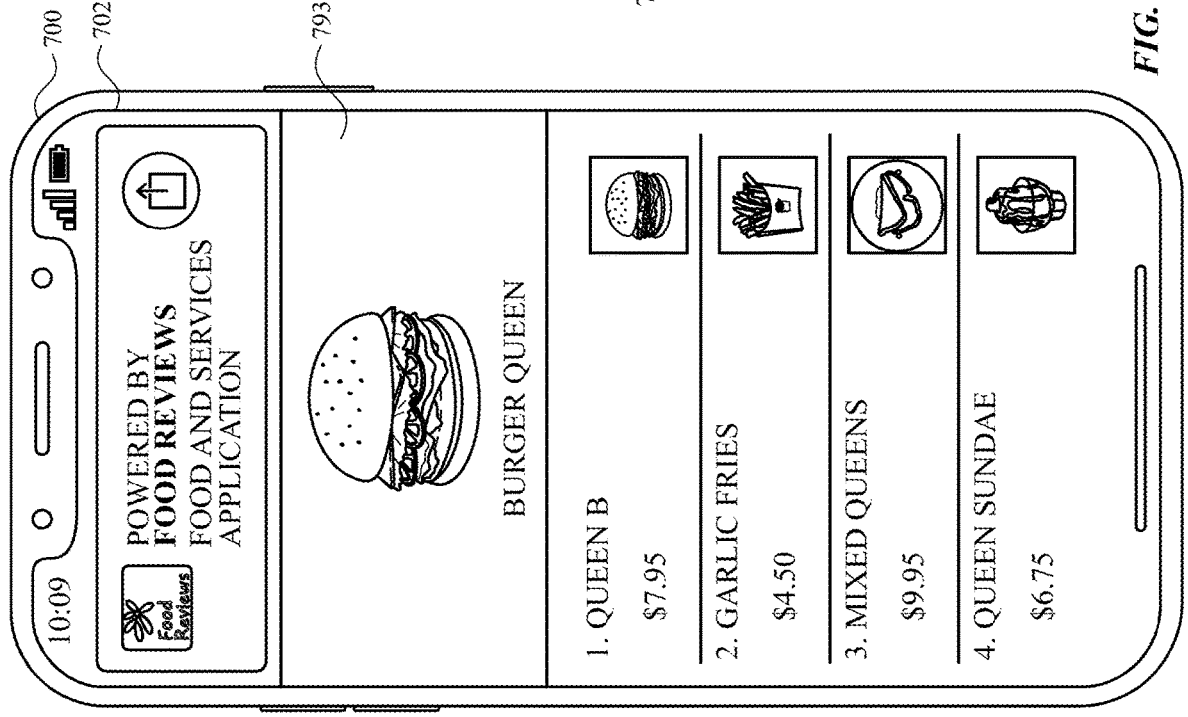
Figure 7A:
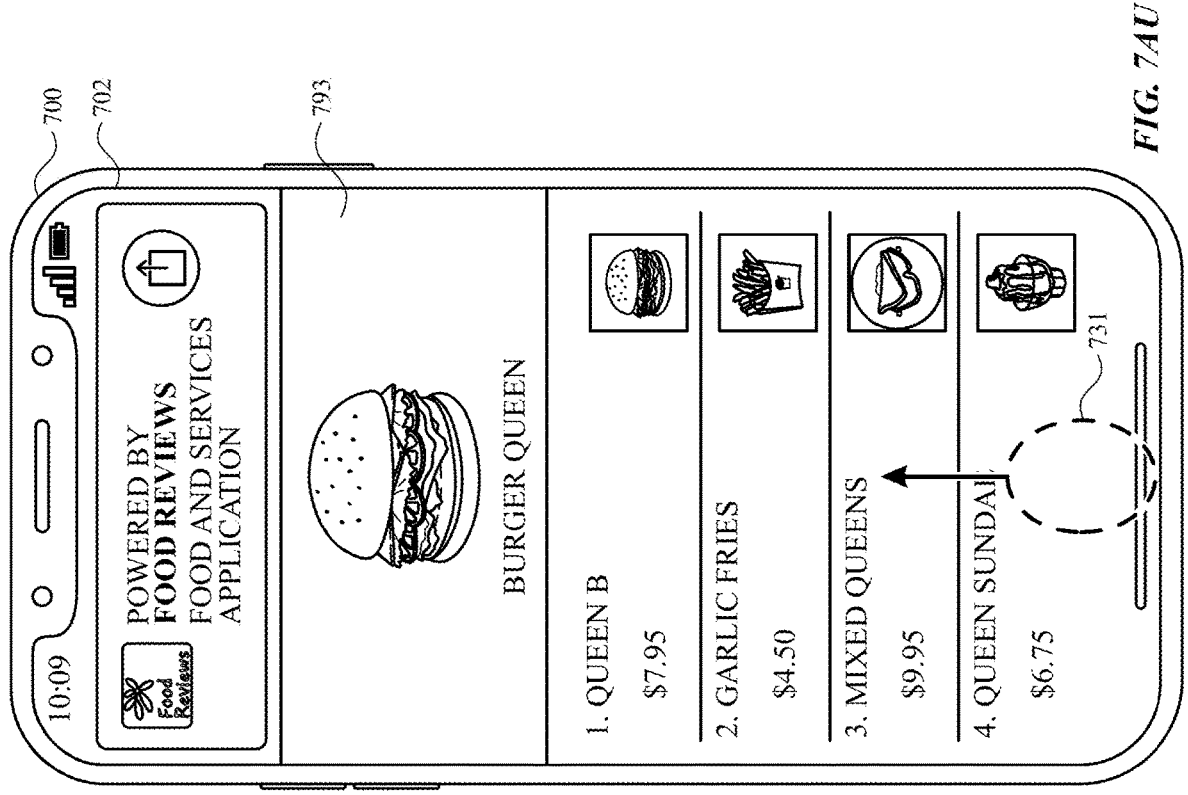
Figure 7A:
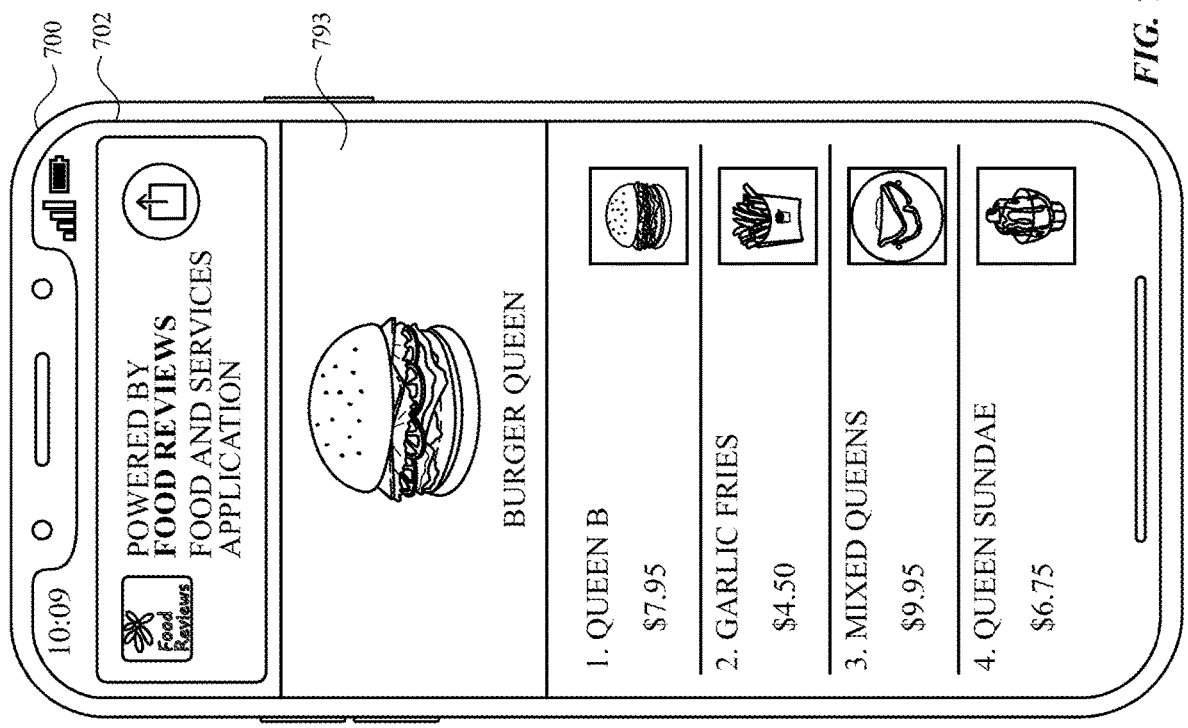
Figure 7A:
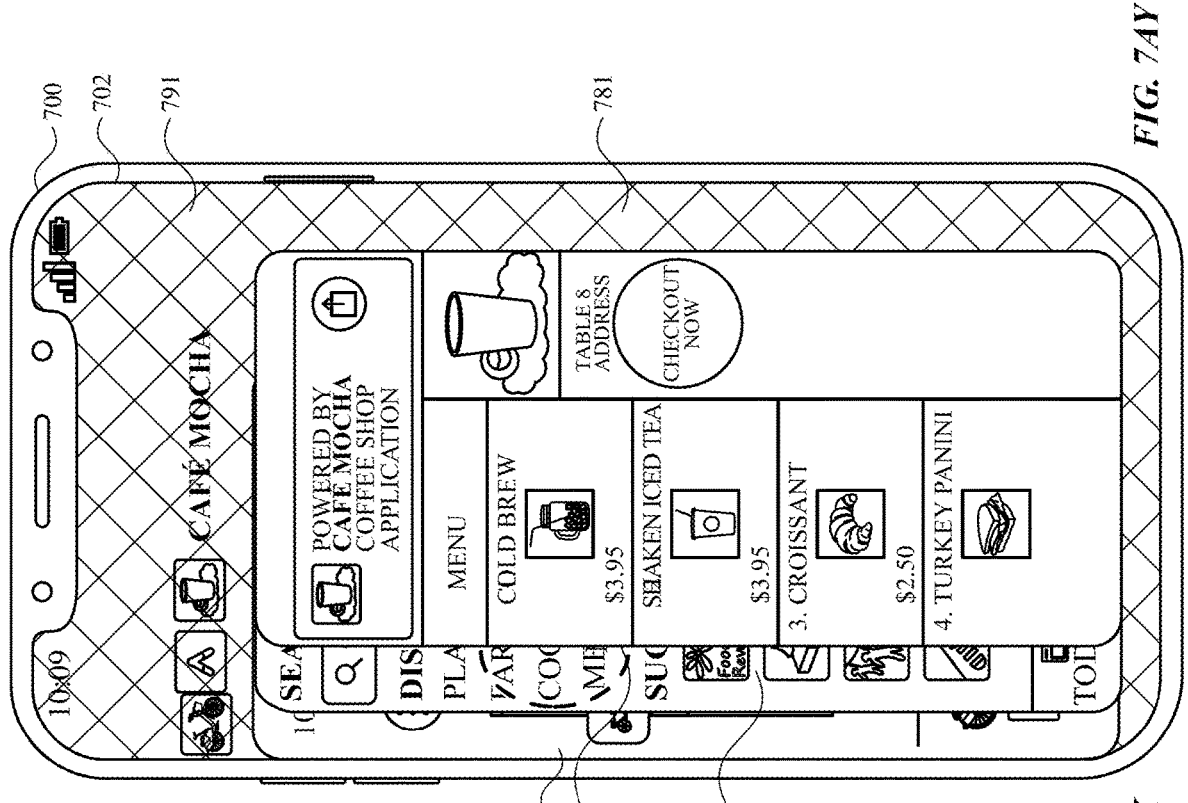
Figure 7A:
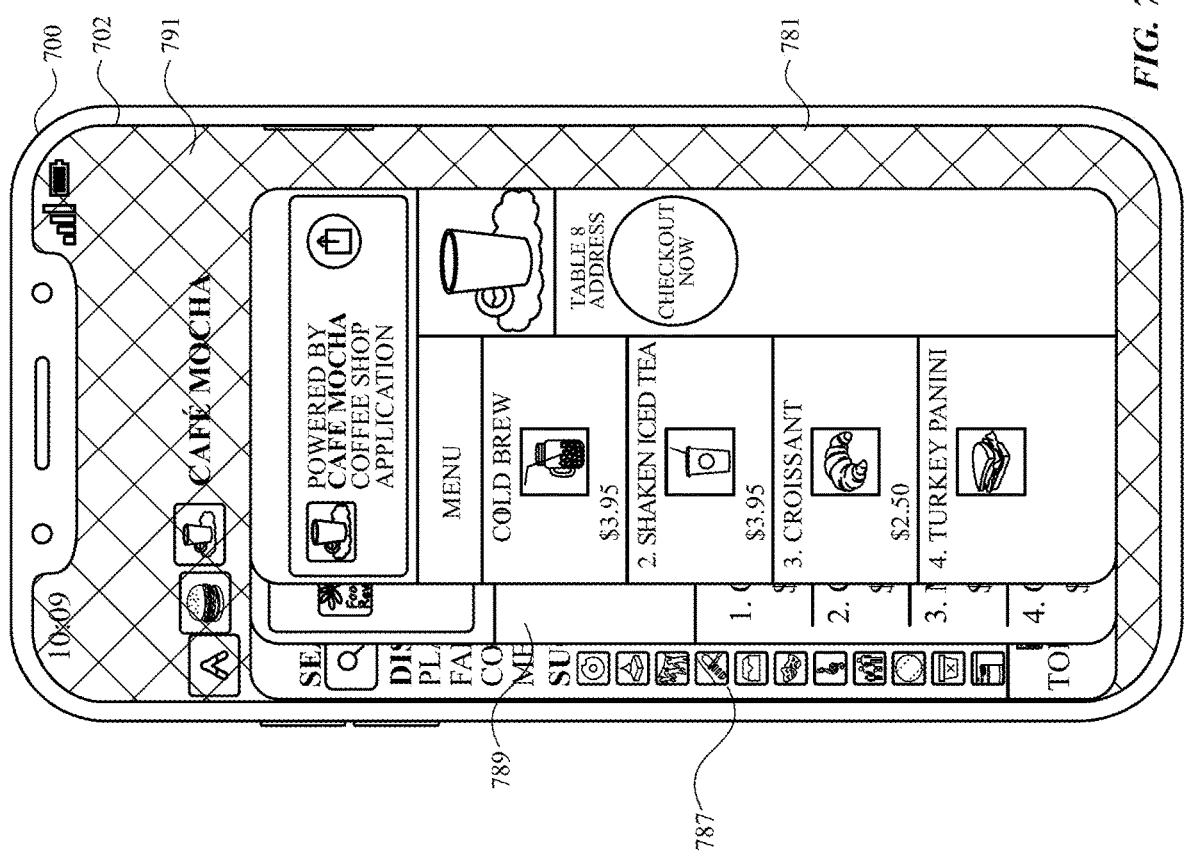
Figure 7A:
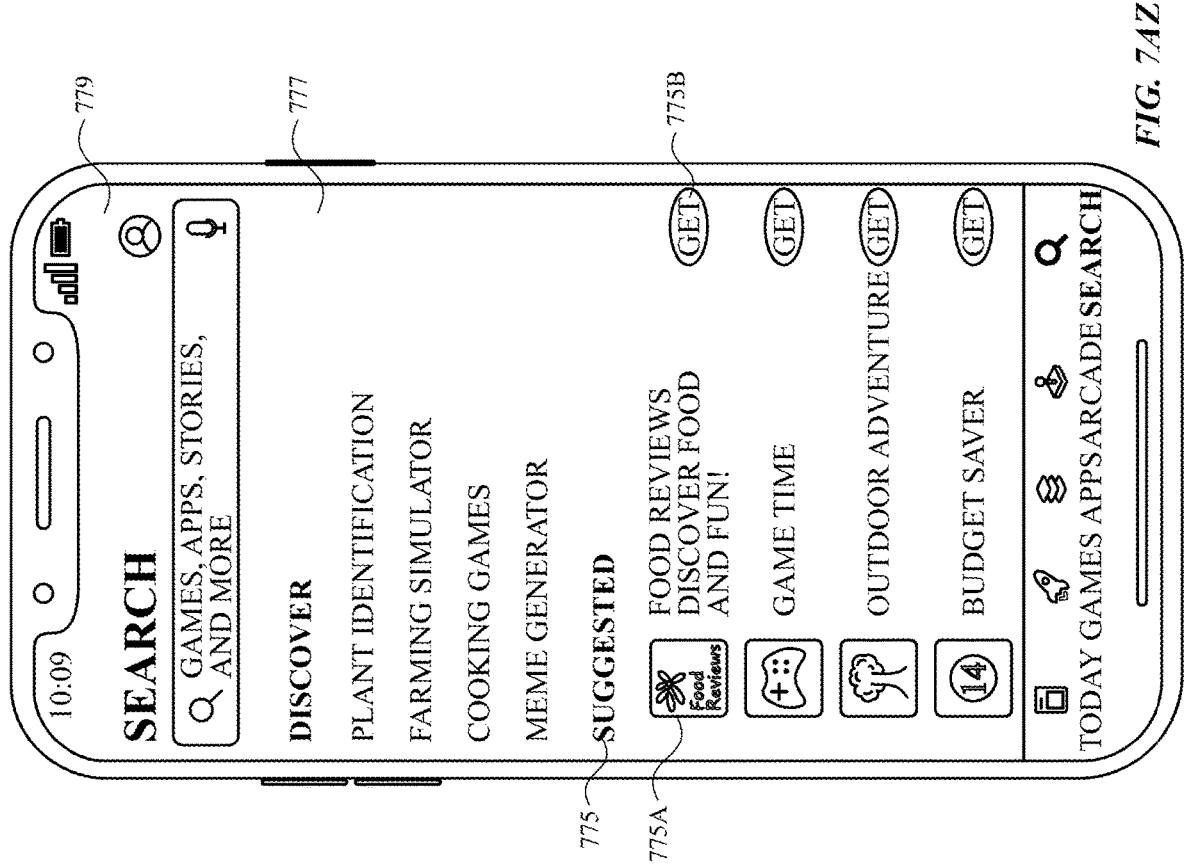

In FIG. 7Z, in response to detecting activation 719 of affordance 752B, in accordance with a determination that the full-version application (e.g., the full-version "Food Reviews" application) for enabling the activity (e.g., ordering the one or more menu items to the first table) is not available on (e.g., is not installed on) computer system 700, computer system 700 displays, via display generation component 702, a lite user interface 754 corresponding to the lite-version application (e.g., "Food Reviews") for enabling the activity (e.g., ordering the one or more menu items to the first table). In some embodiments, if the lite-version application is not installed on computer system 700 (e.g., because this is the first time the lite-version "Food Reviews" application is being accessed), computer system 700 (e.g., in response to detecting activation 719 of affordance 752B) automatically (e.g., without user input; without user authorization) downloads and installs (e.g., prior to and/or while displaying lite user interface 754) the lite-version application.

In some embodiments, lite user interface 754 is similar to (e.g., shares a similar layout with) lite user interface 716 described above with reference to FIG. 7K, as both lite user interfaces are powered by the same developer (e.g., the same entity; the same company) (e.g., "Food Reviews"). As shown in FIG. 7Z, in some embodiments, lite user interface 754 includes location information 756 (e.g., address) of the first cafe. In some embodiments, lite user interface 754 includes (e.g., with location information 756) identification information (e.g., the table number of the first table (e.g., table 5)). In some embodiments, lite user interface 754 includes a menu region 758 that includes a plurality of selectable menu items that can be ordered at the first cafe. In some embodiments, lite user interface 754 includes an affordance 760 (e.g., a selectable user interface object; an activatable user interface object) for ordering/checking out selected menu items.

In some embodiments, lite user interface 754 includes a user interface object 762 (e.g., a banner; a platter) that is displayed concurrently with lite user interface 754 (e.g., overlaid on a portion of lite user interface 754) (e.g., similar to user interface object 724 described above with reference to FIG. 7K). In some embodiments, user interface object 762 is displayed with display of lite user interface 754 and is displayed for a predetermined time period (e.g., 10 seconds; 30 seconds; 1 minute; computer system 700 ceases to display user interface object 762 after the predetermined time period). In some embodiments, user interface object 762 includes an indication 762A (e.g., text information) of the developer (e.g., an entity; a company) that powers (e.g., creates and/or manages the template for) the lite-version application corresponding to lite user interface 754. In some embodiments, user interface object 762 includes a share affordance 762B for initiating a process for sharing the lite-version application corresponding to lite user interface 716 with a different user (e.g., transmitting an electronic communication to a different computer system of the different user that includes the lite-version application and/or a method for initiating the downloading of the lite-version application).

FIG. 7AA illustrates computer system 700 displaying, via display generation component 702, lite user interface 754 after the predetermined time period (e.g., 10 seconds; 30 seconds; 1 minute) has passed. In some embodiments, in accordance with a determination that the predetermined time period has passed, computer system 700 automatically (e.g., without user input) ceases display of user interface object 762 (e.g., while maintaining display of lite user interface 654).

FIGS. 7AB-7AF illustrate a method (e.g., a link-based (e.g., hyperlink-based) method) for initiating a process for enabling an activity on computer system 700 without using a corresponding full-version application on computer system 700 (e.g., because the full-version application is not installed on computer system 700). FIG. 7AB illustrates computer system 700 displaying, via display generation component 702, a user interface 756 of a browser application, where user interface 756 of the browser application is showing a webpage 758. In the example user interface depicted in FIG. 7AB, webpage 758 is a first car sale/rental webpage, and webpage 758 includes a selectable link 760 (e.g., hyperlink).

In FIG. 7AC, while displaying webpage 758 in user interface 756, computer system 700 detects (e.g., via a touch sensitive surface of the one or more input devices) an activation 721 of (e.g., user selection of; user's tap input on) selectable link 760.

In FIG. 7AD, in response to detecting activation 721 of selectable link 760, computer system 700 displays, via display generation component 702 (e.g., overlaid on user interface 756 showing webpage 758), a sheet user interface 762 corresponding to the selected link (e.g., from a car sale/rental webpage). In some embodiments, sheet user interface 762 is similar to (e.g., has the same layout/structure as; provides a consistent experience as) sheet user interface 706 first described above with reference to FIG. 7B, sheet user interface 734 first described above with reference to FIG. 7Q, and sheet user interface 752 first described above with reference to FIG. 7X. In FIG. 7B, sheet user interface 706 is associated with enabling an activity (e.g., ordering) based on a detected respective location (e.g., detecting that computer system 700 is at the first restaurant). In FIG. 7Q, sheet user interface 734 is associated with enabling an activity (e.g., renting) based on a detected (e.g., received) selection of a respective location from the map application. In FIG. 7X, sheet user interface 752 is associated with enabling an activity (e.g., ordering) based on detected (e.g., received) identification information (e.g., via NFC; via scanning a QR code) from an external device (e.g., a contactless wireless terminal). In FIG. 7AD, sheet user interface 762 is associated with enabling an activity (e.g., purchasing; renting) based on a selected link (e.g., from a webpage), where the activity relates to content associated with the link.

In the exemplary user interfaces depicted in FIGS. 7AB-7AF, selected link 760 relates to purchasing and/or renting a car from a first car store. In some embodiments, sheet user interface 762 includes an information region 762A that includes a name of the first car store (e.g., "Shiny Cars") and an address and/or branch information about the first car store and an affordance 762B (e.g., a selectable user interface object; an activatable user interface object) which, when activated, initiates a process for enabling an activity (e.g., purchasing; renting) that relates to the first car store.

In some embodiments, sheet user interface 762 includes an image 762C (e.g., of the first car store; a logo a vendor (e.g., an entity/company) that operates the first car store) that is indicative of the first car store (e.g., "Shiny Cars").

In some embodiments, sheet user interface 762 includes an indication 762D of a developer (e.g., an entity; a company) that powers (e.g., creates and/or manages the template for) a lite-version application that can be used to enable the activity (e.g., purchasing and/or renting a car) associated with the first car store. In some embodiments, as in FIG. 7AD, the developer (e.g., entity/company) that powers the lite-version application (and the corresponding full-version application) also operates the first car store (e.g., "Shiny Cars").

In some embodiments, sheet user interface 762 includes an affordance 762E (e.g., a selectable user interface object; an activatable user interface object) for accessing an application store (e.g., an application store controlled and managed by a developer of the operating system of computer system 700, where the application store can be used to download first-party and third-party applications onto computer system 700). In some embodiments, the full-version application counterpart to the lite-version application for enabling the activity (e.g., purchasing/renting a car) can be downloaded onto computer system 700 from the application store (e.g., via affordance 762E of sheet user interface 762).

In some embodiments, sheet user interface 762 includes an affordance 762F (e.g., a selectable user interface object; an activatable user interface object) for dismissing (e.g., causing computer system 700 to cease display of) sheet user interface 762 without performing the activity (e.g., ordering one or more menu items to the first table) associated with the first car store (e.g., "Shiny Cars").

In FIG. 7AE, while displaying sheet user interface 762 that can be used to initiate the activity (e.g., purchasing/renting a car) associated with the first car store (e.g., "Shiny Cars"), computer system 700 detects (e.g., via a touch sensitive surface of the one or more input devices) an activation 723 of (e.g., user selection of; user's tap input on) affordance 762B.

In FIG. 7AF, in response to detecting activation 723 of affordance 762B, in accordance with a determination that the full-version application (e.g., the full-version "Shiny Cars" application) for enabling the activity (e.g., purchasing/renting a car) is not available on (e.g., is not installed on) computer system 700, computer system 700 displays, via display generation component 702, a lite user interface 764 corresponding to the lite-version application (e.g., the lite-version "Car Store" application) for enabling the activity (e.g., purchasing/renting a car). In some embodiments, if the lite-version application was not installed on computer system 700 (e.g., because this is the first time the lite-version "Shiny Cars" application is being accessed), computer system 700 (e.g., in response to detecting activation 723 of affordance 762B) automatically (e.g., without user input; without user authorization) downloads and installs (e.g., prior to and/or while displaying lite user interface 764) the lite-version application.

In some embodiments, lite user interface 764 is different from (e.g., has a different layout from) lite user interface 736 first described above with reference to FIG. 7S, as lite user interface 764 and lite user interface 736 are operated by different developers (e.g., different entities; different companies). In some embodiments, the layout and/or structure of a respective lite-version application is (e.g., freely) configurable by the respective developer (e.g., respective entity; respective company) for the respective application.

As shown in FIG. 7AF, in some embodiments, lite user interface 764 includes a search region 766 for initiating a search on the lite-version application corresponding to lite user interface 764 (e.g., to search for a car to purchase or rent). In some embodiments, lite user interface 764 includes a map region 768 that includes a map indicating a location of the car store and/or a location of a car being searched. In some embodiments, lite user interface 764 includes a filter region 770 that includes a plurality of filters that can be applied to a given search.

FIGS. 7AG-7AL illustrate a method (e.g., a search-based method) for initiating a process for enabling an activity on computer system 700 without using a corresponding full-version application on computer system 700 (e.g., because the full-version application is not installed on computer system 700).

FIG. 7AG illustrates computer system 700 displaying, via display generation component 702, a search user interface 772 that includes a search region 774. In some embodiments, computer system 700 displays, in search user interface 772, an input region 776 (e.g., a keyboard).

In some embodiments, while displaying search user interface 772, computer system 700 detects (e.g., receives) (e.g., via input region 776; via a mic) an input 778. In the exemplary user interface illustrated in FIG. 7AH, input 778 corresponds to a search for a coffee shop.

In FIG. 7AH, in response to detecting (e.g., receiving) input 778 corresponding to the a search for a coffee shop, computer system 700 displays, in search user interface 772, a first results region 780 that includes a plurality of search results 780A-780C corresponding to different lite-version applications that relate to input 778. In some embodiments, at least some of the plurality of search results 780A-780C correspond to lite-version applications that are already installed on (e.g., has (recently) been used on; has been accessed on) computer system 700. In some embodiments, at least some of the plurality of search results 780A-780C correspond to different lite-version applications that are not installed on (e.g., have not been accessed on) computer system 700.

In FIG. 7AI, while displaying search user interface 772 showing first results region 780, computer system 700 detects (e.g., via a touch sensitive surface of the one or more input devices) a user selection 725 of first search result 780A (e.g., or a user selection of an affordance corresponding to first search result 780A) corresponding to a second cafe.

In FIG. 7AJ, in response to detecting user selection 725 of first search result 780A corresponding to the second cafe, computer system 700 displays, via display generation component 702 (e.g., overlaid on a portion of search user interface 772), a sheet user interface 784 corresponding to the second café. In some embodiments, sheet user interface 784 is similar to (e.g., has the same layout/structure as; provides a consistent experience as) sheet user interface 706 first described above with reference to FIG. 7B, sheet user interface 734 first described above with reference to FIG. 7Q, sheet user interface 752 first described above with reference to FIG. 7X, and sheet user interface 762 first described above with reference to FIG. 7AE. In FIG. 7B, sheet user interface 706 is associated with enabling an activity (e.g., ordering) based on a detected respective location (e.g., detecting that computer system 700 is at the first restaurant). In FIG. 7Q, sheet user interface 734 is associated with enabling an activity (e.g., renting) based on a detected (e.g., received) selection of a respective location from the map application. In FIG. 7X, sheet user interface 752 is associated with enabling an activity (e.g., ordering) based on detected (e.g., received) identification information (e.g., via NFC; via scanning a QR code) from an external device (e.g., a contactless wireless terminal). In FIG. 7AD, sheet user interface 762 is associated with enabling an activity (e.g., purchasing; renting) based on a selected link (e.g., from a webpage), where the activity relates to content associated with the link. In FIG. 7AJ, sheet user interface 784 is associated with enabling an activity (e.g., ordering) based on a selection from search results.

In some embodiments, sheet user interface 784 includes an information region 784A that includes a name of the second cafe (e.g., "Cafe Mocha") and an address and/or branch information about the second cafe and an affordance 784B (e.g., a selectable user interface object; an activatable user interface object) which, when activated, initiates a process for enabling an activity (e.g., purchasing; renting) that relates to the second cafe.

In some embodiments, sheet user interface 784 includes an image 784C (e.g., of the second cafe; a logo a vendor (e.g., an entity/company) that operates the second cafe) that is indicative of the second cafe (e.g., "Cafe Mocha").

In some embodiments, sheet user interface 784 includes an indication 784D of a developer (e.g., an entity; a company) that powers (e.g., creates and/or manages the template for) a lite-version application that can be used to enable the activity (e.g., ordering one or more menu items) associated with the second cafe. In some embodiments, as in FIG. 7AJ, the developer (e.g., entity/company) that powers the lite-version application (and the corresponding full-version application) (e.g., "Cafe Mocha") is the same as (e.g., the same entity as; the same company as) the vendor associated with the second cafe (e.g., "Cafe Mocha").

In some embodiments, sheet user interface 784 includes an affordance 784E (e.g., a selectable user interface object; an activatable user interface object) for accessing an application store (e.g., an application store controlled and managed by a developer of the operating system of computer system 700, where the application store can be used to download first-party and third-party applications onto computer system 700). In some embodiments, the full-version application corresponding to the lite-version application for enabling the activity (e.g., ordering one or more menu items) can be downloaded onto computer system 700 from the application store (e.g., via affordance 784E of user interface 784).

In some embodiments, sheet user interface 784 includes an affordance 784F (e.g., a selectable user interface object; an activatable user interface object) for dismissing (e.g., causing computer system 700 to cease display of) sheet user interface 784 without performing the activity (e.g., ordering one or more menu items) associated with the second cafe (e.g., "Cafe Mocha").

In FIG. 7AK, while displaying sheet user interface 784 that can be used to initiate the activity (e.g., ordering one or more menu items) associated with the second cafe (e.g., "Cafe Mocha"), computer system 700 detects (e.g., via a touch sensitive surface of the one or more input devices) an activation 727 of (e.g., user selection of; user's tap input on) affordance 784B.

In FIG. 7AL, in response to detecting activation 727 of affordance 784B, in accordance with a determination that the full-version application (e.g., the full-version "Cafe Mocha" application) for enabling the activity (e.g., ordering one or more menu items) is not available on (e.g., is not installed on) computer system 700, computer system 700 displays, via display generation component 702, a lite user interface 786 of a lite-version application (e.g., the lite-version "Cafe Mocha" application) for enabling the activity (e.g., ordering one or more menu items). In some embodiments, if the lite-version application is not installed on computer system 700 (e.g., because this is the first time the lite-version "Cafe Mocha" application is being accessed), computer system 700 (e.g., in response to detecting activation 727 of affordance 784B) automatically (e.g., without user input; without user authorization) downloads and installs (e.g., prior to and/or while displaying lite user interface 786) the lite-version application.

In some embodiments, lite user interface 786 is different from (e.g., structurally different from; has a different layout from) lite user interface 716 first described above with reference to FIG. 7K and from lite user interface 754 first described above with reference to FIG. 7Z, as lite user interface 786 is powered by a different developer. As shown in FIG. 7AL, in some embodiments, lite user interface 784 includes location information 788 (e.g., address) of the second cafe. In some embodiments, lite user interface 786 includes a menu region 790 that includes a plurality of selectable menu items that can be ordered at the second cafe. In some embodiments, lite user interface 786 includes an affordance 792 (e.g., a selectable user interface object; an activatable user interface object) for ordering/checking out selected menu items.

As shown in FIG. 7AL, in some embodiments, lite user interface 786 includes a user interface object 794 (e.g., a banner; a platter) that is displayed concurrently with lite user interface 786 (e.g., overlaid on a portion of lite user interface 786) (e.g., similar to user interface object 724 described above with reference to FIG. 7K). In some embodiments, user interface object 794 is displayed with display of lite user interface 786 and is displayed for a predetermined time period (e.g., 10 seconds; 30 seconds; 1 minute). In some embodiments, user interface object 794 includes an indication 794A (e.g., text information) of the developer (e.g., an entity; a company) that powers (e.g., creates and/or manages the template for) the lite-version application corresponding to lite user interface 786. In some embodiments, user interface object 794 includes a share affordance 794B for initiating a process for sharing the lite-version application corresponding to lite user interface 786 with a different user (e.g., transmitting an electronic communication to a different computer system of the different user that includes the lite-version application and/or a method for initiating the downloading of the lite-version application).

FIG. 7AM illustrates computer system 700 displaying, via display generation component 702, a home user interface 796 (e.g., a user interface that includes one or more application icons corresponding to applications that are installed on computer system 700; a user interface controlled by the operating system of computer system 700). In FIG. 7AM, home user interface 796 includes a plurality of application icons 798A-798I corresponding to respective full-version applications that are available on (e.g., installed on) computer system 700.

FIG. 7AN illustrates computer system 700 displaying, via display generation component 702, home user interface 796 including the plurality of application icons 798A-798I corresponding to the respective full-version applications and lite-application icons corresponding to lite-version applications that are available on (e.g., are installed on) computer system 700. In the exemplary user interface depicted in FIG. 7AN, home user interface 796 includes a first lite-application icon 799A corresponding to a first lite-version application (e.g., "Cafe Mocha"), a second lite-application icon 799B corresponding to a second lite-version application (e.g., the "Food Review" lite-version application for "Coffee Shop"), a third lite-application icon 799C corresponding to a third lite-version application (e.g., "Bike Rental"), a fourth lite-application icon 799D for a fourth lite-version application (e.g., "Shiny Cars"), and a fifth lite-application icon 799E for a fifth lite-version application (e.g., the "Food Review" lite-version application for "Burger Queen"). As shown in FIG. 7AN, in some embodiments, lite-application icons 799A-799E corresponding to installed lite-version applications are displayed in and can be accessed from the same user interface (e.g., home user interface 796) as application icons corresponding to full-version (regular) applications that are installed on computer system 700.

In some embodiments, as also shown in FIG. 7AN, a lite-application icon includes a first visual indicator (e.g., 799AA of lite-application icon 799A) (e.g., a first badge (e.g., having a graphical and/or text indicator)) that indicates that the respective lite-application icon corresponds to a lite-version application (instead of a full-version application). In some embodiments, the first visual indicator (e.g., the first badge) is included in a first predefined location (e.g., bottom-left corner) of a respective lite-application icon. In some embodiments, as shown in FIG. 7AN, a lite-application icon includes a second visual indicator (e.g., 799AB of lite-application icon 799A) (e.g., a second badge (e.g., showing a number)) that indicates a number of notifications (e.g., unchecked notifications) that have been generated by and/or are currently available for the respective lite-version application. In some embodiments, the second visual indicator (e.g., the second badge) is included in a second predefined location (e.g., top-right corner) of a respective lite-application icon.

FIG. 7AO illustrates computer system 700 displaying, via display generation component 702, home user interface 796 including application icons 798A-798I, where home user interface 796 also includes a folder icon 797 for lite-application icons. In some embodiments, lite-application icons (e.g., lite-application icons 799A-799E of FIG. 7AN) are included in a folder corresponding to folder icon 797 displayed on home user interface 796 (e.g., instead of being included directly in home user interface 796). In FIG. 7AO, folder icon 797 includes representations (e.g., thumbnail images) of lite-application icons 799A-799E.

In some embodiments, similar to a lite-application icon, folder icon 797 includes a first visual indicator 797B includes a first visual indicator 797A (e.g., a first badge (e.g., having a graphical and/or text indicator)) that indicates folder icon corresponds to a folder for lite-version applications (instead of for full-version applications). In some embodiments, first visual indicator 797A (e.g., the first badge) is included in a first predefined location (e.g., bottom-left corner) of a respective lite-application icon. In some embodiments, folder icon 797 includes a second visual indicator 797B (e.g., a second badge (e.g., showing a number)) that indicates a (e.g., aggregated) number of notifications (e.g., unchecked notifications) that have been generated by and/or are currently available for the respective lite-version applications that are included the folder corresponding to folder icon 797. In some embodiments, the second visual indicator 797B (e.g., the second badge) is included in a second predefined location (e.g., top-right corner) of folder icon 797.

FIG. 7AP illustrates computer system 700 displaying, via display generation component 702, user selection 729 of folder icon 797 displayed in home user interface 796.

In FIG. 7AQ, in response to detecting user selection 729 of folder icon 797, computer system 700 displays, via display generation component 702 (e.g., overlaid on a portion of home user interface 796), a folder user interface 795 (e.g., a pop-up) that includes lite-application icons 799A-799E first described above with reference to FIG. 7AN.

As shown in FIG. 7AQ, in some embodiments, similar to a lite-application icon, folder user interface 795 includes a first visual indicator 795A (e.g., a first badge (e.g., having a graphical and/or text indicator)) that indicates that folder user interface 795 corresponds to a folder for lite-version applications (instead of for full-version applications). In some embodiments, first visual indicator 795A (e.g., the first badge) is included in a first predefined location (e.g., bottom-left corner) of a respective lite-application icon. In some embodiments, folder user interface 795 includes a second visual indicator 795B (e.g., a second badge (e.g., showing a number)) that indicates a (e.g., aggregated) number of notifications (e.g., unchecked notifications) that have been generated by and/or are currently available for the respective lite-version applications that are displayed in folder user interface 795 via lite-application icons 799A-799E. In some embodiments, the second visual indicator 795B (e.g., the second badge) is included in a second predefined location (e.g., top-right corner) of folder user interface 795.

FIG. 7AR illustrates computer system 700 displaying, via display generation component 702 (e.g., and after displaying folder user interface 795 that includes lite-application icons 799A-799E), a lite user interface 793 corresponding to lite-application icon 799E from FIG. 7AQ (e.g., corresponding to the "Food Review" lite-version application to "Burger Queen") (e.g., in response to detecting activation of (e.g., user selection of; user's tap input on) lite-application icon 799E in FIG. 7AQ).

FIG. 7AS illustrates computer system 700 displaying, via display generation component 702, folder user interface 795 after displaying (e.g., accessing) the lite-version application for "Burger Queen" in FIG. 7AR). In FIG. 7AS, as opposed to in FIG. 7AQ, lite-application icon 799E (e.g., corresponding to the lite-version application for "Burger Queen") is moved to be the first lite-application icon listed in folder user interface 795 (e.g., because the corresponding lite-version application was mostly recently accessed/most recently displayed by computer system 700).

FIG. 7AT illustrates computer system 700 displaying, via display generation component 702, lite user interface 793 corresponding to lite-application icon 799E from FIG. 7AS after displaying folder user interface 795) (e.g., in response to detecting activation of (e.g., user selection of; a tap input on) lite-application icon 799E in FIG. 7AS).

In FIG. 7AT, while displaying lite user interface 793, computer system 700 detects (e.g., via a touch sensitive surface of the one or more input devices) an input 731 (e.g., a swipe input; a swipe-up input on a bottom region of display generation component 702).

In FIG. 7AV, in response to detecting input 731 (shown in FIG. 7AU), computer system 700 displays, via display generation component 702, a multitasking user interface 791 that includes a plurality of user interface cards corresponding to a portion of the most recently-displayed user interfaces.

In FIG. 7AV, computer system 700 displays, in multitasking user interface 791, a user interface card 789 (e.g., a user interface preview image, a view of an application) corresponding to lite user interface 793 from FIG. 7AU (the most recently displayed (e.g., accessed) user interface), a user interface card 787 corresponding to an application store (the second-most recently displayed (e.g., accessed) user interface), and a user interface card 785 corresponding to a lite user interface of a lite-version application of a different type than (e.g., developed by a different developer (e.g., different entity; different company)) the lite-version application corresponding to user interface 793 (e.g., a "Bike Rental" lite-version application) (the third-most recently displayed (e.g., accessed) user interface), where user interface card 789 is the first user interface card shown (e.g., the user interface card displayed on top) because it corresponds to the most recently displayed (e.g., accessed) user interface.

FIG. 7AW illustrates computer system 700 displaying, via display generation component 702 (e.g., and after displaying the multitasking user interface 791 of FIG. 7AV), a lite user interface 783 corresponding to a lite-version application that is of the same type as (e.g., developed by the same developer (e.g., same entity; same company)) the lite-version application corresponding to lite user interface 793 of FIG. 7AV (e.g., the "Food Review" lite-version application). Lite user interface 783 of FIG. 7AW corresponds to a lite user interface for a first vendor (e.g., a coffee shop called "Cafe Mocha"), where the first vendor is using the corresponding lite-version application developed by a first developer (e.g., a first entity or a first company called "Food Review"), while lite user interface 793 of FIG. 7AU corresponds to a lite user interface for a second vendor (e.g., a restaurant called "Burger Queen"), where the second vendor is using the corresponding lite-version application developed by the same first developer.

FIG. 7AX illustrates computer system 700 displaying, via display generation component 702 (e.g., (immediately) after displaying lite user interface 783 and without displaying a different user interface for a different application), multitasking user interface 791. As shown in FIG. 7AX, because lite user interface 783 of FIG. 7AW was the most recently-displayed user interface, multitasking user interface 791 now includes a user interface card 781 corresponding to lite user interface 783 of FIG. 7AW as the most recently displayed (e.g., accessed) user interface. In some embodiments, as shown in FIG. 7AX, multitasking user interface 791 includes user interface card 789 corresponding to lite user interface 793, which is the previous most recently displayed (e.g., accessed) user interface, as the second-most recently displayed (e.g., accessed) user interface. In some embodiments, computer system 700 maintains display of two different user interface cards of different vendors that both correspond to the same type of lite-version application (e.g., both corresponding to the "Food Review" lite-version application) in multitasking user interface 791. As shown in FIG. 7AX, multitasking user interface 791 includes user interface card 787 as the third-most recently displayed (e.g., accessed) user interface.

FIG. 7AY illustrates computer system 700 displaying, via display generation component 702 (e.g., (immediately) after displaying lite user interface 783 and without displaying a different user interface for a different application), multitasking user interface 791. As shown in FIG. 7AY, because lite user interface 783 of FIG. 7AW was the most recently-displayed user interface, multitasking user interface 791 includes user interface card 781 corresponding to lite user interface 783 of FIG. 7AW as the most recently-displayed user interface. In some embodiments, if a lite-version application of the same type was displayed (e.g., accessed), even for a different vendor (e.g., "Cafe Mocha" vs. "Burger Queen"), computer system 700 removes display of a user interface card of a respective user interface corresponding to the same lite-version application but for the different vendor that had been included in multitasking user interface 791. For example, in FIG. 7AY, multitasking user interface 791 does not include user interface card 789 corresponding to lite user interface 793, as lite user interface 783 corresponding to the same lite-version application (e.g., the "Food Reviews" lite-version application) was more recently accessed. Instead, in FIG. 7AQ, multitasking user interface 791 includes, after user interface card 781 corresponding to lite user interface 783, user interface card 787 corresponding to the previously second-most recently displayed (e.g., accessed) application and user interface card 785 corresponding to the previously third-most recently displayed (e.g., accessed) application.

In FIG. 7AY, while displaying multitasking user interface 791, computer system 700 detects (e.g., via a touch sensitive surface of the one or more input devices), user selection 733 of (e.g., a tap input on) user interface card 787 corresponding to the application store.

In FIG. 7AZ, in response to detecting user selection 733 of user interface card 787, computer system 700 displays, via display generation component 702, a user interface 779 corresponding to the application store. In some embodiments, computer system 700 displays, in user interface 779 of the application store, a first page 777 (e.g., a search page; a search tab) that includes one or more suggested (e.g., recommended) applications. In some embodiments, full-version applications corresponding to lite-version applications that are installed on and/or have been displayed/accessed via computer system 700 are suggested (e.g., recommended) for download via the application store. For example, in FIG. 7AZ, first page 777 of user interface 779 of the application store includes a first app suggestion 775A corresponding to a full-version application counterpart of the lite-version application corresponding to lite user interface 783 of FIG. 7AW (e.g., the "Food Reviews" full-version application counterpart to the "Food Reviews" lite-version application). In some embodiments, as shown in FIG. 7AZ, first app suggestion 775A includes an affordance 775B (e.g., a selectable user interface object; an activatable user interface object) which, when activated, initiates a process for downloading and installing the respective full-version application on computer system 700.

FIGS. 8A-8B are a flow diagram illustrating a method for invoking an activity associated with an application using a computer system, in accordance with some embodiments. Method 800 is performed at a computer system (e.g., 100, 300, 500, 700) (e.g., an electronic device, a smart device, such as a smartphone or a smartwatch, a mobile device, a wearable device) that is in communication with a display generation component (e.g., 702) and one or more input devices (e.g., a touch-sensitive surface that is integrated with the display generation component). Some operations in method 800 are, optionally, combined, the orders of some operations are, optionally, changed, and some operations are, optionally, omitted.

As described below, method 800 provides an intuitive way for enabling an activity using a computer system. The method reduces the cognitive burden on a user for enabling an activity using a computer system, thereby creating a more efficient human-machine interface. For battery-operated computing devices, enabling a user to enable an activity faster and more efficiently conserves power and increases the time between battery charges.

The computer system (e.g., 700) detects (802) (e.g., via one or more location sensors that are in communication with the computer system, such as GPS sensors) the occurrence of a triggering condition (e.g., scanning a QR code, detecting an NFC signal, detecting selection of a hyperlink, detecting/determining the presence of the computer system near a location beacon, detecting/determining the presence of the computer system at/in a specific geographic location) for initiating an activity (e.g., making a reservation, making an order, making a booking, making a payment, making a request) that is associated with a first application (e.g., an application corresponding to a merchant, a store, a restaurant, and/or a service provider).

In response to detecting the occurrence of the triggering condition (804), the computer system (e.g., 700) displays (806), via the display generation component (e.g., 702) (e.g., overlaid on a wake screen user interface (e.g., 704), overlaid on a desktop or home screen user interface, overlaid on another application user interface), a first user interface (e.g., 706, 734, 752, 762, 784) (e.g., an interstitial user interface, a sheet user interface, a mini-user interface that covers a portion of, but not all of, the previously-displayed user interface such that the previous user interface is still visible on the display, a pop-up user interface). In some embodiments, a home user interface is a main user interface of a computer system that is provided by the operating system of the computer system. In some embodiments, a home screen is a graphical user interface (e.g., with one or more pages or screens) that is provided by the operating system of the computer system and includes links to (e.g., affordances for launching or accessing) applications, settings, and/or notifications.

In some embodiments, in response to detecting the occurrence of the triggering condition, in accordance with a determination that the first application is not available on (e.g., not downloaded on, not installed on, not stored on, cannot be launched or accessed on) the computer system (e.g., 700), the computer system (e.g., 700) displays or causes display of the first user interface without obtaining (e.g., downloading, installing) the first application.

Displaying the first user interface (e.g., 706, 734, 752, 762, 784) includes concurrently displaying a description of the activity (e.g., 706A, 734A, 752A, 762A, 784A) (e.g., text information about the activity, an image associated with the activity, and an indication or logo associated with a company providing or enabling the activity) (808), and a first selectable user interface object (e.g., 706B, 734B, 752B, 762B, 784B) (e.g., a first affordance, a first selectable button) for taking action associated with the activity (e.g., making a reservation, making an appointment, making a booking, making a purchase) (810). In some embodiments, the first selectable user interface object includes an indication (e.g., text information about, such as "reserve," "book," "pay") of the type of the available activity. Displaying the first user interface in response to detecting the triggering condition enables a user to become aware that the computer system can be used to perform the activity and quickly and easily access the activity on the computer system. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

The computer system (e.g., 700), while displaying the first user interface (e.g., 706, 734, 752, 762, 784) (814), detects (816), via the one or more input devices, activation (e.g., 701, 717, 719, 723, 727) of (e.g., user selection of) the first selectable user interface object.

In response to detecting the activation (e.g., 701, 717, 719, 723, 727) of the first selectable user interface object (e.g., 706B, 734B, 752B, 762B, 784B) (818), in accordance with a determination that the first application is not available on (e.g., not downloaded on, not installed on, not stored on, cannot be launched or accessed on) the computer system (e.g., 700) (820), the computer system displays (822), via the display generation component (e.g., 702), a second user interface (e.g., 716, 736, 754, 764, 786) (e.g., a user interface of a lite-version application associated with or related to a full-version application) that is configured to perform the activity without downloading at least a portion of the first application (e.g., without obtaining the first application, without downloading a full-version of the application). In some embodiments, the second user interface is configured to perform the activity with (e.g., by downloading) a lite-version of the first application (e.g., instead of downloading a full-version of the first application) In some embodiments, a lite-version of the first application is a smaller (e.g., requires less memory) than the counterpart full-version application of the first application. In some embodiments, a lite-version of the first application is faster to download and access and requires less memory resources to store and access (e.g., thus faster to load and launch on a respective computer system) than the counterpart full-version application. In some embodiments, a lite-version of the first application enables a subset of (e.g., but not all of) the features (e.g., capabilities) of the counterpart full-version application. Displaying the second user interface that is configured to perform the activity without downloading at least the portion of the first application in accordance with the determination that the first application is not available on the computer system provides the user with quick and easy access to features of the first application for performing the activity even when at least the portion of the first application is not available on the computer system and without needing to download (e.g., the full version of) the first application onto the computer system. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the second user interface (e.g., 716, 736, 754, 764, 786) includes displaying the second user interface without requesting authentication information (e.g., biometric authentication information (e.g., fingerprint authentication information, facial recognition authentication information, retina/iris recognition information), passcode or password authentication information) to authorize display of the second user interface (824). In some embodiments, authorization (e.g., via biometric authentication, via passcode/password authentication) is not required for the computer system to display (or cause display of) the second user interface in response to detecting the activation of the first selectable user interface object (e.g., even if the first selectable user interface object had been displayed in (e.g., overlaid on) a lock screen or a wake screen of the computer system (e.g., 700)). Displaying the second user interface without requesting authentication information to authorize display of the second user interface provides quick access to features of the second user interface without requiring additional inputs. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in accordance with the determination that the first application is not available on (e.g., not downloaded on, not installed on, not stored on, cannot be launched or accessed on) the computer system (e.g., 700), the computer system initiates (826) a process (e.g., automatically, without requesting user permission) for downloading (e.g., and installing) software configured to perform the activity that does not include at least the portion of the first application (e.g., a lite-version of the first application instead of a full-version of the first application, a version of the first application is configured to perform the activity without at least a portion of the first application) on the computer system. In some embodiments, the computer system initiates the process (e.g., automatically, without requesting user permission) for downloading the software if it is the first time that the first application is being invoked (e.g., based on the detected triggering condition) on the computer system, and thus the first application is not available on the computer system. In some embodiments, the computer system downloads the software configured to perform the activity that does not include at least the portion of the first application (e.g., a lite-version of the first application) on the computer system while displaying the first user interface. In some embodiments, the computer system downloads the software configured to perform the activity that does not include at least the portion of the first application (e.g., a lite-version of the first application) on the computer system in response to detecting activation of the first selectable user interface object. Initiating (e.g., automatically, without user input) the process for downloading (e.g., and installing) software configured to perform the activity that does not include at least the portion of the first application on the computer system in accordance with the determination that the first application is not available on the computer system enables the user to access the first application without needing to manually download the first application onto the computer system. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to detecting the activation (e.g., 701, 717, 719, 723, 727) of the first selectable user interface object (e.g., 706B, 734B, 752B, 762B, 784B) (818), in accordance with a determination that the first application is available on (e.g., downloaded on, installed on, stored on, can be launched/accessed on) the computer system (e.g., 700) (828), the computer system displays (830), via the display generation component (e.g., 702), a third user interface (e.g., a user interface of a full-version of the first application), where the third user interface is a user interface of the first application that is configured to perform the activity. Displaying the third user interface, where the third user interface is the user interface of the first application that is configured to perform the activity in accordance with a determination that the first application is available on the computer system enables the user to quickly and easily access (e.g., all of the) features of the first application. Performing an operation when a set of conditions has been met without requiring further user input enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the computer system more quickly and efficiently.

In some embodiments, the second user interface (e.g., 716, 736, 754, 764, 786) corresponds to software configured to perform the activity that does not include at least the portion of the first application (e.g., a lite-version of the first application; a version of the first application is configured to perform the activity without at least a portion of the first application) of the first application and the third user interface corresponds to the first application (e.g., the full-version of the first application), wherein the software configured to perform the activity that does not include at least the portion of the first application and the first application both correspond to a common application source (e.g., the same developer (the developer of the first application); the same company (the company that developed/is developing the first application)).

In some embodiments, displaying the first user interface (e.g., 706, 734, 752, 762, 784) comprises displaying the first user interface over (e.g., overlaid on) a (e.g., portion of, but not all of) background user interface (e.g., overlaid on the previously-displayed user interface, overlaid on a wake screen user interface (e.g., 704), overlaid on a desktop or home screen user interface) (812). Displaying the first user interface over (e.g., overlaid on) the background user interface enables the user to concurrently view the first user interface and at least a portion of the background user interface that had been displayed. Providing additional control of the computer system without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first user interface (e.g., 706, 734, 752, 762, 784) or the second user interface (e.g., 716, 736, 754, 764, 786) includes information (e.g., invocation-based information (e.g., specific branch of the store or restaurant; table number within the restaurant; object identifier (e.g., an object number, such as a bike number); vendor-specific information)) related to (e.g., identifying; indicating an identifier for; describing) the activity, where the information is determined based on the detected triggering condition (832). In some embodiments, in accordance with a determination that the detected triggering condition (e.g., scanning a QR code; detecting an NFC signal; detecting selection of a hyperlink; detecting/determining the presence of the computer system near a location beacon; detecting/determining the presence of the computer system at/in a specific geographic location) is a first type of triggering condition, the computer system displays or causes display of, via the display generation component, first information (e.g., vendor-specific information) based on the detected triggering condition. In some embodiments, in accordance with a determination that the detected triggering condition (e.g., scanning a QR code; detecting an NFC signal; detecting selection of a hyperlink; detecting/determining the presence of the computer system near a location beacon; detecting/determining the presence of the computer system at/in a specific geographic location) is a second type of triggering condition different from the first type of triggering condition, the computer system (e.g., 700) displays or causes display of second information (e.g., vendor-specific information) based on the detected triggering condition that is different from the first information. Providing, in the first user interface or the second user interface, information related to the activity, where the information is determined based on the detected triggering condition enables the user to quickly and easily view the information related to the activity and thus efficiently perform the activity using the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the detected triggering condition includes activation (e.g., user selection) of a link (e.g., a displayed hyperlink; a link displayed in a message, app, or webpage/website). Displaying the first user interface (e.g., 706, 734, 752, 762, 784) in response to detecting the triggering condition, where the detected triggering condition includes activation of the link, enables a user to quickly and easily view information about how the computer system can be used to perform the activity and efficiently access the activity using the computer system. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the detected triggering condition includes detection (e.g., via NFC or other wireless communication; via scanning of a QR or bar code with a camera or other sensor for detecting visual information) of a physical object (e.g., an object that can be detected via a NFC connection; a QR or bar code that can be detected/scanned using the computer system (e.g., 700)). Displaying the first user interface (e.g., 706, 734, 752, 762, 784) in response to detecting the triggering condition, where the detected triggering condition includes detection of the physical object, enables a user to quickly and easily view information about how the computer system can be used to perform the activity and conveniently access the activity using the computer system. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the detected triggering condition includes detecting that the computer system (e.g., 700) is at (or near, proximate to) a respective location (e.g., a location from a point of interest in a map application; a location-based determination that the computer system is at a particular location where the activity can be performed (e.g., at a particular restaurant; at a particular store) using geographic information about the computer system or a broadcast beacon, and/or other computer system location technology such as WiFi triangulation. Displaying the first user interface (e.g., 706, 734, 752, 762, 784) in response to detecting the triggering condition, where the detected triggering condition includes detecting that the computer system is at the respective location, enables a user to recognize that the computer system can be used to perform the activity and provides quick and easy access to the activity on the computer system. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the detected triggering condition includes initiation of a search (e.g., using a universal search feature of the computer system) performed on the computer system (e.g., 700). In some embodiments, the computer system displays, via the display generation component (e.g., 702), search results (e.g., as shown in 772) of a search performed on the computer system (e.g., searching for restaurants, stores, rides, or the like). In some embodiments, the detected triggering condition includes detecting user selection of a particular search result from the plurality of displayed search results. Displaying the first user interface (e.g., 706, 734, 752, 762, 784) in response to detecting the triggering condition, where the detected triggering condition includes initiation of the search performed on the computer system, enables a user to quickly and easily view information about how the computer system can be used to perform the activity and efficiently access the activity using the computer system. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, subsequent to displaying the second user interface (e.g., 716, 736, 754, 764, 786), the computer system (e.g., 700) displays, via the display generation component (e.g., 702), a home user interface (e.g., 796) (e.g., a home screen or one or more screens/pages of the home screen; an operating system-controlled main user interface of the computer system) that includes a plurality of application user interface objects (e.g., app icons) corresponding to respective applications that are available on (e.g., downloaded on; installed on) the computer system, where the home user interface does not include (e.g., does not include in any of the one or more screens/pages of the home screen) an application user interface object for launching the second user interface.

In some embodiments, the home user interface (e.g., 796) includes one or more screens or pages that include the plurality of application user interface objects (e.g., 798A-798I) (e.g., app icons). In some embodiments, the application user interface object for launching the second user interface (e.g., 716, 736, 754, 764, 786) is not included in any of the one or more screens or pages of the home user interface.

In some embodiments, in response to detecting activation (e.g., selection) of the application user interface object (e.g., app icon) for launching the second user interface (e.g., 716, 736, 754, 764, 786), the computer system (e.g., 700) displays or causes display of, via the display generation component (e.g., 702), the second user interface (e.g., 716, 736, 754, 764, 786).

In some embodiments, the home user interface (e.g., 796) does not include application user interface objects (e.g., app icons) corresponding to applications for which a first version (e.g., a lite-version) of the respective application is available on the computer system (e.g., 700) but a second version (e.g., a full-version) of the respective application is not available on the computer system. In some embodiments, the home user interface only includes application user interface objects (e.g., 798A-798I) (e.g., app icons) corresponding to applications for which the second version (e.g., a full-version) of the respective application is available on the computer system.

In some embodiments, subsequent to displaying the second user interface (e.g., 716, 736, 754, 764, 786), the computer system (e.g., 700) displays, via the display generation component (e.g., 702), a home user interface (e.g., 796) (e.g., a home screen; an operating system-controlled main user interface of the computer system) that includes a second selectable user interface object (e.g., 797) (e.g., a folder; a menu). In some embodiments, while displaying the second selectable user interface object (e.g., 797), the computer system (e.g., 700) detects, via the one or more input devices, activation (e.g., 729) (e.g., selection) of the second selectable user interface object. In some embodiments, in response to detecting the activation (e.g., 729) of the second selectable user interface object (e.g., 797), the computer system (e.g., 700) displays, via the display generation component (e.g., 702) (e.g., in a user interface corresponding to a folder (e.g., a temporary folder) for app icons corresponding to first version (e.g., lite-version) applications that are downloaded on the computer system), an application user interface object (e.g., 799A-799E) (e.g., an app icon) for launching the second user interface (e.g., 716, 736, 754, 764, 786). In some embodiments, in response to detecting activation (e.g., selection) of the application user interface object (e.g., app icon) for launching the second user interface (e.g., 716, 736, 754, 764, 786), the computer system (e.g., 700) displays or causes display of, via the display generation component (e.g., 702), the second user interface. In some embodiments, the application user interface object (e.g., 799A-799E) (e.g., app icon) for launching the second user interface includes an indication (e.g., badge) that the application user interface object corresponds to a first version (e.g., lite-version) of the first application (as opposed to a second version (e.g., full-version) of the first application). Displaying the application user interface object (e.g., an app icon) for launching the second user interface in response to detecting the activation of the second selectable user interface object that is included in the home user interface enables the user to quickly and easily launch the second user interface from the home user interface. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to detecting the activation of the second selectable user interface object, in accordance with a determination that a predetermined time period (e.g., 1 day, 1 week, 2 weeks, 1 month, 3 months, 6 months, 1 year) has passed since the second user interface was accessed (e.g., launched; displayed) on the computer system (e.g., 700), the computer system forgoes displaying, via the display generation component (e.g., 702) (e.g., in a user interface corresponding to a folder (e.g., a temporary folder) for app icons corresponding to first version (e.g., lite-version) applications that are downloaded on the computer system), the application user interface object (e.g., an app icon) for launching the second user interface (e.g., 716, 736, 754, 764, 786).

In some embodiments, the application user interface object for launching the second user interface (e.g., 716, 736, 754, 764, 786) is not displayed because the application user interface object has been removed (e.g., deleted) from the computer system (e.g., 700). In some embodiments, in response to detecting the activation of the second selectable user interface object, in accordance with a determination that a predetermined time period (e.g., 1 day, 1 week, 2 weeks, 1 month, 3 months, 6 months, 1 year) has passed since the second user interface was accessed (e.g., launched; displayed) on the computer system, the computer system removes (e.g., deletes) software for (e.g., that corresponds to; that is required to) launching the second user interface from the computer system. Removing (e.g., automatically, without user input) the software for launching the second user interface from the computer system in accordance with a determination that a predetermined time period has passed since the second user interface was accessed on the computer system frees up storage on the computer system that had been used by software that may no longer be accessed by the user on the computer system. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while a first application process corresponding to the second user interface (e.g., 716, 736, 754, 764, 786) has been recently used (e.g., is in an active state (e.g., in the background); is currently running (e.g., in the background)) on the computer system (e.g., 700), the computer system displays, via the display generation component (e.g., 702) (e.g., in a multitasking user interface; in a multitasking screen), a plurality of user interface preview items (e.g., user interface objects that indicate applications that have been launched, are currently active, and/or are running (e.g., in the background) on the computer system, where a preview item includes an image of (the current instance of) the user interface for the corresponding application) corresponding to applications that have been recently used (e.g., in an active state (e.g., in the background); currently running (e.g., in the background); launched and not yet shut down) on the computer system, where the plurality of user interface preview items includes a first user interface preview item corresponding to the second user interface. In some embodiments, in accordance with detecting that the first application process corresponding to the second user interface is no longer active (e.g., has been closed), the computer system no longer includes the first user interface preview item within the plurality of user interface preview items. Including the first user interface preview item corresponding to the second user interface in the plurality of user interface preview items provides the user with quick and easy access to the second user interface. Providing additional control options without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while the first application process corresponding to the second user interface (e.g., 716, 736, 754, 764, 786) and a second application process corresponding to the second user interface have both been recently used (e.g., both are in an active state (e.g., in the background); both are currently running (e.g., in the background)) on the computer system (e.g., 700), where the first application process corresponds to a first instance of the second user interface (e.g., the second user interface launched at a first time, a first location, and/or in relation to a first object) and the second application process corresponds to a second instance of the second user interface (e.g., the second user interface launched at a second time, a second location, and/or in relation to a second object), the computer system displays, via the display generation component (e.g., 702) (e.g., in a multitasking user interface; in a multitasking screen), the plurality of user interface preview items, where the plurality of user interface preview items includes the first user interface preview item corresponding to the first instance of the second user interface and a second user interface preview item corresponding to the second instance of the second user interface.

In some embodiments, subsequent to displaying the second user interface (e.g., 716, 736, 754, 764, 786) that is configured to perform the activity without downloading at least the portion of the first application, the computer system (e.g., 700) displays, via the display generation component (e.g., 702), an application store user interface (e.g., a user interface for an application store from which applications can be searched and application downloads can be initiated). In some embodiments, the computer system concurrently displays, in the application store user interface, a third selectable user interface object (e.g., an affordance; a selectable download button) that, when activated, initiates a process for downloading the first application onto the computer system, and an indication (e.g., description) that the second user interface was used (e.g., accessed; launched) on the computer system (e.g., an indication (e.g., description) of how, when, and/or where the second user interface was used on the computer system). Concurrently displaying, in the application store user interface, the third selectable user interface object that, when activated, initiates the process for downloading the first application onto the computer system, and the indication that the second user interface was used on the computer system enables the user to easily recognize that the second user interface had been used on the computer system while enabling the user to efficiently download the first application (e.g., which relates to the second user interface) onto the computer system. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the second user interface (e.g., 716, 736, 754, 764, 786), the computer system (e.g., 700) displays, in the second user interface, a user interface element (e.g., a banner region or a notification region within the second user interface) that includes an indication that the first application is available to be downloaded onto the computer system (e.g., 700) (e.g., via an application store). In some embodiments, the indication includes a download user interface object (e.g., a download affordance) that, when activated (e.g., selected), initiates a process for downloading the first application onto the computer system. Displaying the user interface element that includes the indication that the first application is available to be downloaded onto the computer system while displaying the second user interface enables the user to quickly and easily recognize that an application that corresponds to or relates to the displayed user interface—the first application—can be downloaded onto the computer system. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the user interface element (e.g., 724, 762, 784) (e.g., a banner region or a notification region within the second user interface) further includes a fourth selectable user interface object (e.g., an affordance; a selectable share button) that, when activated, initiates a process (e.g., a sharing process) for enabling a second computer system (different from the computer system) to access (e.g., display) the second user interface to perform the activity without downloading at least the portion of the first application onto the second computer system. In some embodiments, the user interface element (e.g., a notification; a banner-style notification) is displayed temporarily such that the computer system ceases to display the user interface element after a predetermined time period (e.g., 10 seconds, 30 seconds, one minute) has passed since the user interface element was displayed. Including the fourth selectable user interface object that, when activated, initiates the process (e.g., a sharing process) for enabling a second computer system (different from the computer system) to access the second user interface to perform the activity without downloading at least the portion of the first application onto the second computer system enables the user to efficiently enable the second computer system to perform the activity with fewer inputs. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, an application process corresponding to the second user interface (e.g., 716, 736, 754, 764, 786) is enabled to (e.g., allowed to) cause display of a notification that includes information related to performing the activity. In some embodiments, while the application process corresponding to the second user interface is active (e.g., running (e.g., in the background); launched (e.g., in the background)) on the computer system (e.g., 700), the computer system can display (or cause display of) notifications concerning performing the activity using the computer system.

In some embodiments, the second user interface (e.g., 716, 736, 754, 764, 786, 793) corresponds to software configured to perform the activity (e.g., a lite-version of the first application; a version of the first application that is configured to perform the activity without at least a portion of the first application). In some embodiments, in response to detecting the activation of the first selectable user interface object (e.g., 706B, 734B, 752B, 762B, 784B), the computer system (e.g., 700) sets one or more system privileges for the software to include permission, for a predetermined time period (e.g., for a limited duration) (e.g., for 8 hours; for 12 hours; until the end of the current day), to generate notifications (e.g., 748, 1399) on the computer system. Setting the one or more system privileges for the software (e.g., automatically, without further user input) to include permission to generate the notification on the computer system for the predetermined time period enables the software to provide a feature (providing notifications related to performing the activity) on the computer system during a time period for which notifications by the software may be the most useful and relevant to a user of the computer system, thereby enabling the user to utilize the software in a more efficient manner, while disabling the software from providing notifications after the time period has passed prevents the computer system from unnecessary consuming power which, additionally, improves battery life of the computer system.

In some embodiments, detecting the activation of the first selectable user interface object occurs at a first time. In some embodiments, at a second time after the first time, the computer system (e.g., 700) detects (e.g., determines) the occurrence of a notification event (e.g., an event that meets criteria for generating a notification; an event that relates to the activity being performed by the software; detecting/determining the presence of the computer system near a location beacon; detecting/determining the presence of the computer system at/in a specific geographic location) corresponding to the second application (e.g., the applications corresponding to lite user interfaces 716, 736, 754, 764, 786, 793, respectively) (e.g., a lite-version of the first application; a version of the first application that is configured to perform the activity without at least a portion of the first application). In some embodiments, in response to detecting the occurrence of the notification event, in accordance with a determination that the second time is within the predetermined time period from the first time (e.g., within 8 hours from the first time; within 12 hours from the first time; within the same day as the first time), the computer system displays, via the display generation component (e.g., 702), a notification (e.g., 748, 1399) (e.g., a push notification; a prompt) corresponding to the detected notification event. In some embodiments, in response to detecting the occurrence of the notification event, in accordance with a determination that the second time is not within the predetermined time period from the first time (e.g., as shown via the right depiction of computer system 700 in FIG. 13V) (e.g., more than 8 hours since the first time; more than 12 hours since the first time; after the day during which the first time occurred), the computer system forgoes displaying, via the display generation component, the notification corresponding to the detected notification event. Displaying or forgoing displaying the notification corresponding to the detected notification event based on whether or not the second time is within the predetermined time period from the first time avoids granting an application that is not a full-version application and is designed for temporary use (unlike a full-version application) unnecessarily prolonged access to the ability to generate notifications, which in turn improves system security by avoiding granting unnecessary access to a system privilege and reduces power consumption by the software which, in turn, reduces power usage and improves battery life of the computer system.

In some embodiments, the predetermined time period is based on an amount of time that has elapsed since a predetermined type of user interaction was detected with respect to the second application (e.g., the applications corresponding to lite user interfaces 716, 736, 754, 764, 786, 793, respectively) (e.g., a predetermined amount of time since the last time the second application was displayed via the display generation component of the computer system). Automatically setting the predetermined time period for which notifications are allowed based on detected user interaction with the second application enables the computer system to generate relevant notifications corresponding to the second application that are useful for the user while still enabling the computer system to cease generating notifications corresponding to the second application after the user has stopped using the second application (e.g., the predetermined time period has passed since the user last interacted with the second application). Automatically providing useful information (via the notifications) for the predetermined time period in response to detecting user interaction with the second application reduces the number of inputs needed to perform an operation, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Further, denying the second application from generating further notifications after the user has stopped using the second application improves system security by avoiding granting unnecessary access to a system privilege and reduces power consumption by the software which, in turn, reduces power usage and improves battery life of the computer system.

In some embodiments, while the first application (e.g., the application corresponding to user interface 708, the application corresponding to user interface 1348, the application corresponding to user interface 1394) is installed on the computer system (e.g., 700), the computer system detects the occurrence of a second notification event (e.g., a notification event corresponding to the software (e.g., the lite-version application); an event that relates to the activity being performed by the software; detecting/determining the presence of the computer system near a location beacon; detecting/determining the presence of the computer system at/in a specific geographic location). In some embodiments, in response to detecting the occurrence of the second notification event, in accordance with a determination that one or more system privileges for the first application include permission to generate a notification (e.g., as in FIGS. 13I-13J the computer system displays, via the display generation component (e.g., 702), a notification (e.g., 748, 1399) corresponding to the detected second notification event. In some embodiments, in accordance with a determination that the one or more system privileges for the first application do not include permission to generate the notification (e.g., as in FIG. 13S) (e.g., because the permission has been denied by the user), the computer system forgoes displaying, via the display generation component, the notification corresponding to the detected second notification event. Upon detecting a notification event, allowing the first application to generate notifications if the one or more system privileges for the first application include permission to generate a notification and preventing the first application from generating notifications if the one or more system privileges for the first application do not include permission to generate a notification enhances security, thus making the computer system more secure for use, by allowing the first application to perform a task that is consistent with its system privileges while preventing the first application from performing a task that is inconsistent with its system privileges.

Note that details of the processes described above with respect to method 800 (e.g., FIGS. 8A-8B) are also applicable in an analogous manner to the methods described below. For example, method 1000 optionally includes one or more of the characteristics of the various methods described above with reference to method 800. For example, a respective lite user interface displayed on a respective computer via a process for enabling an activity on the respective computer system initiated based on one or more of the methods described with reference to FIGS. 7A-7AZ can include customized content based on received or detected information from the initiation process. For another example, method 1200 optionally includes one or more of the characteristics of the various methods described above with reference to method 800. For example, the respective lite user interface displayed on the respective computer system via the process for enabling an activity on the respective computer system initiated based on one or more of the methods described with reference to FIGS. 7A-7AZ can be accessed (e.g., again) and/or managed on the respective computer system via the methods described with reference to FIGS. 11A-11S. For another example, method 1400 optionally includes one or more of the characteristics of the various methods described above with reference to method 800. For example, the process for setting the one or more system privileges for an application described with reference to FIGS. 13A-13V can be applied to the software corresponding to the user interface that is configured to perform the activity without downloading at least a portion of an application as described with reference to FIGS. 7A-7AZ. For brevity, these details are not repeated below.

FIGS. 9A-9T illustrate exemplary user interfaces for customizing displayed content based on circumstances (e.g., a context) under which the content was invoked, in accordance with some embodiments. The user interfaces in these figures are used to illustrate the processes described below, including the processes in FIGS. 10A-10C.

FIGS. 9A-9E illustrate exemplary user interfaces for customizing displayed content based on location (e.g., customizing content for different vendors using an application from the same developer).

FIG. 9A illustrates computer system 700 displaying, via display generation component 702, a user interface 904 corresponding to a wake screen (e.g., a lock screen) of computer system 700. In some embodiments, a wake screen is a user interface that is displayed when a display generation component of a computer system transitions from an inactive (e.g., off) state to an active (e.g., on) state. In some embodiments, a lock screen is a user interface that is displayed when the computer system is operating in a locked state in which at least some functionality of the computer system is restricted (e.g., until the computer system is unlocked).

Computer system 700 detects (e.g., via one or more location sensors (e.g., GPS sensors)) (e.g., while displaying user interface 904, while displaying a different user interface, or while display generation component 702 is in an off state) that computer system is at (e.g., has entered) a location corresponding to a first vendor (e.g., a first restaurant).

In FIG. 9B, in response to detecting that computer system 700 is at the location corresponding to the first vendor (e.g., a first restaurant called "Food King"), computer system 700 displays a sheet user interface 906. In some embodiments, sheet user interface 906 is similar to (e.g., has the same layout/structure as; provides a consistent experience as) sheet user interface 706 first described above with reference to FIG. 7B, sheet user interface 734 first described above with reference to FIG. 7Q, sheet user interface 752 first described above with reference to FIG. 7X, sheet user interface 762 first described above with reference to FIG. 7AE, and sheet user interface 784 first described above with reference to FIG. 7AJ.

As shown in FIG. 9B, in some embodiments, sheet user interface 906 includes an information region 908, where information region 908 includes name information 908A of the first vendor (e.g., "Food King") and location information 908B of the first vendor (e.g., the address of the first vendor).

In some embodiments, sheet user interface 906 includes an affordance 910 (e.g., a selectable user interface object; an activatable user interface object) which, when activated, initiates a process for enabling an activity (e.g., ordering one or more menu items, such as food or drinks, from the first vendor) on computer system 700 that relates to the first vendor (e.g., "Food King"). In some embodiments, affordance 910 indicates (e.g., includes text information of) the type of activity e.g., ordering one or more menu items, such as food or drinks, from the first vendor) that relates to the first vendor (e.g., "Food King").

In some embodiments, sheet user interface 906 includes an image 912 (e.g., of the first vendor's store; a logo of the first vendor) that is indicative of the first vendor (e.g., "Food King").

In some embodiments, sheet user interface 906 includes an indication 914 of a first developer (e.g., an entity; a company) that powers (e.g., develops, creates, and/or manages the template for) an application (e.g., a lite-version/partial version of an application for which there is a corresponding available full-version/regular version) that can be used to enable the activity (e.g., ordering menu items, such as food or drinks) associated with the first vendor, where the application (hereinafter referred to as "lite-version application") is based on a portion of (but not all of) a counterpart full-version application of the first developer. In some embodiments, as in FIG. 9B, the application is powered by a first developer (e.g., "Food Reviews") that is different from (e.g., is a different entity from) the first vendor (e.g., "Food King"). In some embodiments, the developer can provide its application platform for use by a plurality of different vendors and the application can be customized for a respective vendor for which the application platform is being used. In some embodiments, the application is powered by a second developer (e.g., the first vendor itself) that is the same as (e.g., is the same entity as) the first vendor (e.g., "Food King").

In some embodiments, sheet user interface 906 includes an affordance 916 (e.g., a selectable user interface object; an activatable user interface object) for accessing an application store (e.g., an application store controlled and managed by a developer of the operating system of computer system 700, where the application store can be used to download first-party and third-party applications onto computer system 700).

In some embodiments, sheet user interface 906 includes an affordance 918 (e.g., a selectable user interface object; an activatable user interface object) for dismissing (e.g., causing computer system 700 to cease display of) sheet user interface 906 without performing the activity (e.g., ordering menu items, such as food or drinks) associated with the first vendor (e.g., "Food King").

In FIG. 9B, while displaying sheet user interface 906, computer system 700 detects (e.g., via a touch sensitive surface of the one or more input devices), an activation 901 of (e.g., user selection of; user's tap input on) affordance 910.

In FIG. 9C, in response to detecting activation 901 of affordance 910 (e.g., and in response to displaying a loading screen as, for example, described above with reference to FIGS. 7H-7J), in accordance with a determination that a counterpart full-version application of the lite-version application of the first developer (e.g., "Food Reviews") is not installed on (e.g., not installed on) computer system 700, computer system 700 displays, via display generation component 702, a lite user interface 920 of the first vendor (e.g., "Food King"), where the lite-application is powered by the first developer (e.g., "Food Reviews"). In some embodiments, if the lite-version application of the first developer (e.g., "Food Reviews") is not available on (e.g., was not installed on) computer system 700 when activation 901 of affordance 910 is detected, computer system 700 automatically (e.g., without user input) downloads and installs the lite-version application corresponding to the first developer (e.g., "Food Reviews") in response to detecting activation 901 of affordance 910.

As shown in FIG. 9C, in some embodiments, lite user interface 920 includes information 922 of the first vendor (e.g., "Food King") (e.g., including an address of the first vendor) that corresponds to location information 908B of the first vendor (e.g., the address of the first vendor) included in sheet user interface 906.

In some embodiments, lite user interface 920 includes a vendor-customized menu region 924 that includes one or more menu items (e.g., foods and/or drinks) provided by the first vendor (e.g., "Food King").

In some embodiments, lite user interface 920 includes an affordance 926 (e.g., a selectable user interface object; an activatable user interface object) for ordering/checking out selected menu items.

In some embodiments, lite user interface 920 includes a user interface object 928 (e.g., a banner; a platter) that is displayed concurrently with lite user interface 920 (e.g., overlaid on a portion of lite user interface 920). In some embodiments, user interface object 928 is displayed with display of lite user interface 928 and is displayed for a predetermined time period (e.g., 10 seconds; 30 seconds; 1 minute; computer system 700 ceases to display user interface object 920 after a non-zero predetermined time period). In some embodiments, user interface object 928 includes an indication 928A (e.g., text information) of the first developer (e.g., "Food Reviews") corresponding to the application. In some embodiments, user interface object 928 includes a share affordance 928B for initiating a process for sharing the lite-version application corresponding to lite user interface 920 with a different user (e.g., transmitting an electronic communication to a different computer system of the different user that includes the portion of the application (e.g., the lite-version application) and/or instructions for downloading the portion of the application (e.g., the lite-version application)).

FIG. 9D illustrates computer system 700 displaying, via display generation component 702, user interface 904 of the wake screen (e.g., lock screen) of computer system 700. In FIG. 9D, in response to detecting that computer system 700 is at the location corresponding to a second vendor (e.g., a second restaurant called "Burger Queen"), computer system 700 displays a sheet user interface 930 that is also powered by the first developer (e.g., "Food Reviews") (e.g., and thus shares the same layout/structure as sheet user interface 906).

As shown in FIG. 9D, in some embodiments, similar to sheet user interface 906 corresponding to the first vendor, sheet user interface 930 includes an information region 932, where information region 932 includes name information 932A of the second vendor (e.g., "Burger Queen") and location information 932B of the second vendor (e.g., the address of the second vendor).

In some embodiments, similar to sheet user interface 906 corresponding to the first vendor, sheet user interface 930 includes an affordance 934 (e.g., a selectable user interface object; an activatable user interface object) which, when activated, initiates a process for enabling an activity (e.g., ordering one or more menu items, such as food or drinks, from the second vendor) on computer system 700 that relates to the second vendor (e.g., "Burger Queen"). In some embodiments, affordance 934 indicates (e.g., includes text information of) the type of activity (e.g., ordering one or more menu items, such as food or drinks, from the second vendor) that relates to the second vendor (e.g., "Burger Queen").

In some embodiments, similar to sheet user interface 906 corresponding to the first vendor, sheet user interface 930 includes an image 936 (e.g., of the second vendor's store; a logo of the second vendor) that is indicative of the second vendor (e.g., "Burger Queen").

In some embodiments, similar to sheet user interface 906 corresponding to the first vendor, sheet user interface 930 includes an indication 938 of the first developer (e.g., "Food Reviews") that powers (e.g., develops, creates, and/or manages the template for) the application that enables the activity (e.g., ordering one or more menu items, such as food or drinks) related to the second vendor (e.g., "Burger Queen").

In some embodiments, similar to sheet user interface 906 corresponding to the first vendor, sheet user interface 930 includes an affordance 940 (e.g., a selectable user interface object; an activatable user interface object) for accessing an application store (e.g., an application store controlled and managed by a developer of the operating system of computer system 700, where the application store can be used to download first-party and third-party applications onto computer system 700).

In some embodiments, similar to sheet user interface 906 corresponding to the first vendor, sheet user interface 930 includes an affordance 942 (e.g., a selectable user interface object; an activatable user interface object) for dismissing (e.g., causing computer system 700 to cease display of) sheet user interface 930 without performing the activity (e.g., ordering one or more menu items, such as food or drinks) associated with the second vendor (e.g., "Burger Queen").

In FIG. 9D, while displaying sheet user interface 930, computer system 700 detects (e.g., via a touch sensitive surface of the one or more input devices), an activation 903 of (e.g., user selection of; a tap input on) affordance 934.

Figure 9E:
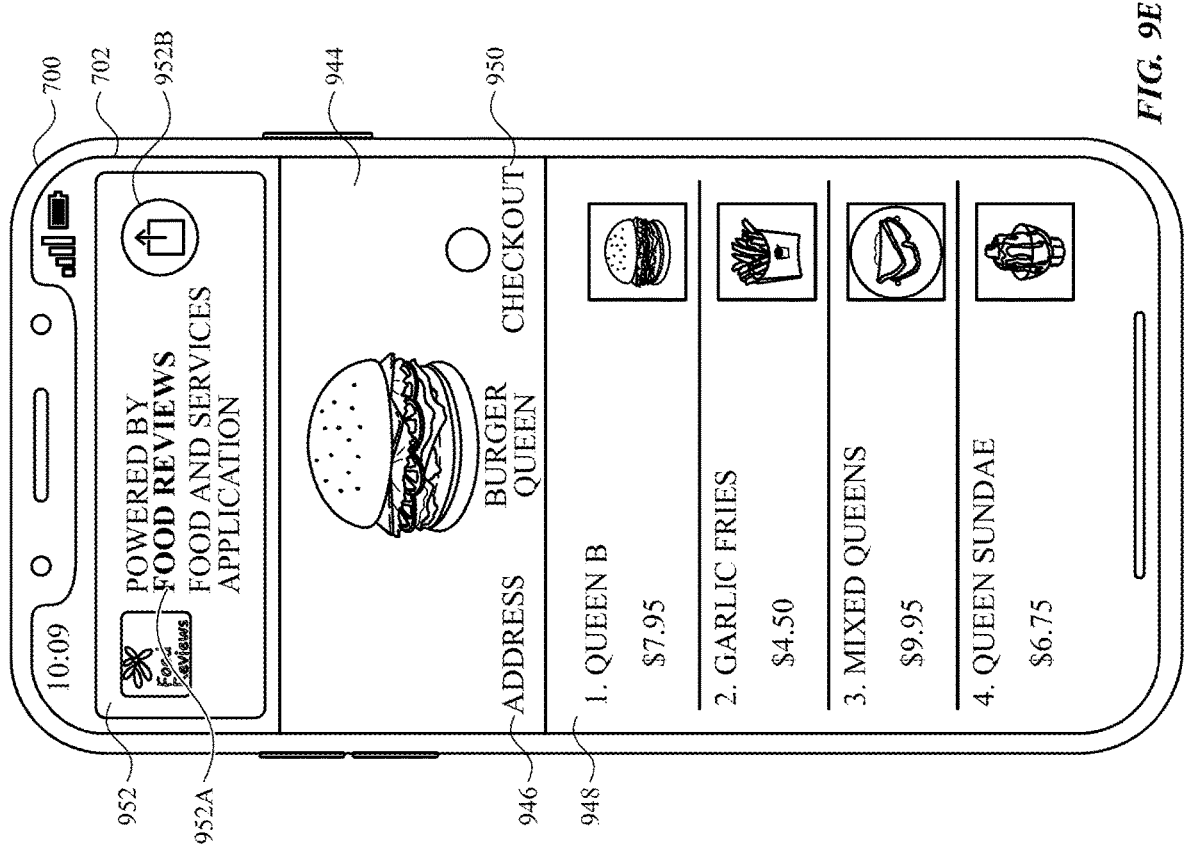
FIGS. 9A-9T illustrate exemplary user interfaces for customizing displayed content based on circumstances under which the content was invoked, in accordance with some embodiments.
Figure 10A:
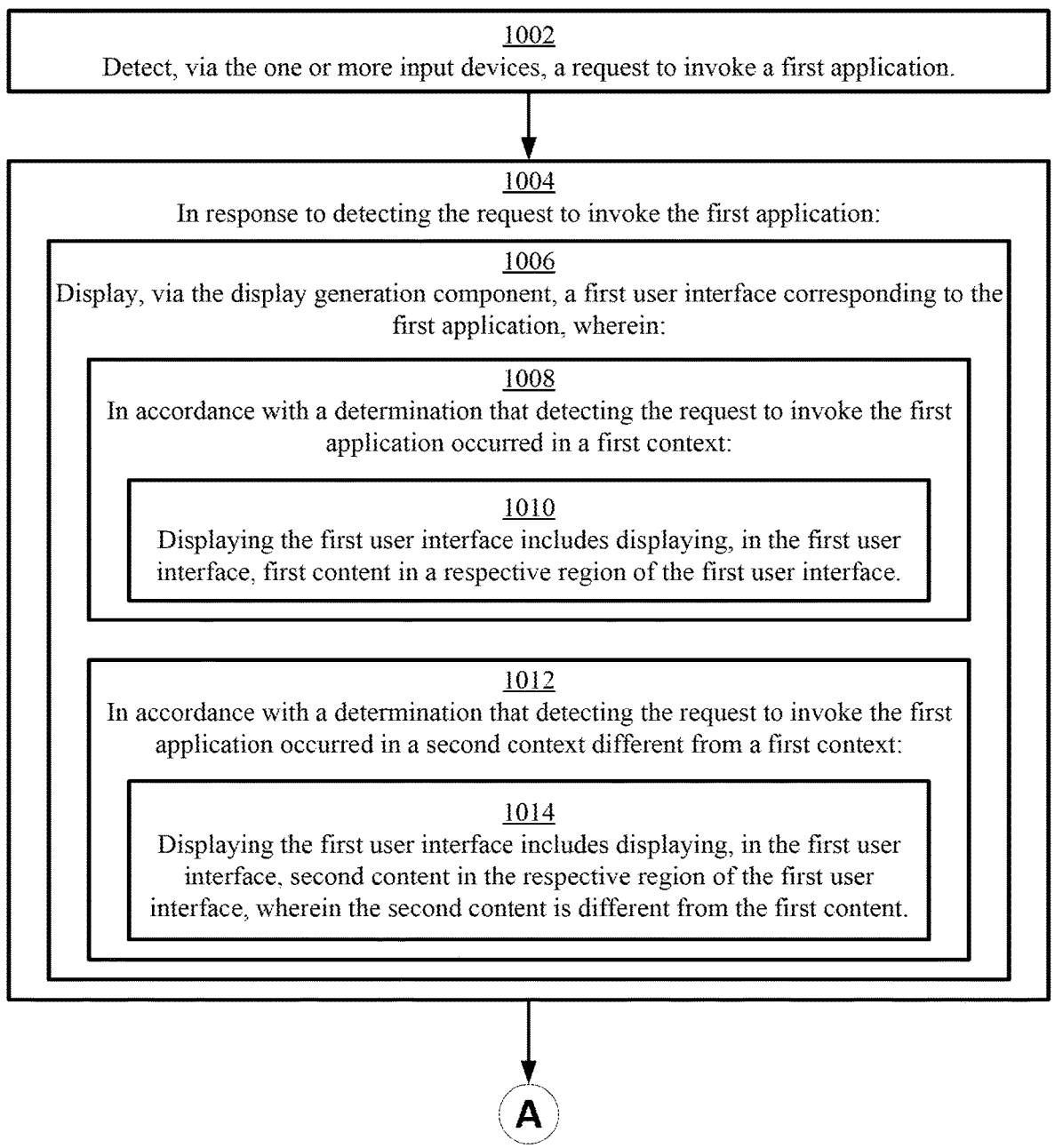

In FIG. 9E, in response to detecting activation 903 of affordance 934 (e.g., and in response to displaying a loading screen as for example described above with reference to FIGS. 7H-7J), computer system 700 displays, via display generation component 702, a lite user interface 944 of the second vendor (e.g., "Burger Queen"), where the lite user interface 944 is powered by the same lite-version application of the first developer (e.g., "Food Reviews") that powered lite user interface 920 described above with reference to FIG. 9C.

In some embodiments, because both lite user interface 920 of the first vendor (e.g., "Food King") and lite user interface 944 of the second vendor ("Burger Queen") are powered by the same lite-version application corresponding to the first developer (e.g., "Food Reviews"), lite user interface 944 shares a similar layout/structure with lite user interface 920, but lite user interface 920 includes information customized for the first vendor (e.g., "Food King") and lite user interface 944 includes information customized for the second vendor (e.g., "Burger Queen").

As shown in FIG. 9E, in some embodiments, lite user interface 944 includes information 946 of the second vendor (e.g., "Burger Queen") (e.g., including an address of the second vendor) that corresponds to location information 932B of the second vendor (e.g., the address of the second vendor) included in sheet user interface 930.

In some embodiments, lite user interface 944 includes a vendor-customized menu region 948 that includes one or more menu items (e.g., foods and/or drinks) provided by the second vendor (e.g., "Burger Queen").

In some embodiments, lite user interface 944 includes an affordance 950 (e.g., a selectable user interface object; an activatable user interface object) for ordering/checking out selected menu items.

In some embodiments, lite user interface 944 includes a user interface object 952 (e.g., a banner; a platter) that is displayed concurrently with lite user interface 944 (e.g., overlaid on a portion of lite user interface 944). In some embodiments, user interface object 952 is displayed with display of lite user interface 944 and is displayed for a predetermined time period (e.g., 10 seconds; 30 seconds; 1 minute; computer system 700 ceases to display user interface object 952 after a non-zero predetermined time period). In some embodiments, user interface object 952 includes an indication 952A (e.g., text information) of the first developer (e.g., "Food Reviews") corresponding to the application. In some embodiments, user interface object 952 includes a share affordance 952B for initiating a process for sharing the lite-version application corresponding to lite user interface 944 with a different user (e.g., transmitting an electronic communication to a different computer system of the different user that includes the portion of the application (e.g., the lite-version application) and/or instructions for downloading the portion of the application (e.g., the lite-version application)).

FIGS. 9F-9M illustrate exemplary user interfaces for customizing displayed content based on object identification (e.g., table number; object number) information, where the object identification information is obtained by computer system 700 via an NFC connection (e.g., or alternative via a QR code), and where different object identification information (e.g., different table numbers; different object numbers) is of the same vendor (e.g., the same restaurant; the same store; the same company).

Figure 9F:
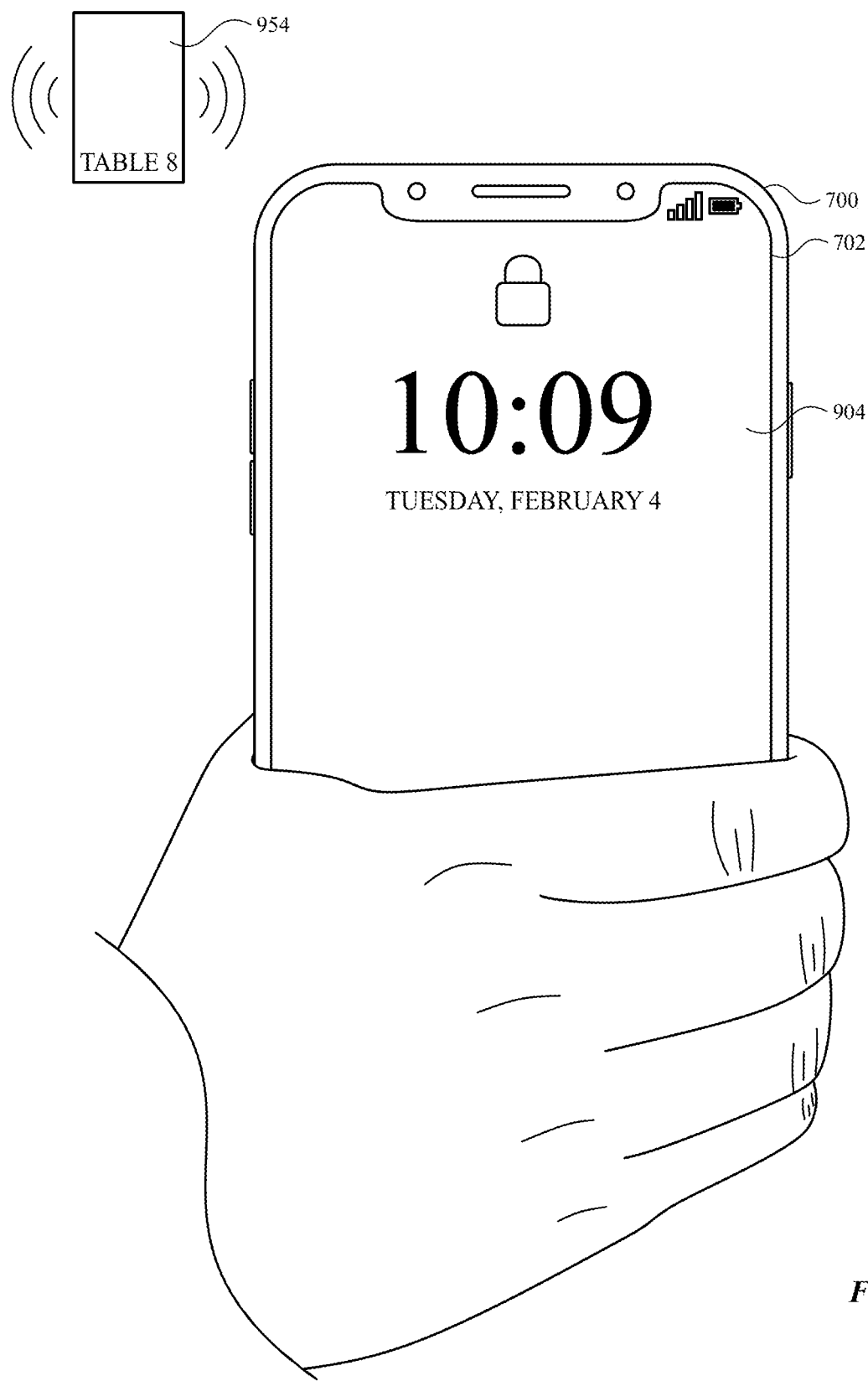
Figure 9H:
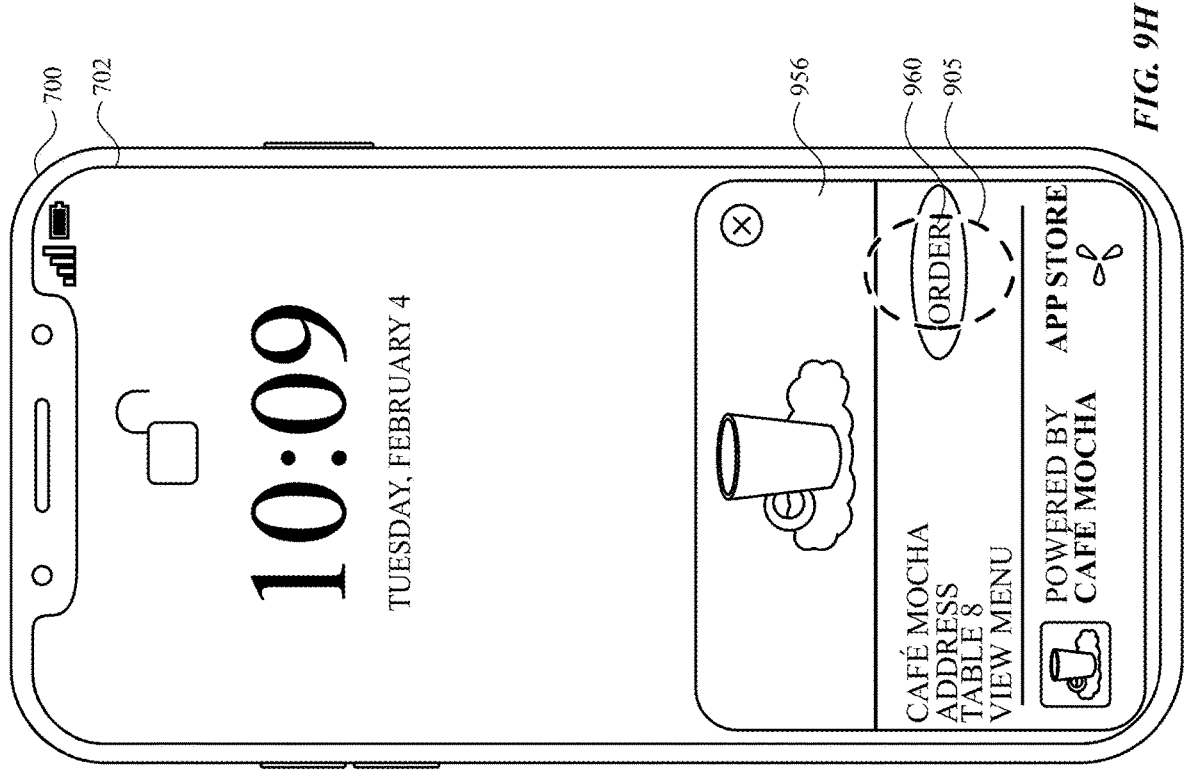
Figure 9G:
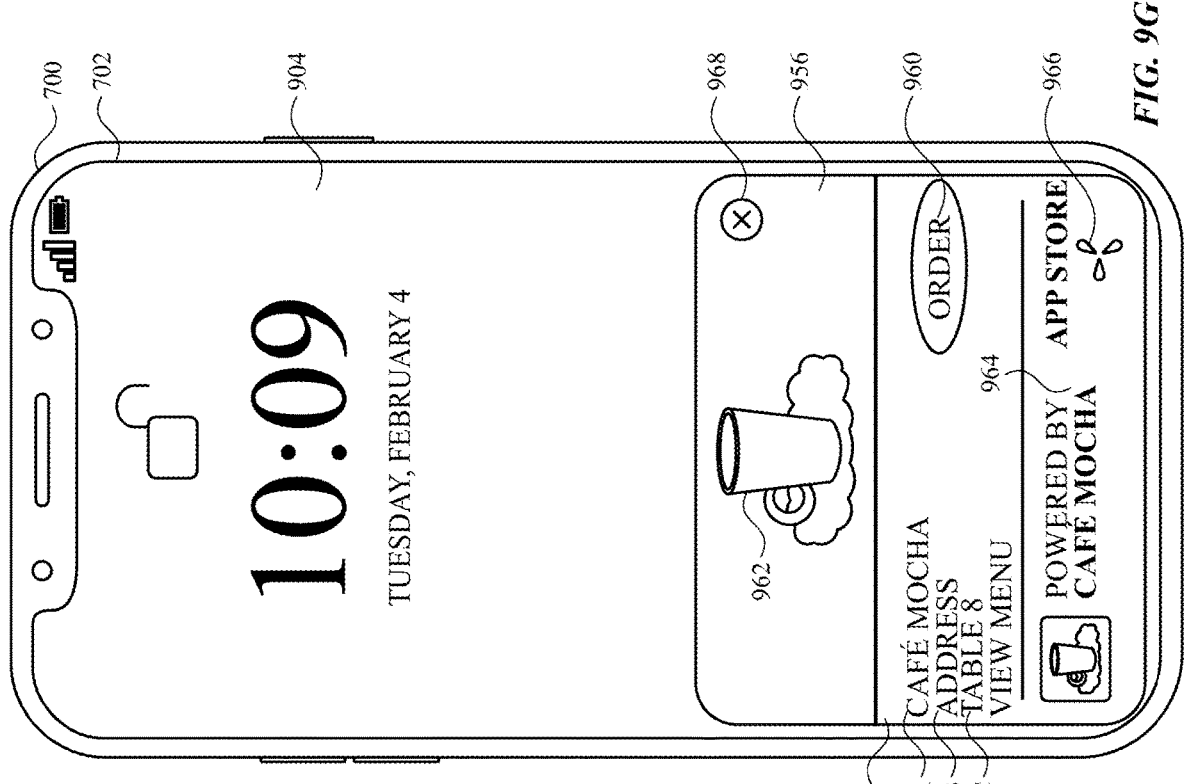
Figure 9I:
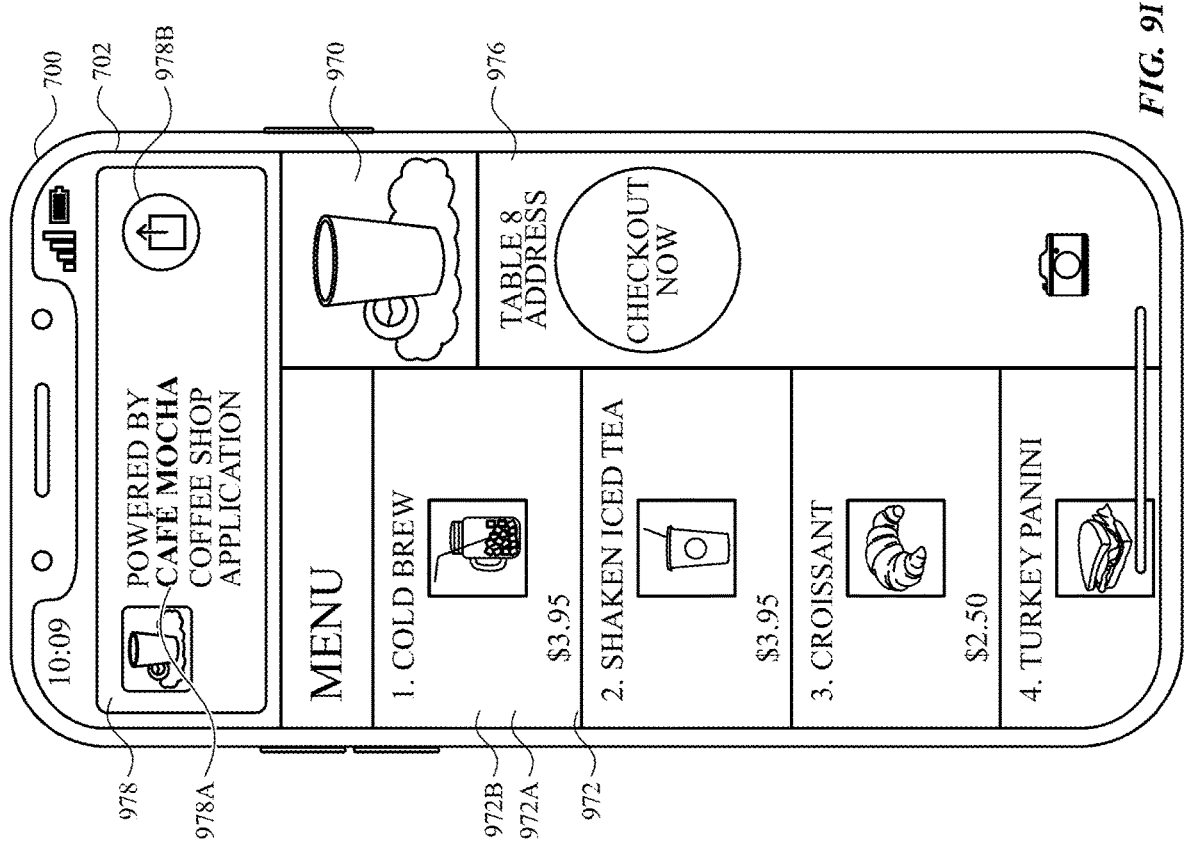

FIG. 9F illustrates computer system 700 (e.g., while displaying, via display generation component 904, user interface 904 of the wake screen) in communication with a wireless communication terminal 954 (e.g., a NFC terminal), where terminal 954 corresponds to a first table (e.g., table 8) at a third vendor (e.g., "Cafe Mocha").

Figure 9J:
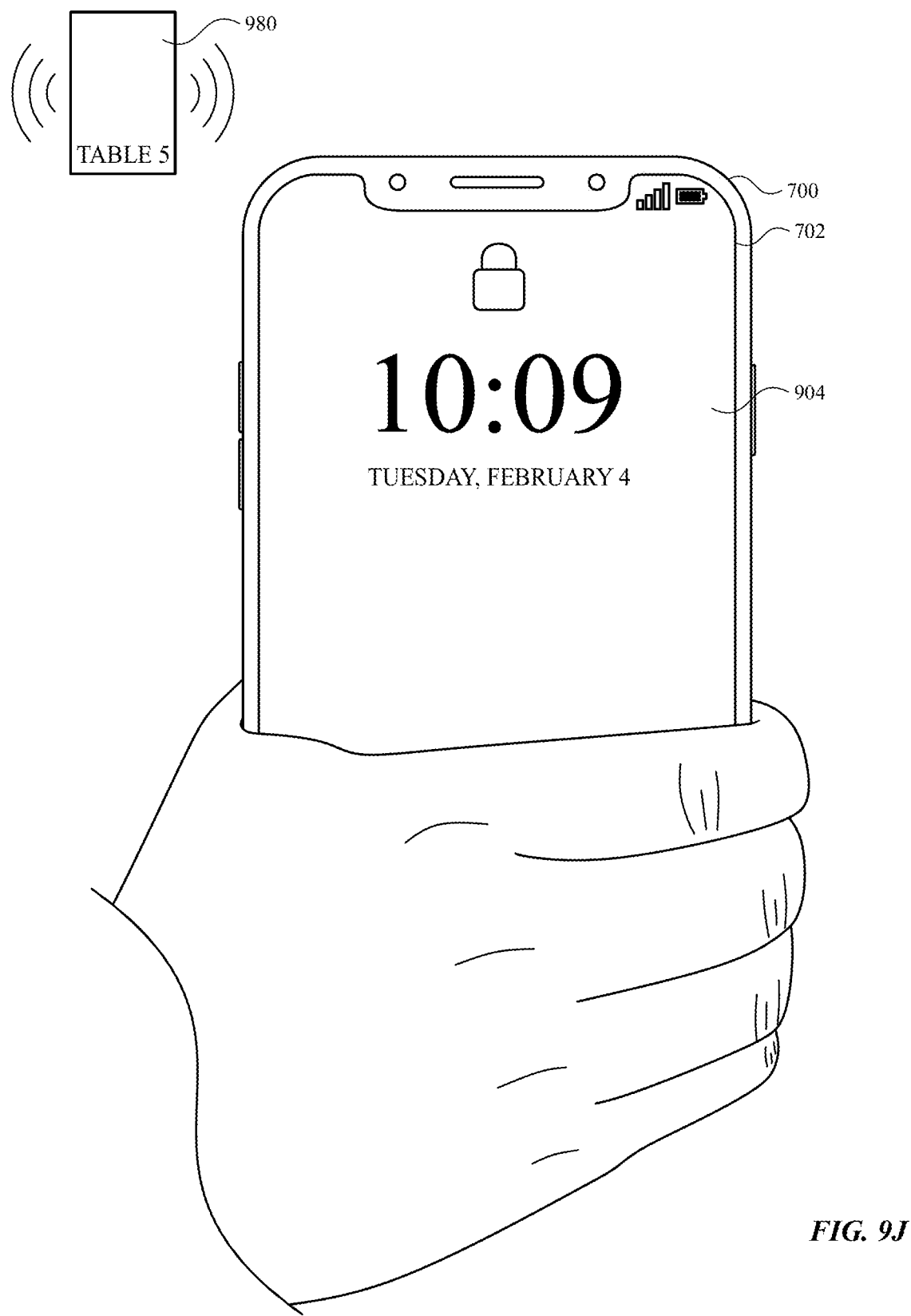
Figure 9L:
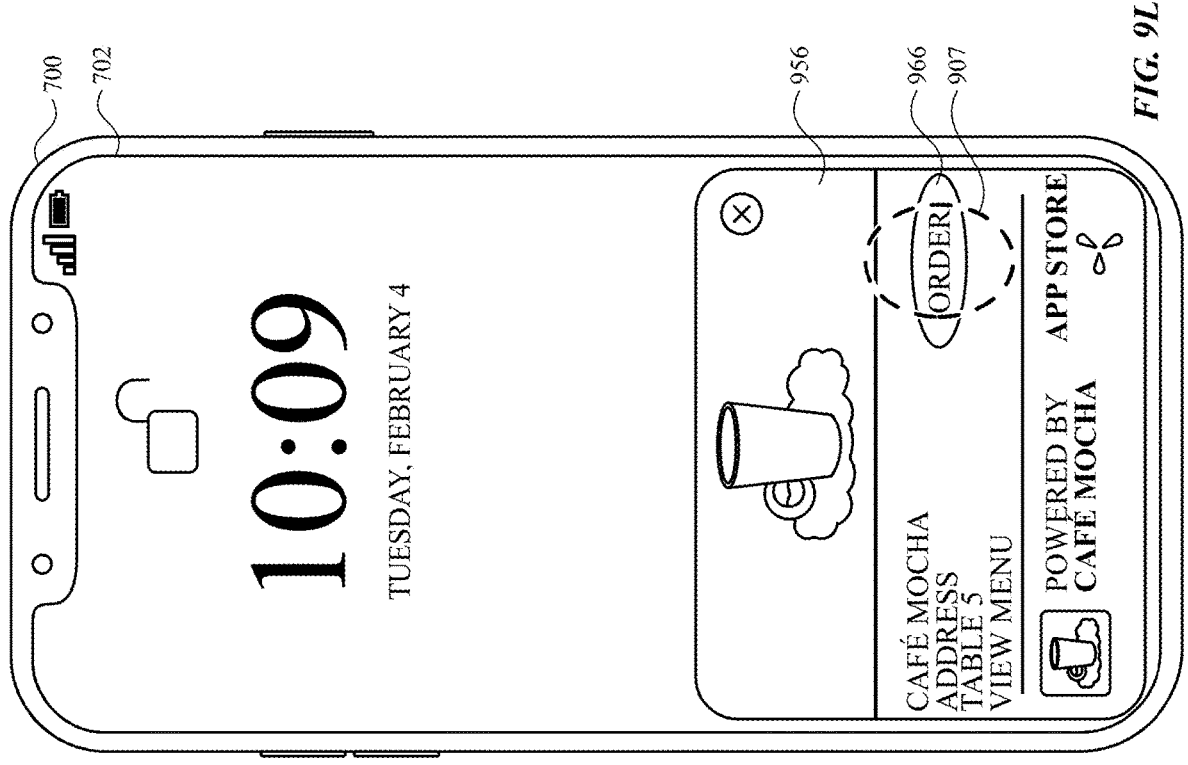

In FIG. 9J, computer system 700 receives (e.g., detects) (e.g., via NFC), identification information corresponding to the first table (e.g., table 8) of the third vendor (e.g., "Cafe Mocha") from terminal 954.

In FIG. 9G, in response to receiving the identification information from terminal 954, computer system 700 displays, via display generation component 702 (e.g., overlaid on user interface 904), sheet user interface 956 that is powered by a second developer (e.g., "Cafe Mocha"), where the second developer is the same as (e.g., is the same entity as; is the same company as) the third vendor (e.g., "Cafe Mocha"). In some embodiments, sheet user interface 956 is similar to (e.g., shares the same layout/structure as) sheet user interface 920 of FIG. 9B and sheet user interface 944 of FIG. 9D.

As shown in FIG. 9G, in some embodiments, sheet user interface 956 includes an information region 958, where information region 958 includes name information 958A of the third vendor (e.g., "Cafe Mocha") and location information 958B of the third vendor (e.g., the address of the third vendor). In some embodiments, sheet user interface 956 includes, in information region 958, identification information 958C (e.g., the first table number (e.g., table 8)) corresponding to the identification information (e.g., table number; object number) received from terminal 954.

In some embodiments, sheet user interface 956 includes an affordance 960 (e.g., a selectable user interface object; an activatable user interface object) which, when activated, initiates a process for enabling an activity (e.g., ordering one or more menu items, such as coffee or other drinks, from the third vendor) on computer system 700 that relates to the third vendor (e.g., "Cafe Mocha"). In some embodiments, affordance 960 indicates (e.g., includes text information of) the type of activity (e.g., ordering one or more menu items, such as coffee or other drinks, from the third vendor) that relates to the third vendor (e.g., "Cafe Mocha").

In some embodiments, sheet user interface 956 includes an image 962 (e.g., of the third vendor's store; a logo of the third vendor) that is indicative of the third vendor (e.g., "Cafe Mocha").

In some embodiments, sheet user interface 956 includes an indication 964 of the second developer (e.g., "Cafe Mocha") that powers (e.g., develops, creates, and/or manages the template for) the application that enables the activity (e.g., ordering one or more menu items, such coffee or other drinks) related to the third vendor (e.g., "Cafe Mocha"). In FIG. 9G, the second developer is the same as (e.g., the same entity as; the same company as) the third vendor (e.g., "Cafe Mocha").

In some embodiments, sheet user interface 956 includes an affordance 966 (e.g., a selectable user interface object; an activatable user interface object) for accessing an application store (e.g., an application store controlled and managed by a developer of the operating system of computer system 700, where the application store can be used to download first-party and third-party applications onto computer system 700).

In some embodiments, sheet user interface 956 includes an affordance 968 (e.g., a selectable user interface object; an activatable user interface object) for dismissing (e.g., causing computer system 700 to cease display of) sheet user interface 956 without performing the activity (e.g., ordering one or more menu items, such as coffee or other drinks) associated with the third vendor (e.g., "Cafe Mocha").

In FIG. 9H, while displaying sheet user interface 956, computer system 700 detects (e.g., via a touch sensitive surface of the one or more input devices), an activation 905 of (e.g., user selection of; user's tap input on) affordance 960.

In FIG. 9I, in response to detecting activation 905 of affordance 960 (e.g., and in response to displaying a loading screen as for example described above with reference to FIGS. 7H-7J), computer system 700 displays, via display generation component 702, a lite user interface 970 corresponding to the third vendor (e.g., "Cafe Mocha"), which is powered by a lite-version application of the second developer (e.g., "Cafe Mocha") that is the same as (e.g., the same entity as; the same company as) the third vendor. In some embodiments, a respective developer can (e.g., freely) create and/or customize respective lite-version applications to provide unique experiences via respective lite user interfaces.

As shown in FIG. 9I, in some embodiments, lite user interface 970 includes an information region 972 that includes location information 972A of the third vendor (e.g., "Cafe Mocha") (e.g., the address of the third vendor) corresponding to location information 958B included in sheet user interface 956 and identification information 972B (e.g., the first table number (e.g., table 8)) corresponding to identification information 958C included in sheet user interface 956.

In some embodiments, lite user interface 970 includes a vendor-customized menu region 974 that includes one or more menu items (e.g., coffee or other drinks) provided by the third vendor (e.g., "Cafe Mocha").

In some embodiments, lite user interface 970 includes an affordance 976 (e.g., a selectable user interface object; an activatable user interface object) for ordering/checking out selected menu items.

In some embodiments, lite user interface 970 includes a user interface object 978 (e.g., a banner; a platter) that is displayed concurrently with lite user interface 970 (e.g., overlaid on a portion of lite user interface 970). In some embodiments, user interface object 978 is displayed with display of lite user interface 970 and is displayed for a predetermined time period (e.g., 10 seconds; 30 seconds; 1 minute; computer system 700 ceases to display user interface object 978 after a non-zero predetermined time period). In some embodiments, user interface object 978 includes an indication 978A (e.g., text information) of the second developer (e.g., "Cafe Mocha") corresponding to the application. In some embodiments, user interface object 978 includes a share affordance 978B for initiating a process for sharing the lite-version application corresponding to lite user interface 970 with a different user (e.g., transmitting an electronic communication to a different computer system of the different user that includes the portion of the application (e.g., the lite-version application) and/or instructions for downloading the portion of the application (e.g., the lite-version application)).

FIG. 9J illustrates computer system 700 (e.g., while displaying, via display generation component 702, user interface 904 of the wake screen) in communication with a wireless communication terminal 980 (e.g., a NFC terminal), where terminal 980 corresponds to a second table (e.g., table 5) at the third vendor (e.g., "Cafe Mocha") and is different from terminal 954 at the third vendor. In FIG. 9J, computer system 700 receives (e.g., detects) (e.g., via NFC), identification information corresponding to the second table (e.g., table 5) of the third vendor (e.g., "Cafe Mocha") from terminal 980.

Figure 9K:
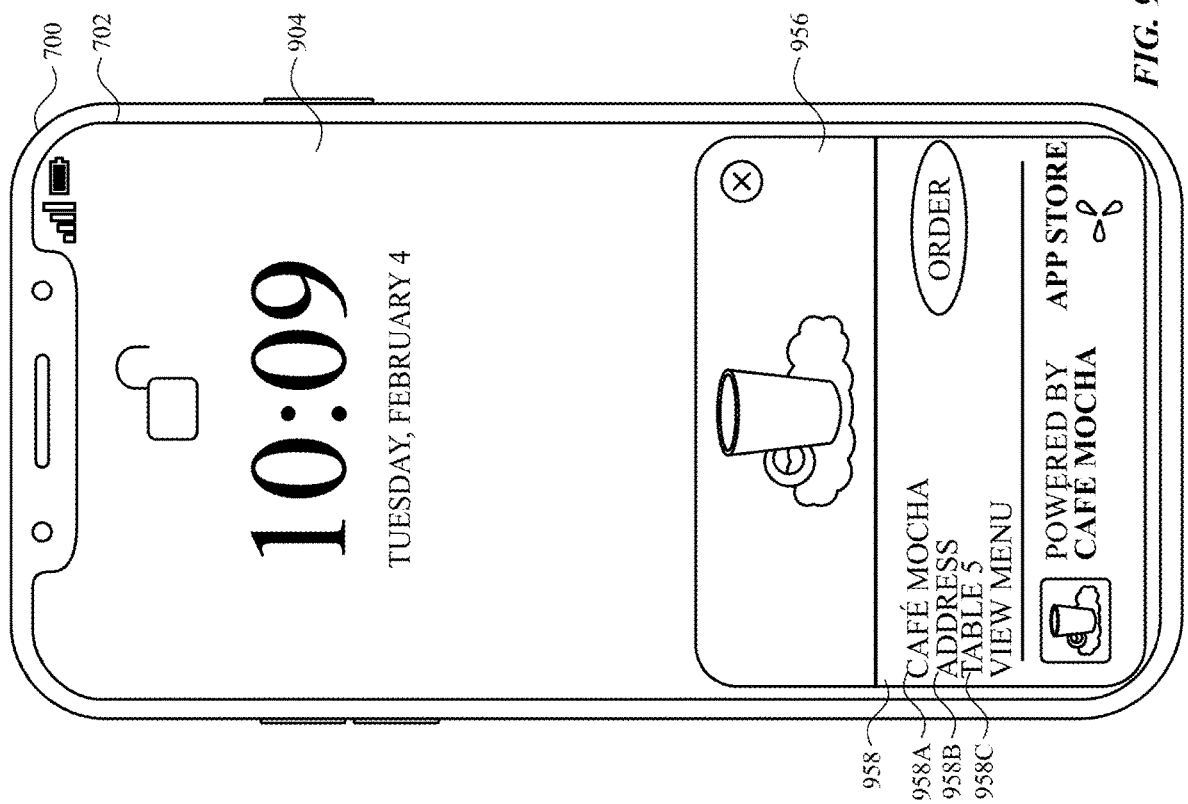
Figure 9N:
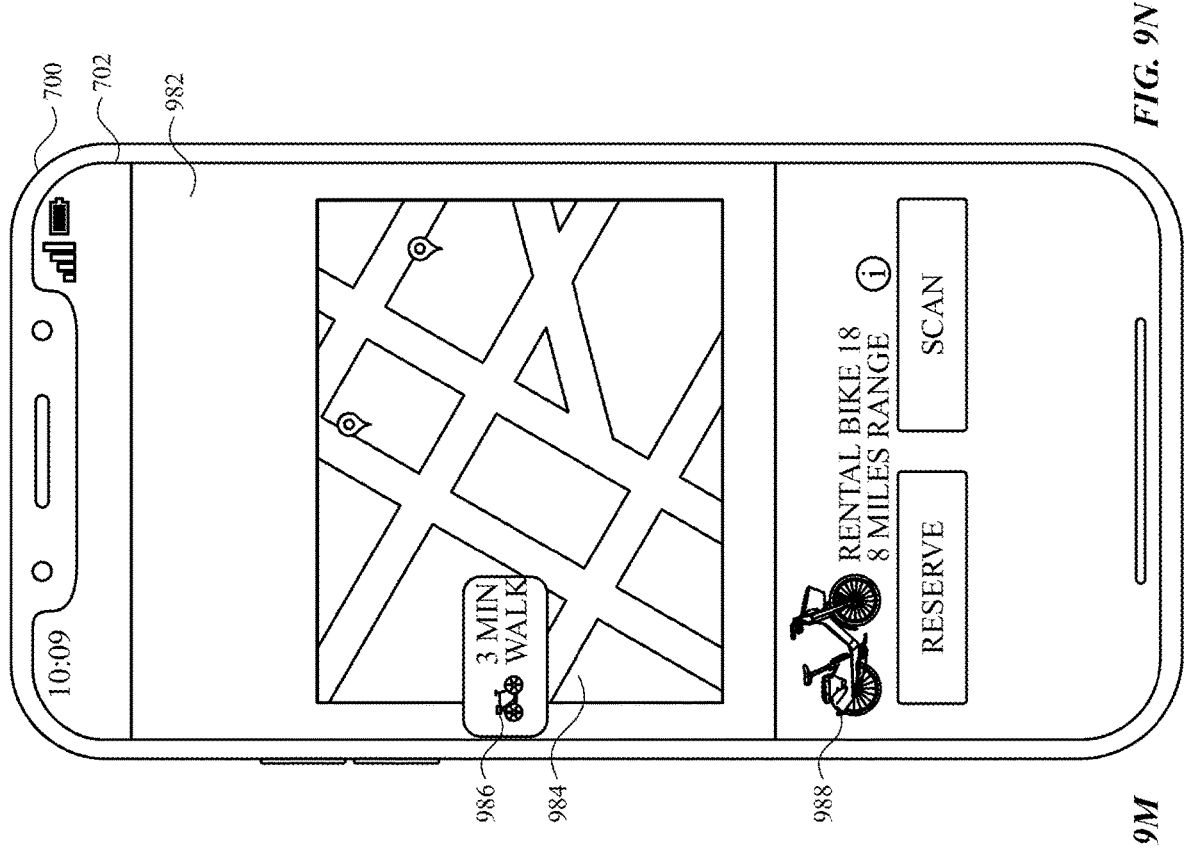

In FIG. 9K, in response to receiving the identification information from terminal 980, computer system 700 displays, via display generation component 702 (e.g., overlaid on user interface 904), sheet user interface 956, as first described above with reference to FIG. 9G, that is powered by the second developer (e.g., "Cafe Mocha").

In FIG. 9K, display of sheet user interface 956 was initiated in response to receiving the identification information corresponding to the second table (e.g., table 5), instead of the identification information corresponding to the first table (e.g., table 8), at the third vendor (e.g., Cafe Mocha"). As shown in FIG. 9K, sheet user interface 956 includes, in information region 958, name information 958A of the third vendor (e.g., "Cafe Mocha"), which is the same as in FIG. 9G and location information 958B of the third vendor (e.g., the address of the third vendor), which is the same as in FIG. 9G (e.g., because both terminals 954 and 980 are of the same third vendor (e.g., "Cafe Mocha"), but includes, in information region 958, identification information 958C, where identification information 958C displays the identification information corresponding to terminal 980 (e.g., the second table number (e.g., table 5) instead of the identification information corresponding to terminal 954 (e.g., the first table number (e.g., table 8)).

In FIG. 9L, while displaying sheet user interface 956, computer system 700 detects (e.g., via a touch sensitive surface of the one or more input devices), an activation 907 of (e.g., user selection of; user's tap input on) affordance 960.

Figure 9M:
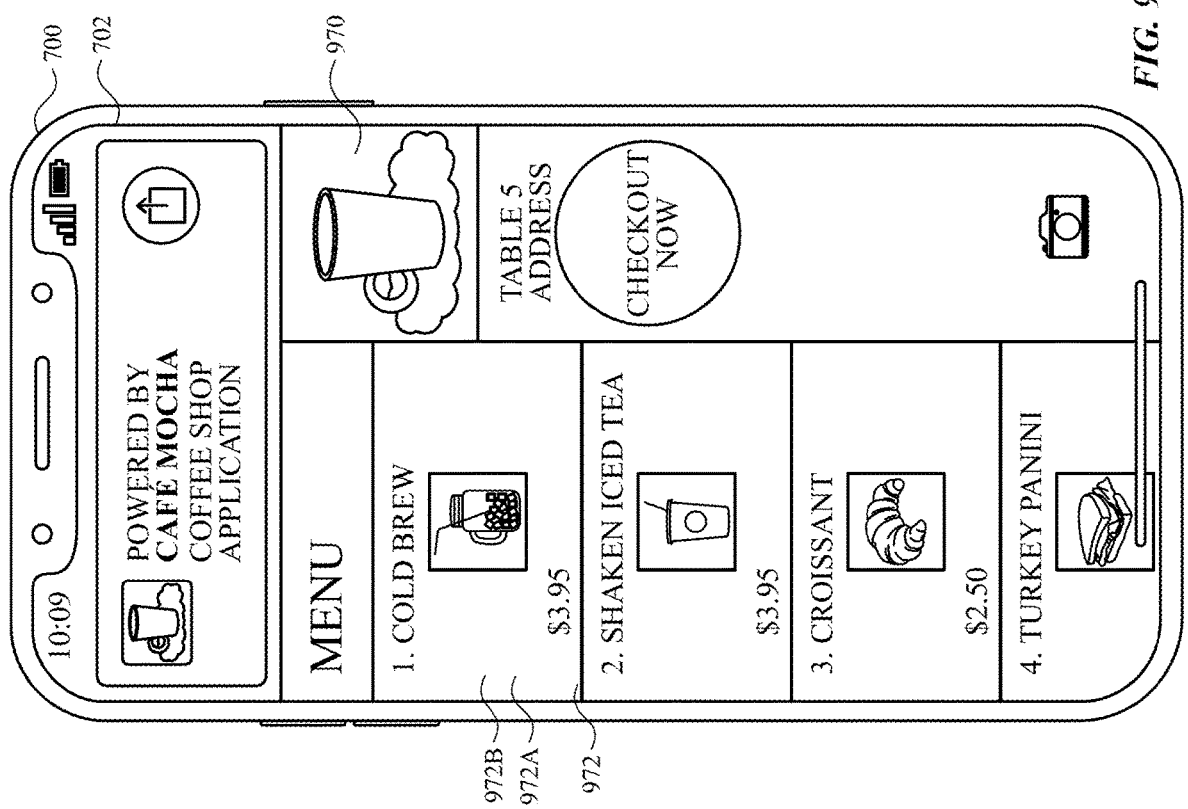
Figure 9P:
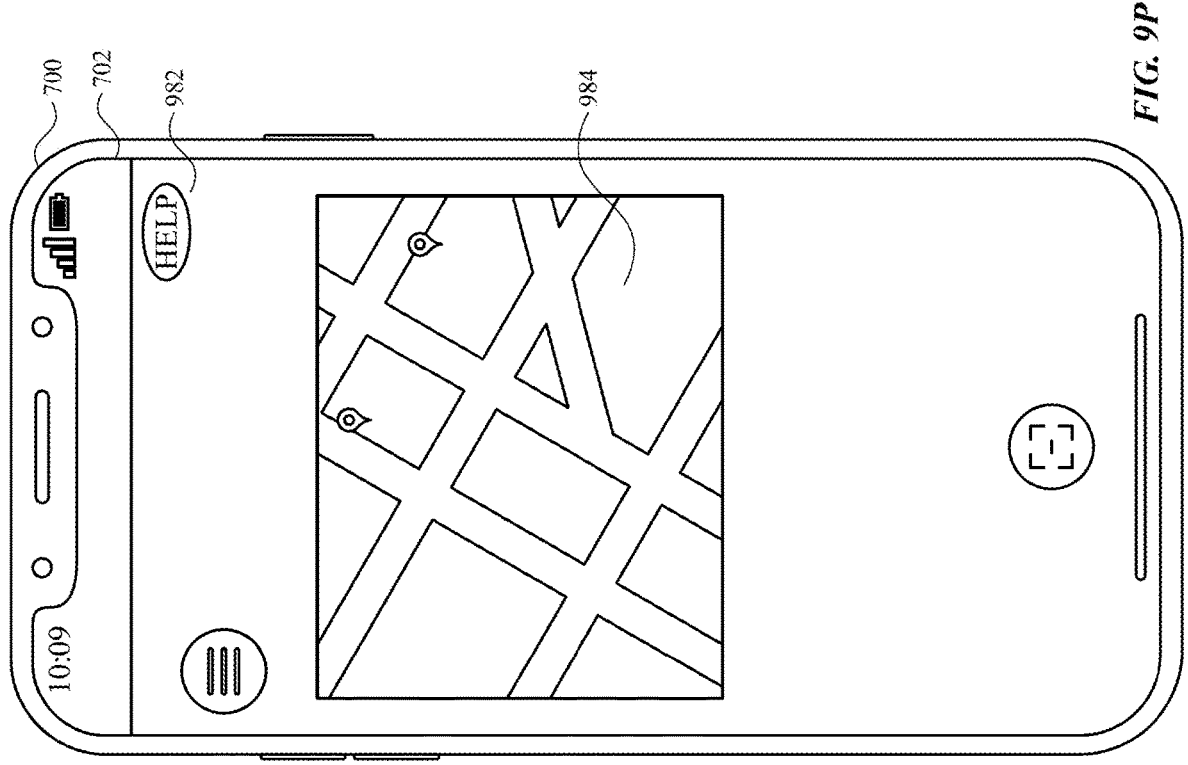

In FIG. 9M, in response to detecting activation 907 of affordance 960 in FIG. 9L (e.g., and in response to displaying a loading screen as for example described above with reference to FIGS. 7H-7J), computer system 700 displays, via display generation component 702, lite user interface 970 corresponding to the third vendor (e.g., "Cafe Mocha"), as first described above with reference to FIG. 9I.

As shown in FIG. 9M, computer system 700 displays, in information region 972 of lite user interface 970, location information 972A of the third vendor (e.g., "Cafe Mocha"), which is the same as in FIG. 9I, and identification information 972B, where identification information 972B corresponds to the identification information (e.g., the second table number (e.g., table 5)) corresponding to terminal 980 instead of the identification information (e.g., the first table number (e.g., table 8)) corresponding to terminal 954, as shown in FIG. 9I.

FIG. 9N illustrates computer system 700 displaying, via display generation component 702, a lite user interface 982 corresponding to a fourth vendor that is a bike rental store (e.g., similar to lite user interface 736 first described above with reference to FIG. 7S).

As shown in FIG. 9N, lite user interface 982 includes a first region 984 that includes a map (e.g., indicating one or more locations in the vicinity corresponding to different bike rental locations). In some embodiments, lite user interface 982 includes an indication 986 (e.g., displayed as a user interface object; as a platter) showing a respective bike rental location operated by the fourth vendor that is closest to computer system 700's current location (e.g., and includes a time required to reach (e.g., walk to) the respective bike rental location).

In some embodiments, lite user interface 982 includes a second region 988 that includes information about an object (e.g., a specific bike) that can be reserved at the respective bike rental location, including an identifier/identification number for that object (e.g., an identification number for that specific bike).

Figure 9O:
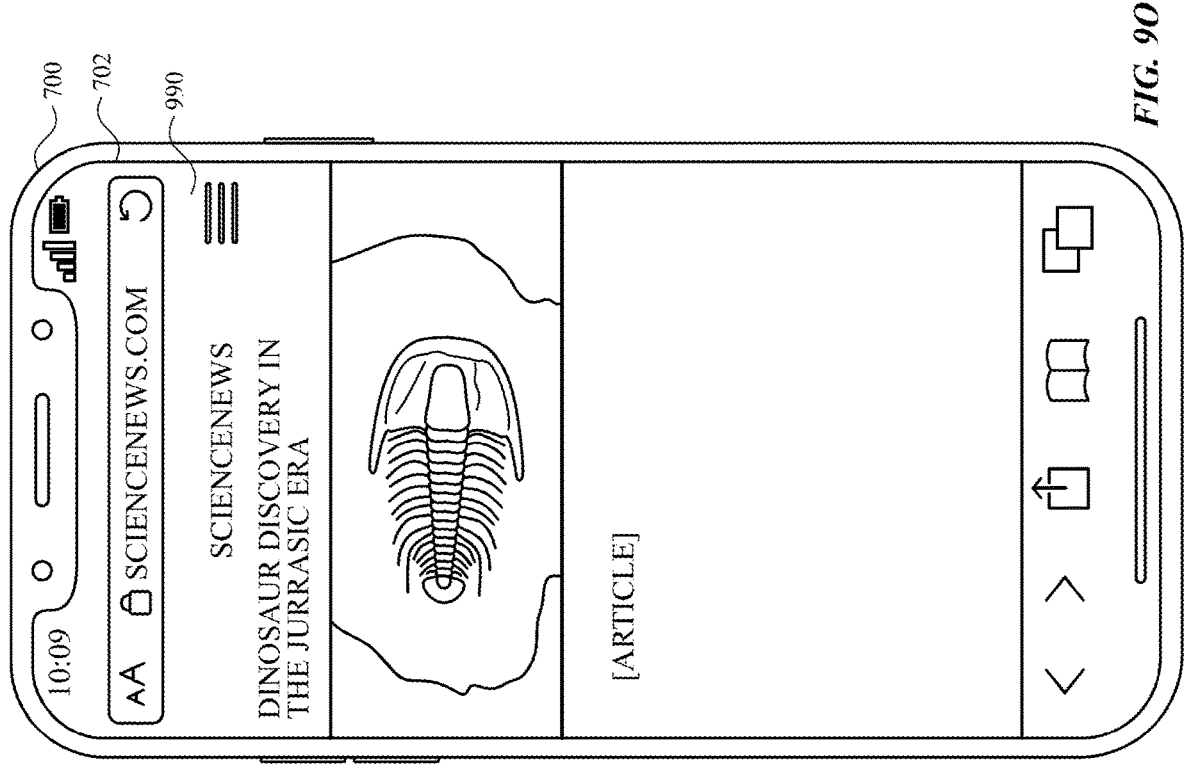
Figure 9T:
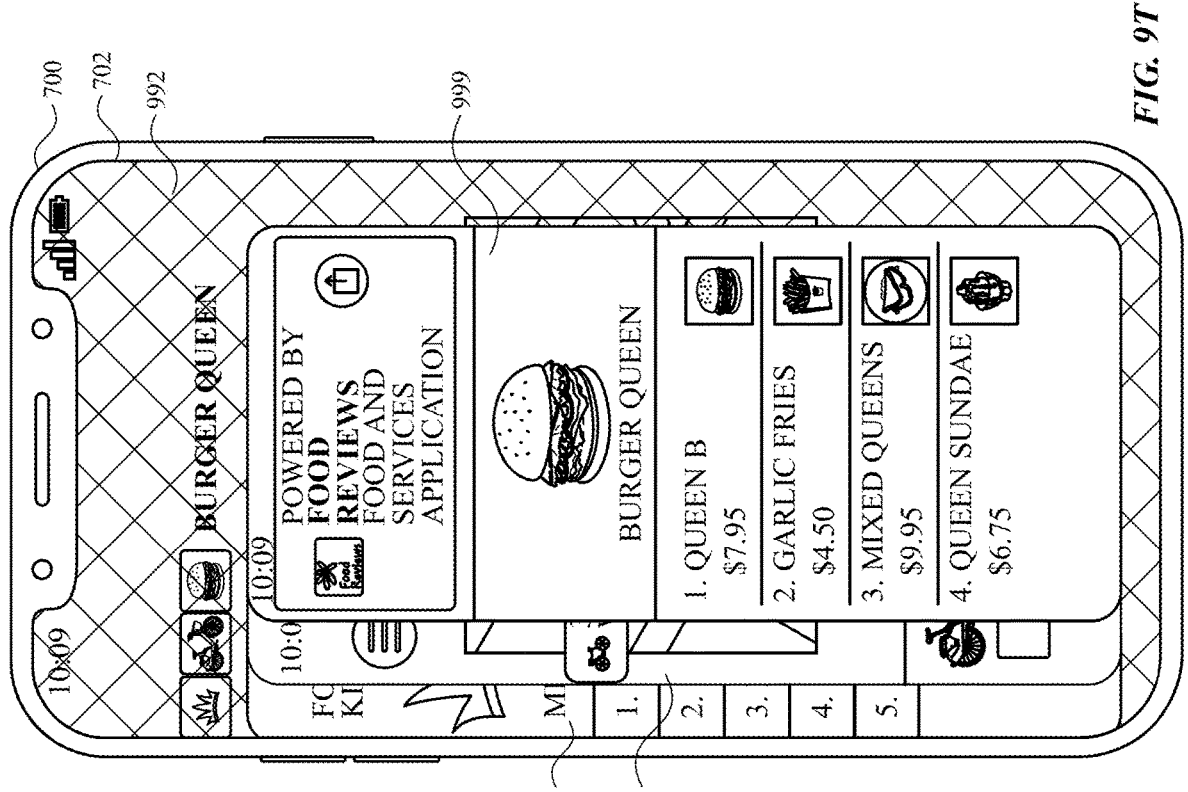

FIG. 9O illustrates computer system 700 displaying, via display generation component 702 and after displaying lite user interface 982 in FIG. 9N, a user interface 990 of an application (e.g., a browser application) that is different from the lite-version application corresponding to lite user interface 982 depicted in FIG. 9N.

FIG. 9P illustrates computer system 700 displaying, via display generation component 702 and after displaying user interface 990 of the application that is different from the lite-version application corresponding to lite user interface 982, lite user interface 982. In some embodiments, when a respective lite user interface of a respective lite-version application is accessed again on computer system 700 after accessing a different application (e.g., as for example illustrated in the transition from FIG. 9N to FIG. 9O to FIG. 9P), computer system 700 displays, in the respective lite user interface, generalized content and ceases display of specific content (e.g., specific object identification information; specific location information) that had previously been displayed in the respective lite user interface.

As shown in FIG. 9P, in some embodiments, computer system 700 no longer displays, in lite user interface 982, indication 986 showing the respective bike rental location operated by the fourth vendor that is closest to computer system 700's current location. In some embodiments, computer system 700 also no longer displays, in lite user interface 982, second region 988 that includes information about an object (e.g., a specific bike) that can be reserved at the respective bike rental location (e.g., or maintains display of second region 988 but no longer displays, in second region 988, the information about the object (e.g., specific bike)).

FIG. 9Q illustrates computer system 700 displaying, via display generation component 702 (e.g., and in response to detecting a type of input (e.g., a swipe-up input) directed to causing display of a multitasking user interface while displaying lite user interface 982 in FIG. 9P), a multitasking user interface 992 (e.g., corresponding to multitasking user interface 791 first described above with reference to FIG. 7AV). As shown in FIG. 9Q, in some embodiments, user interface cards corresponding to lite user interfaces are included with user interface cards corresponding to (e.g., regular) non-lite user interfaces in multitasking user interface 992.

In FIG. 9Q, multitasking user interface 992 includes a user interface card 994 corresponding to lite user interface 982 of FIG. 9P (and corresponding to the most recently displayed (e.g., accessed) user interface on computer system 700), a user interface card 996 corresponding to lite user interface 920 of FIG. 9C (and corresponding to the second-most recently displayed (e.g., accessed) user interface on computer system 700), and a user interface card 998 corresponding to a user interface of a browser application (and corresponding to the third-most recently displayed (e.g., accessed) user interface on computer system 700).

FIG. 9R illustrates computer system 700 displaying, via display generation component 702 and after displaying multitasking user interface 992 in FIG. 9Q (e.g., without displaying (e.g., accessing) a user interface of a different application), lite user interface 944 corresponding to the first developer (e.g., "Food Review") as first described above with reference to FIG. 9E.

Figure 9S:
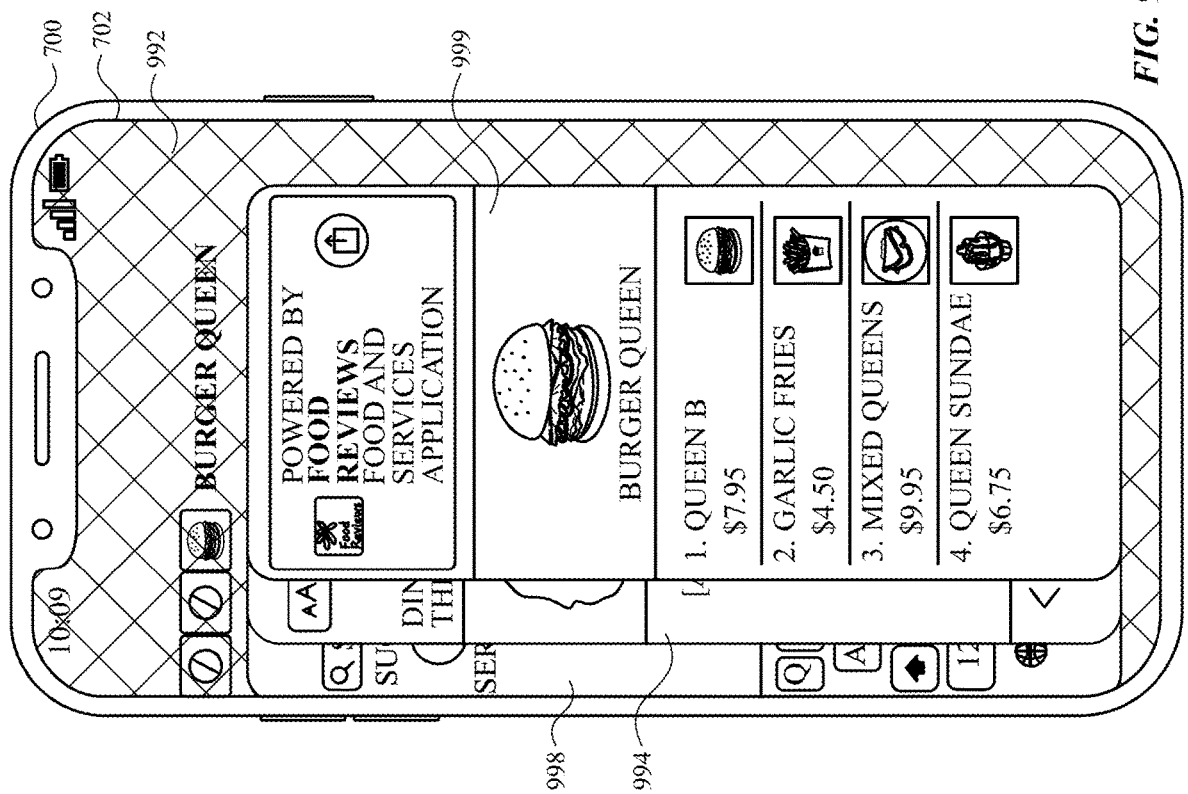

FIG. 9S illustrates computer system 700 displaying, via display generation component 702 (e.g., and in response to detecting the type of input (e.g., a swipe-up input) directed to causing display of a multitasking user interface while displaying lite user interface 944 in FIG. 9R), multitasking user interface 992.

In FIG. 9S, multitasking user interface 992 includes a user interface card 999 corresponding to lite user interface 944 of FIG. 9R as the most recently displayed (e.g., accessed) user interface computer system 700, user interface card 994 corresponding to lite user interface 982 of FIG. 9P as the second-most recently displayed (e.g., accessed) user interface on computer system 700, and user interface card 998 corresponding to the user interface of the browser application as the third-most recently displayed (e.g., accessed) user interface on computer system 700. Multitasking user interface 992 no longer includes user interface card 996 corresponding to lite user interface 920 of FIG. 9C, as both lite user interface 944 (corresponding to user interface card 999) and lite user interface 920 (corresponding to user interface card 996) corresponding to the same lite-version application (e.g., of the first developer "Food Reviews"). In some embodiments, if a lite user interface corresponding to a respective first vendor for a respective lite-version application is more recently displayed (e.g., accessed) on computer system 700 after having previously displayed (e.g., accessed) a lite user interface corresponding to a respective second vendor for the same respective lite-version application, the previously-displayed lite user interface corresponding to the respective second vendor is removed from multitasking user interface 992 as the more recently displayed lite user interface corresponding to the respective second vendor is added to multitasking user interface 992, as both lite user interfaces correspond to the same lite-version application (e.g., of the first developer "Food Reviews") (even if the two lite user interfaces correspond to different vendors). In some embodiments, multitasking user interface 992 is enabled to include one user interface card for a respective lite-version application (e.g., even if different lite user interfaces corresponding to the respective lite-version application but for different vendors are accessed on computer system 700).

In FIG. 9T, multitasking user interface 992 now includes a user interface card 999 corresponding to lite user interface 944 of FIG. 9R as the most recently displayed (e.g., accessed) user interface computer system 700, user interface card 994 corresponding to lite user interface 982 of FIG. 9P as the second-most recently displayed (e.g., accessed) user interface on computer system 700, and user interface card 996 corresponding to lite user interface 920 of FIG. 9C as the third-most recently displayed (e.g., accessed) user interface on computer system 700. In some embodiments, even if a lite user interface corresponding to a respective first vendor for a respective lite-version application is more recently displayed (e.g., accessed) on computer system 700 after having previously displayed (e.g., accessed) a lite user interface corresponding to a respective second vendor for the same respective lite-version application, the previously-displayed lite user interface corresponding to the respective second remains in multitasking user interface 992 after the more recently displayed lite user interface corresponding to the respective second vendor is added to multitasking user interface 992. In some embodiments, multitasking user interface 992 is enabled to include different user interface cards corresponding to different vendors for the same lite-version application.

FIGS. 10A-10C are a flow diagram illustrating a method for customizing displayed content based on circumstances under which the content was invoked using a computer system, in accordance with some embodiments. Method 1000 is performed at a computer system (e.g., 100, 300, 500, 700) (e.g., an electronic device, a smart device, such as a smartphone or a smartwatch, a mobile device, a wearable device) that is in communication with a display generation component and one or more input devices (e.g., a touch-sensitive surface that is integrated with the display generation component). Some operations in method 1000 are, optionally, combined, the orders of some operations are, optionally, changed, and some operations are, optionally, omitted.

As described below, method 1000 provides an intuitive way for enabling an activity using a computer system. The method reduces the cognitive burden on a user for enabling an activity using a computer system, thereby creating a more efficient human-machine interface. For battery-operated computing devices, enabling a user to enable an activity faster and more efficiently conserves power and increases the time between battery charges.

The computer system (e.g., 700) detects (1002), via the one or more input devices, a request to invoke a first application. In some embodiments, the first application is a lite-version application of a corresponding full-version application that is not currently installed on the computer system. In some embodiments, the full-version application is available to be downloaded and installed on the computer system from an applications store (e.g., a computer application or a website) that is accessible on the computer system. In some embodiments, prior to detecting the request to invoke the first application, the computer system displays (e.g., in a wake screen user interface (e.g., 904)) a sheet user interface (e.g., a pop-up user interface) that includes a first user interface object which, when activated, causes display of the first user interface corresponding to the first application described below, where the first user interface is configured to perform an activity related to the first application (e.g., making a reservation, making an order, making a booking, making a payment, making a request) without downloading at least a portion of the first application (e.g., without downloading a full-version counterpart of the first application). In some embodiments, detecting the request to invoke the first application comprises detecting activation of the first selectable user interface object of the sheet user interface.

In response to detecting the request to invoke the first application (1004), the computer system (e.g., 700) displays (1006), via the display generation component (e.g., 702), a first user interface (e.g., 906, 920, 930, 944, 956, 970) (e.g., an interstitial user interface, a sheet user interface, a mini-user interface that covers a portion of, but not all of, the previously-displayed user interface such that the previous user interface is still visible on the display, a pop-up user interface).

In accordance with a determination that detecting the request to invoke the first application occurred in a first context (e.g., location information detected via GPS, object identifier information accessed from an external server, time and/or date information) (1008), the computer system (e.g., 700) displaying the first user interface (e.g., 906, 920, 930, 944, 956, 970) includes displaying, in the first user interface, first content (e.g., current location information shown in a map, navigation information based on current location shown in a map, object identifier information shown in a map or image or shown as text) in a respective region of the first user interface (e.g., a region designated for an affordance that performs different functions based on context, a central region of the user interface, a bottom region of the user interface) (1010). Displaying (e.g., automatically, without user input), in the first user interface, the first content in the respective region of the first user interface in accordance with the determination that detecting the request to invoke the first application occurred in the first context enables a user to quickly and easily access and/or view information about an activity or feature related to the first content. Performing an operation when a set of conditions has been met without requiring further user input enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the computer system more quickly and efficiently.

In accordance with a determination that detecting the request to invoke the first application occurred in a second context (e.g., location information detected via GPS, object identifier information accessed from an external server, time and/or date information) different from the first context (1012), the computer system (e.g., 700) displaying the first user interface (e.g., 906, 920, 930, 944, 956, 970) includes displaying, in the first user interface, second content (e.g., current location information shown in a map, navigation information based on current location shown in a map, object identifier information shown in a map or image or shown as text) in the respective region of the first user interface, where the second content is different from the first content (1014). Displaying (e.g., automatically, without user input), in the first user interface, the second content in the respective region of the first user interface in accordance with a determination that detecting the request to invoke the first application occurred in the second context enables the user to quickly and easily access and/or view information about an activity or feature related to the second content. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the request to invoke the application occurs in the second context if the request to invoke the application is detected (e.g., again) after having detected the request to invoke the application in the first context and having closed and/or ceased to display the first application. In some embodiments, the request to invoke the application occurs in the first context when the request to invoke the application is detected during a first time and/or at a first location. In some embodiments, the request to invoke the application occurs in the second context when the request to invoke the application is detected during a second time different from the first time and/or at a second location different from the first location.

In some embodiments, the first context corresponds to a first location (e.g., location of a first store or a first restaurant, location of a first chain store/location of a particular store/restaurant chain, location of a first service area/region of a particular merchant or service provider (e.g., shared ride provider)) and the first content includes an indication (e.g., 908, 922, 932, 946, 958, 972) of the first location (1016), and the second context corresponds to a second location (e.g., location of a second store or a second restaurant, location of a second chain store/location of the particular store/restaurant chain, location of a second service area/region of the particular merchant or service provider (e.g., shared ride provider)) different from the first location and the second content includes an indication of the second location (1018). In some embodiments, the computer system (e.g., 700) detects the first location and the second location via one or more sensors that are in communication with the computer system, such as GPS sensors. Displaying content in the first user interface that is based on detecting a request to invoke the first application occurring in a context that corresponds to a location enables the user to quickly and easily access and/or view information related to the content when the user is at the respective location. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first context corresponds to first identification information (e.g., object identification information or object identifier, such as an object number (e.g., a shared vehicle/ride number, such as a bike number) or a table number (e.g., within a restaurant)) and the first content includes an indication (e.g., 908, 922, 932, 946, 958, 972) of a first identifier (e.g., an object identifier or identification number of a first object (e.g., a first shared vehicle/ ride, such as a first bike, a first table within a particular restaurant)) (1020), and the second context corresponds to second identification information (e.g., object identification information or object identifier, such as an object number (e.g., a shared vehicle/ride number, such as a bike number) or a table number (e.g., within a restaurant)) and the second content includes an indication of a second identifier (e.g., an object identifier or identification number of a second object (e.g., a second shared vehicle/ride, such as a second bike; a second table within a particular restaurant)) (1022). Displaying content in the first user interface that is based on detecting a request to invoke the first application occurring in a context that corresponds to identification information enables the user to quickly and easily access and/or view information related to the content about the identified object. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, subsequent to displaying the first user interface (e.g., 906, 920, 930, 944, 956, 970) corresponding to the first application (1024), the computer system (e.g., 700) detects (1026), via the one or more input devices, a second request to invoke the first application, where the second request is detected after at least a predetermined time period (e.g., a particular amount of minutes, a particular amount of hours). In some embodiments, the second request is detected the predetermined time period after detecting the request. In some embodiments, the second request to invoke the first application is detected at the same location as the request to invoke the first application.

In some embodiments, in response to detecting the second request to invoke the first application (1028), the computer system (e.g., 700) displays (1030), via the display generation component (e.g., 702), the first user interface (e.g., 906, 920, 930, 944, 956, 970) corresponding to the first application, wherein displaying the first user interface includes displaying, in the first user interface, third content (e.g., general information about the first application and/or about an activity (or activities) that can be performed via the first user interface), different from the first content and the second content, in the respective region of the first user interface (e.g., and the respective region of the first user interface no longer include the first content and the second content). In some embodiments, the third content (e.g., general content) is not based on (e.g., does not change/update based on; is independent of) the first context or the second context. In some embodiments, the third content (e.g., general content) does not include location- or object-specific information (e.g., a table number or a bike number). Displaying (e.g., automatically, without user input), in the first user interface, the third content (e.g., general information about the first application and/or about an activity (or activities) that can be performed via the first user interface) in the respective region of the first user interface in response to detecting the second request to invoke the first application provides the user with feedback that the previously displayed content specific to the context may no longer be relevant. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first user interface (e.g., 906, 920, 930, 944, 956, 970) corresponds to a first vendor (e.g., a restaurant; a merchant; a store), and displaying the first user interface includes displaying, via the display generation component (e.g., 702) (e.g., in the first user interface and/or during a process of initiating display of the first user interface), an indication of (e.g., name of; image of; logo of) an entity (e.g., a third-party institution; a merchant; a company) that created (e.g., created; developed; distributes; maintains) the first application used to display the first user interface (1032). In some embodiments, the first user interface corresponds to a second vendor (e.g., a different restaurant; a different merchant; a different store) different from the first vendor, and displaying the first user interface still includes displaying, via the display generation component, the indication of the entity that created the first application used to display the first user interface.

In some embodiments, while a first instance of the first application has been recently used (e.g., is in an active state (e.g., in the background); is currently running (e.g., in the background)) and a second instance of the first application (e.g., a second, separate instance of the first application having been used) has been recently used (e.g., is in an active state (e.g., in the background); is currently running (e.g., in the background)) (e.g., after having displayed the first instance of the first user interface and having separately, at a different time, displayed a second instance of the first user interface (e.g., 906, 920, 930, 944, 956, 970), and both instances are still active on the computer system) on the computer system (e.g., 700), the computer system displays, via the display generation component, a second user interface (e.g., 982) (e.g., a multitasking user interface; a multitasking screen) that includes a plurality of user interface preview items (e.g., user interface objects that indicate applications that have been launched, are currently active, and/or are running (e.g., in the background) on the computer system, where a preview item includes an image of (the current instance of) the user interface for the corresponding application) corresponding to applications that have been recently used (e.g., are in an active state (e.g., in the background); are currently running (e.g., in the background); launched and not yet shut down) on the computer system, where the plurality of user interface preview items includes a first user interface preview item corresponding to the first application without including another user interface preview item that corresponds to the first application. In some embodiments, the second user interface (e.g., a multitasking user interface; a multitasking screen) only includes one user interface preview item for one instance (e.g., the most recent instance) of the first user interface having been displayed and no other instances of the first user interface having been displayed. Including the first user interface preview item corresponding to the first application without including another user interface preview item that corresponds to the first application in the second user interface enables the user to easily identify, in the second user interface, the respective preview item that corresponds to the first application. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while a first instance of the first application has been recently used (e.g., is in an active state (e.g., in the background); is currently running (e.g., in the background)) and a second instance of the first application (e.g., a second, separate instance of the first application having been used) has been recently used (e.g., is in an active state (e.g., in the background); is currently running (e.g., in the background)) (e.g., after having displayed the first instance of the first user interface (e.g., 906, 920, 930, 944, 956, 970) and having separately, at a different time, displayed a second instance of the first user interface, and both instances are still active on the computer system) on the computer system (e.g., 700), the computer system displays, via the display generation component (e.g., 702), a second user interface (e.g., 982) (e.g., a multitasking user interface; a multitasking screen) that includes a plurality of user interface preview items (e.g., user interface objects that indicate applications that have been launched, are currently active, and/or are running (e.g., in the background) on the computer system, where a preview item includes an image of (the current instance of) the user interface for the corresponding application) corresponding to applications that have been recently used (e.g., are in an active state (e.g., in the background); are currently running (e.g., in the background); launched and not yet shut down) on the computer system, where the plurality of user interface preview items includes a first user interface preview item corresponding to the first instance of the first user interface without including (e.g., removing) a second user interface preview item corresponding to the second instance of the first user interface. In some embodiments, the second user interface (e.g., a multitasking user interface; a multitasking screen) only includes one user interface preview item for one instance (e.g., the most recent instance) of the first user interface having been displayed and no other instances of the first user interface having been displayed. Including the first user interface preview item corresponding to the first instance of the first user interface without including the second user interface preview item corresponding to the second instance of the first user interface enables the user to easily identify, in the second user interface, the respective preview item that corresponds to the first application even when multiple instances of the first application had been accessed on the computer system. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, subsequent to displaying, via the display generation component (e.g., 702), the first user interface (e.g., 906, 920, 930, 944, 956, 970) corresponding to the first application (e.g., after having displayed and now no longer displaying the first user interface corresponding to the first application), the computer system (e.g., 700) displays, via the display generation component, a second user interface (e.g., 982) (e.g., a multitasking user interface; a multitasking screen) that includes a plurality of user interface preview items (e.g., user interface objects that indicate applications that have been launched, are currently active, and/or are running (e.g., in the background) on the computer system, where a preview item includes an image of (the current instance of) the user interface for the corresponding application) corresponding to applications that have been recently used (e.g., are in an active state (e.g., in the background); are currently running (e.g., in the background); launched and not yet shut down) on the computer system, where the plurality of user interface preview items include a first user interface preview item corresponding to a first instance (e.g., the first user interface) of the first application and a second user interface preview item of a second instance (e.g., a second user interface) of the first application. In some embodiments, the second user interface includes a user interface preview item for the first user interface (e.g., an instance (e.g., the most recent instance) of the first user interface having been displayed) and another user interface preview item for the first user interface (e.g., another instance (e.g., the previous instance) of the first user interface having been displayed). Including the first user interface preview item corresponding to a first instance of the first application and a second user interface preview item of a second instance of the first application enables the user to access (e.g., re-access) different instances of the first application that have been accessed on the computer system. Providing additional control options without cluttering the UI with additional displayed controls enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the computer system more quickly and efficiently.

Note that details of the processes described above with respect to method 1000 (e.g., FIGS. 10A-10C) are also applicable in an analogous manner to the methods described below and above. For example, method 800 optionally includes one or more of the characteristics of the various methods described above with reference to method 1000. For example, content that is displayed on a respective-user interface for which display is initiated via a respective process for enabling an activity, as described with reference to FIGS. 7A-7AZ, can be customized based on one or more methods described with reference to FIGS. 9A-9T. For another example, method 1200 optionally includes one or more of the characteristics of the various methods described above with reference to method 1000. For example, a respective lite-version application corresponding to the respective lite user interface for which content is determined and displayed as described with reference to FIGS. 9A-9T can be accessed (e.g., again) and/or managed on the respective computer system via the methods described with reference to FIGS. 11A-11S. For another example, method 1400 optionally includes one or more of the characteristics of the various methods described above with reference to method 1000. For example, the process for setting the one or more system privileges for an application described with reference to FIGS. 13A-13V can be applied to the application for enabling an activity on a respective computer system described with reference to FIGS. 9A-9T. For brevity, these details are not repeated below.

FIGS. 11A-11S illustrate exemplary user interfaces for managing applications that were used to enable activities, in accordance with some embodiments. The user interfaces in these figures are used to illustrate the processes described below, including the processes in FIGS. 12A-12D.

FIG. 11A illustrates computer system 700 displaying, via display generation component 702, a user interface 1102 that includes a plurality of user interface elements (e.g., a group of applications of the same type; widgets) corresponding to different types of applications. In FIG. 11A, user interface 1102 includes a first user interface element 1104 associated with lite-version applications (e.g., different vendors that correspond to the same lite-version application and/or different lite-version applications).

In FIG. 11A, user interface element 1104 includes a representation 1104A of a first vendor (e.g., "Food King") for a first lite-version application that corresponds to a first developer (e.g., "Food Reviews"), a representation 1104B of a second vendor (e.g., "Burger Queen") for the first lite-version application that corresponds to the first developer (e.g., "Food Reviews"), and a representation 1104C of a third vendor (e.g., "Cafe Mocha") for a second lite-version application that corresponds to a second developer (e.g., "Cafe Mocha"), where the third vendor is the same as (e.g., is the same entity as; is the same company as) the second developer (e.g., "Cafe Mocha"). In some embodiments, representations 1104A-1104C correspond to a portion of (but not all of) respective lite-version applications (e.g., different vendors that correspond to the same lite-version application and/or different lite-version applications) that are installed on computer system 700.

FIG. 11B illustrates computer system 700 displaying, via display generation component 702, a home user interface 1106 of computer system 700, where home user interface 1106 includes a plurality of application icons 1108A-1108I corresponding to full-version applications that are installed on computer system 700. In some embodiments, computer system 700 displays, in home user interface 1106, lite-application icons corresponding to lite-version applications that are installed on computer system 700.

In FIG. 11B, home user interface 1106 includes a lite-application icon 1110A corresponding to the third vendor (e.g., "Cafe Mocha") for the second lite-version application that corresponds to the second developer (e.g., "Cafe Mocha"), where the third vendor is the same as (e.g., is the same entity as; is the same company as) the second developer (e.g., "Cafe Mocha"), a lite-application icon 1110B corresponding to the second vendor (e.g., "Burger Queen") for the first lite-version application that corresponds to the first developer (e.g., "Food Reviews"), and a lite-application icon 1110C corresponding to the first vendor (e.g., "Food King") for a first lite-version application that corresponds to the first developer (e.g., "Food Reviews").

As shown in FIG. 11B, in some embodiments, a lite-application icon includes a first visual indicator (e.g., a first badge (e.g., having a graphical and/or text indicator)) that indicates that the respective lite-application icon corresponds to a lite-version application (instead of a full-version application). In some embodiments, the first visual indicator (e.g., 1110AA of lite-application icon 1110A) (e.g., the first badge) is included in a first predefined location (e.g., bottom-left corner) of a respective lite-application icon. In some embodiments, a lite-application icon includes a second visual indicator (e.g., 1110AB of lite-application icon 1110A) (e.g., a second badge (e.g., showing a number)) that indicates a number of notifications (e.g., unchecked notifications) that have been generated by and/or are currently available for the respective lite-version application. In some embodiments, the second visual indicator (e.g., the second badge) is included in a second predefined location (e.g., top-right corner) of a respective lite-application icon.

FIG. 11C illustrates computer system 700 displaying, via display generation component 702, home user interface 1106 including application icons 1108A-1108I, as also depicted in FIG. 11B, but where home user interface 1106 includes a folder icon 1112 for lite-application icons (e.g., instead of including lite-application icons within home user interface 1106 with regular application icons).

As shown in FIG. 11C, in some embodiments, similar to a lite-application icon, folder icon 1112 includes a first visual indicator 1112A (e.g., a first badge (e.g., having a graphical and/or text indicator)) that indicates that folder icon 1112 corresponds to a folder for lite-version applications (instead of for full-version applications). In some embodiments, first visual indicator 1112A (e.g., the first badge) is included in a first predefined location (e.g., bottom-left corner) of a respective lite-application icon. In some embodiments, folder icon 1112 includes a second visual indicator 1112B (e.g., a second badge (e.g., showing a number)) that indicates a (e.g., aggregated) number of notifications (e.g., unchecked notifications) that have been generated by and/or are currently available for the respective lite-version applications that are included within the folder represented by folder icon 1112.

FIG. 11D illustrates computer system 700 displaying, via display generation component 702, user interface 1102 as first described above with reference to FIG. 11A. In FIG. 11D, while displaying first user interface element 1104 associated with lite-version applications (e.g., different vendors that correspond to the same lite-version application and/or different lite-version applications), computer system 700 detects (e.g., via a touch-sensitive surface of the one or more input devices) user selection 1101 of (e.g., a tap input on) representation 1104B of the second vendor (e.g., "Burger Queen") for the first lite-version application that corresponds to the first developer (e.g., "Food Reviews") (e.g., or of an affordance 1104BB (e.g., selectable user interface object; an activatable user interface object) corresponding to representation 1104B).

Figure 11F:
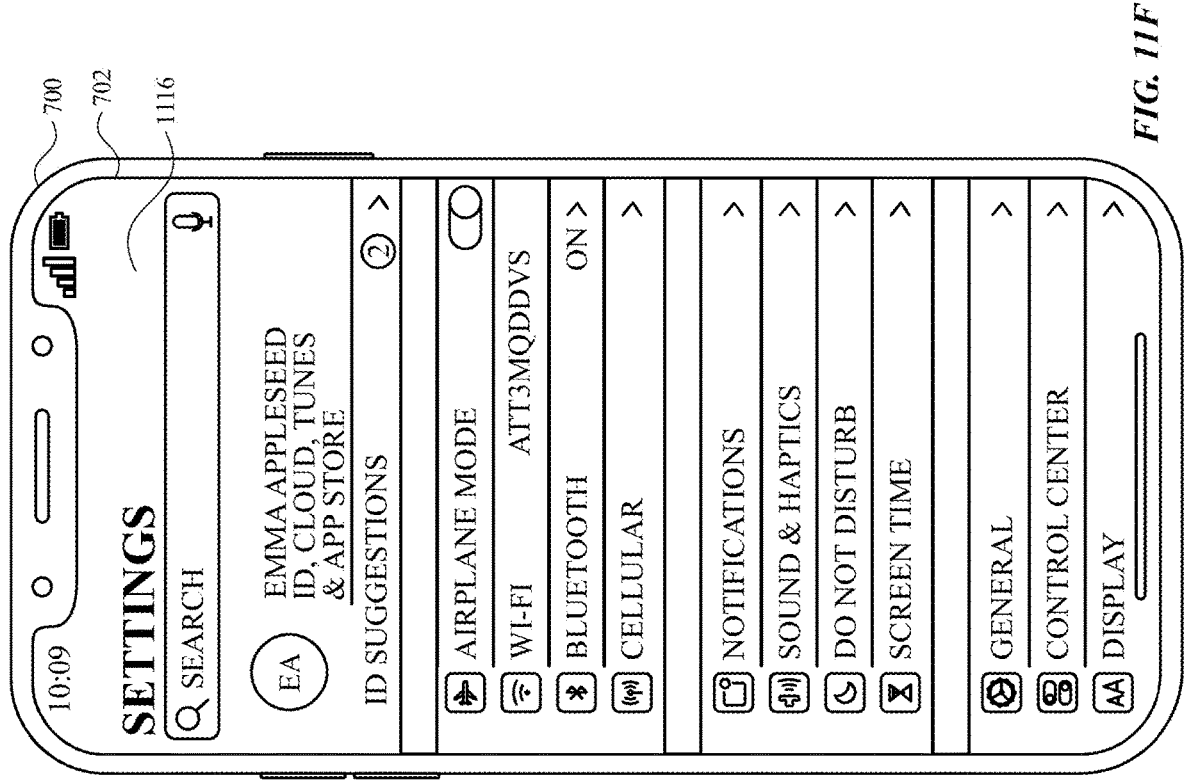
FIGS. 11A-11S illustrate exemplary user interfaces for managing applications that were used to enable activities, in accordance with some embodiments.
Figure 11E:
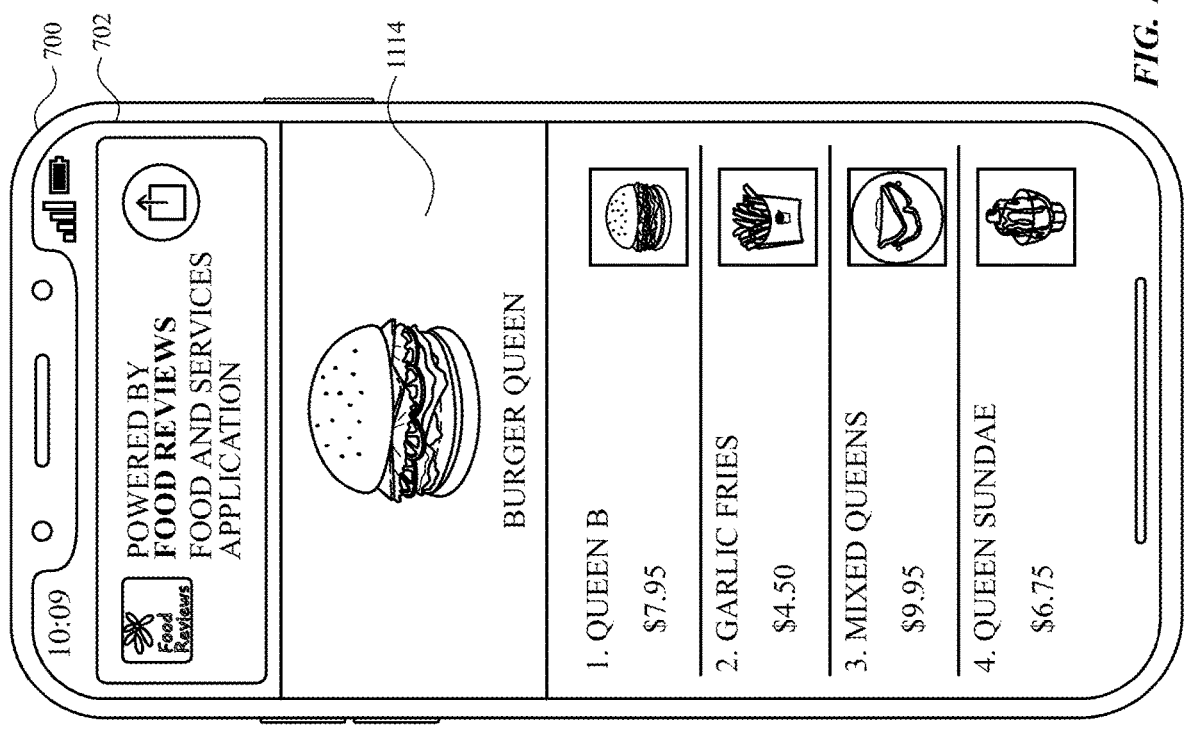

In FIG. 11E, in response to detecting user selection 1101 of representation 1104B of the second vendor (e.g., "Burger Queen") for the first lite-version application that corresponds to the first developer (e.g., "Food Reviews") (e.g., or of an affordance 1104BB (e.g., selectable user interface object; an activatable user interface object) corresponding to representation 1104B), computer system 700 displays, via display generation component 702, lite user interface 1114 for the first lite-version application that corresponds to the first developer (e.g., "Food Reviews") (e.g., where lite user interface 1114 is similar to or corresponds to lite user interface 944 described above with reference to FIG. 9E). In some embodiments, lite-version applications (and/or a respective vendor-specific lite-version applications) that are installed on computer system 700 can be accessed via lite-application icons corresponding to the lite-version applications that are displayed via computer system 700 (e.g., as in FIGS. 11B-11C) and/or via other representations of the corresponding lite-version applications that are displayed via computer system 700 (e.g., as shown in FIGS. 11A and 11D).

FIG. 11F illustrates computer system 700 displaying, via display generation component 702 and while a plurality of lite-version applications (e.g., the first lite-version application (e.g., "Food Reviews") and the second lite-version application (e.g., "Cafe Mocha")) are installed on computer system 700, a settings user interface 1116 (e.g., that is operating system-controlled) for managing system settings of computer system 700.

Figure 11G:
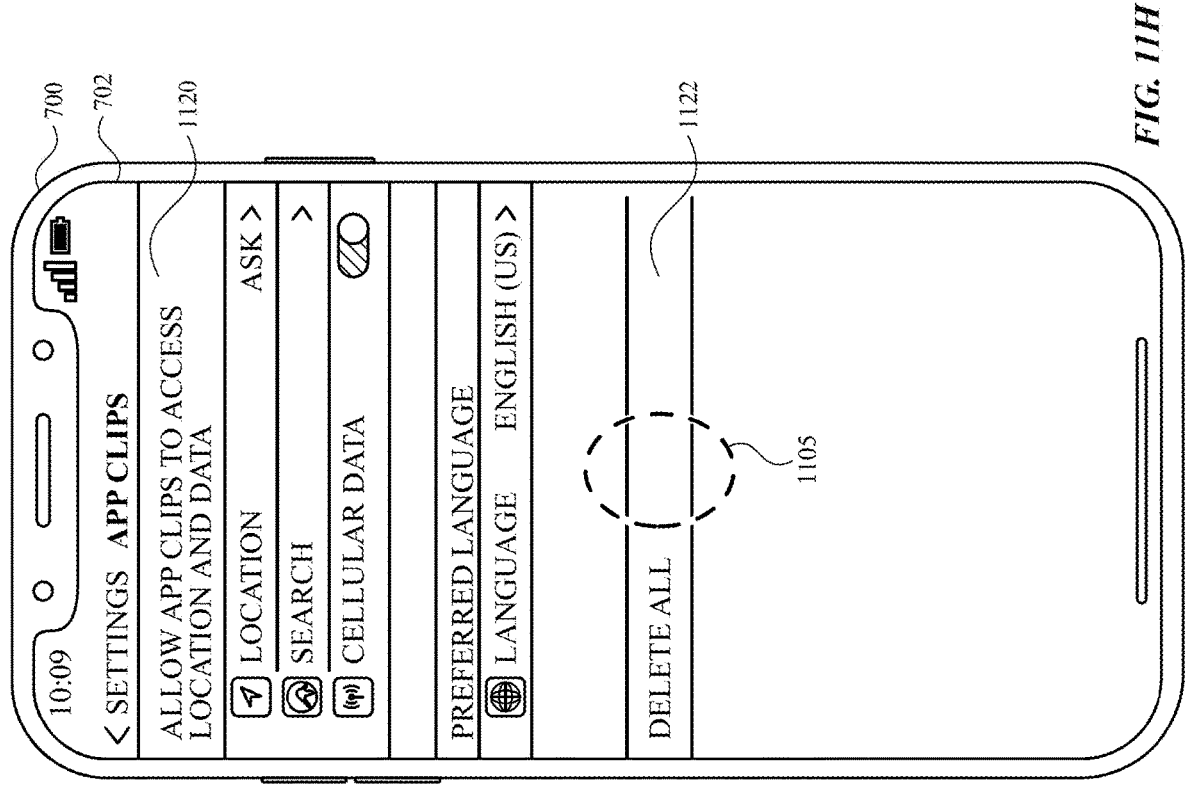

As shown in FIG. 11G, in some embodiments settings user interface 1116 includes a user interface element 1118 for accessing a settings page for managing settings associated with lite-version applications. In FIG. 11G, while displaying user interface element 1118 in settings user interface 1116, computer system 700 detects (e.g., via a touch-sensitive surface of the one or more input devices), a user selection 1103 of (e.g., user's tap input on) user interface element 1118.

Figure 11H:
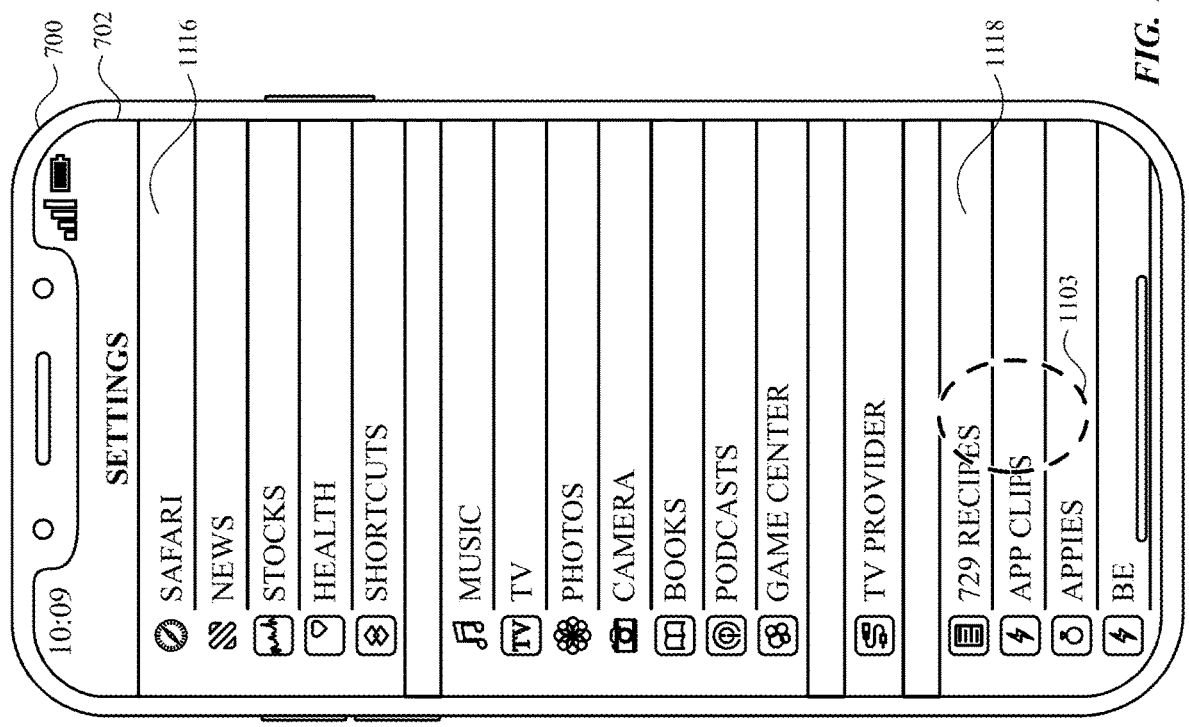

In FIG. 11H, in response to detecting user selection 1103 of user interface element 1118, computer system 700 displays a user interface 1120 of the settings application for managing settings associated with lite-version applications. In some embodiments, user interface 1120 of the settings application for managing settings associated with lite-version applications includes a delete affordance 1122.

In FIG. 11H, while displaying user interface 1120 with delete affordance 1122, computer system 700 detects (e.g., via a touch-sensitive surface of the one or more input devices), an activation 1105 of (e.g., user selection of; user's tap input on) delete affordance 1122.

In some embodiments, in response to detecting activation 1105 of delete affordance 1122 in user interface 1120, computer system 700 deletes (e.g., removes) all lite-version applications (e.g., the first lite-version application (e.g., "Food Reviews") and the second lite-version application (e.g., "Cafe Mocha")) that are currently installed on computer system 700.

Figure 11J:
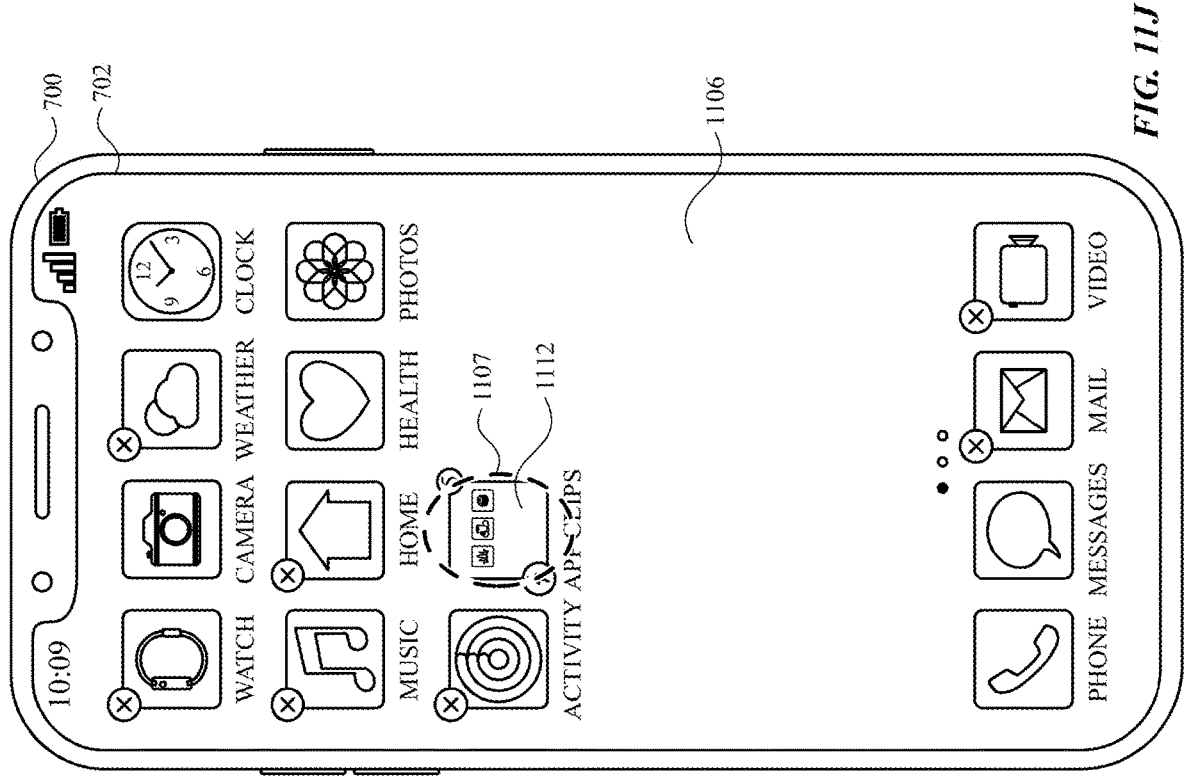
Figure 11I:
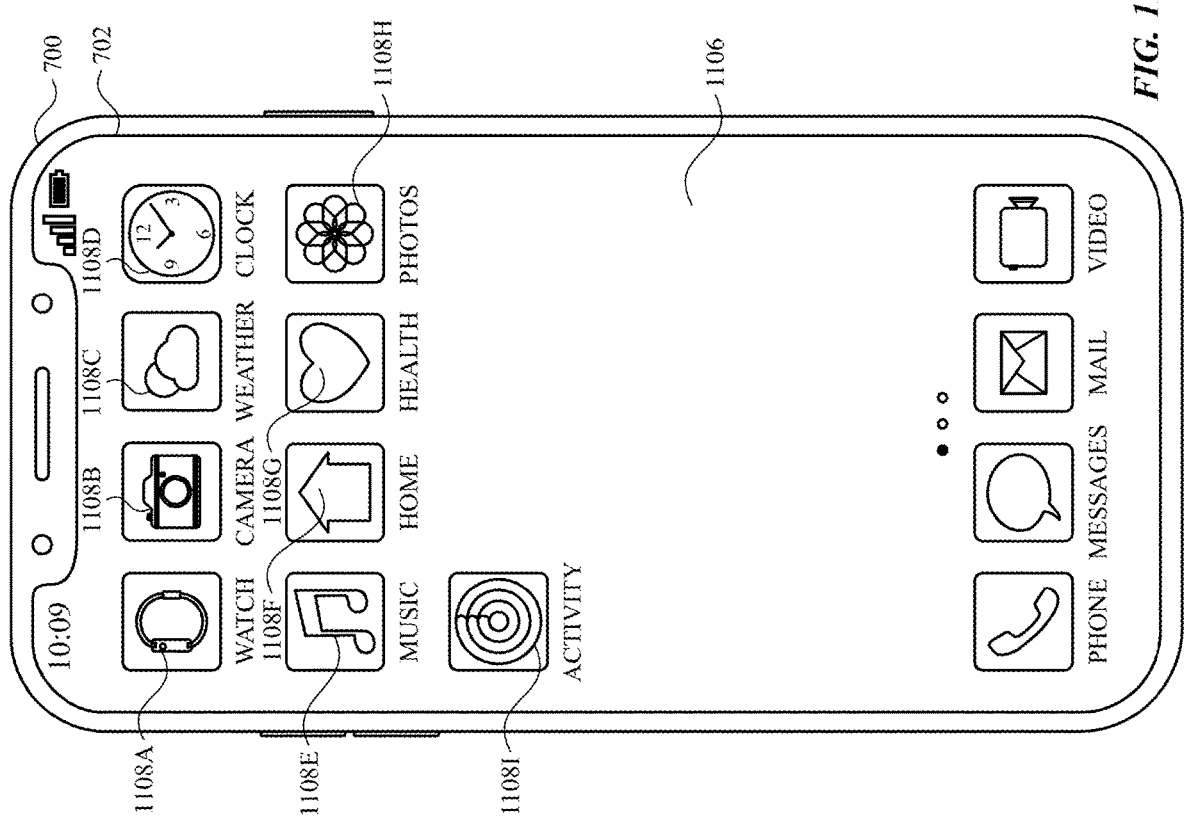

FIG. 11I illustrates computer system 700 displaying, via display generation component 702 and after detecting activation 1105 of delete affordance 1122, home user interface 1106 as first depicted in FIGS. 11B-11C. In the embodiment illustrated in FIG. 11I, home user interface 1106 includes application icons 1108A-1108I corresponding to full-version (e.g., regular) applications, but does not (e.g., no longer) includes lite-application icons 1110A-1110C as in FIG. 11B. In some embodiments, home user interface 1106 includes application icons 1108A-1108I corresponding to full-version (e.g., regular) applications, but does not (e.g., no longer) includes folder icon 1112 as in FIG. 11C.

FIG. 11J illustrates computer system 700 displaying, via display generation component 702, home user interface 1106 that includes folder icon 1112, as first depicted in FIG. 11C. In FIG. 11J, while displaying home user interface 1106 with folder icon 1112, computer system 700 detects (e.g., via a touch-sensitive surface of the one or more input devices) user selection 1107 of (e.g., user's tap input on) folder icon 1112.

Figure 11L:
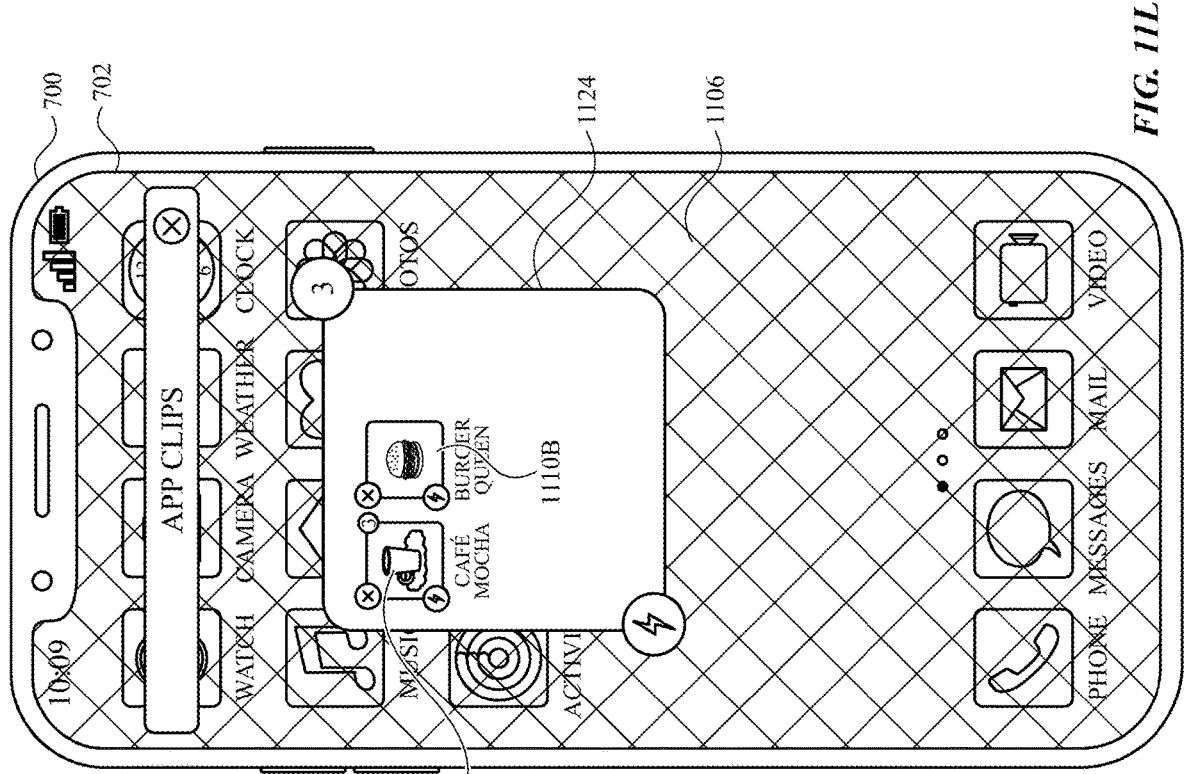
Figure 11K:
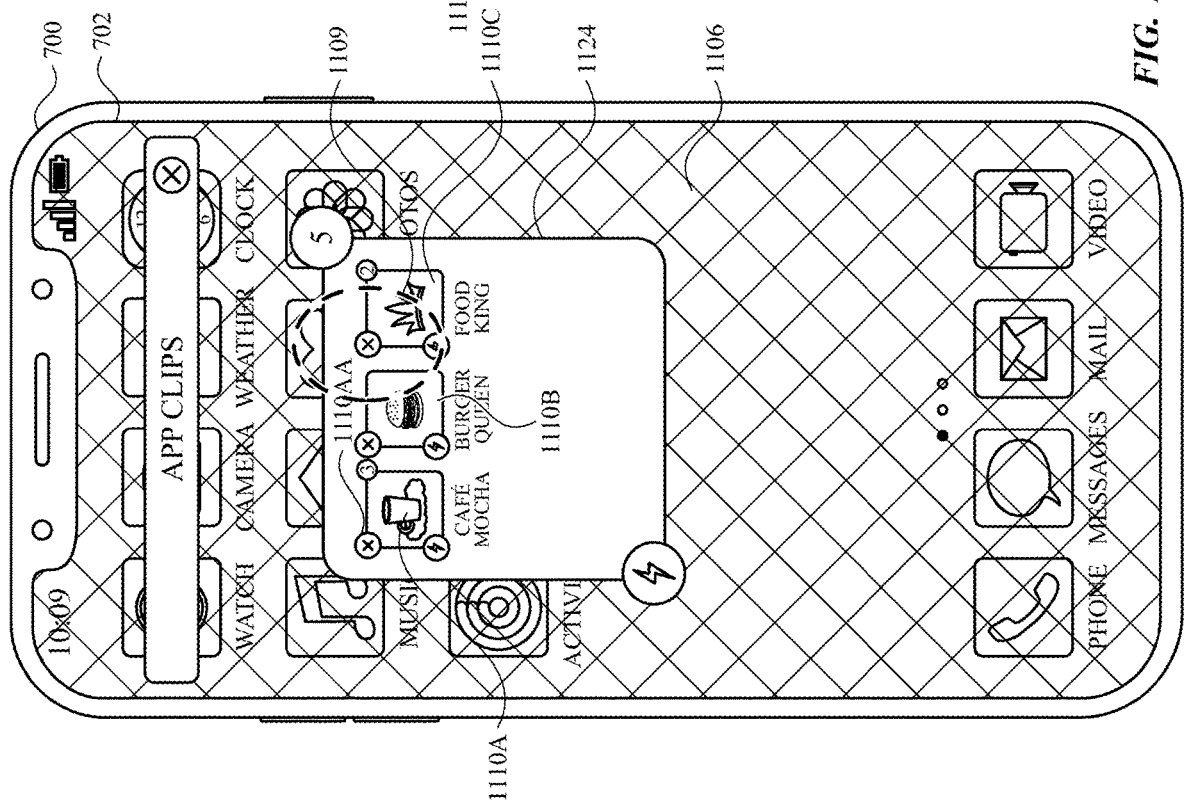
Figure 12B:
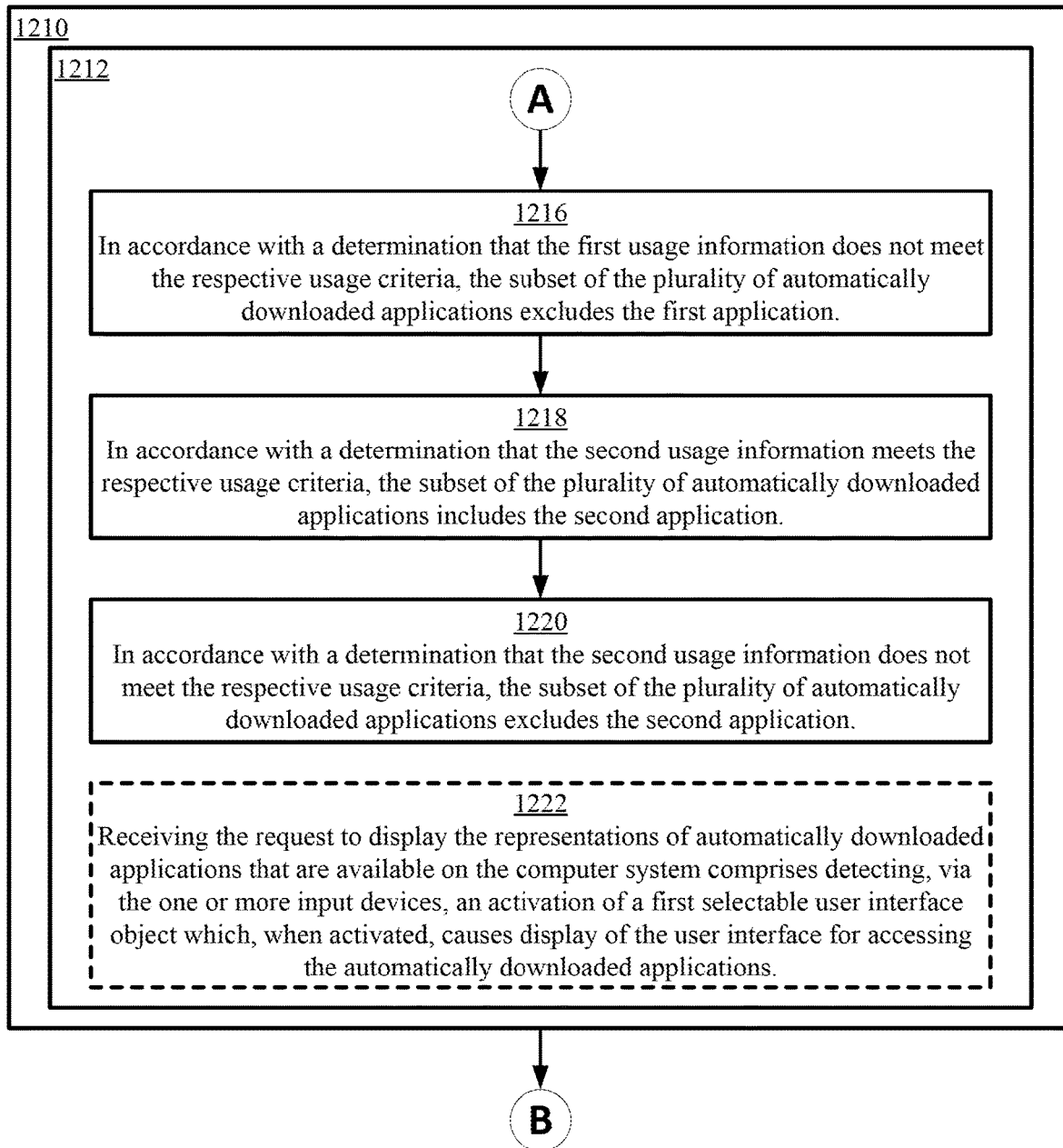
Figure 12C:
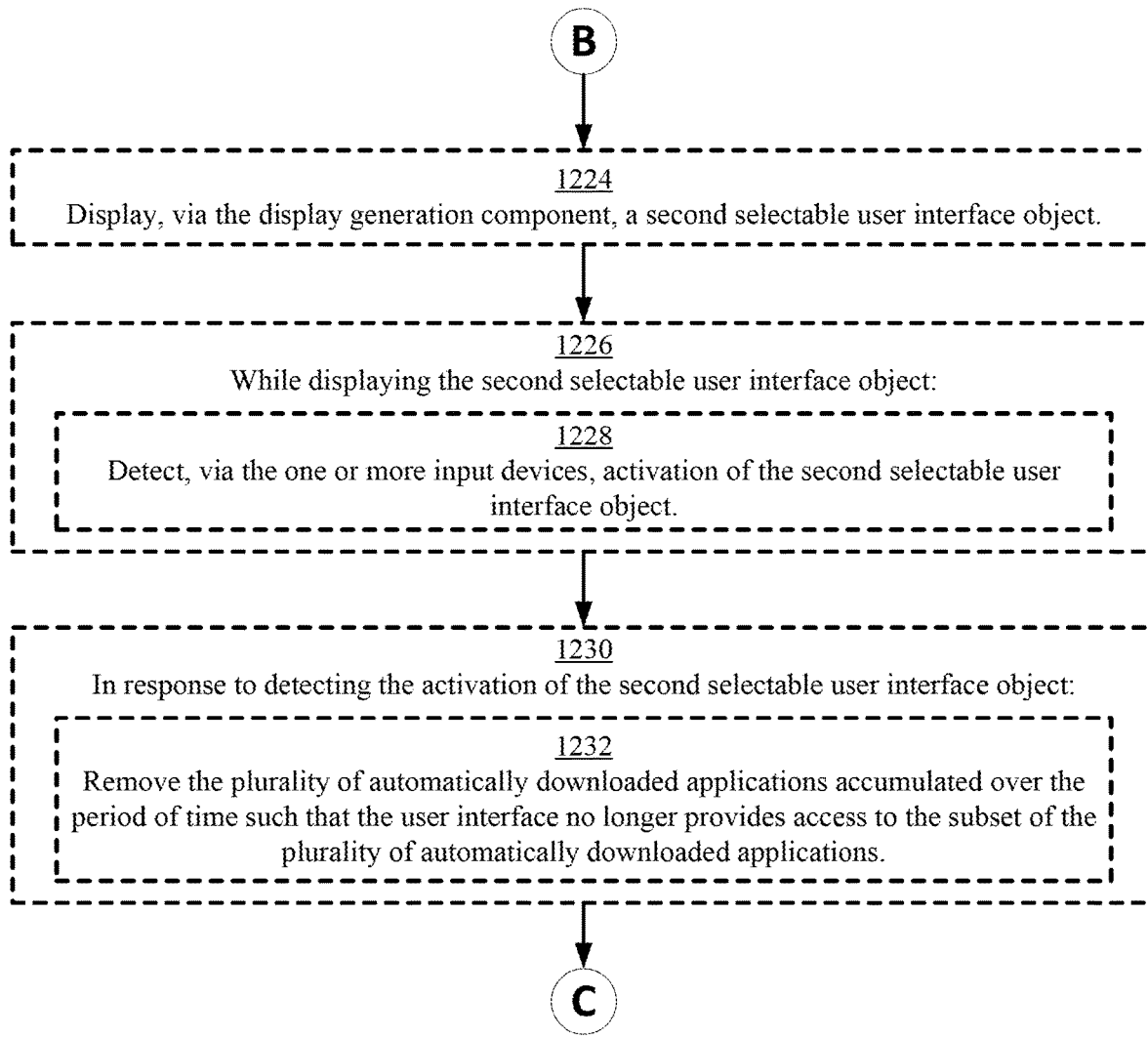
Figure 12D:
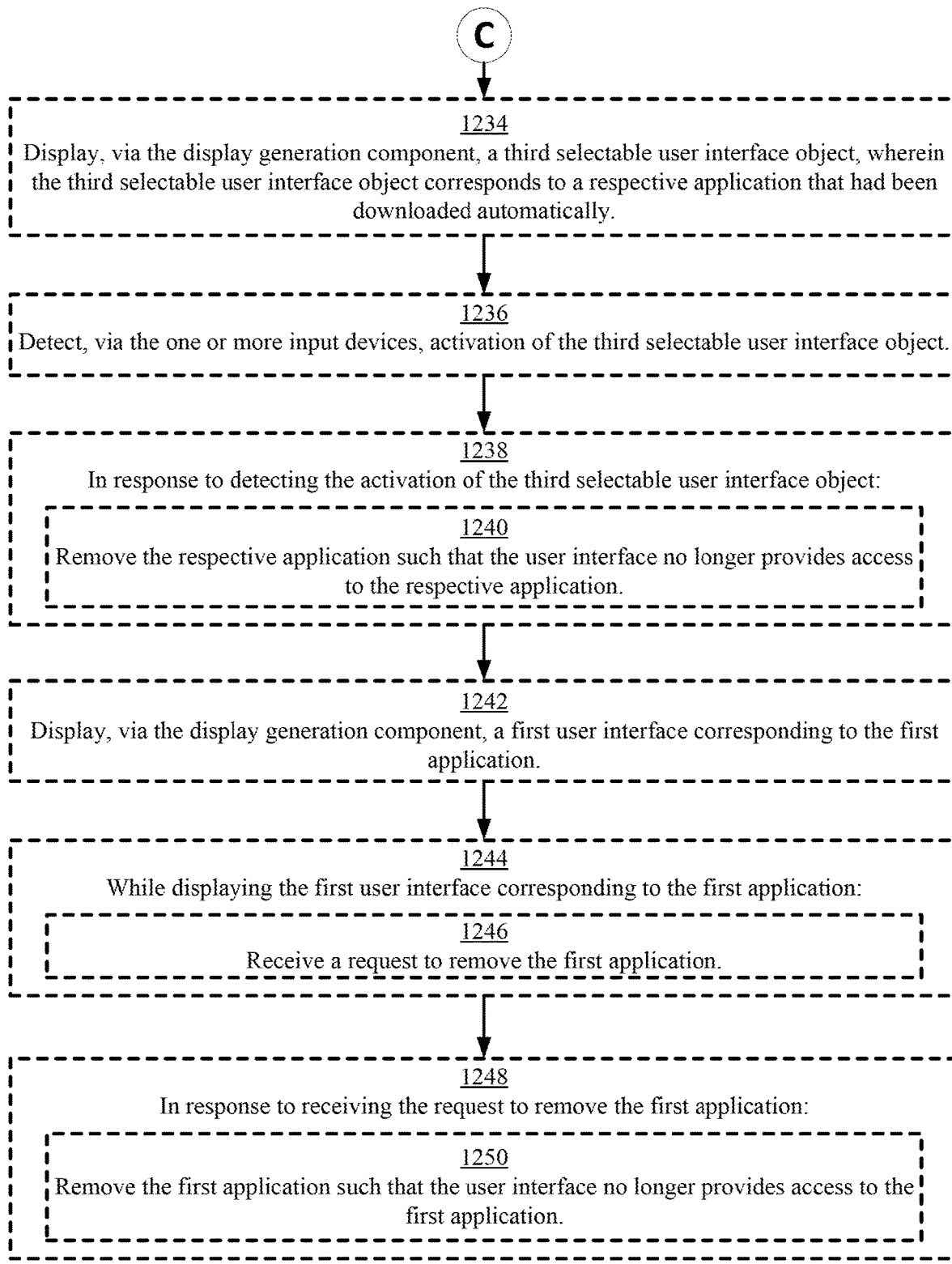

In FIG. 11K, in response to detecting user selection 1107 of folder icon 1112, computer system 700 displays, via display generation component 702 (e.g., overlaid on a portion of home user interface 1106), a folder user interface 1124 (e.g., a pop-up) that includes lite-application icons 1110A-1110C first described above with reference to FIG. 11B.

In some embodiments, while displaying folder user interface 1124 that includes lite-application icons 1110A-1110C, computer system 700 detects (e.g., via a touch-sensitive surface of the one or more input devices) a user input (e.g., a press-and-hold input) (e.g., directed to one of lite-application icon 1110A, lite-application icon 1110B, and lite-application icon 1110C).

In some embodiments, in response to detecting the user input (e.g., a press-and-hold input) directed to lite-application icon 1110A, computer system 700 displays an indication for each lite-application icon (e.g., by displaying an "x" for each respective lite-application icon (e.g., in a corner region of each respective lite-application icon)) that each lite-application can be deleted (e.g., removed).

In FIG. 11K, while displaying the indication for each lite-application icon that each lite-application can be deleted (e.g., removed), computer system 700 detects (e.g., via a touch-sensitive surface of the one or more input devices) user selection 1109 of the indication corresponding to lite-application icon 1110C corresponding to the first vendor (e.g., "Food King") for a first lite-version application that corresponds to a first developer (e.g., "Food Reviews").

In some embodiments, in response to detecting user selection 1109 of the indication corresponding to lite-application icon 1110C in FIG. 11K, computer system 700 removes the lite-version application (e.g., "Food King" version of "Food Reviews") corresponding to the selected lite-application icon. In some embodiments, if the selected lite-application icon corresponds to a respective lite-version application for which there are a plurality of different associated vendors, and different vendor-versions of the respective lite-version applications are installed on computer system 700 for the different associated vendors, computer system 700 only deletes (e.g., removes) the specific vendor-versions of the respective lite-version application corresponding to the lite-application icon that was selected without deleting (e.g., removing) the other types of vendor-versions of the respective lite-version application. In some embodiments, if the selected lite-application icon corresponds to a respective lite-version application for which there are a plurality of different associated vendors, and different vendor-versions of the respective lite-version applications are installed on computer system 700 for the different associated vendors, computer system 700 deletes (e.g., removes) all of the vendor-versions of the respective lite-version application that are installed on computer system 700.

In FIG. 11L, computer system 700 displays, in folder user interface 1124, lite-application icon 1110A corresponding to the third vendor (e.g., "Cafe Mocha") for the second lite-version application that corresponds to the second developer (e.g., "Cafe Mocha") and lite-application icon 1110B corresponding to the second vendor (e.g., "Burger Queen") for the first lite-version application that corresponds to the first developer (e.g., "Food Reviews"), but does not (e.g., no longer) displays lite-application icon 1110C as it was deleted (e.g., removed) from computer system 700 in FIG. 11K.

In FIG. 11M, computer system 700 displays, in first user interface element 1104 associated with lite-version applications of user interface 1102 (as first described above with reference to FIG. 11A), representation 1104B corresponding to the second vendor (e.g., "Burger Queen") for the first lite-version application that corresponds to the first developer (e.g., "Food Reviews") and representation 1104C corresponding to the third vendor (e.g., "Cafe Mocha") for the second lite-version application that corresponds to the second developer (e.g., "Cafe Mocha"), but no longer displays representation 1104A as the corresponding lite-version application (e.g., "Food King"-version of "Food Reviews") was deleted (e.g., removed) from computer system 700 in response to the input in FIG. 11K.

In FIG. 11M, computer system 700 displays, in first user interface element 1104, a representation 1104D corresponding to a fourth vendor (e.g., "Bike Rental") for a third lite-version application that corresponds to a third developer (e.g., "Bike Rental Store") (e.g., because the lite-version application corresponding to representation 1104D was accessed/used on computer system 700 after having deleted the lite-version application corresponding to representation 1104A).

FIG. 11N illustrates computer system 700 displaying, via display generation component 702, user interface 1102 that includes first user interface element 1104 after at least a predetermined time period (e.g., 30 days; at least 3 months; at least 6 months; a non-zero time period) has passed since the lite-version application corresponding to representation 1104B in FIG. 11M was accessed/used on computer system 700.

In FIG. 11N, computer system 700 displays, in first user interface element 1104 of user interface 1102, representation 1104C corresponding to the third vendor (e.g., "Cafe Mocha") for the second lite-version application that corresponds to the second developer (e.g., "Cafe Mocha") and representation 1104D corresponding to the fourth vendor (e.g., "Bike Rental") for the third lite-version application that corresponds to the third developer (e.g., "Bike Rental Store") (e.g., cause both the second lite-version application and the third lite-version application were accessed/used on computer system 700 within the predetermined time period), but no longer displays representation 1104B corresponding to the second vendor (e.g., "Burger Queen") for the first lite-version application that corresponds to the first developer (e.g., "Food Reviews") because the first lite-version application for the second vendor was not accessed/used on computer system 700 for at least the predetermined time period. In some embodiments, computer system 700 automatically (e.g., without user instructions) deletes (e.g., removes) a respective lite-version application from computer system 700 if at least the predetermined time period (e.g., 30 days; at least 3 months; at least 6 months; a non-zero time period) has passed since the respective lite-version application (or a respective vendor-version of the respective lite-version application) was accessed/used on computer system 700.

In FIG. 11N, computer system 700 also displays, in first user interface element 1104, representation 1104A corresponding to the first vendor (e.g., "Food King") for the first lite-version application that corresponds to the first developer (e.g., "Food Reviews") (e.g., because the lite-version application corresponding to representation 1104A was again installed on computer system 700 after it had been deleted in FIG. 11K).

FIG. 11O illustrates computer system 700 displaying (e.g., and thus being accessed/used), via display generation component 702, lite user interface 1114 corresponding to the second vendor (e.g., "Burger Queen") for the first lite-version application that corresponds to the first developer (e.g., "Food Reviews") before the predetermined time period (e.g., 30 days; at least 3 months; at least 6 months) has passed since the lite-version application was last accessed/used on computer system 700.

In FIG. 11P, because the second-vendor (e.g., "Burger Queen") version of the first lite-version application (e.g., "Food Reviews") was accessed/used on computer system 700 before the predetermined time period (e.g., 30 days; at least 3 months; at least 6 months) has passed since the lite-version application was last accessed/used on computer system 700, computer system 700 does not automatically delete (e.g., remove) the second-vendor (e.g., "Burger Queen") version of the first lite-version application (e.g., "Food Reviews") from computer system 700. In FIG. 11P, computer system 700 displays, in first user interface element 1104 of user interface 1102, representation 1104B corresponding to the second-vendor (e.g., "Burger Queen") for the first lite-version application that corresponds to the first developer (e.g., "Food Reviews"), as in FIG. 11M.

FIG. 11Q illustrates computer system 700 displaying, via display generation component 702, a user interface 1126 of a wake screen (e.g., a lock screen) of computer system 700 (e.g., corresponding to user interface 704 described above with reference to FIG. 7A). In some embodiments, a wake screen is a user interface that is displayed when a display generation component of a computer system transitions from an inactive (e.g., off) state to an active (e.g., on) state. In some embodiments, a lock screen is a user interface that is displayed when the computer system is operating in a locked state in which at least some functionality of the computer system is restricted (e.g., until the computer system is unlocked).

In FIG. 11R, computer system 700 displays, via display generation component 702 (e.g., and in user interface 1126), a first notification 1128 corresponding to the first lite-version application (e.g., "Food Reviews"), and in particular the second-vendor (e.g., "Burger Queen") version of the first lite-version application. In some embodiments, lite-version applications are enabled to cause display of notifications on computer system 700.

As shown in FIG. 11R, in some embodiments, first notification 1128 includes an indication 1130 (e.g., an image and/or text) that the corresponding application is a lite-version application. In some embodiments, first notification 1128 includes an indication 1132 of the developer (e.g., "Food Reviews") of the corresponding lite-version application. In some embodiments, first notification 1128 includes a message 1134 generated by the corresponding lite-version application, where content of the message relates to an activity (e.g., ordering one or more menu items, such as food and/or drinks) that relate to the respective vendor. In some embodiments, first notification 1128 includes an affordance 1136 which, when activated, initiates display of a lite user interface corresponding to the respective vendor-version of the lite-version application.

In FIG. 11S, computer system 700 displays, via display generation component 702 (e.g., and in user interface 1126), a second notification 1138 corresponding to a third lite-version application (e.g., "Sticky Buns Bakery").

As shown in FIG. 11S, in some embodiments, second notification 1138 includes an indication 1140 (e.g., an image and/or text) that the corresponding application is a lite-version application. In some embodiments, second notification 1138 includes an indication 1142 of the developer (e.g., "Sticky Buns Bakery") of the corresponding lite-version application. In some embodiments, second notification 1138 includes a message 1144 generated by the corresponding lite-version application, where content of the message relates to an activity (e.g., ordering one or more menu items, such as bread) that relates to the respective vendor (e.g., which in this example is the same as the developer of the third lite-version application (e.g., "Sticky Buns Bakery")). In some embodiments, second notification 1138 includes an affordance 1146 which, when activated, initiates display of a lite user interface corresponding to the third lite-version application.

FIGS. 12A-12D are a flow diagram illustrating a method for managing applications that were used to enable activities using a computer system, in accordance with some embodiments. Method 1200 is performed at a computer system (e.g., 100, 300, 500, 700) (e.g., an electronic device, a smart device, such as a smartphone or a smartwatch, a mobile device, a wearable device) that is in communication with a display generation component (e.g., 702) and one or more input devices (e.g., a touch-sensitive surface that is integrated with the display generation component). Some operations in method 1200 are, optionally, combined, the orders of some operations are, optionally, changed, and some operations are, optionally, omitted.

As described below, method 1200 provides an intuitive way for managing applications using a computer system. The method reduces the cognitive burden on a user for managing applications using a computer system, thereby creating a more efficient human-machine interface. For battery-operated computing devices, enabling a user to enable an activity faster and more efficiently conserves power and increases the time between battery charges.

The computer system (e.g., 700), over a period of time, accumulates (1202) a plurality of automatically downloaded applications (e.g., lite-version applications) that were downloaded automatically (e.g., applications that were automatically downloaded onto the computer system as described above with reference to FIGS. 7A-7AZ) to assist in performing contextually relevant tasks (e.g., without a specific user request to install the application on the device), where the plurality of applications includes a first application (e.g., a first lite-version application, where the lite-version application has a first full-version counterpart (e.g., where the full-version application is not available on the computer system)) with first usage information (e.g., used for a first contextually relevant task) and a second application (e.g., a second lite-version application, where the lite-version application has a second full-version counterpart (e.g., where the full-version application is not available on the computer system)) with second usage information (e.g., used for a second contextually relevant task). Accumulating the plurality of automatically downloaded applications that were downloaded automatically to assist in performing contextually relevant tasks enables a user to quickly and easily re-access one or more of the automatically downloaded applications, if needed, to perform the contextually relevant tasks (e.g., without needing additional inputs to re-download the applications). Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

After the plurality of applications have been downloaded automatically (1206), the computer system (e.g., 700) receives (1208) (e.g., detecting), via the one or more input devices, a request to display representations (e.g., 1104A-1104C, 1110A-1110C) (e.g., app icons) of automatically downloaded applications that are available on the computer system.

In response to receiving the request (1210), the computer system (e.g., 700) displays (1212), via the display generation component (e.g., 702), a user interface (e.g., 1102, 1106, 1124) for accessing the automatically downloaded applications, where the user interface provides access to a subset of the plurality of automatically downloaded applications that excludes one or more applications that do not meet respective usage criteria.

In accordance with a determination that the first usage information meets the respective usage criteria (e.g., the first application has been used at least a threshold amount within a threshold time period (e.g., 1 day, 1 week, 2 weeks, 1 month, 3 months, 6 months, 1 year from the current time; a non-zero time period), the subset of the plurality of automatically downloaded applications includes the first application (1214). Thus, in some embodiments, the displayed user interface (e.g., 1102, 1106, 1124) for accessing the automatically downloaded application includes (e.g., shows or is enabled to show) the subset of the plurality of applications including the first application. Including the first application in the subset of the plurality of automatically downloaded applications in accordance with the determination that the first usage information meets the respective usage criteria provides the user with quick and easy access to the first application (e.g., where the user is more likely to access the first application).

Performing an optimized operation when a set of conditions has been met enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In accordance with a determination that the first usage information does not meet the respective usage criteria (e.g., the first application has not been used at least a threshold amount within a threshold time period (e.g., 1 day, 1 week, 2 weeks, 1 month, 3 months, 6 months, 1 year) from the current time), the subset of the plurality of automatically downloaded applications excludes the first application (1216). Thus, in some embodiments, the displayed user interface (e.g., 1102, 1106, 1124) for accessing the automatically downloaded application includes (e.g., shows or is enabled to show) the subset of the plurality of applications which do not include (e.g., does not show and is not enabled to show) the first application. Excluding the first application in the subset of the plurality of automatically downloaded applications in accordance with the determination that the first usage information does not meet the respective usage criteria prevents unnecessary controls and/or information related to the first application from being presented to the user (e.g., where the user is not likely or less likely to access the first application). Preventing cluttering of the UI, and thus providing improved visual feedback, enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In accordance with a determination that the second usage information meets the respective usage criteria (e.g., the second application has been used at least a threshold amount within a threshold time period (e.g., 1 day, 1 week, 2 weeks, 1 month, 3 months, 6 months, 1 year) from the current time), the subset of the plurality of automatically downloaded applications includes the second application (1218). Thus, in some embodiments, the displayed user interface (e.g., 1102, 1106, 1124) for accessing the automatically downloaded application includes (e.g., shows or is enabled to show) the subset of the plurality of applications including the second application.

In accordance with a determination that the second usage information does not meet the respective usage criteria (e.g., the second application has not been used at least a threshold amount within a threshold time period (e.g., 1 day, 1 week, 2 weeks, 1 month, 3 months, 6 months, 1 year) from the current time), the subset of the plurality of automatically downloaded applications excludes the second application (1220). Thus, in some embodiments, the displayed user interface (e.g., 1102, 1106, 1124) for accessing the automatically downloaded application includes (e.g., shows or is enabled to show) the subset of the plurality of applications which do not include (e.g., does not show and is not enabled to show) the second application.

In some embodiments, the plurality of automatically downloaded applications are, once downloaded, stored (e.g., locally) on the computer system (e.g., 700) (e.g., so that they do not need to be downloaded the next time they are needed) (1204).

In some embodiments, receiving the request to display the representations (e.g., 1104A-1104C, 1110A-1110C) of automatically downloaded applications that are available on the computer system (e.g., 700) comprises detecting, via the one or more input devices, an activation of a first selectable user interface object (e.g., 1112) (e.g., a first graphical user interface object, a first selectable folder icon, a first affordance) which, when activated (e.g., selected), causes display of the user interface (e.g., 1124) for accessing the automatically downloaded applications (1222). In some embodiments, the first selectable user interface object is an app icon that is displayed on a home user interface (e.g., home screen) or desktop user interface of the computer system. In some embodiments, a home user interface is a main user interface of a computer system that is provided by the operating system of the computer system. In some embodiments, a home screen is a graphical user interface (e.g., with one or more pages or screens) that is provided by the operating system of the computer system and includes links to (e.g., affordances for launching or accessing) applications, settings, and/or notifications. In some embodiments, the first selectable user interface object is an app icon or menu option that is displayed in a search user interface of the computer system). Providing the first selectable user interface object which, when activated (e.g., selected), causes display of the user interface for accessing the automatically downloaded applications provides quick and easy access to the automatically downloaded applications and reduces the amount of inputs at the computer system. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently In some embodiments, the computer system (e.g., 700) displays, in a second user interface (e.g., 1106) (e.g., a home user interface (e.g., a home screen), a desktop user interface), the first selectable user interface object (e.g., 1112)

(e.g., a selectable folder icon). In some embodiments, while displaying the first selectable user interface object, the computer system detects, via the one or more input devices, activation (e.g., 1107) (e.g., selection) of the first selectable user interface object. In some embodiments, in response to detecting the activation of the first selectable user interface object, the computer system detects, via the display generation component (e.g., and replaces display of the second user interface with), the user interface (e.g., 1124) for accessing the automatically downloaded applications. Displaying the user interface for accessing the automatically downloaded applications in response to detecting the activation of the first selectable user interface object displayed in the second user interface provides quick and easy access to the automatically downloaded applications and reduces the number of inputs at the computer system. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system (e.g., 700) displays (1224), via the display generation component (e.g., 702) (e.g., in an operating system-controlled settings user interface of the computer system), a second selectable user interface object (e.g., 1122) (e.g., a second affordance; a selectable clear/remove/delete button or icon). In some embodiments, while displaying the second selectable user interface object (1226), the computer system detects (1228), via the one or more input devices, activation (e.g., 1105) (e.g., selection) of the second selectable user interface object. In some embodiments, in response to detecting the activation of the second selectable user interface object (1230), the computer system removes (e.g., deletes, uninstalls, makes no longer locally accessible/available) (1232) the plurality of automatically downloaded applications accumulated over the period of time such that the user interface no longer provides access to the subset of the plurality of automatically downloaded applications. Thus, in some embodiments, if the user interface for accessing the automatically downloaded applications is displayed after the second selectable user interface object has been activated (and no applications have been automatically downloaded since), the user interface does not include any applications (e.g., does not show any icons corresponding to applications). Enabling removing of the plurality of automatically downloaded applications accumulated over the period of time in response to detecting the activation of the second selectable user interface object enables the user to quickly and easily remove the plurality of automatically downloaded applications to free up storage space on the computer system. Providing convenient control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system (e.g., 700) displays (1234), via the display generation component (e.g., 702) (e.g., in an operating system-controlled settings user interface of the computer system), a third selectable user interface object (e.g., a third affordance; a third selectable clear/remove/delete button or icon), where the third selectable user interface object corresponds to a respective application that had been downloaded automatically. In some embodiments, the third selectable user interface object is displayed next to, proximate to, or together with a representation (e.g., 1104A-1104C, 1110A-1110C) (e.g., app icon) corresponding to the respective application. In some embodiments, the computer system detects (1236), via the one or more input devices, activation (e.g., selection) of the third selectable user interface object. In some embodiments, in response to detecting the activation of the third selectable user interface object (1238), the computer system removes (e.g., deleting; uninstalling; making no longer locally accessible/available) (1240) the respective application such that the user interface no longer provides access to the respective application. Enabling removing of the respective application (e.g., as opposed to removing all of the automatically downloaded applications) enables the user to conveniently target specific automatically downloaded applications for removal from the computer system without needing to remove all of the automatically downloaded applications from the computer system. Providing customized control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system (e.g., 700) displays (1242), via the display generation component (e.g., 702), a first user interface (e.g., 1114) corresponding to the first application. In some embodiments, the first user interface includes a remove affordance (e.g., a delete affordance; an uninstall affordance). In some embodiments, while displaying the first user interface corresponding to the first application (1244), the computer system receives (e.g., detects) (1246) a request to remove the first application. In some embodiments, receiving the request to remove the first application comprises detecting activation (e.g., selection) of the remove affordance. In some embodiments, in response to receiving the request to remove the first application (1248), the computer system removes (1250) the first application (e.g., uninstalls the first application; deletes the first application) such that the user interface no longer provides access to the first application. Thus, in some embodiments, after receiving the request to remove the first application, the user interface no longer provides access to the first application.

In some embodiments, the computer system (e.g., 700) displays, via the display generation component (e.g., 702), the user interface (e.g., 1102, 1106, 1124) for accessing the automatically downloaded applications, where the user interface includes a first representation (e.g., 1104A-1104C, 1110A-1110C) (e.g., a representation of a first application; an app icon) corresponding to (e.g., a lite-version of) the first application, where the first representation includes an indication (e.g., 1110OAB of 1110A) (e.g., a visual indicator; a badge) that the first application (e.g., the lite-version of the application) does not include at least a portion of a counterpart application of the first application (e.g., the full-version of the first application). Displaying the first representation that includes the indication (e.g., a visual indicator; a badge) that the first application (e.g., the lite-version of the application) does not include at least the portion of the counterpart application of the first application enables the user to quickly and easily recognize that the first representation corresponding to the first application that is displayed in the user interface for accessing the automatically downloaded applications does not include at least the portion of the counterpart application of the first application. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. In some embodiments, the computer system displays or causes display of, via the display generation component, a second user interface (e.g., a home user interface (e.g., a home screen); a desktop user interface), where the second user interface includes a second representation (e.g., a different app icon) corresponding to a second version (e.g., a full-version) of the first application, where the second representation does not include an indication (e.g., a visual indicator; a badge) that the second representation corresponds to the first version (e.g., the lite-version) of the first application.

In some embodiments, the computer system (e.g., 700) displays, via the display generation component (e.g., 702), the user interface (e.g., 1102, 1106, 1124) for accessing the automatically downloaded applications, where the user interface includes representations (e.g., 1104A-1104C, 1110A-1110C) (e.g., representations of apps; app icons) of automatically downloaded applications corresponding to the subset of the plurality of automatically downloaded applications, and where the representations are arranged (e.g., ordered; listed) within the user interface based on access time (e.g., most recent time of access) of the subset of the plurality of automatically downloaded applications. Thus, in some embodiments, the computer system displays or causes display of, in the user interface, the representations (e.g., representations of apps; app icons) corresponding to the subset of the plurality of automatically downloaded applications where the representations are automatically arranged and re-arranged based on most recent of the respective applications corresponding to the representations (e.g., the representation corresponding to the most recently-used application is arranged to be shown first or at the top, the representation corresponding to the second most recently-used application is arranged to be shown second or at the second-to-the-top, and so on). Arranging the representations within the user interface based on access time (e.g., most recent time of access) of the subset of the plurality of automatically downloaded applications enables the user to quickly and easily access and/or view the most recently-accessed automatically downloaded applications. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the representations (e.g., 1104A-1104C, 1110A-1110C) (e.g., representations of apps; app icons) of automatically downloaded applications corresponding to the subset of the plurality of automatically downloaded applications include a first representation (e.g., a representation of a first application; a first app icon) corresponding to the first application (e.g., and wherein the first representation is not displayed/shown as the first or at the top of the user interface). In some embodiments, the computer system (e.g., 700) displays, via the display generation component (e.g., 702), the user interface (e.g., 1102, 1106, 1124) for accessing the automatically downloaded applications, where the first representation corresponding to the first application is not in a first position (e.g., not in the top position; not in the position corresponding to the first app icon of the shown/listed plurality of app icons, but instead a lower position within the shown/listed plurality of app icons) in the user interface. In some embodiments, subsequent to (e.g., after) displaying the user interface with the first representation not in the first position in the user interface, the computer system detects a request to invoke (e.g., the lite-version of) the first application. In some embodiments, subsequent to (e.g., after) detecting the request to invoke the first application, the computer system displays, via the display generation component, the user interface for accessing the automatically downloaded applications, where the first representation corresponding to the first application is in the first position (e.g., the top position; in the position corresponding to the first app icon of the shown/listed plurality of app icons, thereby indicating that the first application was the most recently-used application of the respective applications) in the user interface.

In some embodiments, the representations (e.g., 1104A-1104C, 1110A-1110C) (e.g., representations of apps; app icons) of automatically downloaded applications corresponding to the subset of the plurality of automatically downloaded applications include a respective representation corresponding to the first application without including another respective representation corresponding to the first application. In some embodiments, if the first application had previously been accessed for a first vendor connected to the first application (e.g., if the first application is an application associated with a chain of restaurants, a first chain of the chain of restaurants; if the first application is an application associated with renting an object (e.g., an object; a ride vehicle), a first object of the available objects or a first object location within available object locations) and had also previously been accessed for a second vendor different from the vendor that is also connected to the first application, the representation (e.g., 1110A-1110B) the user interface only includes one representation corresponding to the first application (e.g., instead of including a representation for the first vendor and a representation for the second vendor). Including the respective representation corresponding to the first application without including another respective representation corresponding to the first application within the displayed representations of automatically downloaded applications provides quick and easy access to the first application and avoids including numerous (e.g., too many) respective representations corresponding to the first application within the displayed representations of automatically downloaded applications. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system (e.g., 700) displays, in the user interface (e.g., 1102, 1106, 1124) for accessing the automatically downloaded applications, a respective representation (e.g., 1104A-1104C, 1110A-1110C) corresponding to the first application at a respective position within the user interface that is not a top position (e.g., not a first/beginning position; not in the position indicating most recent access) within the user interface relative to other representations in the user interface (e.g., the other representations in the user interface do not correspond to the first application), where the respective representation corresponds to a previous invocation of the first application with respect to a first vendor associated with the first application (e.g., if the first application is an application associated with a chain of restaurants, a first chain of the chain of restaurants; if the first application is an application associated with renting an object (e.g., an object; a ride vehicle), a first object of the available objects or a first object location within available object locations). In some embodiments, subsequent to (e.g., after; in response to) displaying the user interface with the respective representation corresponding to the first application at the respective position within the user interface that is not the top position, the computer system detects a request to invoke the first application with respect to a second vendor, different from the first vendor, associated with the first (e.g., if the first application is an application associated with a chain of restaurants, a second chain of the chain of restaurants; if the first application is an application associated with renting an object (e.g., an object; a ride vehicle), a second object of the available objects or a second object location within available object locations). In some embodiments, subsequent to (e.g., after; in response to) detecting the request to invoke the first application with respect to the second vendor different from the first vendor, the computer system displays, via the display generation component, the user interface for accessing the automatically downloaded applications, where the user interface includes the respective representation corresponding to the first application at the top position (e.g., the first/beginning position; the position indicating most recent access) within the user interface. Displaying the user interface for accessing the automatically downloaded applications subsequent to detecting the request to invoke the first application with respect to the second vendor different from the first vendor, where the user interface includes the respective representation corresponding to the first application at the top position within the user interface, enables the user to quickly and easily access the first application (e.g., even when the first application was more recently used with respect to a different vendor) with fewer inputs. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, subsequent to having (previously) automatically downloaded the first application on the computer system, the computer system (e.g., 700) detects (e.g., via one or more sensors that are in communication with the computer system, such as a GPS sensor; determining based on usage history of the computer system) that the computer system is operating in a first context (e.g., the computer system is operating at a first location; the computer system is being used in a context in which the first application had previously been used). In some embodiments, in response to detecting (e.g., determining) that the computer system is operating in the first context, in accordance with a determination that the first context relates to a first contextually relevant task (e.g., a task specific to a first location (e.g., a first restaurant; a first store; a first merchant); a first vendor-specific task) that the first application is configured to perform, (e.g., automatically) the computer system displays, via the display generation component (e.g., 702), a first indication (e.g., a notification; a suggestion; a prompt) that the first application is available on (e.g., can be used on) the computer system to be used to perform the first contextually relevant task. Displaying the first indication (e.g., a notification; a suggestion; a prompt) that the first application is available on the computer system to be used to perform the first contextually relevant task (e.g., a first location (e.g., a first restaurant; a first store; a first merchant) specific task; a first vendor-specific task) that the first application is configured to perform in accordance with the determination that the first context relates to a first contextually relevant task enables the user to conveniently recognize that the first application had previously been used and again can be used to perform the first contextually relevant task (e.g., without needing to search for how to perform the first contextually relevant task and/or without needing to manually download another application to perform the first contextually relevant task) on the computer system. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while the first application is not downloaded on the computer system (e.g., 700), the computer system detects (e.g., via one or more sensors that are in communication with the computer system, such as a GPS sensor; determining based on usage history of the computer system) that the computer system is operating in a first context (e.g., the computer system is operating at a first location; the computer system is being used in a context in which the first application had previously been used). In some embodiments, in response to detecting (e.g., determining) that the computer system is operating in the first context, in accordance with a determination that the first context relates to a first contextually relevant task (e.g., a first location (e.g., a first restaurant; a first store; a first merchant) specific task; a first vendor-specific task) that the first application is configured to perform, (e.g., automatically) displaying, via the display generation component, a second indication (e.g., a notification; a suggestion; a prompt) that the third application can be used (e.g., can be downloaded on and installed on) on the computer system to be used to perform the third contextually relevant task. Displaying the second indication (e.g., a notification; a suggestion; a prompt) that the third application can be used on the computer system to be used to perform the third contextually relevant task in accordance with the determination that the first context relates to a first contextually relevant task (e.g., a first location (e.g., a first restaurant; a first store; a first merchant) specific task; a first vendor-specific task) that the first application is configured to perform enables the user to conveniently recognize that the first application can be used to perform the first contextually relevant task (e.g., without needing to search for how to perform the first contextually relevant task and/or without needing to manually download another application to perform the first contextually relevant task) on the computer system. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

Note that details of the processes described above with respect to method 1200 (e.g., FIGS. 12A-12D) are also applicable in an analogous manner to the methods described above and below. For example, method 800 optionally includes one or more of the characteristics of the various methods described above with reference to method 1200. For example, the respective lite user interface displayed on the respective computer via the process for enabling an activity on the respective computer system initiated based on one or more of the methods described with reference to FIGS. 7A-7AZ can be accessed (e.g., again) and/or managed on the respective computer system via the methods described with reference to FIGS. 11A-11S. For another example, method 1000 optionally includes one or more of the characteristics of the various methods described above with reference to method 1200. For example, a respective lite-version application corresponding to the respective lite user interface for which content is determined and displayed as described with reference to FIGS. 9A-9T can be accessed (e.g., again) and/or managed on the respective computer system via the methods described with reference to FIGS. 11A-11S. For another example, method 1400 optionally includes one or more of the characteristics of the various methods described above with reference to method 1200. For example, the process for setting the one or more system privileges for an application described with reference to FIGS. 13A-13V can be applied to the plurality of automatically downloaded applications described with reference to FIGS. 11A-11S. For brevity, these details are not repeated below.

FIGS. 13A-13V illustrate exemplary user interfaces for managing settings for applications used to enable activities using a computer system, in accordance with some embodiments. The user interfaces in these figures are used to illustrate the processes described below, including the processes in FIGS. 14A-14B.

FIG. 13A illustrates computer system 700 displaying, via display generation component 702, a user interface 1300 (e.g., a wakescreen) and, overlaid on user interface 1300, a sheet user interface 1302 for a cafe (e.g., "Cafe Mocha"). Sheet user interface 1302 corresponds to a lite-version application of the cafe that is not installed on computer system 700. As described above with reference to FIGS. 9A-9M, computer system 700 displays the sheet user interface for the lite-version application (e.g., automatically, without a user request) in response to detecting a trigger event (e.g., a location-based event; a hyperlink-based event; a NFC-based event; a QR code-based event). Sheet user interface 1302 includes an affordance 1304 for causing display of a user interface corresponding to the lite-version application of the cafe.

In FIG. 13A, while displaying sheet user interface 1302, computer system 700 receives (e.g., detects) an input 1301 directed to affordance 1304. In some embodiments, input 1301 is a touch input or tap input on affordance 1304. In response to receiving input 1301, computer system 700 downloads and installs the lite-version application of the cafe on the computer system. In some embodiments, a full-version counterpart of the lite-version application of the cafe is not installed on computer system 700 when the lite-version application of the cafe is installed on the computer system (e.g., the full-version application of the cafe has not been installed on the computer system; the full-version application of the cafe was previously installed and subsequently deleted from the computer system). In some embodiments, the full-version application of the cafe is not installed on computer system 700 when one or more system privileges for the lite-version application of the cafe are set by the user, as described below with reference to FIGS. 13B, 13D, 13F, and 13G.

FIG. 13A also illustrates a legend 1306 that indicates system privilege setting statuses for the lite-version application of the cafe. System privileges for the lite-version application of the cafe include permission to generate notifications (row 1306A), permission to access location information (row 1306B), permission to access a camera (row 1306C), permission to access a microphone (row 1306D), and permission to access Bluetooth (row 1306E).

In FIG. 13A, the lite-version application of the cafe has not yet been accessed on computer system 700, and the system privileges are all set to no access (not allowed). In some embodiments, the default system privileges for an application (e.g., whether a lite-version application or a full-version application) is that all system privilege are initially denied (not allowed).

Figure 13B:
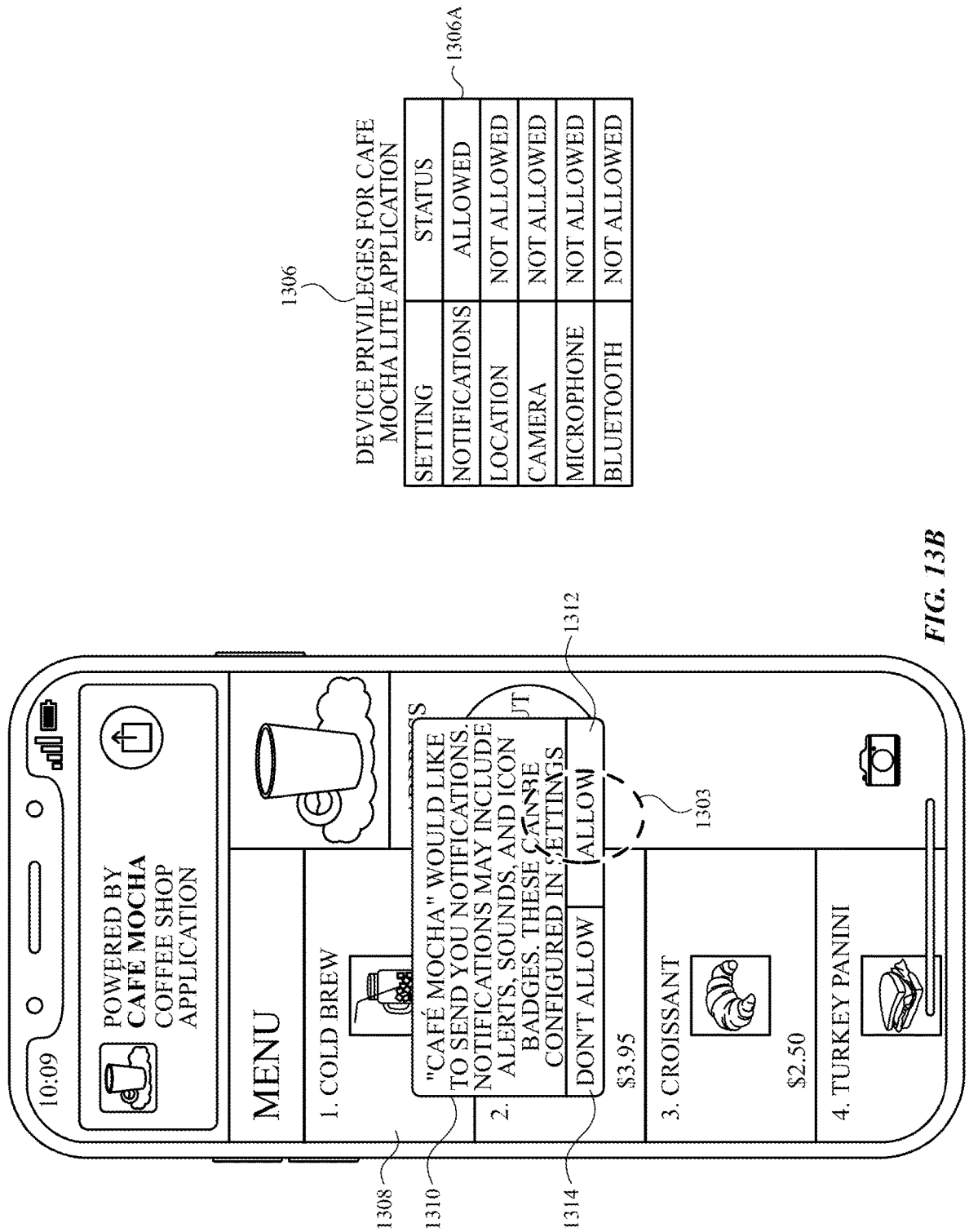

In FIG. 13B, in response to receiving input 1301, computer system 700 displays, via display generation component 702, a lite user interface 1308 corresponding to the lite-version application of the cafe. Computer system 700 also displays (e.g., because the lite-version application of the cafe is being accessed for the first time on the computer system) (e.g., overlaid on lite user interface 1308) a notification permission notification 1310 from the lite-version application of the cafe requesting permission to generate notifications on the computer system. Notification 1310 includes an affordance 1312 that, when selected, grants the lite-version application permission to generate notifications on the computer system and an affordance 1314 that, when selected, denies the lite-version application permission to generate notifications on the computer system.

In FIG. 13B, while displaying notification 1310, computer system 700 receives (e.g., detects) an input 1303 directed to affordance 1312 for granting permission to generate notifications on the computer system. In some embodiments, input 1303 is a touch input or tap input on affordance 1312.

In response to receiving input 1303, computer system 700 grants the lite-version application of the cafe permission to generate notifications on the computer system. Legend 1306 now indicates, in row 1306A, that the lite-version application of the cafe is granted permission to generate notifications on the computer system.

Figure 13C:
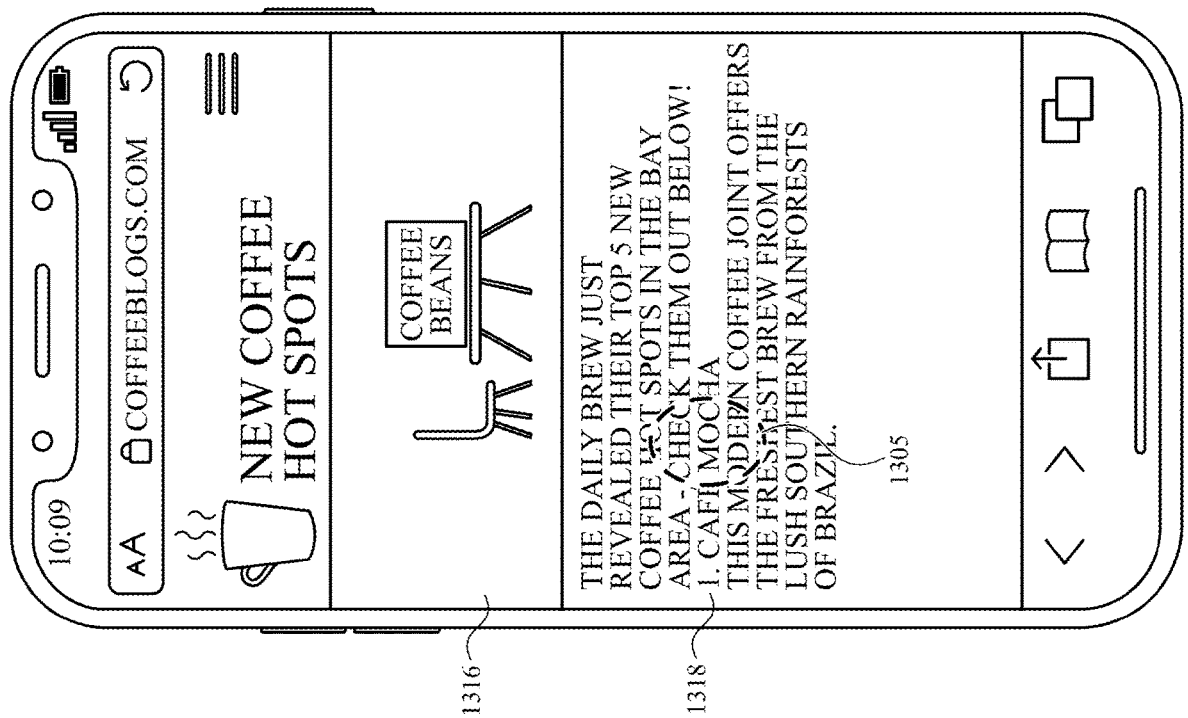

FIG. 13C illustrates computer system 700 displaying, via display generation component 702, a webpage 1316 in a web browsing application, where webpage 1316 includes a hyperlink 1318 that, when selected, causes the computer system to launch the lite-version application of the cafe.

In FIG. 13C, while displaying webpage 1316, computer system receives (e.g., detects) an input 1305 directed to hyperlink 1318. In some embodiments, input 1305 is a touch input or tap input on hyperlink 1318.

Also in FIG. 13C, legend 1306 indicates that system privileges for the lite-version application of the cafe remain unchanged from FIG. 13B.

Figure 13D:
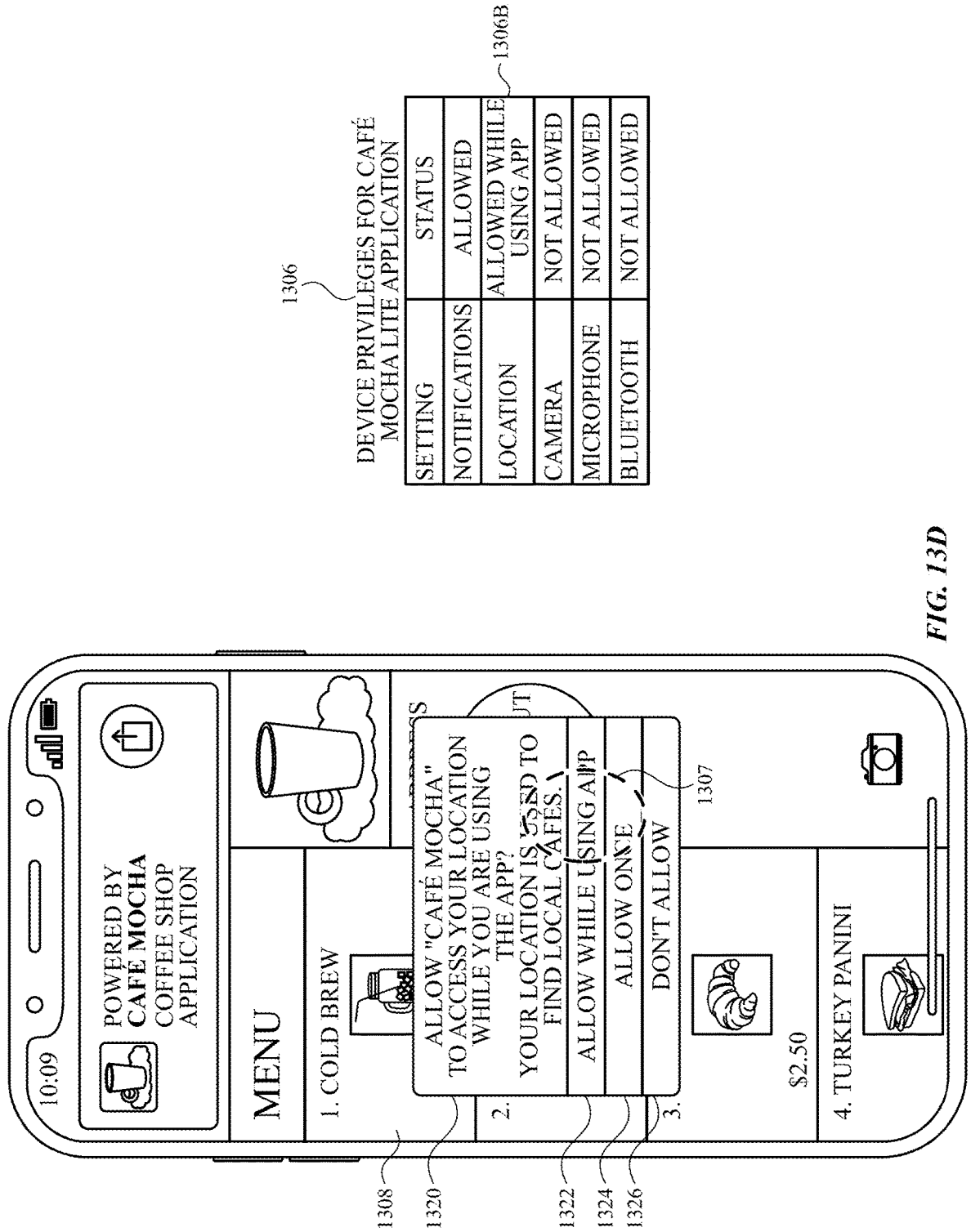

In FIG. 13D, in response to receiving input 1305, computer system 700 displays, via display generation component 702, lite user interface 1308 corresponding to the lite-version application of the cafe. Computer system 700 also displays (e.g., overlaid on lite user interface 1308) a location permission notification 1320 from the lite-version application of the cafe requesting permission to access location information from the computer system. Notification 1320 includes an affordance 1322 that, when selected, grants the lite-version application permission to access location information from the computer system only while the lite-version application is being used on the computer system (e.g., while lite user interface 1308 is being displayed on the computer system), an affordance 1324 that, when selected, grants the lite-version application permission to access location information from the computer system only during the current session, and an affordance 1326 that, when selected, denies the lite-version application permission to access location information from the computer system.

In FIG. 13D, while displaying notification 1320, computer system 700 receives (e.g., detects) an input 1307 directed to affordance 1322 for granting permission to access location information from the computer system only while the application is being used on the computer system. In some embodiments, input 1307 is a touch input or tap input on affordance 1322.

In response to receiving input 1307, computer system 700 grants the lite-version application of the cafe permission to access location information from the computer system only while the application is being used on the computer system. Legend 1306 now indicates, in row 1306B, that the lite-version application of the cafe is granted permission to access location information from the computer system only while the application is being used.

Figure 13E:
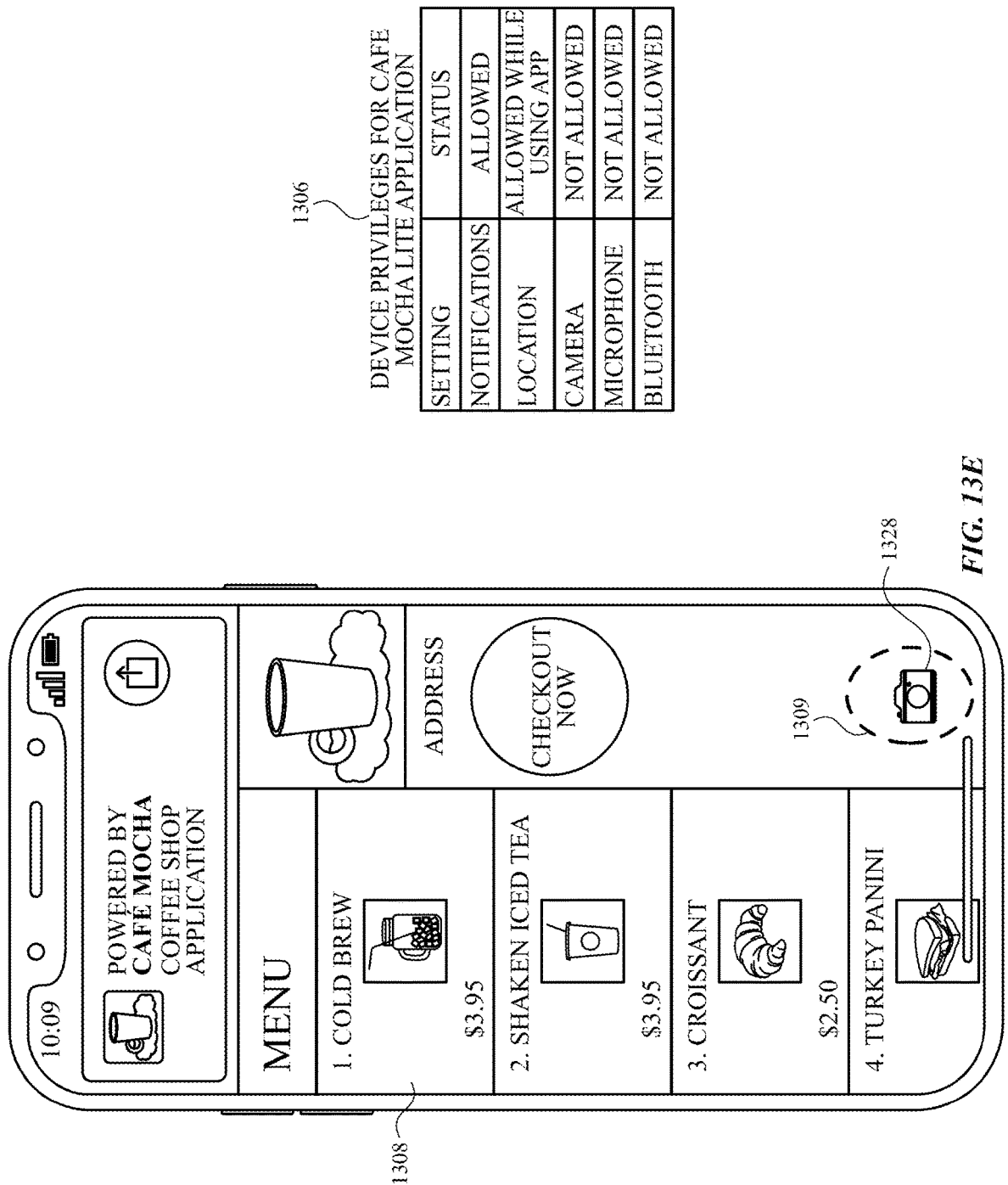

FIG. 13E illustrates computer system 700 displaying, via display generation component 702, lite user interface 1308, where lite user interface 1308 includes an affordance 1328 for accessing a camera application on the computer system.

In FIG. 13E, while displaying user interface 1308, computer system 700 receives (e.g., detects) an input 1309 directed to affordance 1328. In some embodiments, input 1309 is a touch input or tap input on affordance 1328.

Also in FIG. 13E, legend 1306 indicates that system privileges for the lite-version application of the cafe remain unchanged from FIG. 13D.

Figure 13F:
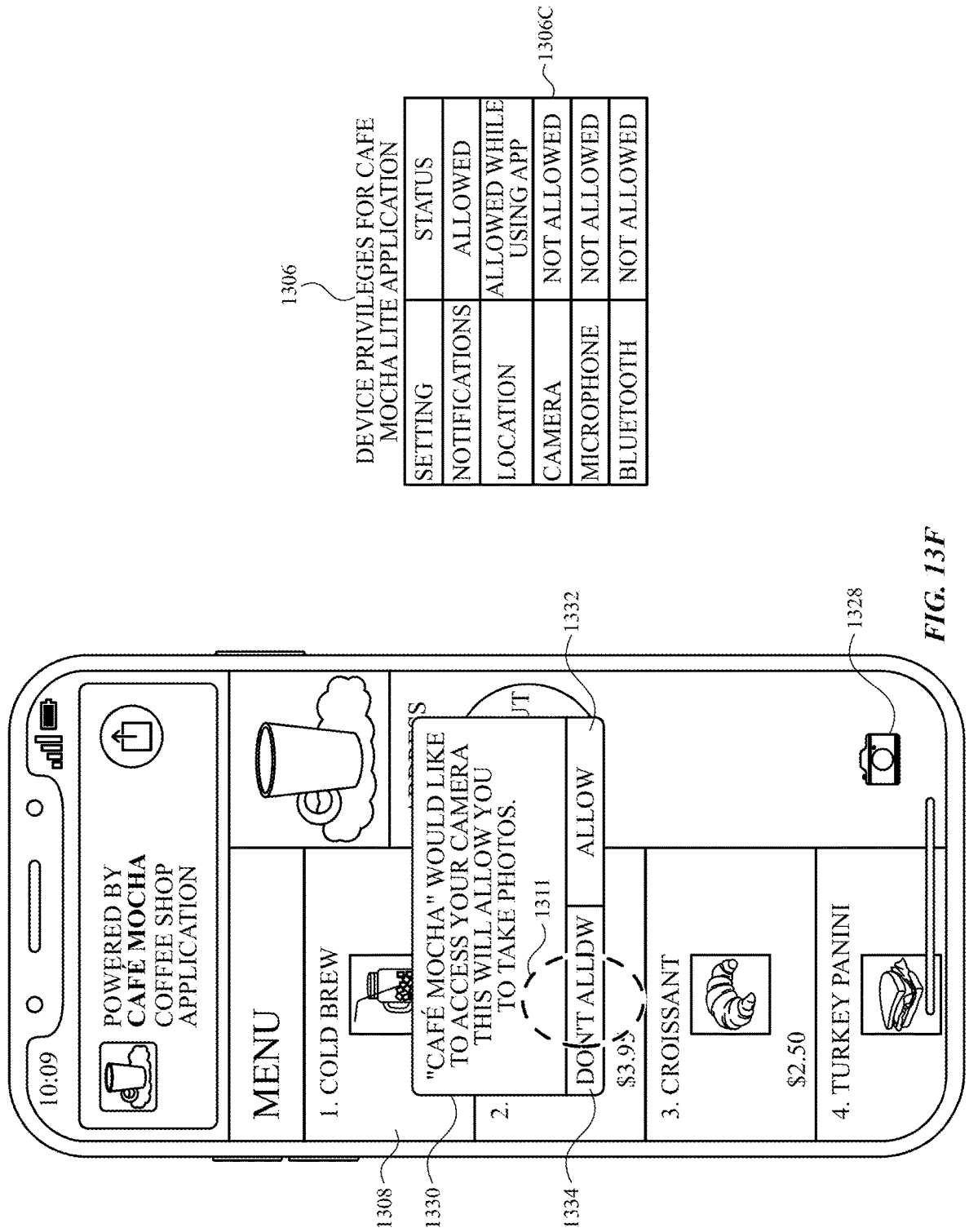

In FIG. 13F, in response to receiving input 1309, computer system 700 displays, via display generation component 702 (e.g., and overlaid on lite user interface 1308), a camera access permission notification 1330 from the lite-version application of the cafe requesting permission to access the camera of the computer system. Notification 1330 includes an affordance 1332 that, when selected, grants the lite-version application permission to access the camera of the computer system and an affordance 1334 that, when selected, denies the lite-version application permission to access the camera of the computer system.

In FIG. 13F, while displaying notification 1330, computer system 700 receives (e.g., detects) an input 1311 directed to affordance 1334 for denying permission to access the camera on the computer system. In some embodiments, input 1311 is a touch input or tap input on affordance 1334.

In response to receiving input 1311, computer system 700 forgoes granting the lite-version application of the cafe permission to access the camera on the computer system. Legend 1306 still indicates, in row 1306C, that the lite-version application of the cafe is denied permission to access the camera on the computer system.

Figure 13G:
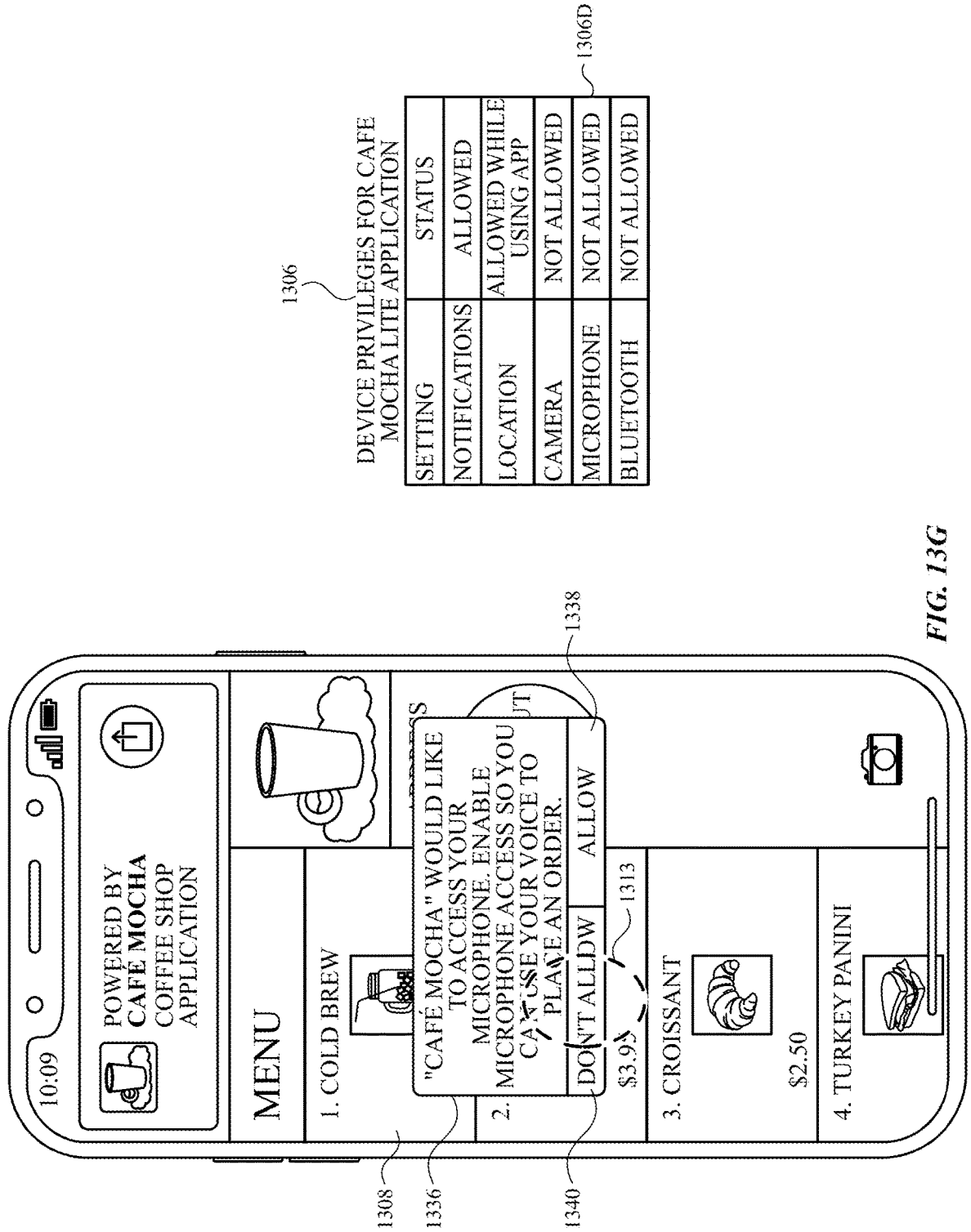

In FIG. 13G, computer system 700 displays (e.g., in response to receiving input 1311), via display generation component 702 (e.g., and overlaid on lite user interface 1308), a microphone access permission notification 1336 from the lite-version application of the cafe requesting permission to access the microphone of the computer system. Notification 1336 includes an affordance 1338 that, when selected, grants the application permission to access the microphone of the computer system and an affordance 1340 that, when selected, denies the application permission to access the microphone of the computer system.

In FIG. 13G, while displaying notification 1336, computer system 700 receives (e.g., detects) an input 1313 directed to affordance 1340 for denying permission to access the microphone on the computer system. In some embodiments, input 1313 is a touch input or tap input on affordance 1340.

In response to receiving input 1311, computer system 700 forgoes granting the lite-version application of the cafe permission to access the microphone on the computer system. Legend 1306 still indicates, in row 1306D, that the lite-version application of the cafe is denied permission to access the microphone on the computer system.

Figure 13H:
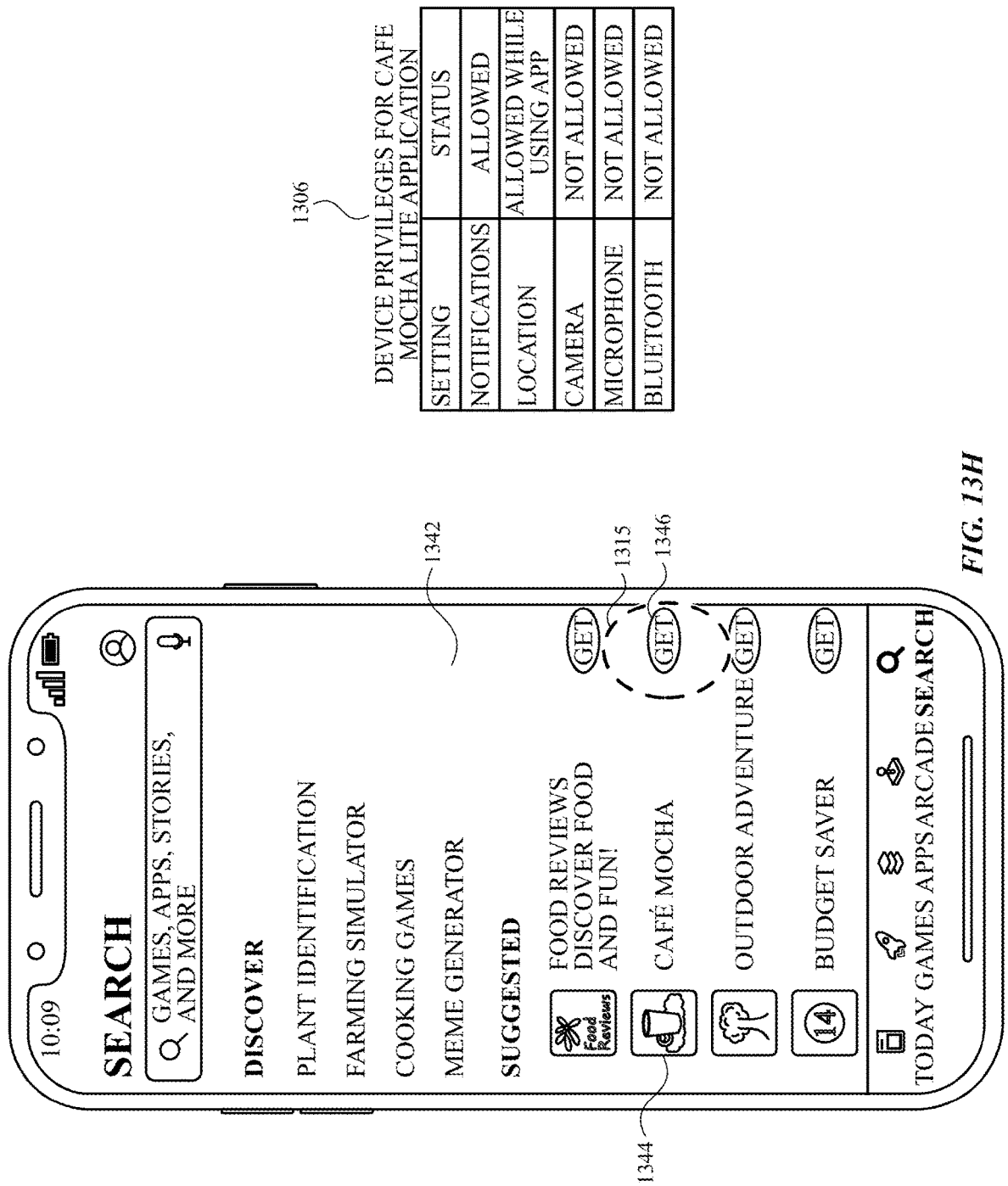

FIG. 13H illustrates computer system 700 displaying, via display generation component 702, a user interface 1342 of an application store, where user interface 1342 includes an indication 1344 that the full-version application of the cafe (e.g., "Cafe Mocha") can be downloaded and installed on the computer system and an affordance 1346 for downloading and installing the full-version application of the cafe on the computer system.

In FIG. 13H, while displaying user interface 1342 of the application store, computer system 700 receives (e.g., detects) an input 1315 directed to affordance 1346. In response to receiving input 1315, computer system 700 initiates a process for downloading and installing the full-version application of the cafe on computer system 700.

Also in FIG. 13H, legend 1306 indicates that system privileges for the lite-version application of the cafe remains unchanged from FIG. 13G when the counterpart full-version application of the cafe is downloaded and installed on the computer system.

Figure 13I:
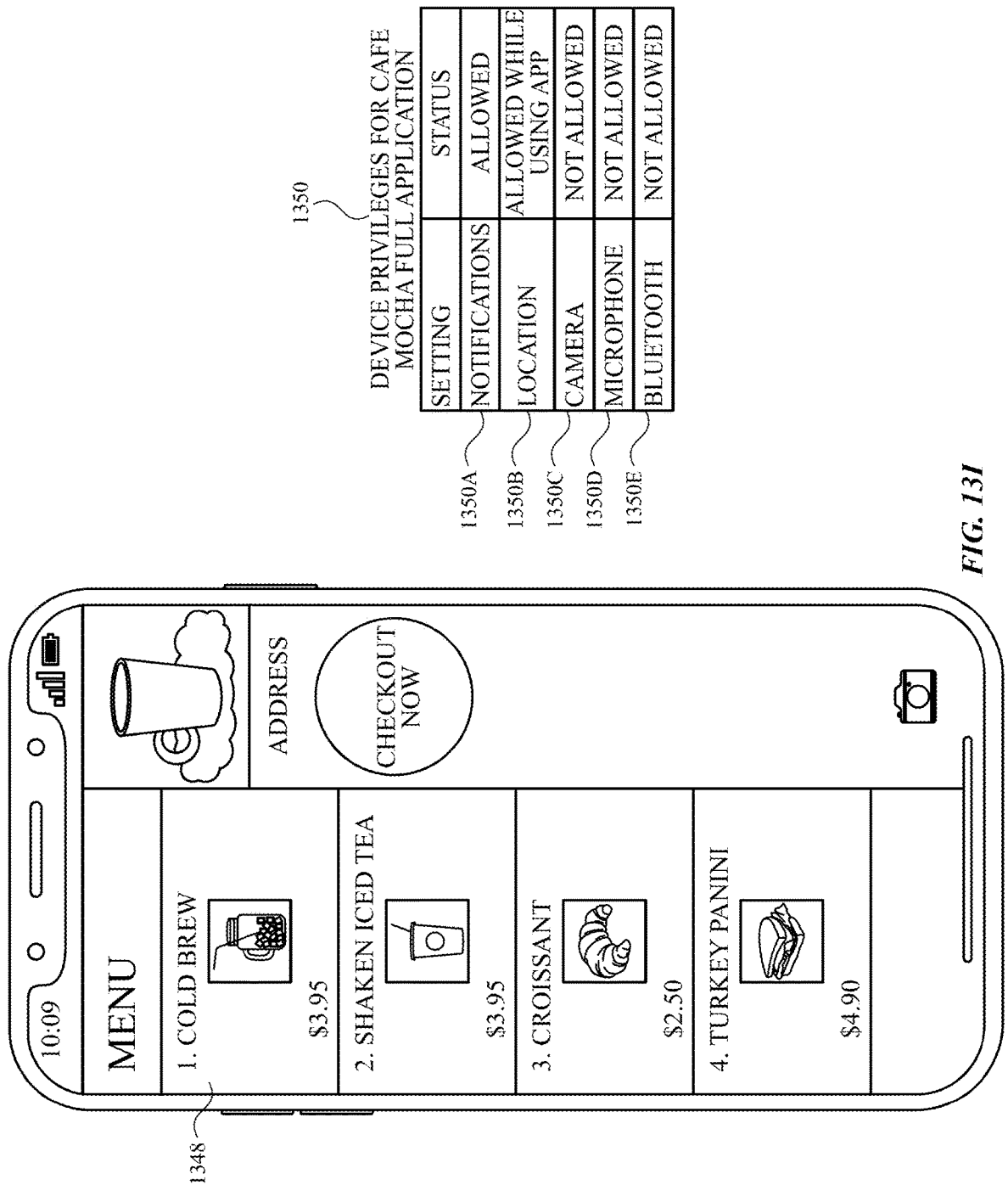

FIG. 13I illustrates computer system 700 displaying, after having downloaded and installed the full-version application of the cafe on the computer system, a user interface 1348 corresponding to the full-version application of the cafe.

In FIG. 13I, legend 1350 for the full-version application indicates that system privileges for the full-version application of the cafe are set to be the same as what the system privileges for the lite-version application of the cafe were at the time when the full-version counterpart was downloaded and installed on the computer system, as indicated by rows 1350A-1350E (as compared to rows 1306A-1306E of legend 1306, respectively, in FIG. 13H).

In some embodiments, as in FIG. 13I, when a full-version application is downloaded and installed on computer system 700, all of the system privileges for the counterpart lite-version application that was installed on the computer system 700 are automatically, without user input, carried over and applied to the system privileges for the full-version application. In FIG. 13I, all of the system privileges for the full-version application of the cafe, as indicated by rows 1350A-1350E of legend 1350, are consistent with (e.g., set to be the same as) the system privileges for the lite-version application of the cafe, as indicated by rows 1306A-1306E of legend 1306 in FIG. 13H, at the time the full-version application was downloaded and installed on the computer system.

Figure 13J:
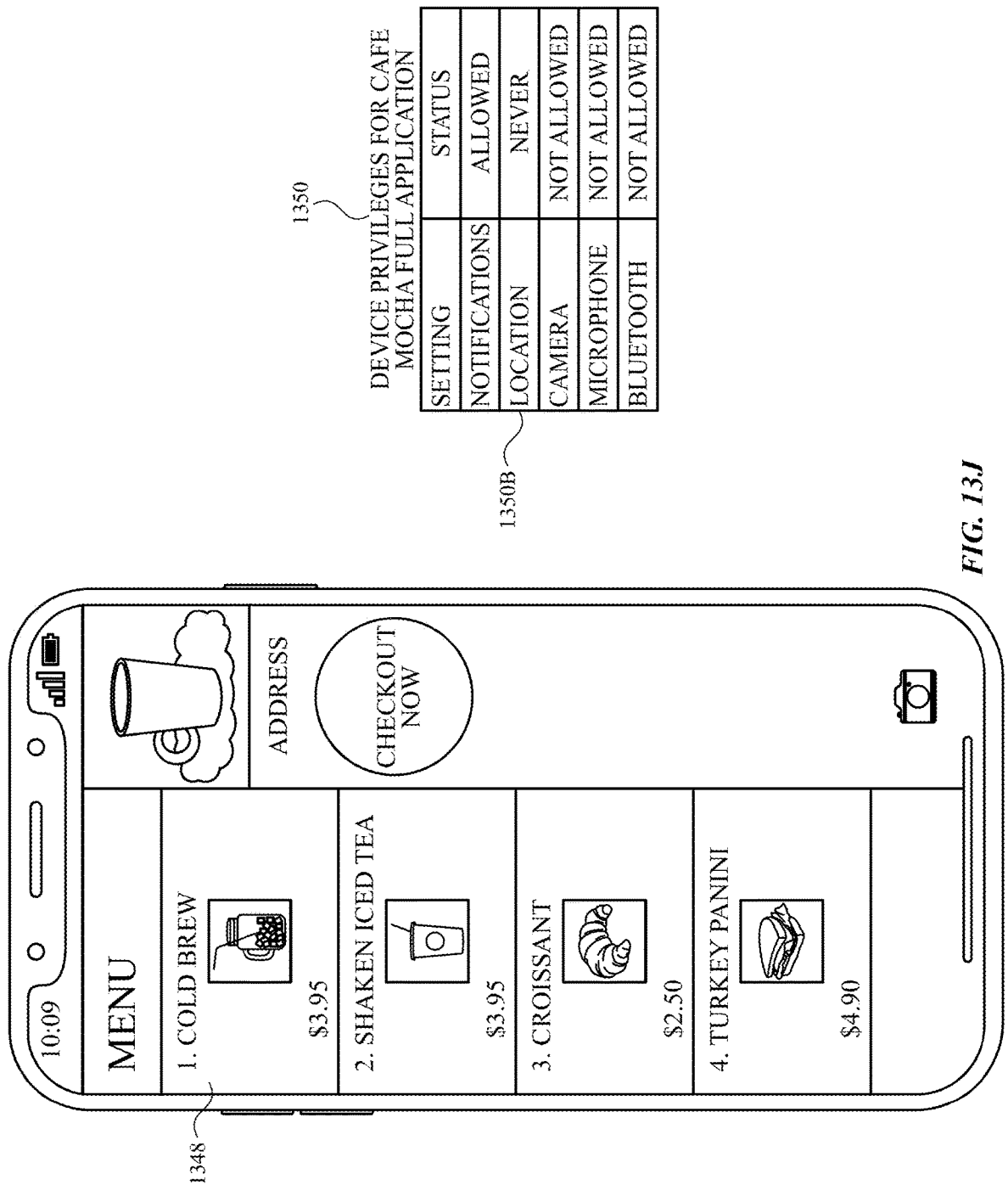

Alternatively, in some embodiments, when a full-version application is downloaded and installed on computer system 700, a portion of, but not all of, the system privileges for the counterpart lite-version application that was installed on the computer system 700 are automatically, without user input, carried over and applied to the system privileges for the full-version application. In FIG. 13J, system privileges corresponding to notifications, camera, microphone, and Bluetooth are automatically, without user input, carried over from the previously-set system privilege for the lite-version application, but the system privilege corresponding to location information access is not carried over from the system privilege setting for the lite-version application. Instead, as indicated by row 1350B of legend 1350, computer system 700 automatically denies the full-version application of the cafe permission to access location information from the computer system even when the lite-version application had been granted permission to access location information. In FIG. 13J, to grant the full-version application permission to access location information, the user can manually (e.g., via a settings page for the full-version application of the cafe) grant the full-version application permission to access location information.

Figure 13K:
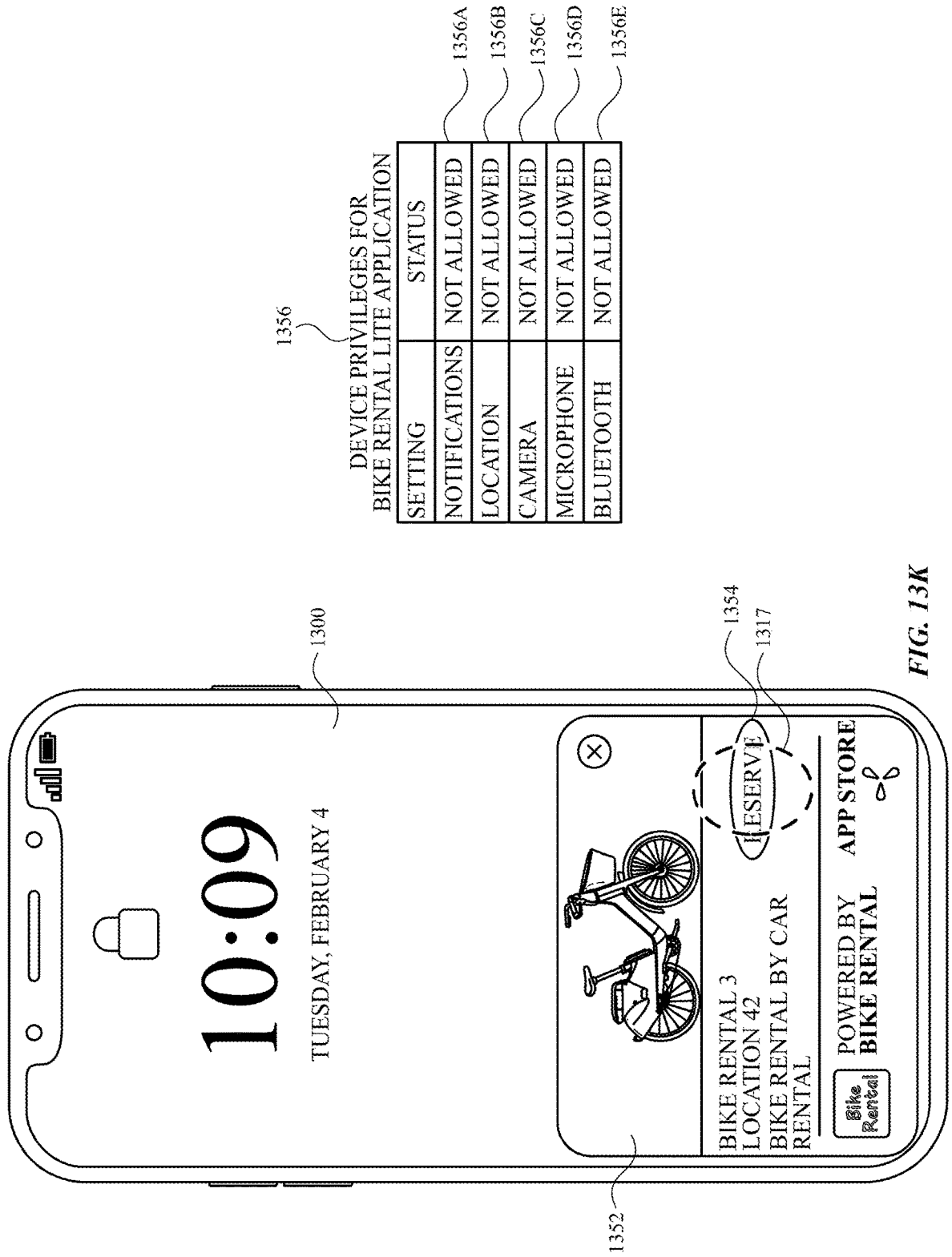

FIG. 13K illustrates computer system 700 displaying, via display generation component 702, user interface 1300 (e.g., a wake screen) and, overlaid on user interface 1300, a sheet user interface 1352. Sheet user interface 1352 corresponds to a lite-version application for a bike rental company (e.g., "Bike Rental") that is not installed on computer system 700. Sheet user interface 1352 includes an affordance 1354 for causing display of a user interface corresponding to the lite-version application of the bike rental company.

In FIG. 13K, while displaying sheet user interface 1352, computer system 700 receives (e.g., detects) an input 1317 directed to affordance 1354. In some embodiments, input 1317 is a touch input or tap input on affordance 1354. In response to receiving input 1317, computer system 700 downloads and installs the lite-version application of the bike rental company on the computer system. In some embodiments, a full-version counterpart of the lite-version application of the bike rental company is not installed on computer system 700 when the lite-version application of the bike rental company is installed on the computer system (e.g., the full-version application of the bike rental company has not been installed on the computer system; the full-version application of the bike rental company was previously installed and subsequently deleted from the computer system). In some embodiments, the full-version application of the bike rental company is not installed on computer system 700 when one or more system privileges for the lite-version application of the bike rental company are set by the user, as described below with reference to FIGS. 13L, 13M, 13O, and 13Q.

FIG. 13K also illustrates a legend 1356 that indicates setting statuses for system privileges for the lite-version application of the bike rental company. As with system privileges of the cafe, system privileges for the lite-version application of the bike rental company include permission to generate notifications (row 1356A), permission to access location information (row 1356B), permission to access a camera (row 1356C), permission to access a microphone (row 1356D), and permission to access Bluetooth (row 1356E). In FIG. 13K, the lite-version application of the bike rental company has not yet been accessed on computer system 700, and the system privileges are all set to no access (not allowed).

Figure 13L:
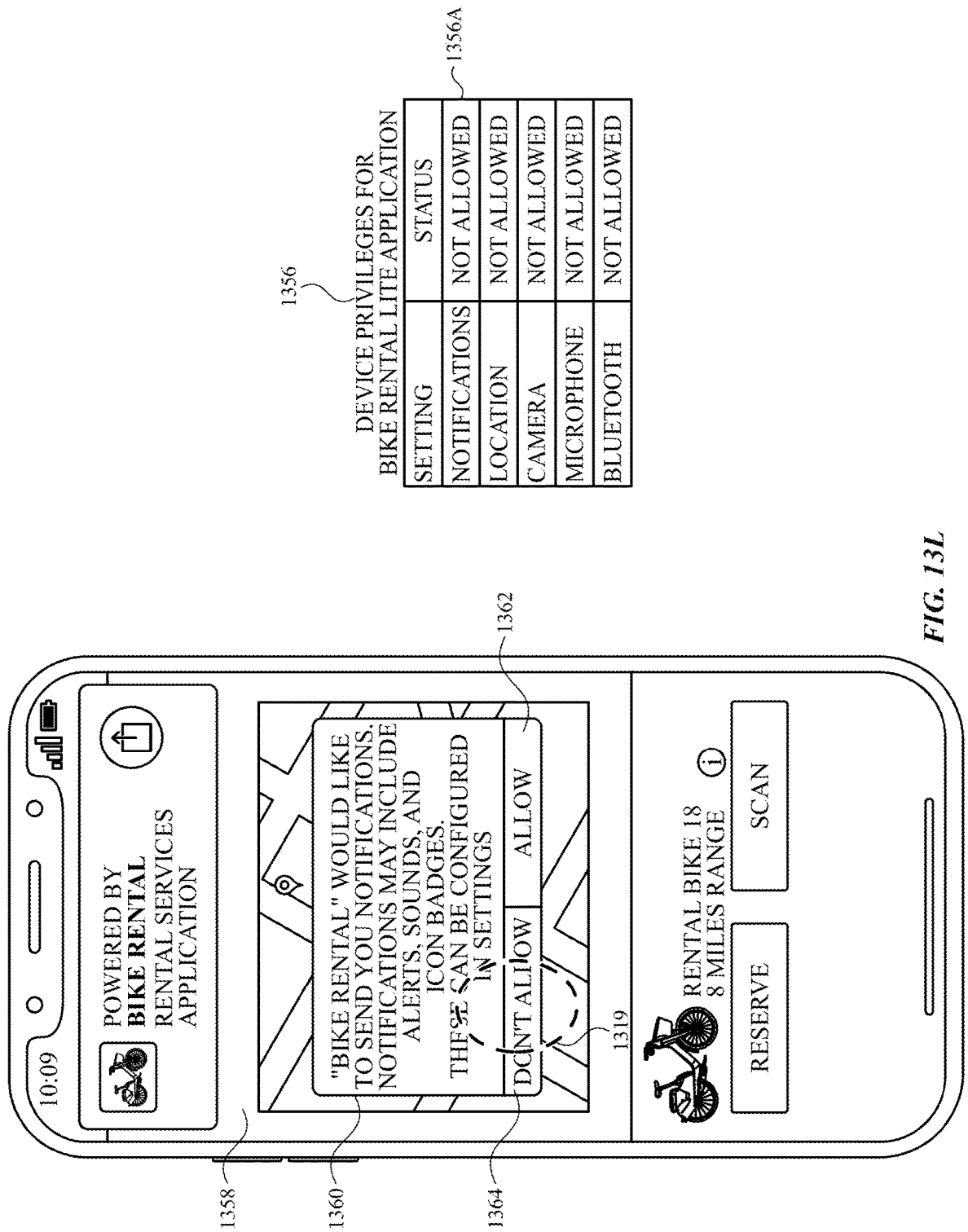

In FIG. 13L, in response to receiving input 1317, computer system 700 displays, via display generation component 702, a lite user interface 1358 corresponding to the lite-version application of the bike rental company (e.g., "Bike Rental"). Computer system 700 also displays (e.g., because the lite-version application of the cafe is being accessed for the first time on the computer system) (e.g., overlaid on lite user interface 1358) a notification permission notification 1360 from the lite-version application of the bike rental company requesting permission to generate notifications on the computer system. Notification 1360 includes an affordance 1362 that, when selected, grants the application permission to generate notifications on the computer system, and an affordance 1364 that, when selected, denies the application permission to generate notifications on the computer system.

In FIG. 13L, while displaying notification 1360, computer system 700 receives (e.g., detects) an input 1319 directed to affordance 1364 for denying permission to generate notifications on the computer system. In some embodiments, input 1319 is a touch input or tap input on affordance 1364.

In response to receiving input 1319, computer system 700 forgoes granting the lite-version application of the bike rental company permission to generate notifications on the computer system. Legend 1356 still indicates, in row 1356A, that the lite-version application of the bike rental company is denied permission to generate notifications on the computer system.

Figure 13M:
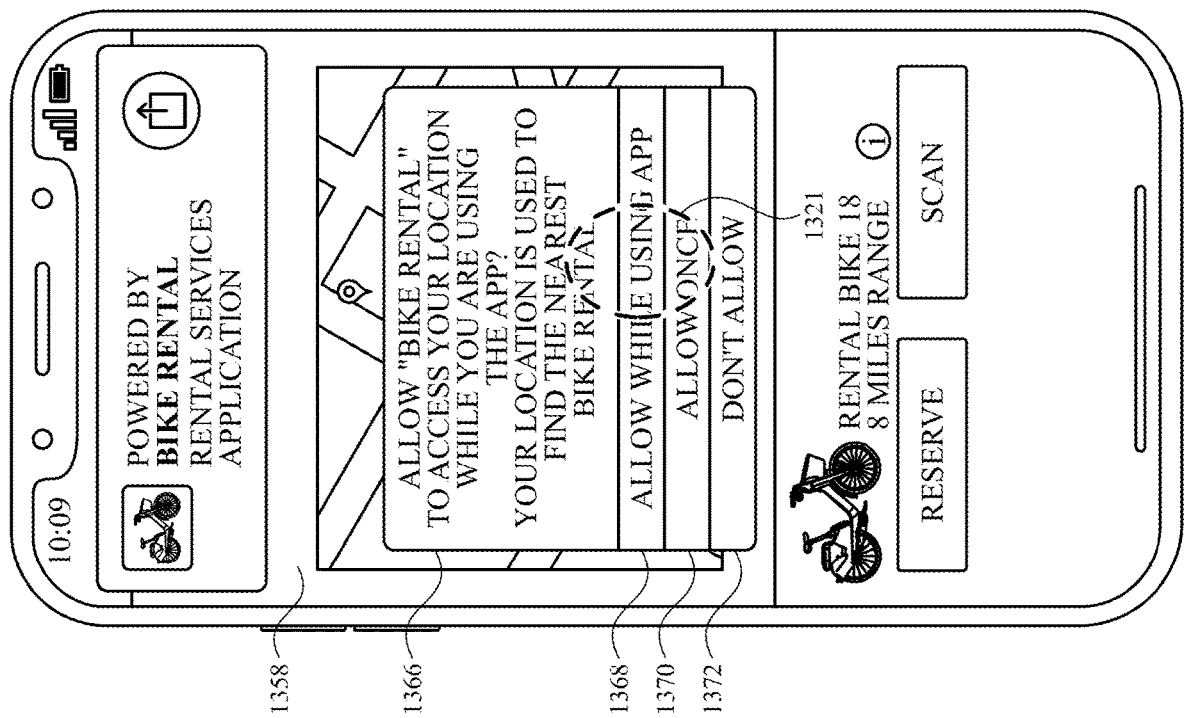

FIG. 13M illustrates computer system 700 displaying, via display generation component 702 (e.g., and overlaid on lite user interface 1358), a location permission notification 1366 from the lite-version application of the bike rental company requesting permission to access location information from the computer system. Notification 1366 includes an affordance 1368 that, when selected, grants the lite-version application permission to access location information from the computer system only while the lite-version application is being used on the computer system (e.g., while lite user interface 1358 is being displayed on the computer system), an affordance 1370 that, when selected, grants the lite-version application permission to access location information from the computer system only during the current session, and an affordance 1372 that, when selected, denies the lite-version application permission to access location information from the computer system.

In FIG. 13M, while displaying notification 1366, computer system 700 receives (e.g., detects) an input 1321 directed to affordance 1368 for granting permission to access location information from the computer system only while the application is being used on the computer system. In some embodiments, input 1321 is a touch input or tap input on affordance 1368.

In response to receiving input 1321, computer system 700 grants the lite-version application of the bike rental company permission to access location information from the computer system only while the lite-version application is being used on the computer system. Legend 1356 now indicates, in row 1356B, that the lite-version application of the bike rental company is granted permission to access location information from the computer system only while the lite-version application is being used.

Figure 13N:
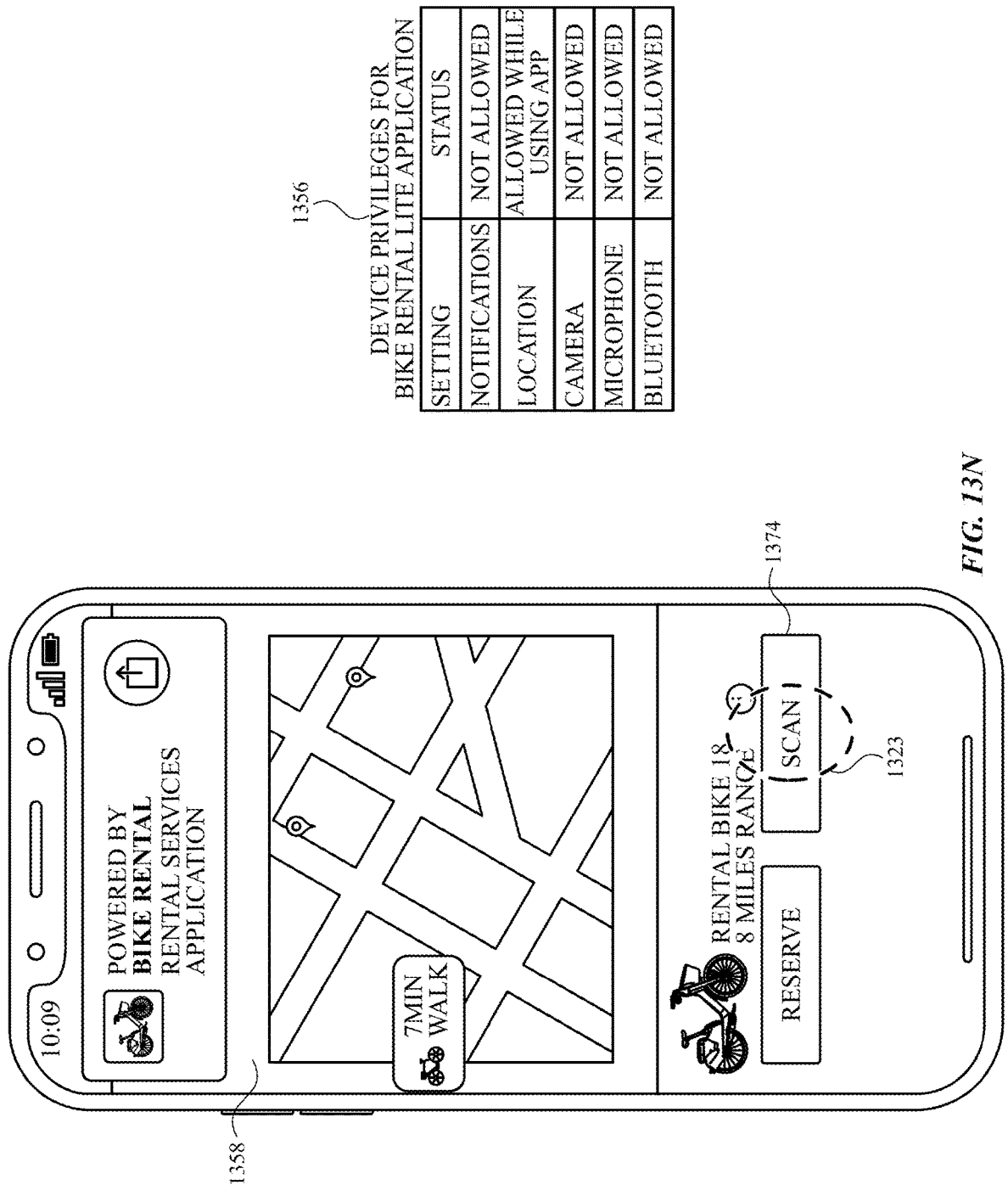
Figure 130:
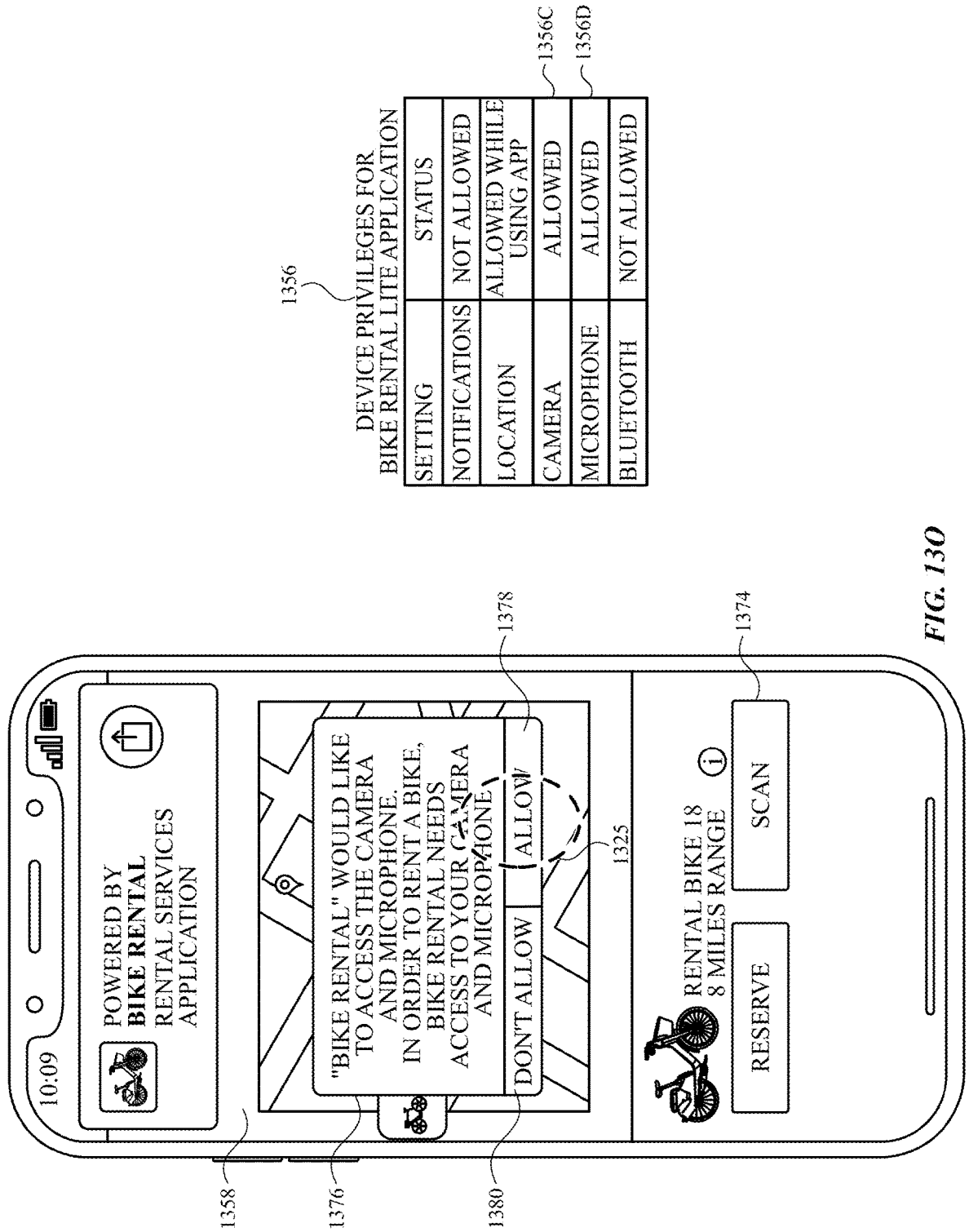

FIG. 13N illustrates computer system 700 displaying, via display generation component 702, lite user interface 1358, where lite user interface 1358 includes an affordance 1374 for accessing a camera application on the computer system.

In FIG. 13N, while displaying user interface 1358, computer system 700 receives (e.g., detects) an input 1323 directed to affordance 1374. In some embodiments, input 1323 is a touch input or tap input on affordance 1374.

Also in FIG. 13N, legend 1356 indicates that system privileges for the lite-version application of the bike rental company remain unchanged from FIG. 13M.

In FIG. 13O, in response to receiving input 1309, computer system 700 displays, via display generation component 702 (e.g., and overlaid on lite user interface 1358), a camera and microphone access permission notification 1376 from the lite-version application of the bike rental company requesting permission to access both the camera and the microphone of the computer system. Notification 1376 includes an affordance 1378 that, when selected, grants the application permission to access the camera and the microphone of the computer system and an affordance 1380 that, when selected, denies the application permission to access the camera and the microphone of the computer system.

In FIG. 13O, while displaying notification 1376, computer system 700 receives (e.g., detects) an input 1325 directed to affordance 1378 for granting permission to access the camera and the microphone on the computer system. In some embodiments, input 1325 is a touch input or tap input on affordance 1378.

In response to receiving input 1325, computer system 700 grants the lite-version application of the bike rental company permission to access both the camera and the microphone on the computer system. Legend 1356 now indicates, in rows 1356C and 1356D, that the lite-version application of the bike rental company is granted permission to access the camera and the microphone on the computer system.

Figure 13P:
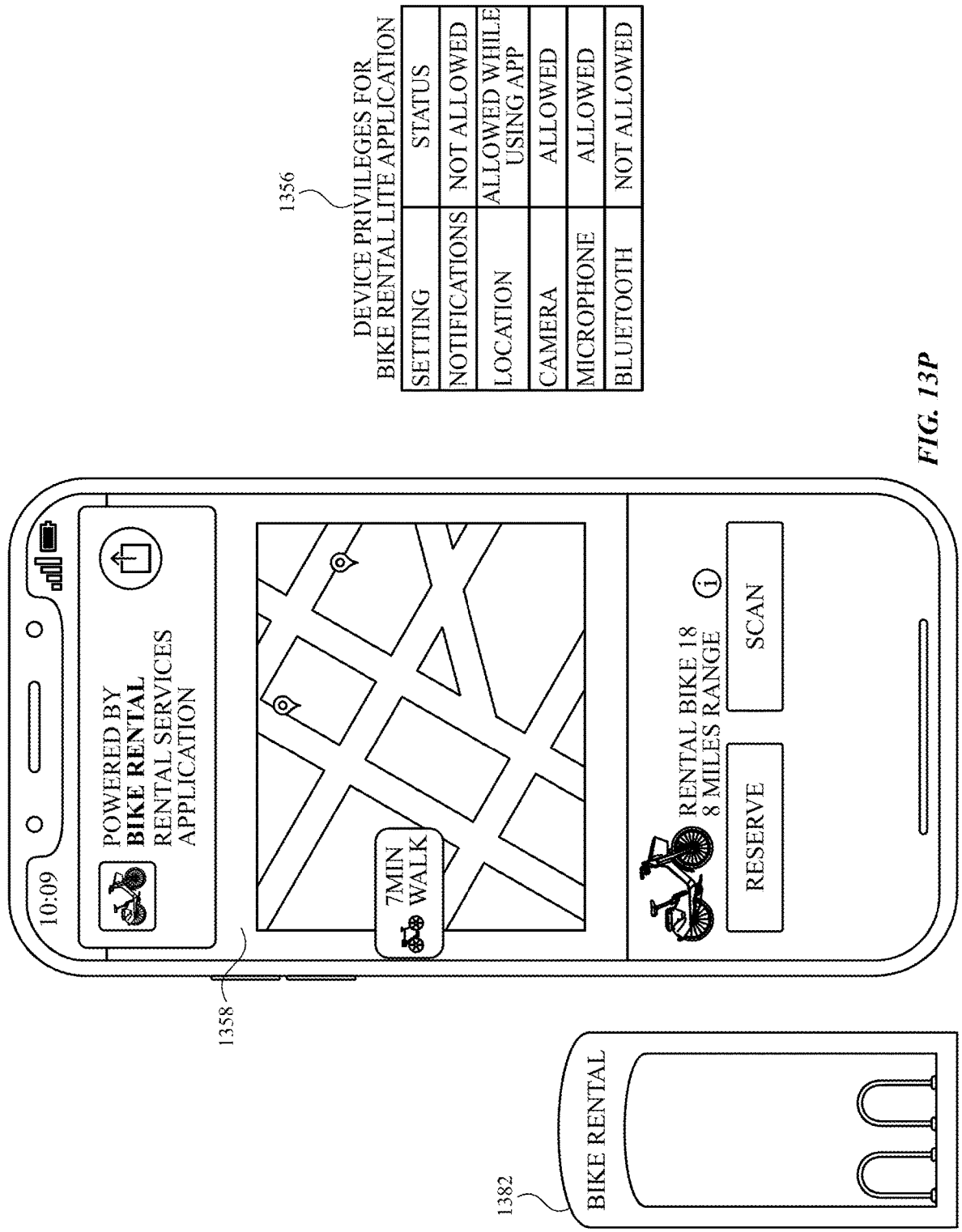

FIG. 13P illustrates computer system 700 in proximity with a bike rental station 1382 of the bike rental company such that computer system 700 can communicate (e.g., via Bluetooth) with bike rental station 1382. In the embodiment of FIG. 13P, device 700 displays lite user interface 1358 corresponding to the bike rental application. In some embodiments, device 700 displays a different user interface (e.g., the home user interface, the wake screen; of a different application) or display generation component 702 is in an off state.

In FIG. 13P, legend 1356 indicates that the system privileges for the lite-version application of the bike rental company remains the same as in FIG. 13O prior to communicating with bike rental station 1382.

Figure 13Q:
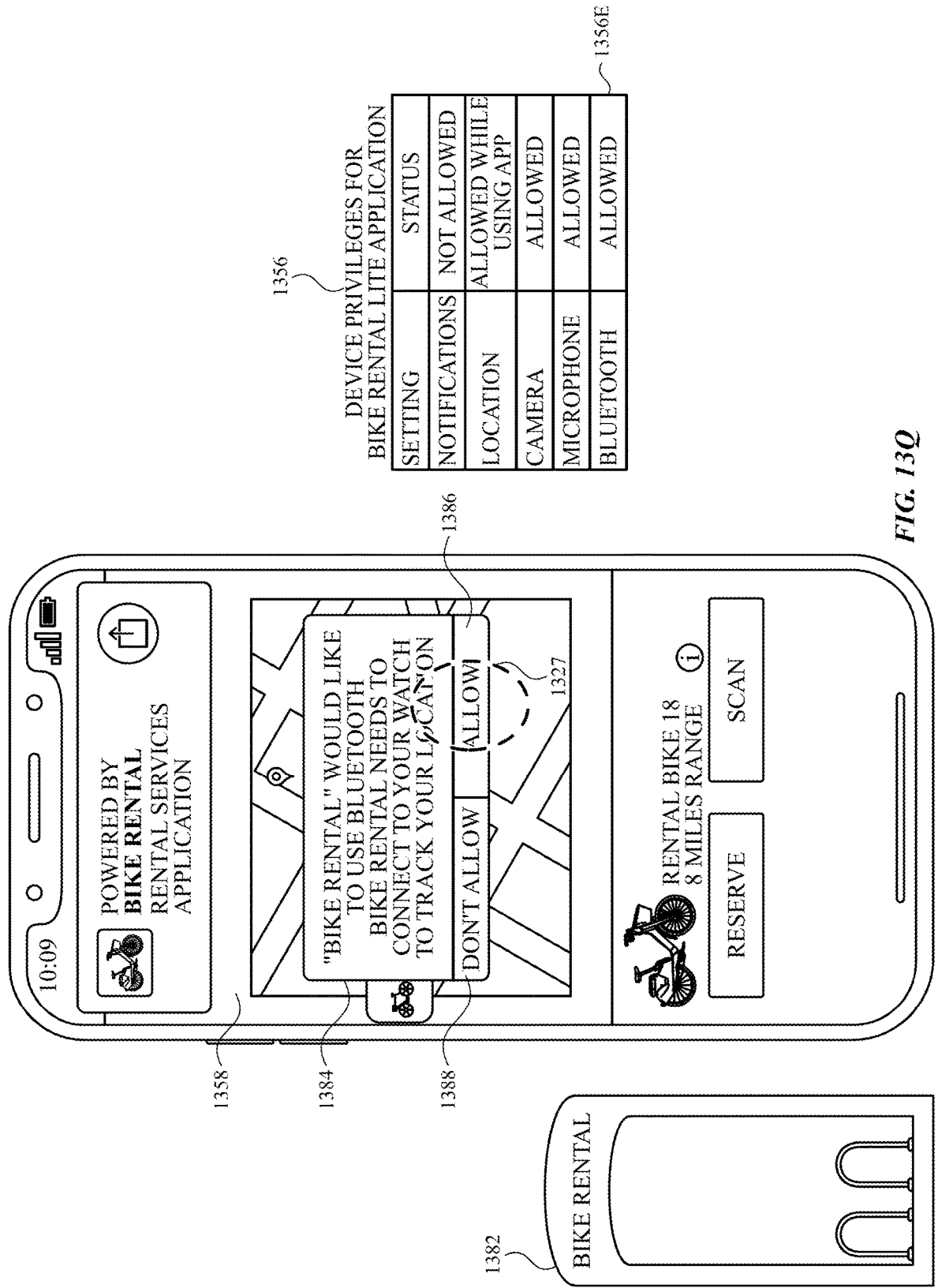

In FIG. 13Q, upon detecting the presence of bike rental station 1382, computer system 700 displays, via display generation component 702 (e.g., and overlaid on lite user interface 1358), a Bluetooth access permission notification 1384 from the lite-version application of the bike rental company requesting permission to access Bluetooth on the computer system (to enable the lite-version application to communication with bike rental station 1382). Notification 1384 includes an affordance 1386 that, when selected, grants the lite-version application permission to access Bluetooth on the computer system and an affordance 1380 that, when selected, denies the lite-version application permission to access Bluetooth on the computer system.

In FIG. 13Q, while displaying notification 1384, computer system 700 receives (e.g., detects) an input 1327 directed to affordance 1386 for granting permission to access Bluetooth on the computer system. In some embodiments, input 1327 is a touch input or tap input on affordance 1386.

In response to receiving input 1325, computer system 700 grants the lite-version application of the bike rental company permission to access Bluetooth on the computer system. Legend 1356 now indicates, in row 1365E, that the lite-version application of the bike rental company is granted permission to access Bluetooth on the computer system.

Figure 13R:
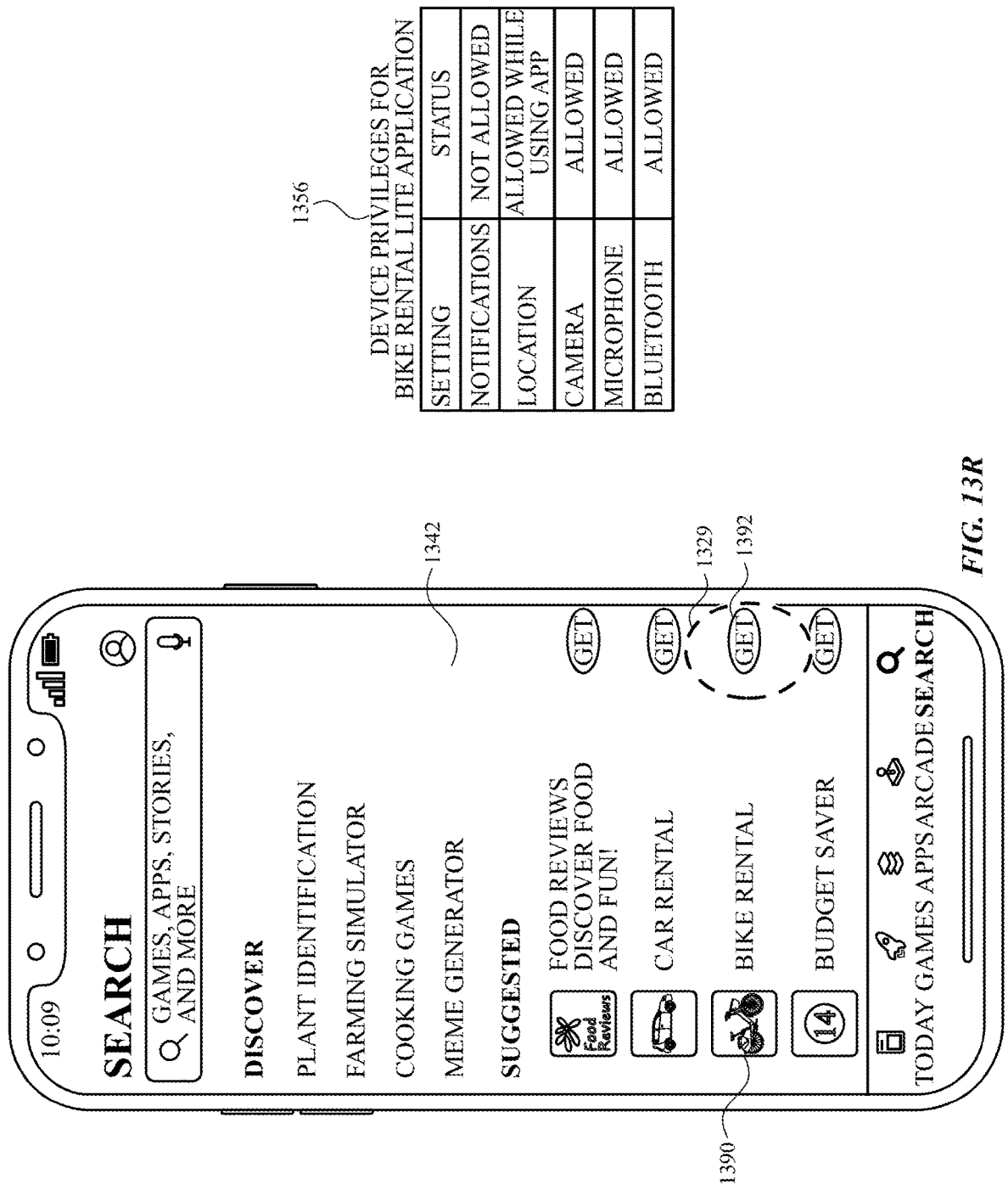

FIG. 13R illustrates computer system 700 displaying, via display generation component 702, user interface 1342 of the application store, where user interface 1342 includes an indication 1390 that the full-version application of the bike rental company (e.g., "Bike Rental") can be downloaded and installed on the computer system and an affordance 1392 for downloading and installing the full-version application of the bike rental company on the computer system.

In FIG. 13R, while displaying user interface 1342 of the application store, computer system 700 receives (e.g., detects) an input 1329 directed to affordance 1392. In response to receiving input 1329, computer system 700 initiates a process for downloading and installing the full-version application of the bike rental company on the computer system.

Also in FIG. 13R, legend 1356 indicates that system privileges for the lite-version application of the bike rental company remains unchanged from FIG. 13Q when the counterpart full-version application of the bike rental company is downloaded an installed on the computer system.

Figure 13S:
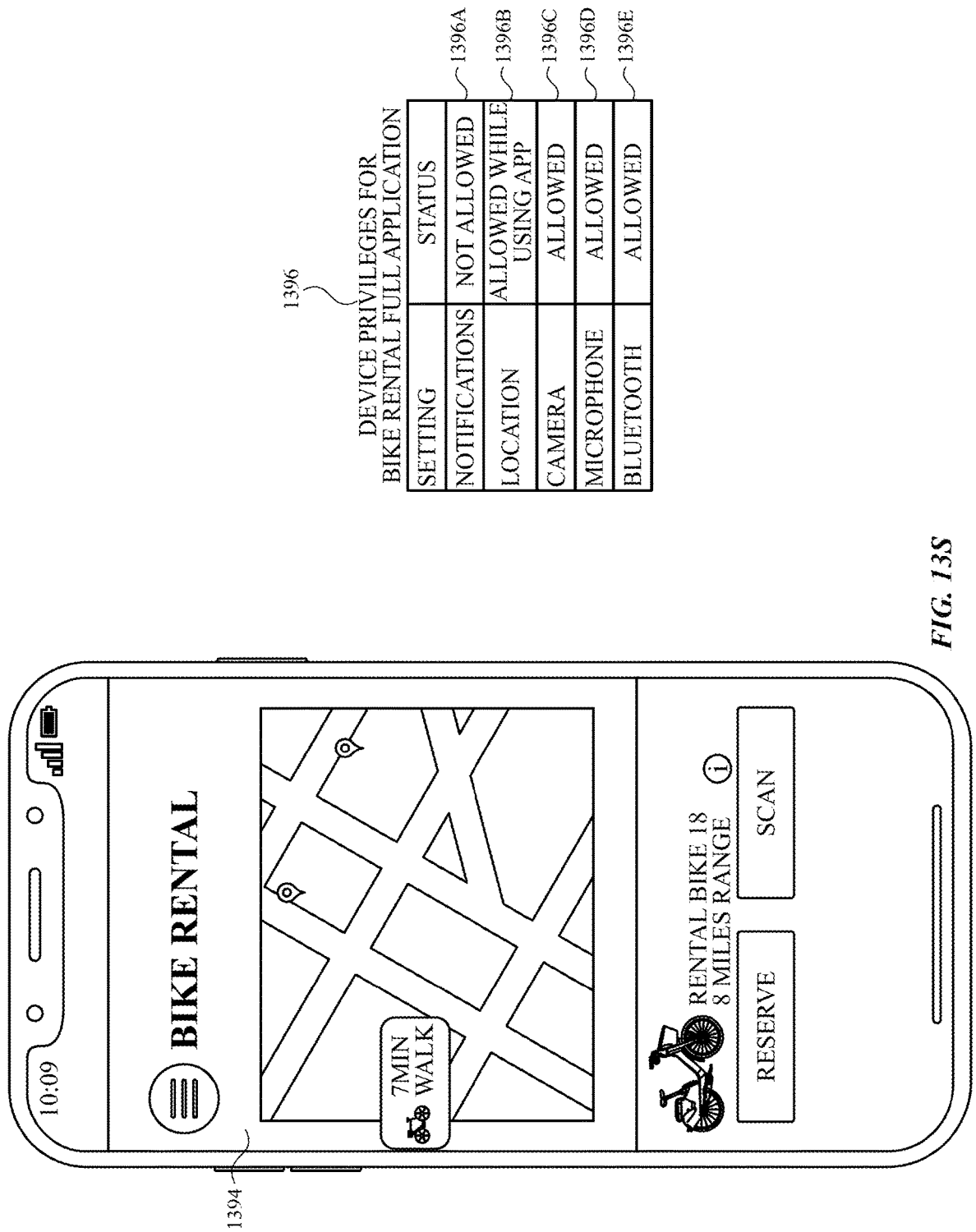

FIG. 13S illustrates computer system 700 displaying, after having downloaded and installed the full-version application of the bike rental company on the computer system, a user interface 1394 corresponding to the full-version application of the bike rental company.

In FIG. 13S, legend 1396 for the full-version application indicates that system privileges for the full-version application of the bike rental company are set to be the same as what the system privileges for the lite-version application of the bike rental company were at the time when the full-version counterpart was downloaded and installed on the computer system, as indicated by rows 1396A-1396E (as compared to rows 1396A-1396E of legend 1356, respectively, in FIG. 13R).

As mentioned above with reference to FIG. 13I, in some embodiments, as in FIGS. 13I and 13S, when a full-version application is downloaded and installed on computer system 700, all of the system privileges for the counterpart lite-version application that was installed on the computer system 700 are automatically, without user input, carried over and applied to the system privileges for the full-version application. In FIG. 13S, all of the system privileges for the full-version application of the bike rental company, as indicated by rows 1396A-1396E of legend 1396, have been carried over from the system privileges for the lite-version application of the lite-version application of the bike rental company at the time the full-version application was downloaded and installed on the computer system.

Figure 13T:
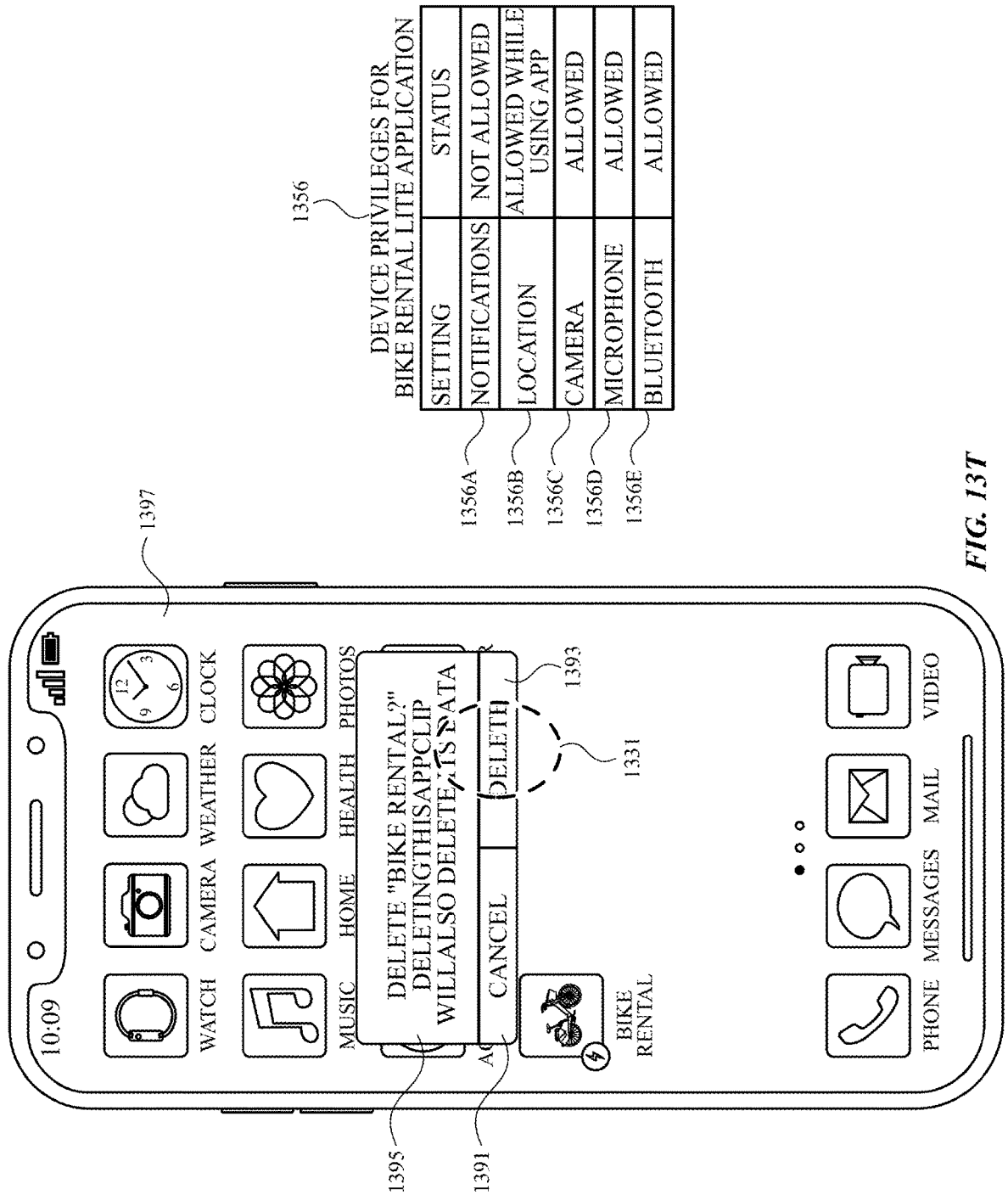

FIG. 13T illustrates computer system 700 system displaying, via display generation component 702 (e.g., and overlaid on a home user interface 1397), a notification 1395 requesting confirmation as to whether the lite-version application of the bike rental company should be deleted from the computer system, where notification 1395 includes an affordance 1393 that, when selected, initiates a process for deleting the lite-version application of the bike rental company from the computer system and an affordance 1391 that, when selected, forgoes deleting the lite-version application of the bike rental company from the computer system. In FIG. 13T, the lite-version application is already installed on computer system 700, with its system privileges set as shown by rows 1356A-1356E in legend 1356—notifications permission denied, location access permission allowed while the application is being used, camera access permission allowed, microphone access allowed, and Bluetooth access allowed.

In FIG. 13T, while displaying notification 1395, computer system 700 receives (e.g., detects) an input 1331 directed to affordance 1393. In some embodiments, input 1331 is a touch input or tap input on affordance 1393. In response to receiving input 1331, computer system 700 deletes the lite-version application of the bike rental company from the commuter system.

Figure 13U:
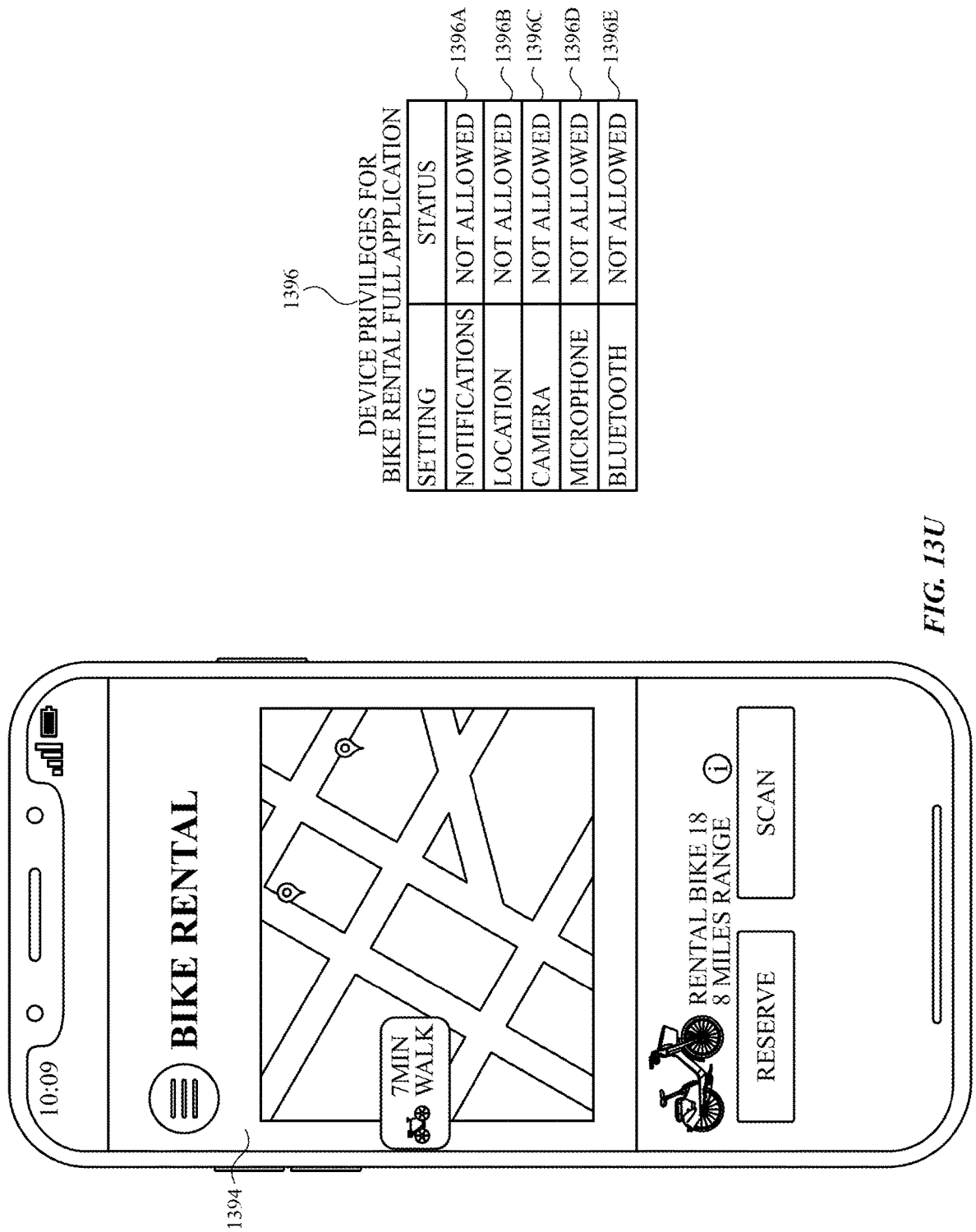
Figure 13V:

FIG. 13U illustrates computer system 700 displaying, via display generation component 702, user interface 1394 corresponding to the full-version application of the bike rental company, where the full-version application of the bike rental company was downloaded and installed on the computer system after the lite-version counterpart was already deleted from the computer system as in FIG. 13T.

In FIG. 13U, upon downloading and installing the full-version application of the bike rental company when the lite-version counterpart was not installed on the computer system, computer system 700 sets the system privileges for the full-version application of the bike rental company to be default system privileges (instead of setting the system privileges to correspond to those that had previously been set for the lite-version counterpart, as in FIG. 13R). In some embodiments, as shown by rows 1396A-1396E of legend 1396 in FIG. 13U, default system privileges do not grant access permission for any of the system privileges.

FIG. 13V illustrates computer system 700 first displaying user interface 1300 at a first time and later displaying user interface 1300 at a second time that is later than the first time. In the embodiment of FIG. 13T, computer system 700 is first displaying user interface 1300 at 10:09 am, as indicated via time indicator 1398 of user interface 1300 in the left depiction, and is next displaying user interface 1300 at 7:09 pm, as indicated via time indicator 1398 of user interface 1300 in the right depiction.

In FIG. 13V, the lite-version application of the bike rental company is installed on computer system 700 (while the full-version counterpart is not installed on the computer system), where the lite-version application has been granted notification permission to generate notifications on the computer system.

In some embodiments, upon detecting (e.g., determining) the occurrence of an event that would generate a notification (e.g., the user is close to a bike rental station; the user is at a bike rental station; the distance allowance for a rented bike is running out; the time allowance for renting a bike is running out) the lite-version application of the bike rental company generates a notification 1399 regarding the event, as in the left depiction of computer system 700 in FIG. 13V.

In some embodiments (e.g., even if permission to generate notifications is granted for the lite-version application of the bike rental company) notifications from the lite-version application are granted for a limited time period (e.g., 8 hours; 12 hours; the current day) from the time when the lite-version application was last accessed on computer system 700 (e.g., from the time when lite user interface 1358 corresponding to the lite-version application of the bike rental company was last displayed on the computer system). In some embodiments, if more than the limited time period has passed since the lite-version application was last accessed on computer system 700, the computer system prevents the lite-version application from generating notifications on the computer system, as in the right depiction of FIG. 13V (e.g., even if the occurrence of an event that would generate a notification is detected). In some embodiments, computer system 700 automatically grants the lite-version application permission to generate notifications again for the limited time period when the lite-version application is again accessed on the computer system (e.g., accessing the lite-version application restarts the time period for permission to generate notifications).

FIGS. 14A-14B are a flow diagram illustrating a method for managing settings for applications used to enable activities using a computer system, in accordance with some embodiments. Method 1400 is performed at a computer system (e.g., 100, 300, 500, 700) (e.g., an electronic device; a smart device, such as a smartphone or a smartwatch; a mobile device; a wearable device) that is in communication with one or more input devices (e.g., including a touch-sensitive surface that is integrated with a display generation component). Some operations in method 1400 are, optionally, combined, the orders of some operations are, optionally, changed, and some operations are, optionally, omitted.

As described below, method 1400 provides an intuitive way for managing applications using a computer system. The method reduces the cognitive burden on a user for managing applications using a computer system, thereby creating a more efficient human-machine interface. For battery-operated computing devices, enabling a user to enable an activity faster and more efficiently conserves power and increases the time between battery charges.

The computer system (e.g., 700) detects (1402) (e.g., via the one or more sensors (e.g., location sensors; GPS sensors)) the occurrence of a triggering condition (e.g., scanning a QR code; detecting an NFC signal; detecting selection of a hyperlink; detecting/determining the presence of the computer system near a location beacon; detecting/determining the presence of the computer system at/in a specific geographic location) for initiating an activity (e.g., making a reservation; making an order; making a booking; making a payment; making a request) that is associated with a first application (e.g., an application corresponding to a vendor, an entity (e.g., a company), a merchant, a store, a restaurant, and/or a service provider). In some embodiments, in response to detecting the occurrence of the triggering condition, the computer system displays, via a display generation component (e.g., 702) that is in communication with the computer system, a user interface (e.g., 1302; 1352) that includes an affordance (e.g., 1304; 1354) for requesting invocation of an application (e.g., corresponding to lite user interface 1308 for the cafe depicted in FIG. 13B; corresponding to lite user interface 1358 of the bike rental company depicted in FIG. 13L) used to perform the activity (e.g., as described above with reference to FIGS. 7A-7AZ).

While the first application (e.g., the full-version application of the cafe, as depicted in FIG. 13I; the full-version application of the bike rental company, as depicted in FIG. 13S) is not installed on the computer system (e.g., 700) (1404), the computer system installs (1406) (e.g., in response to detecting an invocation request), on the computer system and based on the detected triggering condition, a second application (e.g., the lite-version application of the cafe, as depicted in FIG. 13B; the lite-version application of the bike rental company, as depicted in FIG. 13L) that is configured to perform the activity without downloading at least a portion of the first application (e.g., the first application is a full-version application and the second application is a lite-version counterpart of the full-version application). In some embodiments, in response to installing the second application, the computer system displays, via a display generation component (e.g., 702), a user interface (e.g., 1308; 1358) corresponding to the second application. Installing (e.g., automatically, without further user input) the second application on the computer system, where the second application is configured to perform the activity without downloading at least the portion of the first application, provides access to the activity that can be performed on the computer system in an efficient and convenient manner. Providing efficient and convenient access to performing the activity on the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

While the first application is not installed on the computer system (e.g., 700) (1404), the computer system sets (1408) one or more system privileges (e.g., system privileges depicted in legend 1306; system privileges depicted in legend 1356) for the second application (e.g., the lite-version application of the cafe, as depicted in FIG. 13B; the lite-version application of the bike rental company, as depicted in FIG. 13L) (e.g., permission settings (e.g., notification permission; location access permission; camera/microphone access permission; Bluetooth access permission) for the second application). In some embodiments, the one or more system privileges for the second application are set by a user in a settings menu or settings user interfaces for the second application. In some embodiments, the one or more system privileges for the second application are set via one or more prompts (e.g., 1310, 1320, 1330, 1336, 1360, 1366, 1376, 1384) from the second application (e.g., requesting user decisions on the system privileges for the second application).

After setting the one or more system privileges for the second application, the computer system (e.g., 700) installs (1410), on the computer system, the first application (e.g., the full-version application of the cafe, as depicted in FIG. 13I; the full-version application of the bike rental company, as depicted in FIG. 13S) (e.g., in response to detecting, via the one or more input devices, a request to install the first application on the computer system (e.g., via an application store that is accessible on the computer system)).

After (e.g., in response to) installing the first application (e.g., the full-version application of the cafe, as depicted in FIG. 13I; the full-version application of the bike rental company, as depicted in FIG. 13S) on the computer system (e.g., 700) (1412), in accordance with a determination that the second application (e.g., the lite-version application of the cafe, as depicted in FIG. 13B; the lite-version application of the bike rental company, as depicted in FIG. 13L) was installed on the computer system when installing the first application occurred (e.g., the second application was previously installed on the computer system and has not been removed prior to installation of the first application, such that the second application is installed on the computer system at the time of installation of the first application (e.g., as in FIG. 13H)), the computer system sets (1414) (e.g., configuring (e.g., automatically, without user input) the computer system to have) one or more system privileges for the first application (e.g., permission settings (e.g., notification permission; location access permission; camera/microphone access permission; Bluetooth access permission) for the first application) based (e.g., at least partly) on the one or more system privileges for the second application (e.g., setting the one or more system privileges of the first application to correspond to (e.g., to be analogous to) the one or more system privileges of the second application; system privileges for the second application are applied/carried over to the first application). Setting the one or more privileges for the first application based on the one or more system privileges for the second application in accordance with a determination that the second application was installed on the computer system when installing the first application occurred enables the one or more system privileges for the first application to be set in a convenient and intuitive manner and prevents the need for a user to manually reset the one or more system privileges to maintain consistency with the previous settings. Reducing the number of inputs needed to perform an operation enhances the operability of the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

After (e.g., in response to) installing the first application (e.g., the full-version application of the cafe, as depicted in FIG. 13I; the full-version application of the bike rental company, as depicted in FIG. 13S) on the computer system (e.g., 700) (1412), in accordance with a determination that the second application (e.g., the lite-version application of the cafe, as depicted in FIG. 13B; the lite-version application of the bike rental company, as depicted in FIG. 13L) was not installed on the computer system when installing the first application occurred (e.g., as depicted in FIG. 13U) (e.g., the second application was previously installed on the computer system, but has been removed (e.g., by the user or the computer system) prior to installation of the first application and is not installed on the computer system at the time of installation of the first application), the computer system sets (1416) the one or more system privileges for the first application based on default system privileges (e.g., without regard to the one or more system privileges for the second application; system privileges for the second application are not applied/carried over to the first application). Setting the one or more system privileges for the first application based on the default system privileges in accordance with the determination that the second application was not installed on the computer system when installing the first application occurred enables the one or more system privileges for the first application to be set in a convenient and intuitive manner without additional inputs to manually set the system privileges. Reducing the number of inputs needed to perform an operation enhances the operability of the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the one or more system privileges for the second application (e.g., the lite-version counterpart to the full-version first application) (e.g., the lite-version application of the cafe, as depicted in FIG. 13B; the lite-version application of the bike rental company, as depicted in FIG. 13L) exclude permission for persistent access (e.g., always on access; unlimited access) to location information (1418) (e.g., as indicated via notifications 1320 and 1366). In some embodiments, the second application cannot request (e.g., is denied from requesting) persistent access to location information.

In some embodiments, the first application (e.g., the full-version application of the cafe, as depicted in FIG. 13I;

the full-version application of the bike rental company, as depicted in FIG. 13S) is enabled to request persistent access to location information. In some embodiments, the one or more system privileges for the first application include persistent (e.g., always allowed; always on) access to location information. In some embodiments, the computer system grants the second application (e.g., the lite-version application of the cafe, as depicted in FIG. 13B; the lite-version application of the bike rental company, as depicted in FIG. 13L) permission for the persistent (e.g., always allowed; always on) access to location information for a predetermined time period (e.g., until the end of the current day; 24 hours; 8 hours). Not including (e.g., denying) permission for persistent access to location information enables the computer system to reduce power consumption, in particular during circumstances when the power consumption may be unnecessary (e.g., when the second application is not being actively used on the computer system by a user) which, additionally, improves battery life of the computer system. Not including (e.g., denying) permission for persistent access to location information also avoids granting an application that is not a full-version application and is designed for temporary use (unlike a full-version application) unnecessary access to persistent use of location information, which improves system security by avoiding granting unnecessary access to a system privilege.

In some embodiments, the one or more system privileges for the second application (e.g., the lite-version application of the cafe, as depicted in FIG. 13B; the lite-version application of the bike rental company, as depicted in FIG. 13L) include a first type of permission (e.g., permission to request access to location information for a predetermined limited time period) and exclude a second type of permission different from the first type of permission (e.g., permission to request persistent (e.g., always on) access to location information) (1420). In some embodiments, both the first type of permission and the second type of permission are available to the first application. In some embodiments, the second application has access to a restricted set of permissions as compared to the first application. Enabling the second application to be able to access the first type of permission without being able to access the second type of permission, thereby restricting the types of system privileges that are available to the second application, enhances system security and prevents the second application from automatically accessing certain system privileges that may increase power consumption which, in turn, reduces power usage by the second application and improves battery life of the computer system.

In some embodiments, the one or more system privileges for the second application (e.g., the lite-version application of the cafe, as depicted in FIG. 13B; the lite-version application of the bike rental company, as depicted in FIG. 13L) (e.g., and for the first application) include one or more of: permission for access to a camera (e.g., that is in communication with the computer system) (e.g., as shown via notifications 1330 and 1376), permission for access to a microphone (e.g., that is in communication with the computer system) (e.g., as shown via notifications 1336 and 1376), permission for access to Bluetooth (e.g., as shown via notification 1384), or permission for access to location information (e.g., current location of the computer system detected/determined via the one or more sensors (e.g., GPS sensors; using WiFi triangulation; using Bluetooth beacons)) (e.g., as shown via notifications 1320 and 1366) (e.g., for a limited duration) (1422).

In some embodiments, setting the one or more system privileges for the first application (e.g., the full-version application of the cafe, as depicted in FIG. 13I; the full-version application of the bike rental company, as depicted in FIG. 13S) based on the default system privileges includes, in accordance with a determination that the one or more system privileges for the second application (e.g., the lite-version application of the cafe, as depicted in FIG. 13B; the lite-version application of the bike rental company, as depicted in FIG. 13L) include an indication that permission for access to location information has been denied (e.g., the second application was denied permission to access location information), setting the one or more system privileges for the first application to include denial of permission for access to location information (e.g., if the second application was denied permission for access to location information, also deny permission for access to location information for the first application). Forgoing setting the one or more system privileges for the first application to include permission for access to location information in accordance with the determination that the one or more system privileges for the second application do not include permission for access to location information ensures to a user that a denied system privilege is maintained, thereby enhancing system security and preventing the need for a user to manually deny the same system privilege, which in turn further enhances the operability of the computer system and makes the user-system interface more efficient (e.g., by allowing the user to not have to manually re-set system privileges) which, additionally, reduces power usage and improves battery life of the computer system.

In some embodiments, setting the one or more system privileges for the first application (e.g., the full-version application of the cafe, as depicted in FIG. 13I; the full-version application of the bike rental company, as depicted in FIG. 13S) based on the default system privileges includes, in accordance with a determination that the one or more system privileges for the second application (e.g., the lite-version application of the cafe, as depicted in FIG. 13B; the lite-version application of the bike rental company, as depicted in FIG. 13L) include the indication that permission for access to location information has been granted (e.g., as in FIGS. 13D and 13M) (e.g., the second application was not denied permission to access location information), forgoing setting permission for access to location information for the first application. Requesting permission for access to location information for the first application even if the one or more system privileges for the second application include permission for access to location information prevents the first application from automatically being granted permission to access location information without a user's express consent, thereby enhancing system security.

In some embodiments, after the first application (e.g., the full-version application of the cafe, as depicted in FIG. 13I; the full-version application of the bike rental company, as depicted in FIG. 13S) has been installed and after the second application (e.g., the lite-version application of the cafe, as depicted in FIG. 13B; the lite-version application of the bike rental company, as depicted in FIG. 13L) was granted permission for access to location information (1424), the computer system (e.g., 700) detects (1426) the occurrence of a condition under which the first application has a use for location information. In some embodiments, in response to detecting the occurrence of the condition under which the first application has a use for location information (1428), in accordance with the determination that the one or more system privileges for the second application do not include the indication that permission for access to location information has been denied (e.g., because the location permission granted to the second application was not applied to the first application, as described with reference to FIG. 13J), the computer system displays (1430) (e.g., via a display generation component that is in communication with the computer system) a request (e.g., a prompt; a notification) for permission for access to location information by the first application.

In some embodiments, in response to detecting the occurrence of the condition under which the first application (e.g., the full-version application of the cafe, as depicted in FIG. 13I; the full-version application of the bike rental company, as depicted in FIG. 13S) has a use for location information and in accordance with the determination that the one or more system privileges for the second application (e.g., the lite-version application of the cafe, as depicted in FIG. 13B; the lite-version application of the bike rental company, as depicted in FIG. 13L) include the indication that permission for access to location information has been denied (e.g., because the location permission denied to the second application was applied to the first application), the computer system denies access to the location information (e.g., without displaying a request for permission for access to location information by the first application). Displaying the request for permission for access to location information for the first application if the one or more system privileges for the second application include permission for access to location information enables a user to quickly and easily authorize a similar system privilege for the first application as for the second application with fewer inputs. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Displaying the request for permission for access to location information for the first application if the one or more system privileges for the second application include permission for access to location information also enhances system security by avoiding automatically allowing a type of system access without the user's express authorization.

Note that details of the processes described above with respect to method 1400 (e.g., FIGS. 14A-14B) are also applicable in an analogous manner to the methods described above. For example, method 800 optionally includes one or more of the characteristics of the various methods described above with reference to method 1400. For example, the process for setting the one or more system privileges for an application described with reference to FIGS. 13A-13V can be applied to the software corresponding to the user interface that is configured to perform the activity without downloading at least a portion of an application as described with reference to FIGS. 7A-7AZ. For another example, method 1000 optionally includes one or more of the characteristics of the various methods described above with reference to method 1400. For example, the process for setting the one or more system privileges for an application described with reference to FIGS. 13A-13V can be applied to the application for enabling an activity on a respective computer system described with reference to FIGS. 9A-9T. For another example, method 1200 optionally includes one or more of the characteristics of the various methods described above with reference to method 1400. For example, the process for setting the one or more system privileges for an application described with reference to FIGS. 13A-13V can be applied to the plurality of automatically downloaded applications described with reference to FIGS. 11A-11S. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of suggestions of one or more activities that can be performed using the electronic device. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to display suggestions for an activity or enable the user to perform the activity using the electronic device. Accordingly, use of such personal information data enables users to quickly and conveniently access the activity on the electronic device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of using the device's location to suggest or enable an activity, the present technology can be configured to allow users to select to "opt in" or "opt out" of participation in the collection of personal information data during registration for services or anytime thereafter. In another example, users can select not to have activities suggested on the electronic device based on the collection of personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an activity can be suggested or enabled on the electronic device based on non-personal information data or a bare minimum amount of personal information, such as the activity being suggested or enabled based on information obtained via NFC or a QR Code.

What is claimed is:

1. A computer system, comprising:
a display generation component;
one or more input devices;
one or more processors; and
memory storing one or more programs configured to be executed by the one or more processors, the one or more programs including instructions for:
detecting the occurrence of a triggering condition for initiating an activity that is associated with a first application;
in response to detecting the occurrence of the triggering condition, displaying, via the display generation component, a first user interface, wherein displaying the first user interface includes concurrently displaying:
a description of the activity, and
a first selectable user interface object for taking action associated with the activity;
while displaying the first user interface, detecting, via the one or more input devices, activation of the first selectable user interface object; and
in response to detecting the activation of the first selectable user interface object:
in accordance with a determination that the first application is not available on the computer system, displaying, via the display generation component, a second user interface that is configured to perform the activity without downloading at least a first portion of the first application, wherein the second user interface is generated based on a second portion of the first application that was downloaded after detecting occurrence of the triggering condition, and wherein the first portion of the first application is different from the second portion of the first application.

2. The computer system of claim 1, wherein displaying the second user interface includes displaying the second user interface without requesting authentication information to authorize display of the second user interface.

3. The computer system of claim 1, the one or more programs further including instructions for:
in accordance with the determination that the first application is not available on the computer system, initiating a process for downloading software configured to perform the activity that does not include at least the portion of the first application on the computer system.

4. The computer system of claim 1, the one or more programs further including instructions for:
in response to detecting the activation of the first selectable user interface object:
in accordance with a determination that the first application is available on the computer system, displaying, via the display generation component, a third user interface, wherein the third user interface is a user interface of the first application that is configured to perform the activity.

5. The computer system of claim 4, wherein the second user interface corresponds to software configured to perform the activity that does not include at least the portion of the first application of the first application and the third user interface corresponds to the first application, wherein the software configured to perform the activity that does not include at least the portion of the first application and the first application both correspond to a common application source.

6. The computer system of claim 1, wherein displaying the first user interface comprises displaying the first user interface over a background user interface.

7. The computer system of claim 1, wherein the first user interface or the second user interface includes information related to the activity, wherein the information is determined based on the detected triggering condition.

8. The computer system of claim 1, wherein the detected triggering condition includes activation of a link.

9. The computer system of claim 1, wherein the detected triggering condition includes detection of a physical object.

10. The computer system of claim 1, wherein the detected triggering condition includes detecting that the computer system is at a respective location.

11. The computer system of claim 1, wherein the detected triggering condition includes initiation of a search performed on the computer system.

12. The computer system of claim 1, the one or more programs further including instructions for:
subsequent to displaying the second user interface, displaying, via the display generation component, a home user interface that includes a plurality of application user interface objects corresponding to respective applications that are available on the computer system, wherein the home user interface does not include an application user interface object for launching the second user interface.

13. The computer system of claim 1, the one or more programs further including instructions for:
subsequent to displaying the second user interface, displaying, via the display generation component, a home user interface that includes a second selectable user interface object;
while displaying the second selectable user interface object, detecting, via the one or more input devices, activation of the second selectable user interface object; and
in response to detecting the activation of the second selectable user interface object, displaying, via the display generation component, an application user interface object for launching the second user interface.

14. The computer system of claim 13, the one or more programs further including instructions for:
in response to detecting the activation of the second selectable user interface object:
in accordance with a determination that a predetermined time period has passed since the second user interface was accessed on the computer system:
forgoing displaying, via the display generation component, the application user interface object for launching the second user interface; and
removing software for launching the second user interface from the computer system.

15. The computer system of claim 1, the one or more programs further including instructions for:
while a first application process corresponding to the second user interface has been recently used on the computer system, displaying, via the display generation component, a plurality of user interface preview items corresponding to applications that have been recently used on the computer system, wherein the plurality of user interface preview items includes a first user interface preview item corresponding to the second user interface.

16. The computer system of claim 15, the one or more programs further including instructions for:
while the first application process corresponding to the second user interface and a second application process corresponding to the second user interface have both been recently used on the computer system, wherein the first application process corresponds to a first instance of the second user interface and the second application process corresponds to a second instance of the second user interface, displaying, via the display generation component, the plurality of user interface preview items, wherein the plurality of user interface preview items includes the first user interface preview item corresponding to the first instance of the second user interface and a second user interface preview item corresponding to the second instance of the second user interface.

17. The computer system of claim 1, the one or more programs further including instructions for:
subsequent to displaying the second user interface that is configured to perform the activity without downloading at least the portion of the first application, displaying, via the display generation component, an application store user interface; and
concurrently displaying, in the application store user interface:
a third selectable user interface object that, when activated, initiates a process for downloading the first application onto the computer system, and
an indication that the second user interface was used on the computer system.

18. The computer system of claim 1, the one or more programs further including instructions for:
while displaying the second user interface, displaying, in the second user interface, a user interface element that includes an indication that the first application is available to be downloaded onto the computer system.

19. The computer system of claim 18, wherein the user interface element further includes a fourth selectable user interface object that, when activated, initiates a process for enabling a second computer system to access the second user interface to perform the activity without downloading at least the portion of the first application onto the second computer system.

20. The computer system of claim 1, wherein an application process corresponding to the second user interface is enabled to cause display of a notification that includes information related to performing the activity.

21. The computer system of claim 1, wherein the second user interface corresponds to software configured to perform the activity, the one or more programs further including instructions for:
in response to detecting the activation of the first selectable user interface object, setting one or more system privileges for the software to include permission, for a predetermined time period, to generate notifications on the computer system.

22. The computer system of claim 21, wherein detecting the activation of the first selectable user interface object occurred at a first time, the one or more programs further including instructions for:
at a second time after the first time, detecting the occurrence of a notification event corresponding to the second application; and
in response to detecting the occurrence of the notification event:
in accordance with a determination that the second time is within the predetermined time period from the first time, displaying, via the display generation component, a notification corresponding to the detected notification event; and in accordance with a determination that the second time is not within the predetermined time period from the first time, forgoing displaying, via the display generation component, the notification corresponding to the detected notification event.

23. The computer system of claim 21, wherein the predetermined time period is based on an amount of time that has elapsed since a predetermined type of user interaction was detected with respect to the second application.

24. The computer system of claim 1, the one or more programs further including instructions for:
while the first application is installed on the computer system:
detecting the occurrence of a second notification event; and
in response to detecting the occurrence of the second notification event:
in accordance with a determination that one or more system privileges for the first application include permission to generate a notification, displaying, via the display generation component, a notification corresponding to the detected second notification event; and
in accordance with a determination that the one or more system privileges for the first application do not include permission to generate the notification, forgoing displaying, via the display generation component, the notification corresponding to the detected second notification event.

25. A non-transitory computer-readable storage medium storing one or more programs configured to be executed by one or more processors of computer system that is in communication with a display generation component and one or more input devices, the one or more programs including instructions for:
detecting the occurrence of a triggering condition for initiating an activity that is associated with a first application;
in response to detecting the occurrence of the triggering condition, displaying, via the display generation component, a first user interface, wherein displaying the first user interface includes concurrently displaying:
a description of the activity, and
a first selectable user interface object for taking action associated with the activity;
while displaying the first user interface, detecting, via the one or more input devices, activation of the first selectable user interface object; and
in response to detecting the activation of the first selectable user interface object:
in accordance with a determination that the first application is not available on the computer system, displaying, via the display generation component, a second user interface that is configured to perform the activity without downloading at least a first portion of the first application, wherein the second user interface is generated based on a second portion of the first application that was downloaded after detecting occurrence of the triggering condition, and wherein the first portion of the first application is different from the second portion of the first application.

26. A method, comprising:
at a computer system that is in communication with a display generation component and one or more input devices:
detecting the occurrence of a triggering condition for initiating an activity that is associated with a first application;
in response to detecting the occurrence of the triggering condition, displaying, via the display generation component, a first user interface, wherein displaying the first user interface includes concurrently displaying:
a description of the activity, and
a first selectable user interface object for taking action associated with the activity;
while displaying the first user interface, detecting, via the one or more input devices, activation of the first selectable user interface object; and
in response to detecting the activation of the first selectable user interface object:
in accordance with a determination that the first application is not available on the computer system, displaying, via the display generation component, a second user interface that is configured to perform the activity without downloading at least a first portion of the first application, wherein the second user interface is generated based on a second portion of the first application that was downloaded after detecting occurrence of the triggering condition, and wherein the first portion of the first application is different from the second portion of the first application.

* * * * *

UNITED STATES PATENT AND TRADEMARK OFFICE
CERTIFICATE OF CORRECTION

| | | |
|---|---|---|
| PATENT NO. | : 11,175,929 B2 | Page 1 of 1 |
| APPLICATION NO. | : 17/030804 | |
| DATED | : November 16, 2021 | |
| INVENTOR(S) | : Zhang et al. | |

It is certified that error appears in the above-identified patent and that said Letters Patent is hereby corrected as shown below:

On the Title Page

Column 1, Item (72), (Inventors), after "Patrick L. Coffman, San Francisco, CA (US)," insert --Alan C. Dye, San Francisco, CA (US)--

Signed and Sealed this
Twenty-third Day of September, 2025

John A. Squires
*Director of the United States Patent and Trademark Office*